United States Patent
Zhang et al.

(10) Patent No.: US 11,431,464 B2
(45) Date of Patent: Aug. 30, 2022

(54) METHOD AND APPARATUS FOR UPLINK TRANSMISSION IN WIRELESS COMMUNICATION SYSTEM

(71) Applicant: Samsung Electronics Co., Ltd., Suwon-si (KR)

(72) Inventors: Yingjie Zhang, Beijing (CN); Chen Qian, Beijing (CN); Bin Yu, Beijing (CN); Qi Xiong, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/610,230

(22) PCT Filed: May 4, 2018

(86) PCT No.: PCT/KR2018/005223
§ 371 (c)(1),
(2) Date: Nov. 1, 2019

(87) PCT Pub. No.: WO2018/203727
PCT Pub. Date: Nov. 8, 2018

(65) Prior Publication Data
US 2020/0059390 A1   Feb. 20, 2020

(30) Foreign Application Priority Data

May 5, 2017 (CN) .......................... 201710313543.2
May 19, 2017 (CN) .......................... 201710365873.6
(Continued)

(51) Int. Cl.
*H04L 27/26* (2006.01)
*H04B 1/713* (2011.01)
(Continued)

(52) U.S. Cl.
CPC .......... *H04L 5/0092* (2013.01); *H04B 1/713* (2013.01); *H04J 13/0062* (2013.01);
(Continued)

(58) Field of Classification Search
CPC ... H04B 1/713; H04L 27/2607; H04L 5/0007; H04L 1/0003; H04L 27/2613;
(Continued)

(56) References Cited

U.S. PATENT DOCUMENTS

2009/0073944 A1   3/2009  Jiang et al.
2010/0222067 A1   9/2010  Hooli et al.
(Continued)

FOREIGN PATENT DOCUMENTS

| CN | 101217793 A | 7/2008 |
| CN | 101873712 A | 10/2010 |
| CN | 101873714 A | 10/2010 |

OTHER PUBLICATIONS

Takeda et al, "Understanding the Heart of the 5G Air Interface: An Overview of Physical Downlink Control Channel for 5G New Radio (NR)", IEEE 2020 (Year: 2020).*
(Continued)

*Primary Examiner* — Omer S Mian
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An embodiment of the present disclosure provides a base station, a user equipment (UE), and a method for uplink resource allocation and a method for uplink transmission, which are applied in the field of communication technologies. The method includes that: a base station allocates Bandwidth Part (BWP) resources and intra-BWP Physical
(Continued)

MSB                                                                                          LSB

| BWP indication information | Intra-BWP PRB indication information | Time domain indication information | Other information |

| Other information | BWP indication information | Intra-BWP PRB indication information | Time domain indication information | Other information |

| Other information 1 | BWP indication information | Intra-BWP PRB indication information | Time domain indication information | Other information 2 |

Resource Block (PRB) resources to a UE, and then transmits BWP resource indication information and intra-BWP PRB resource indication information to the UE. The BWP resource indication information is used for indicating the BWP resources allocated by the base station to the UE. The intra-BWP PRB resource indication information is used for indicating the intra-BWP PRB resources allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission.

9 Claims, 27 Drawing Sheets

(30) Foreign Application Priority Data

| Jun. 23, 2017 | (CN) | 201710488133.1 |
|---|---|---|
| Sep. 29, 2017 | (CN) | 201710911763.5 |
| Apr. 3, 2018 | (CN) | 201810291338.5 |
| Apr. 16, 2018 | (CN) | 201810339204.6 |

(51) Int. Cl.

| *H04L 5/00* | (2006.01) |
|---|---|
| *H04L 1/00* | (2006.01) |
| *H04W 72/14* | (2009.01) |
| *H04J 13/00* | (2011.01) |
| *H04W 74/08* | (2009.01) |

(52) U.S. Cl.
CPC ........ *H04L 1/0004* (2013.01); *H04L 27/2607* (2013.01); *H04W 72/14* (2013.01); *H04W 74/0833* (2013.01)

(58) Field of Classification Search
CPC ... H04L 1/0004; H04L 5/0092; H04L 1/0025; H04L 1/0028; H04L 1/0007; H04L 1/0072; H04L 27/26136; H04J 13/0062; H04J 2211/005; H04J 2011/0016; H04W 72/14; H04W 74/0833; H04W 72/044
See application file for complete search history.

(56) References Cited

U.S. PATENT DOCUMENTS

| 2010/0322174 | A1 | 12/2010 | Ji et al. | |
|---|---|---|---|---|
| 2015/0078264 | A1 | 3/2015 | Han et al. | |
| 2016/0119887 | A1 | 4/2016 | Charipadi et al. | |
| 2017/0055297 | A1 | 2/2017 | Da | |
| 2019/0357303 | A1* | 11/2019 | Xiong | H04W 56/001 |
| 2020/0022127 | A1* | 1/2020 | Li | H04L 5/0037 |
| 2020/0059345 | A1* | 2/2020 | Pelletier | H04L 1/1657 |

OTHER PUBLICATIONS

Liu, "Design aspects on physical layer structure for 5G V2X and related issues", IEEE 2021 (Year: 2021).*
International Telecommunication Union; SWG Traffic; Working Document Towards a Preliminary Draft New Report ITU-R M.[IMT. Beyond2020.Traffic]; IMT Traffic estimates beyond year 2020; Radiocommunication Study Groups; Document 5D/TEMP/466-E; Oct. 21, 2014.
International Telecommunication Union; IMT Vision—Framework and overall objectives of the future development of IMT for 2020 and beyond; ITU-R; Radiocommunication Sector of ITU; Recommendation ITU-R M.2083-0; M Series Mobile, radiodetermination, amateur and related satellite services; Sep. 2015.
International Telecommunication Union; Future technology trends of terrestrial IMT systems; ITU-R Radiocommunication Sector of ITU; Report Itu-R M.2320-0; M Series Mobile, radiodetermination, amateur and related satellite services; Nov. 2014.
3GPP; 3rd Generation Partnership Project; Technical Specification Group Radio Access Network; Evolved Universal Terrestrial Radio Access (E-UTRA); Physical layer procedures (Release 15); 3GPP TS 36.213; V15.0.0; Dec. 2017; Valbonne, France.
3GPP; 3rd Generation Partnership Project; Technical Specification Group Radio Access Network; Evolved Universal Terrestrial Radio Access (E-UTRA); Physical channels and modulation (Release 15); 3GPP TS 36.211; V15.0.0 Dec. 2017; Valbonne, France.
Huawei et al.; WF on bandwidth part; 3GPP TSG RAN WG1 Meeting #88bis; R1-1706582; Apr. 3-7, 2017; Spokane, USA.
Qualcomm Incorporated; Synchronization signal bandwidth and sequence design; 3GPP TSG-RAN WG1 #88bis; R1-1705564; Apr. 3-7, 2017; Spokane, USA.
Mediatek et al.; Way Forward on bandwidth part in NR; 3GPP TSG-RAN WG1 #88bis; R1-1706666; Apr. 3-7, 2017 Spokane, USA.
CATT; On NR Rach Preamble Design; 3GPP TSG RAN WG1 Meeting #88bis; R1-1706183; Apr. 3-7, 2017 Spokane, USA.
NTT Docomo et al.: 11 Resource allocation for DL/UL data, 3GPP Draft; RI-1705746, 3rd Generation Partnership Project (3GPP), Mobile Competence Centre; 650, Route Des Lucioles, F-06921 Sophia-Antipolis Cedex, France, vol. RAN WGI, No. Spokane, USA; Apr. 3, 2017-Apr. 7, 2017, Apr. 2, 2017 (Apr. 2, 2017), XP051243861.
Huawei et al: "Resource allocation and indication for data channel", 3GPP Draft; RI-1705069, 3rd Generation Partnership Project (3GPP), Mobile Competence Centre; 650, Route Des Lucioles ; F-06921 Sophia-Antipolis Cedex, France, vol. RAN WGI, No. Spokane, USA, Apr. 3, 2017-Apr. 7, 2017, Apr. 2, 2017 (Apr. 2, 2017), XP051243200.
Interdigital et al: "On data resource 1-7 ,15 allocation for NR", 3GPP Draft; RI-1716482 On Data Resource Allocation for NR, 3rd Generation Partnership Project (3GPP), Mobile Competence Centre; 650, Route Des Lucioles ; F-06921 Sophia-Antipolis Cedex, France vol. RAN WGI, No. Nagoya, Japan; Sep. 18, 2017-Sep. 21, 2017, Sep. 17, 2017 (Sep. 17, 2017), XP051339935.
NEC: 11 Frequency and time resource allocation schemes for NR 11, 3GPP Draft; RI-1707200 Freq-Time Resource Allocation Schemes VIB, 3rd Generation Partnership Project (3GPP), Mobile Competence Centre; 650, Route Des Lucioles, F-06921 Sophia-Antipolis Cedex, France, vol. RAN WGI, No. Hangzhou; May 15, 2017-May 19, 2017, May 14, 2017 (May 14, 2017), XP051272415.
Partial Supplementary European Search Report dated Apr. 2, 2020, issued in European Application No. 18795091.0.
Alcatel Lucent: "A New Cyclic Shirt Restriction Set for very High speed Cells", 3GPP Draft; R4-154364 Prach Cyclic Shift Restriction Set, 3rd Generation Partnership Project (3GPP), Mobile Competence Centre; 650, Route Des Lucioles, F-06921 Sophia-Antipolis Cedex, France, vol. RAN WG4, No. Beijing, China; Aug. 24, 2015-Aug. 28, 2015, Aug. 23, 2015 (Aug. 23, 2015) XP051040520.
Extended European Search Report dated Jul. 14, 2020, issued in European Application. No. 18795091.0.
Motorola, "Clarification of PRACH cyclic shift configuration parameter", 3GPP TSG-RAN-WG1 Meeting #57, R1-092179, May 4-8, 2009, San Francisco, U.S.A.
Chinese Office Action dated Sep. 3, 2021, issued in Chinese Patent Application No. 201710488133.1.
Chinese Office Action dated May 6, 2022, issued in Chinese Patent Application No. 201710488133.1.
European Office Action dated Jun. 22, 2022, issued in European Patent Application No. 18795091.0.

* cited by examiner

[Fig. 1]
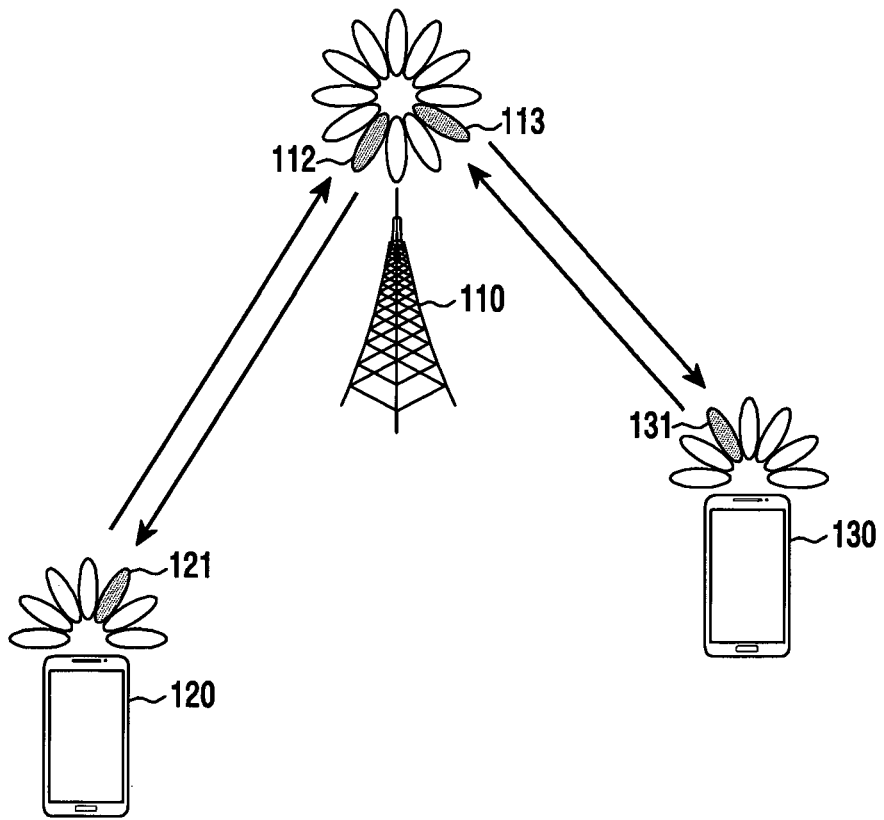
[Fig. 2]
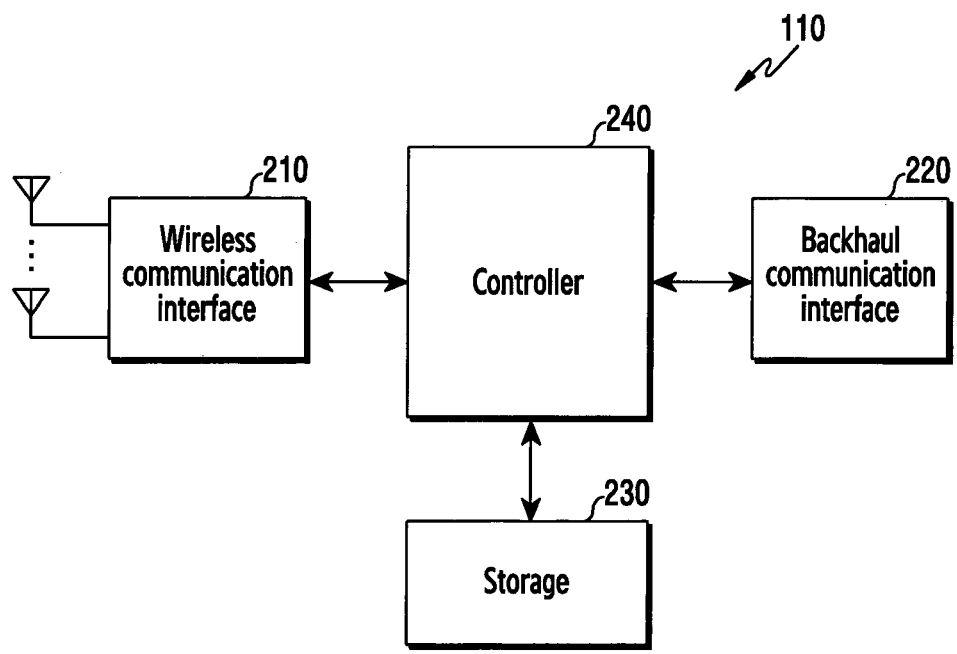

[Fig. 3]
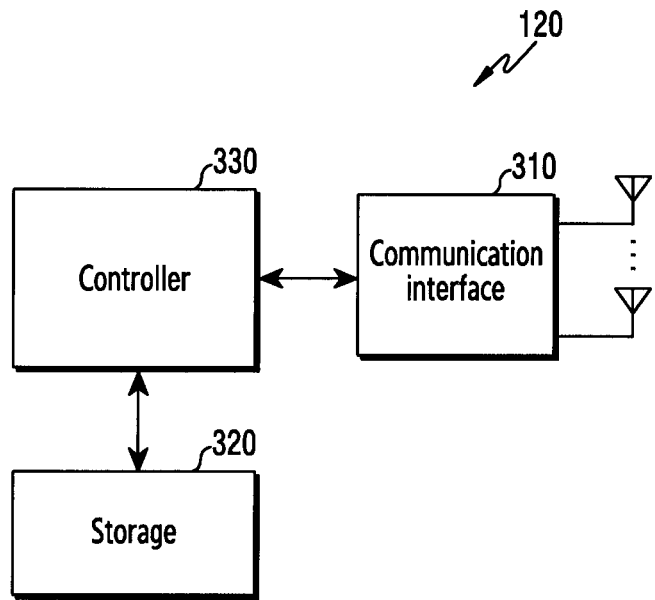
[Fig. 4]
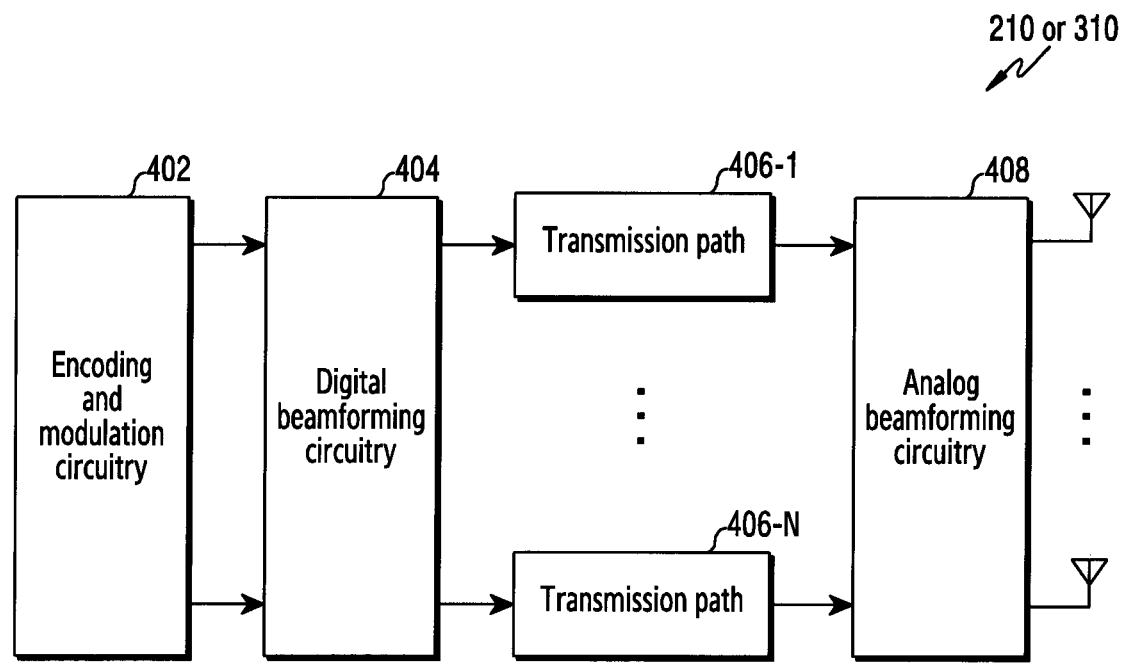

[Fig. 5]
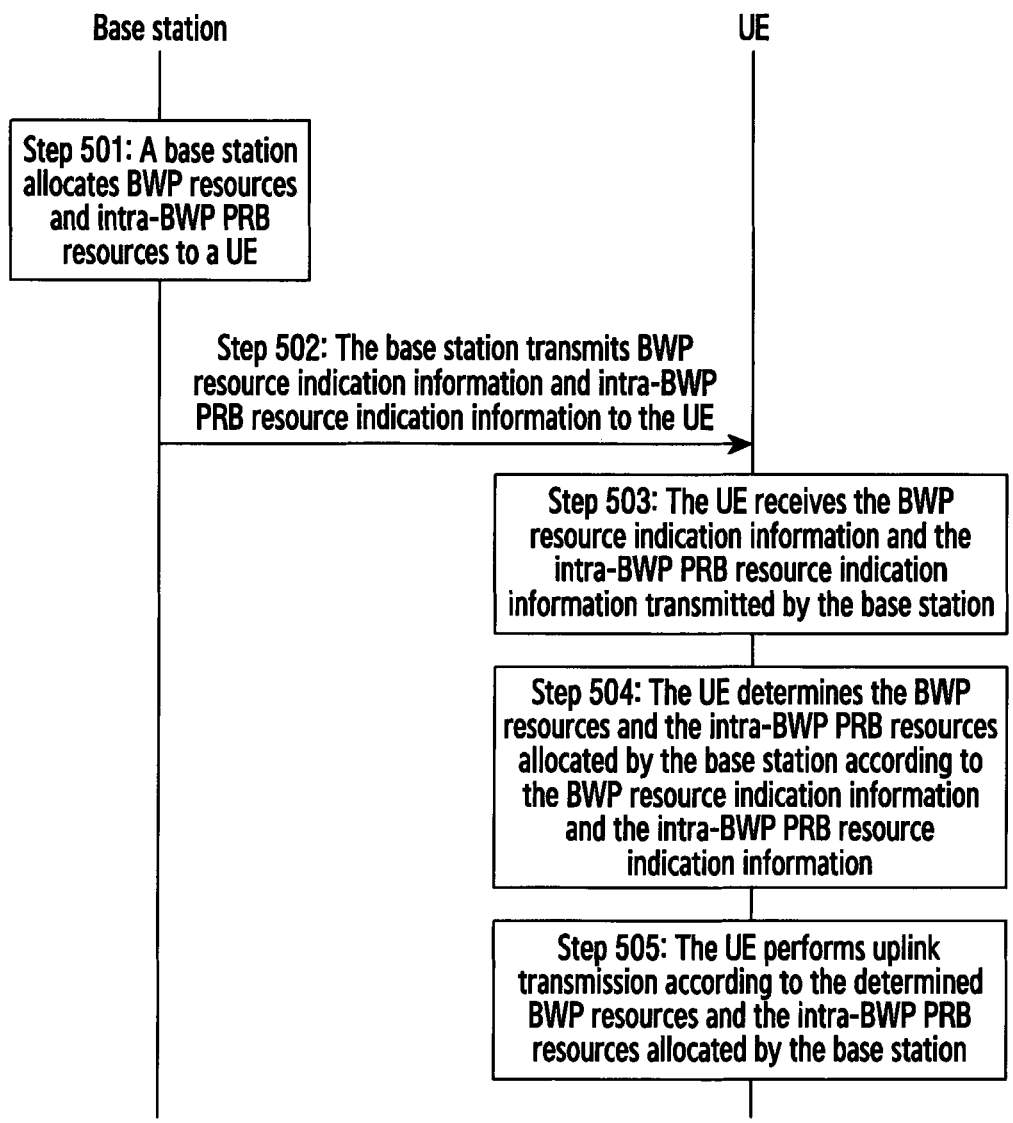

[Fig. 6]

MSB | | | | | LSB

| BWP indication information | Intra-BWP PRB indication information | Other information |
|---|---|---|

| Other information | BWP indication information | Intra-BWP PRB indication information |
|---|---|---|

| Other information 1 | BWP indication information | Intra-BWP PRB indication information | Other information 2 |
|---|---|---|---|

[Fig. 7]

MSB | | | | | LSB

| BWP indication information | Other information | Intra-BWP PRB indication information |
|---|---|---|

| BWP indication information | Other information 1 | Intra-BWP PRB indication information | Other information 2 |
|---|---|---|---|

| Other information 1 | BWP indication information | Other information 2 | Intra-BWP PRB indication information |
|---|---|---|---|

| Other information 1 | BWP indication information | Other information 2 | Intra-BWP PRB indication information | Other information 3 |
|---|---|---|---|---|

[Fig. 8]

MSB  LSB

| Intra-BWP PRB indication information | BWP indication information | Other information |

| Other information | Intra-BWP PRB indication information | BWP indication information |

| Other information 1 | Intra-BWP PRB indication information | BWP indication information | Other information 2 |

[Fig. 9]

MSB  LSB

| Intra-BWP PRB indication information | Other information | BWP indication information |

| Intra-BWP PRB indication information | Other information 1 | BWP indication information | Other information 2 |

| Other information 1 | Intra-BWP PRB indication information | Other information 2 | BWP indication information |

| Other information 1 | Intra-BWP PRB indication information | Other information 2 | BWP indication information | Other information 3 |

[Fig. 10]
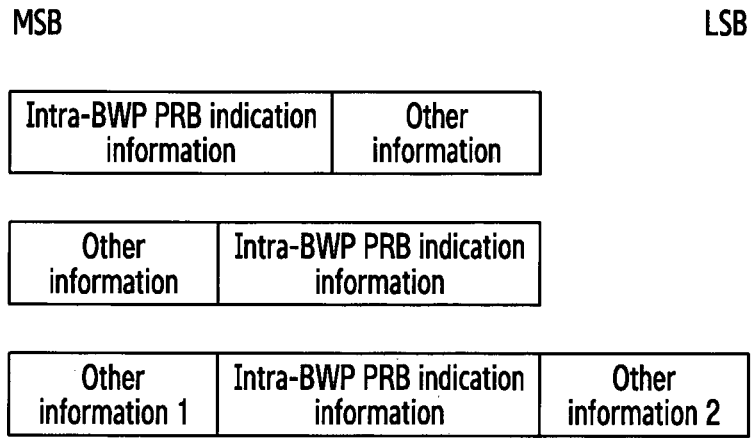
[Fig. 11]
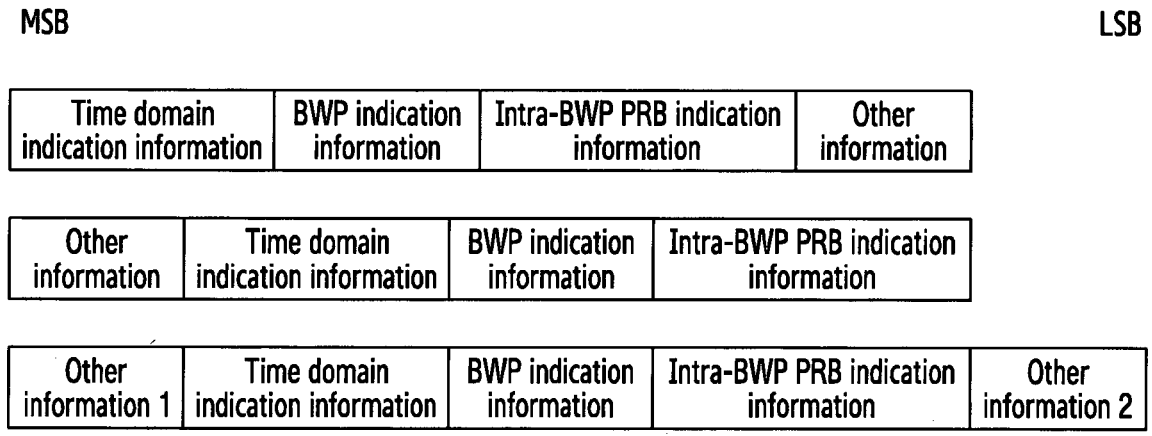

[Fig. 12]

MSB | | | | LSB

| Time domain indication information | Intra-BWP PRB indication information | BWP indication information | Other information |

| Other information | Time domain indication information | Intra-BWP PRB indication information | BWP indication information |

| Other information 1 | Time domain indication information | Intra-BWP PRB indication information | BWP indication information | Other information 2 |

[Fig. 13]

MSB | | | | LSB

| BWP indication information | Intra-BWP PRB indication information | Time domain indication information | Other information |

| Other information | BWP indication information | Intra-BWP PRB indication information | Time domain indication information | Other information |

| Other information 1 | BWP indication information | Intra-BWP PRB indication information | Time domain indication information | Other information 2 |

[Fig. 14]

MSB | | | | LSB

| Intra-BWP PRB indication information | BWP indication information | Time domain indication information | Other information |

| Other information | Intra-BWP PRB indication information | BWP indication information | Time domain indication information |

| Other information 1 | Intra-BWP PRB indication information | BWP indication information | Time domain indication information | Other information 2 |

[Fig. 15]
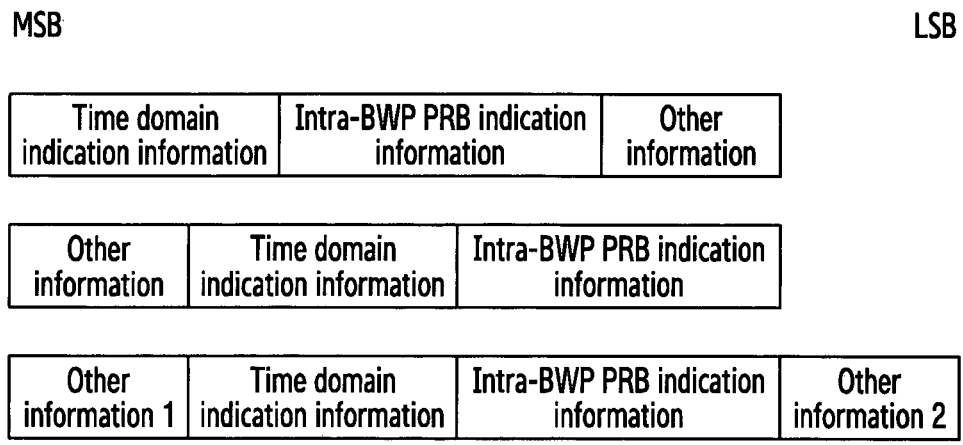
[Fig. 16]
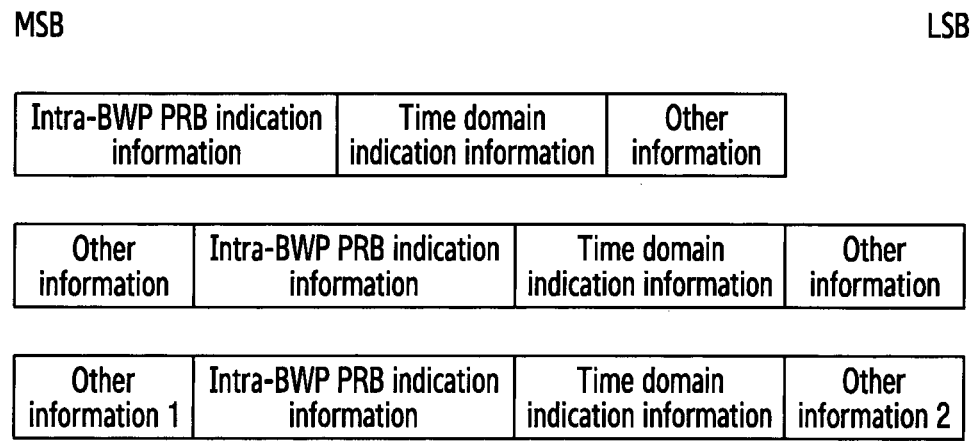

[Fig. 17]
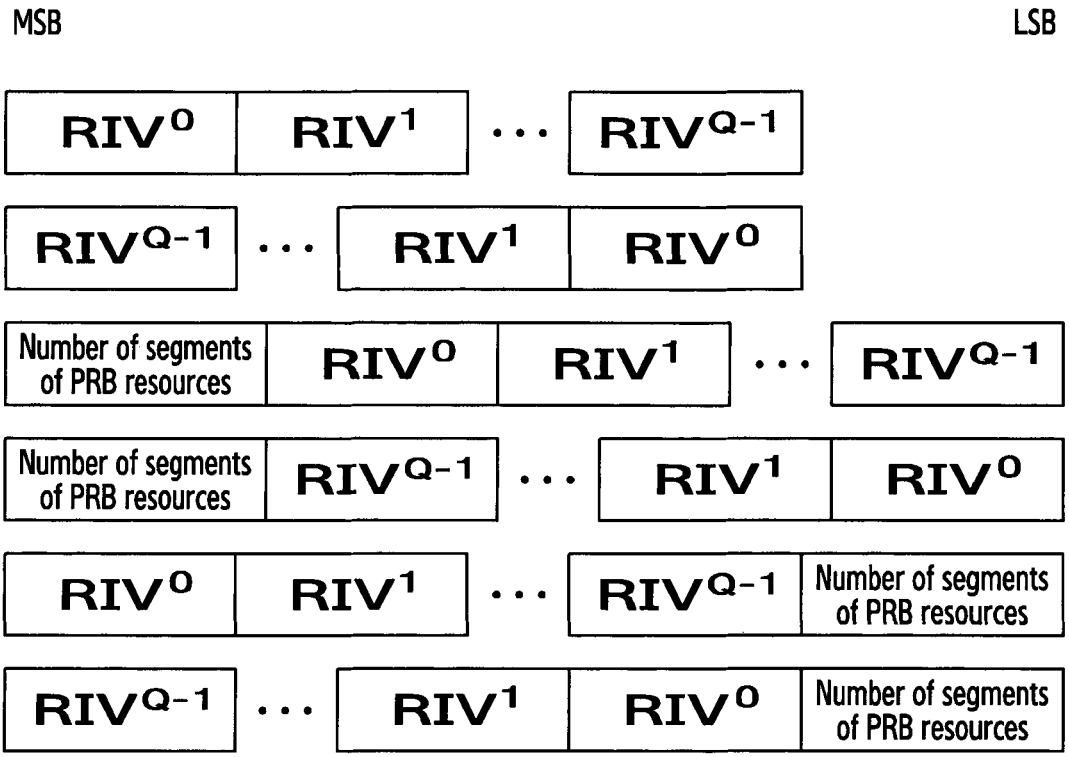
[Fig. 18]
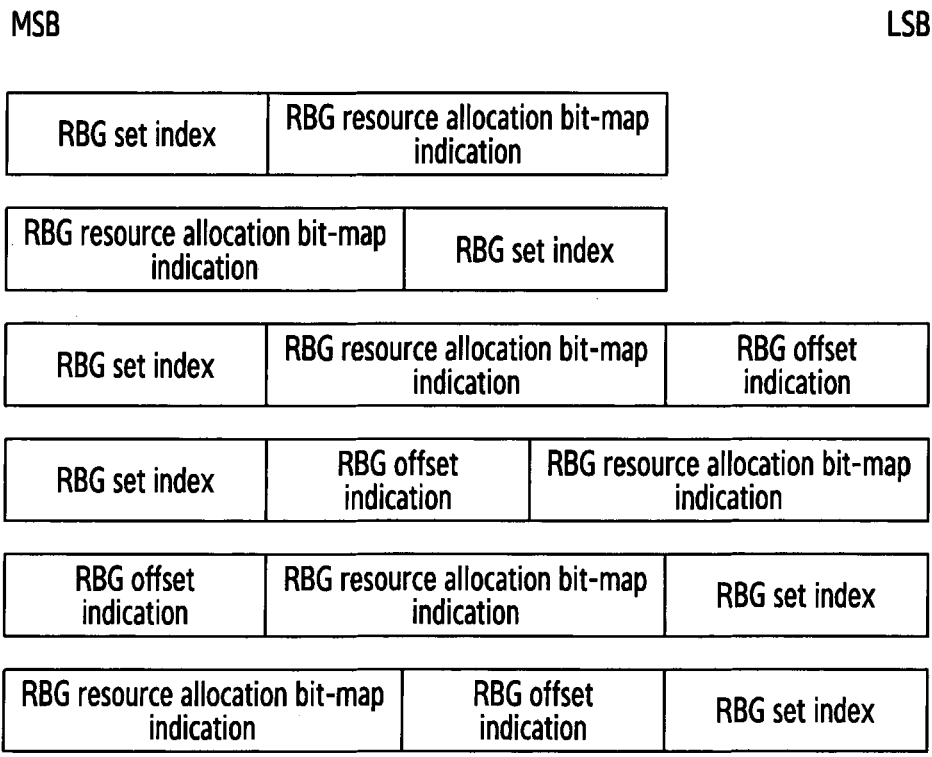

[Fig. 19]
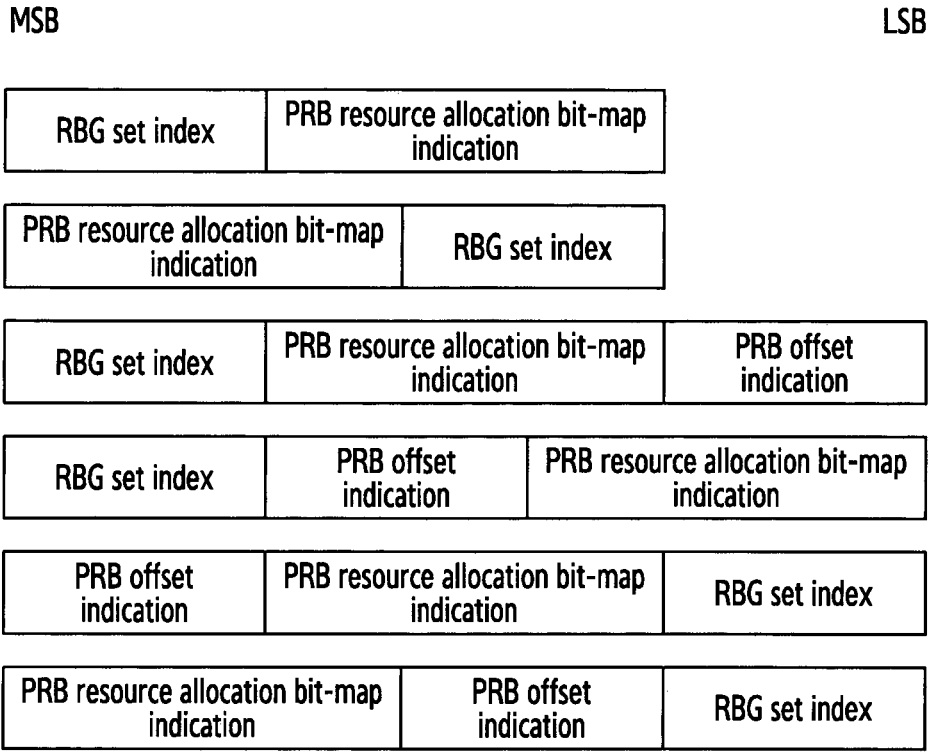
[Fig. 20]
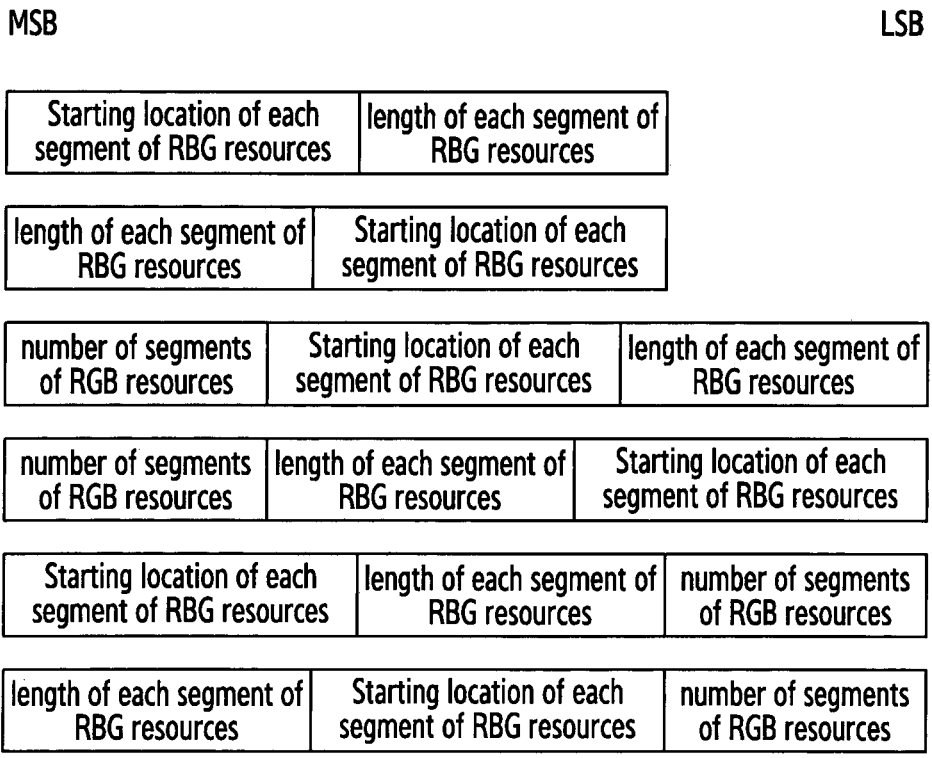

[Fig. 21]

MSB                                                                                                              LSB

| Starting location of each segment of PRB resources | length of each segment of PRB resources | |
|---|---|---|

| length of each segment of PRB resources | Starting location of each segment of PRB resources | |
|---|---|---|

| number of segments of PRB resources | Starting location of each segment of PRB resources | length of each segment of PRB resources |
|---|---|---|

| number of segments of PRB resources | length of each segment of PRB resources | Starting location of each segment of PRB resources |
|---|---|---|

| Starting location of each segment of PRB resources | length of each segment of PRB resources | number of segments of PRB resources |
|---|---|---|

| length of each segment of PRB resources | Starting location of each segment of PRB resources | number of segments of PRB resources |
|---|---|---|

[Fig. 22]
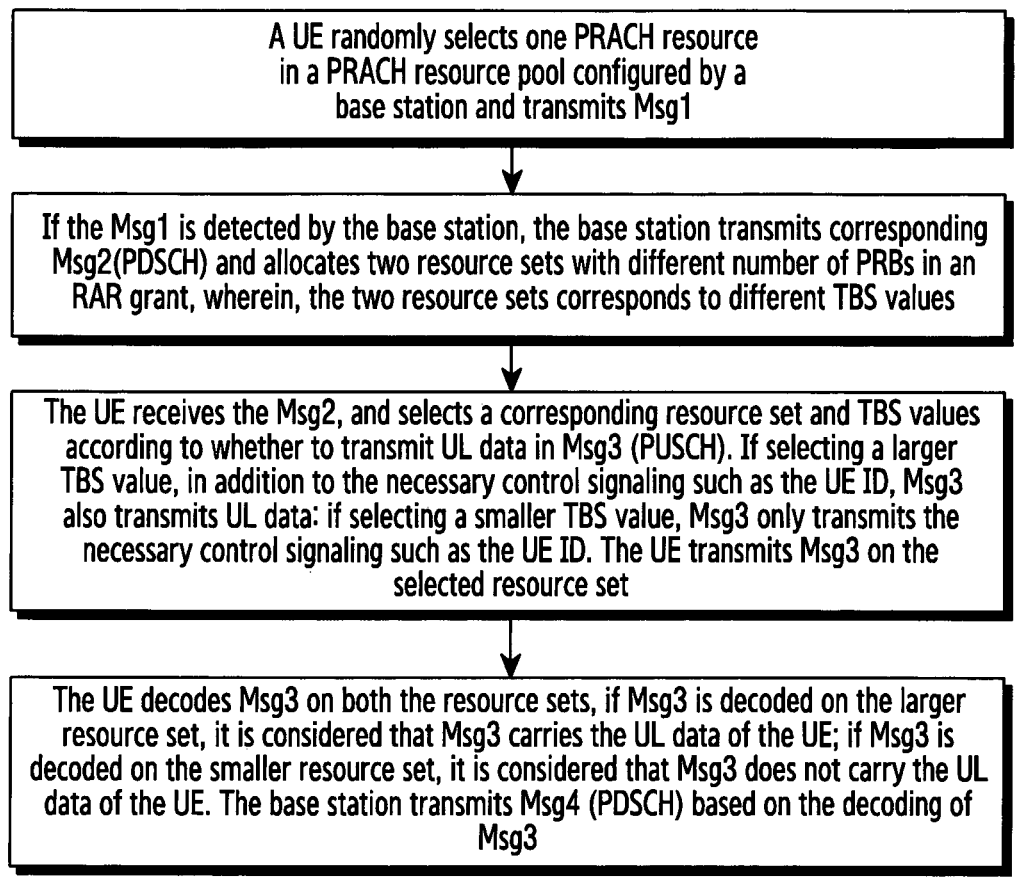

[Fig. 23]
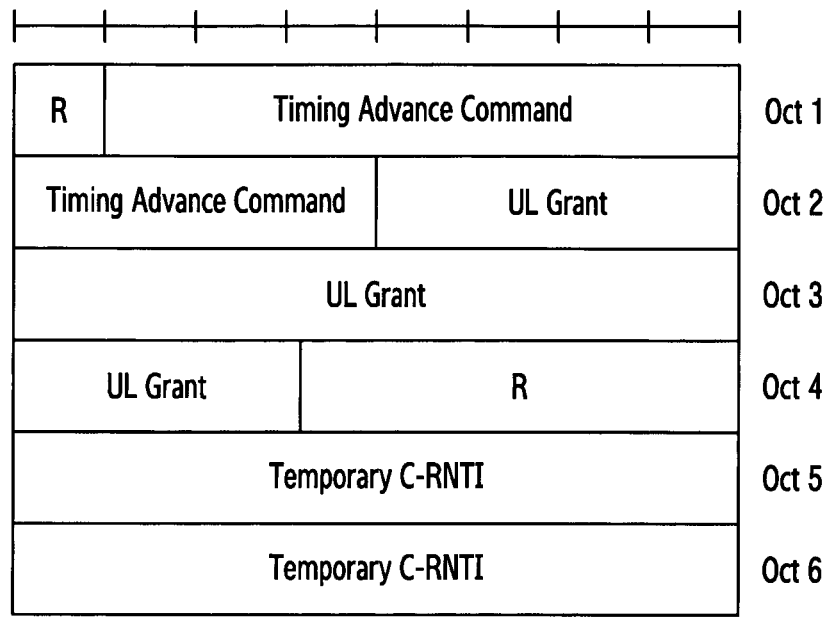
[Fig. 24]
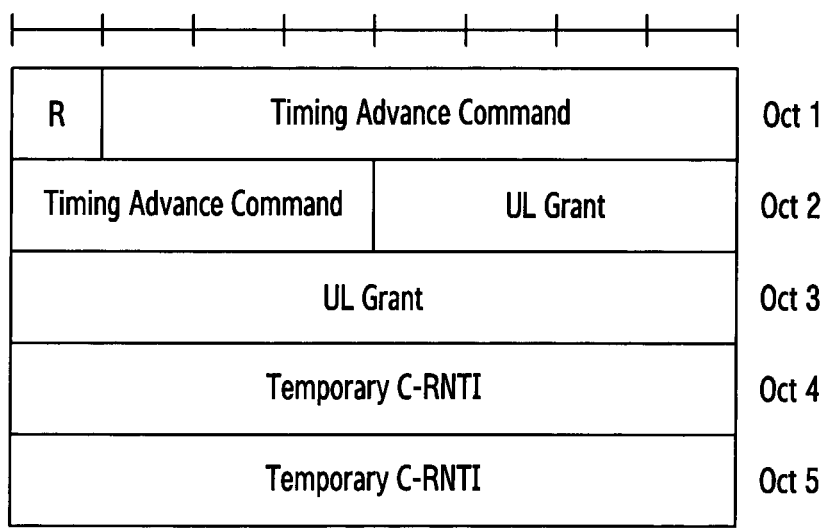

[Fig. 25]
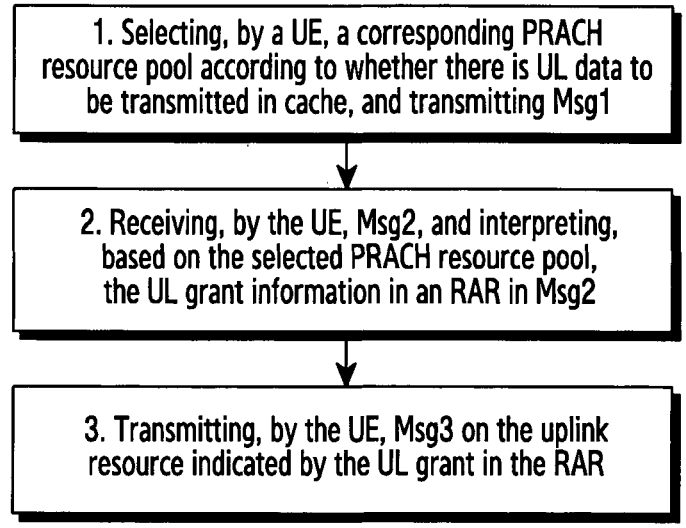
[Fig. 26]
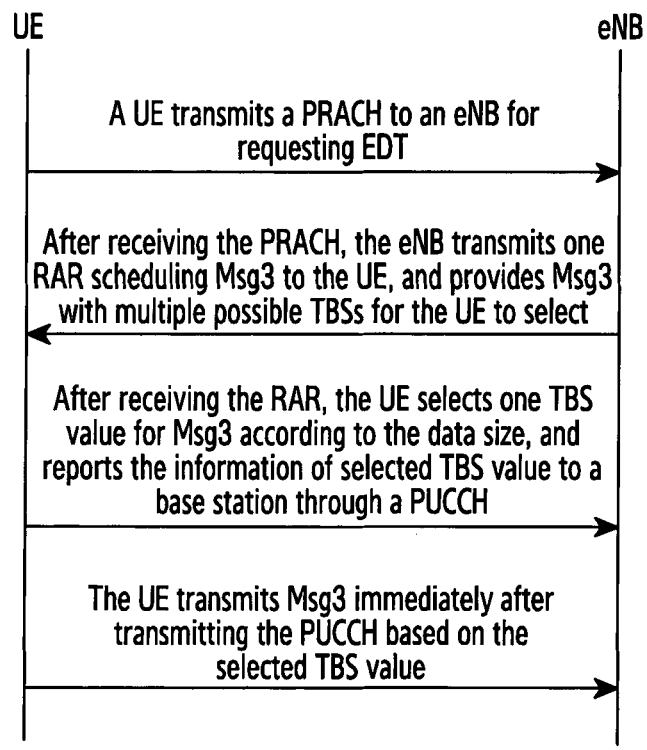

[Fig. 27]
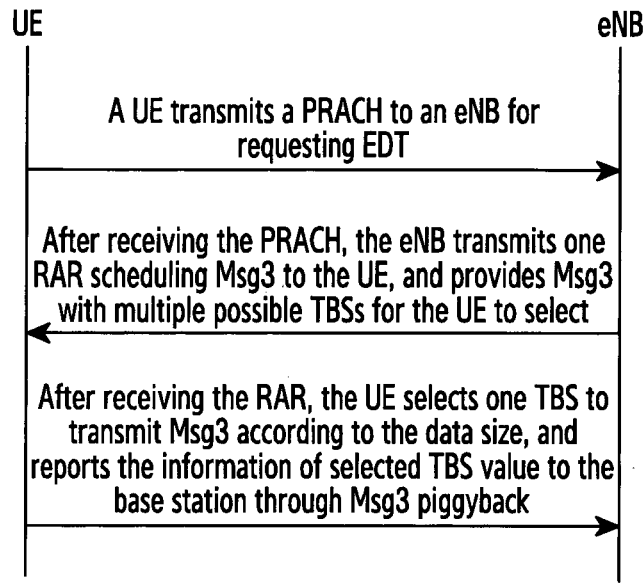
[Fig. 28]
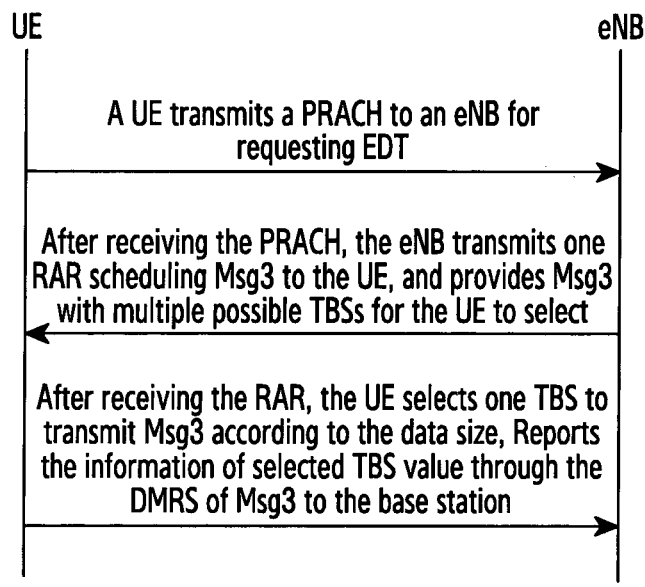

[Fig. 29]
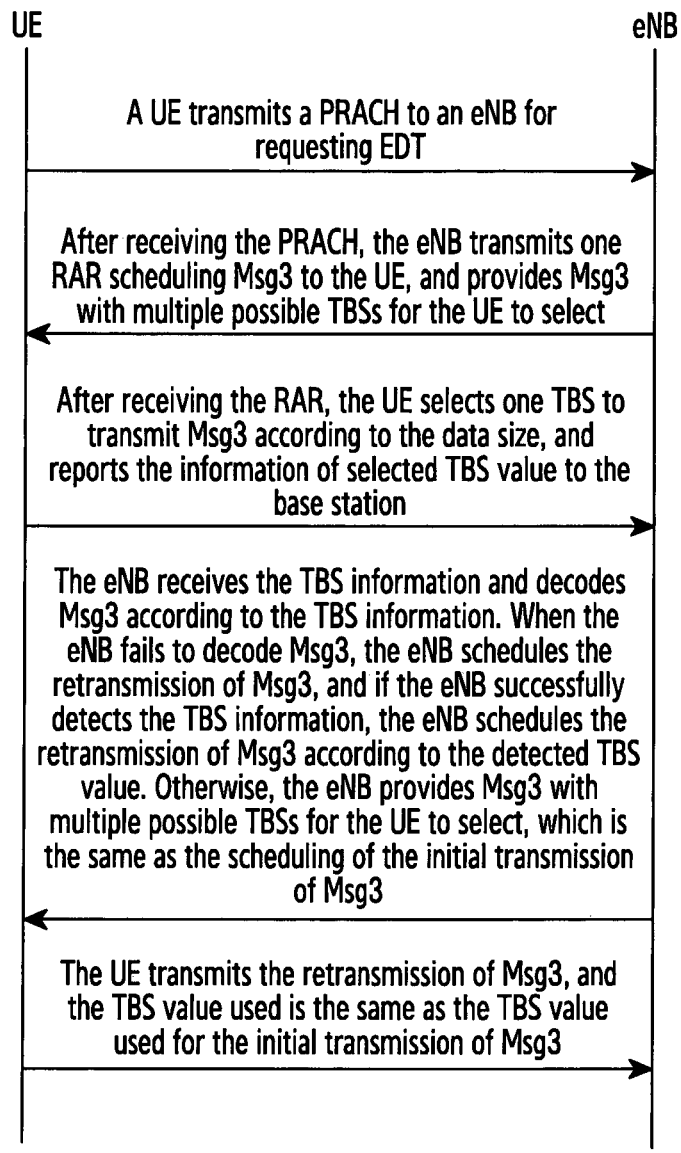

[Fig. 30]
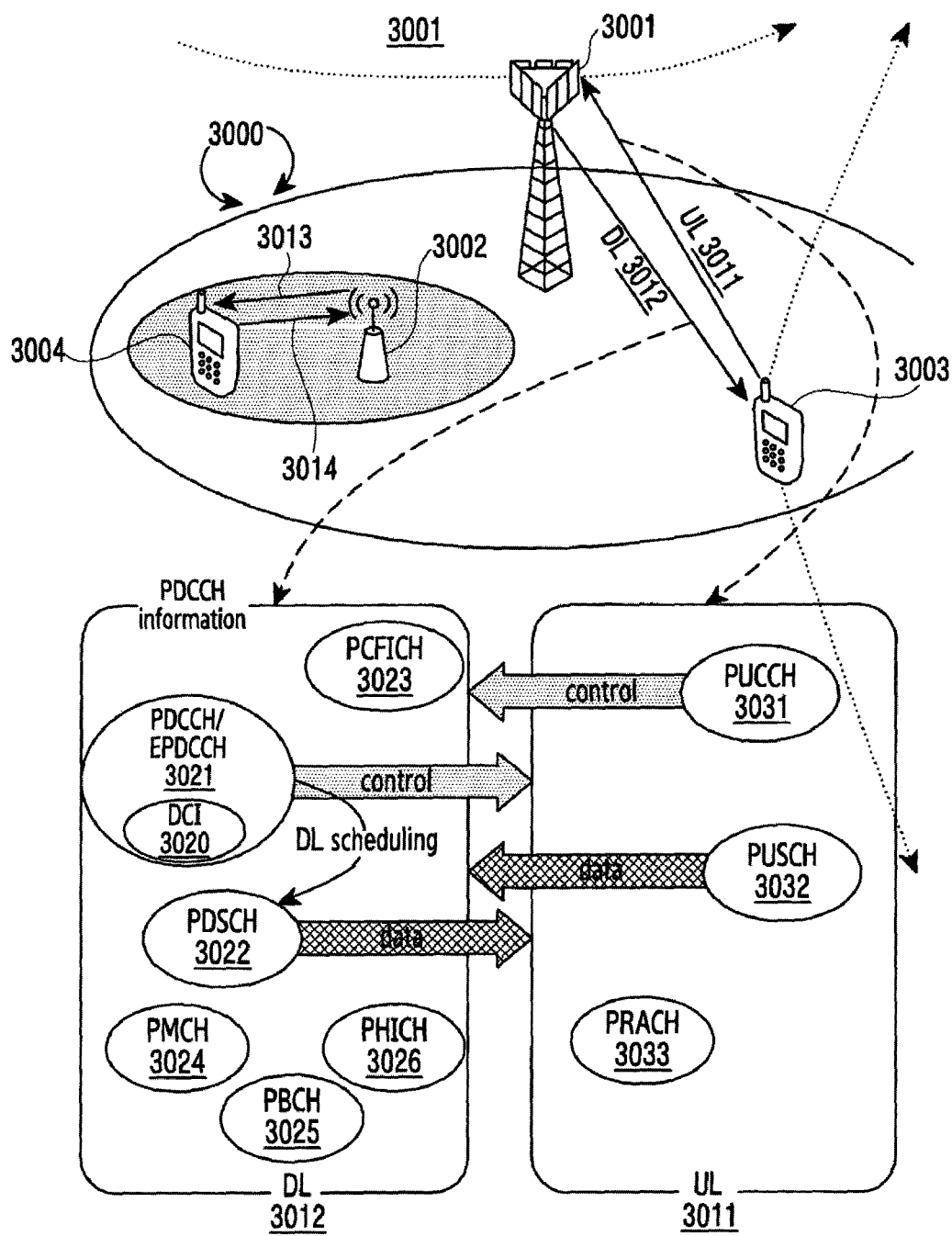

[Fig. 31]
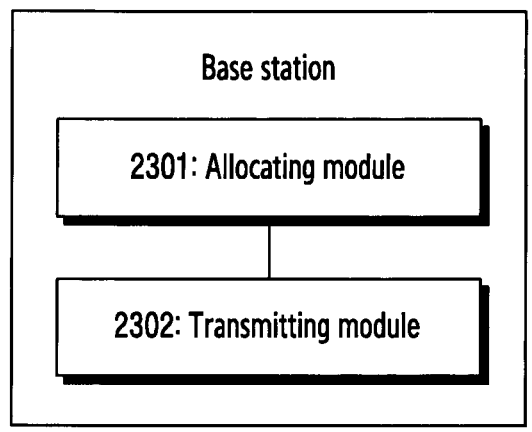
[Fig. 32]
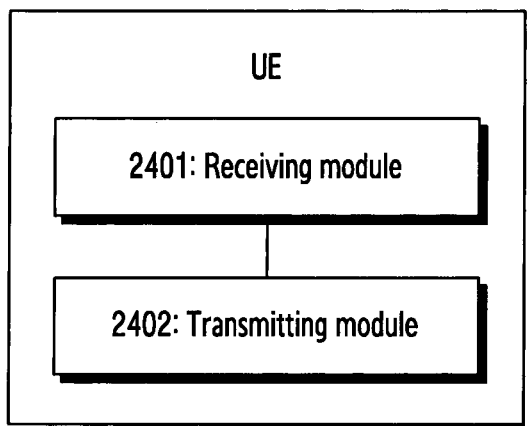

[Fig. 33]
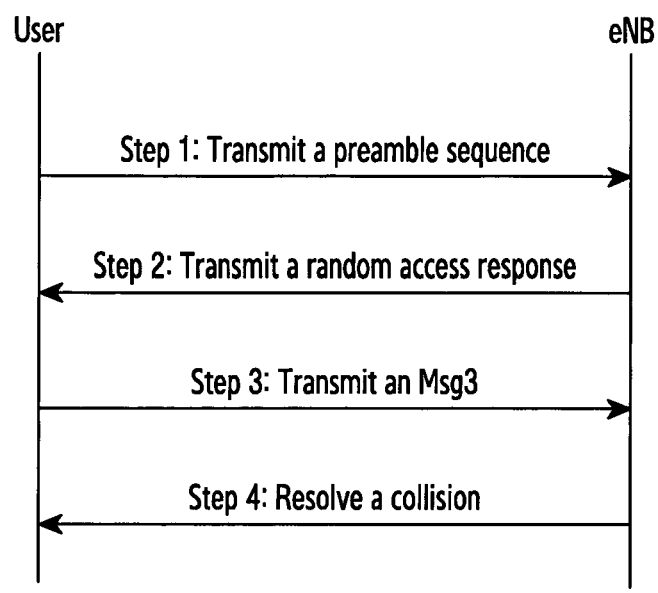

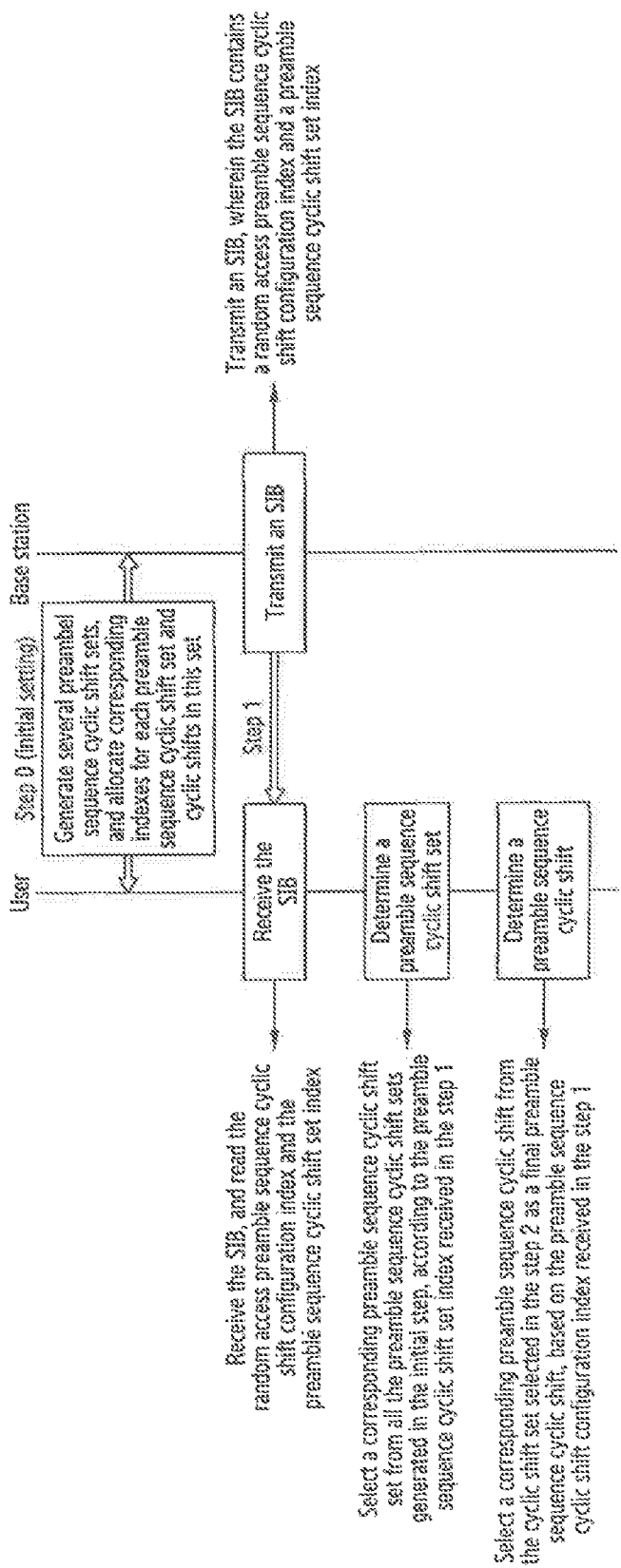
[Fig. 34]

[Fig. 35]
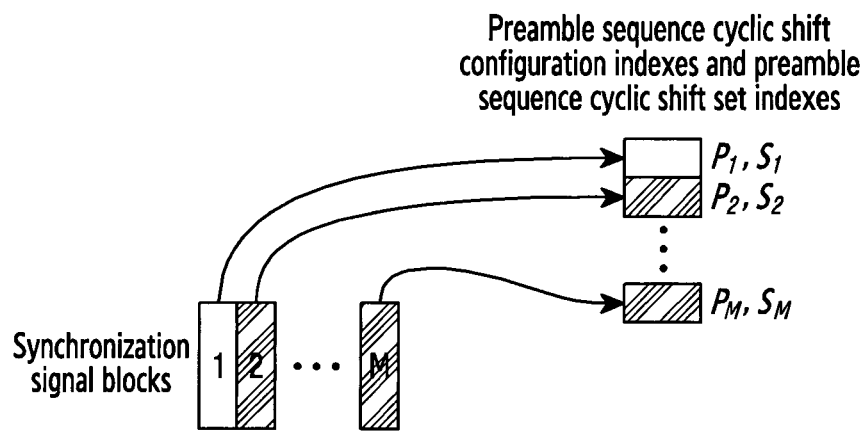
[Fig. 36]
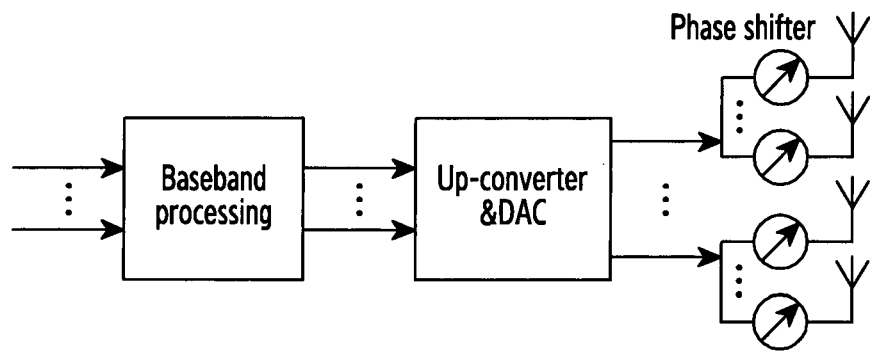
[Fig. 37]
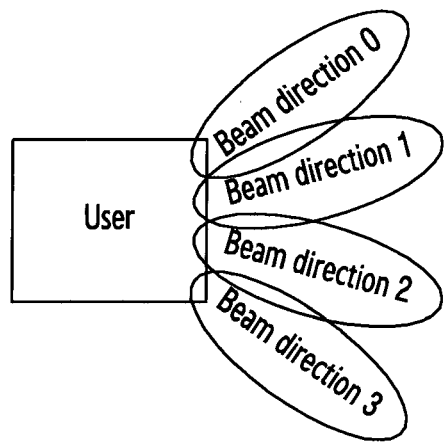

[Fig. 38]
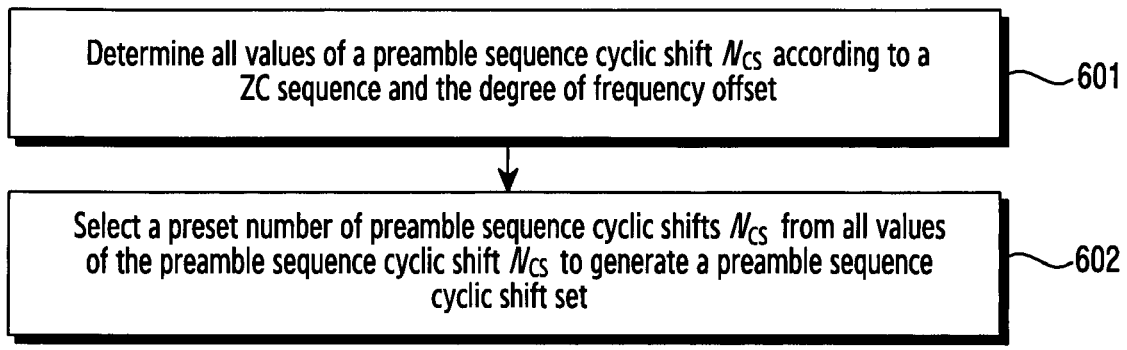
[Fig. 39]
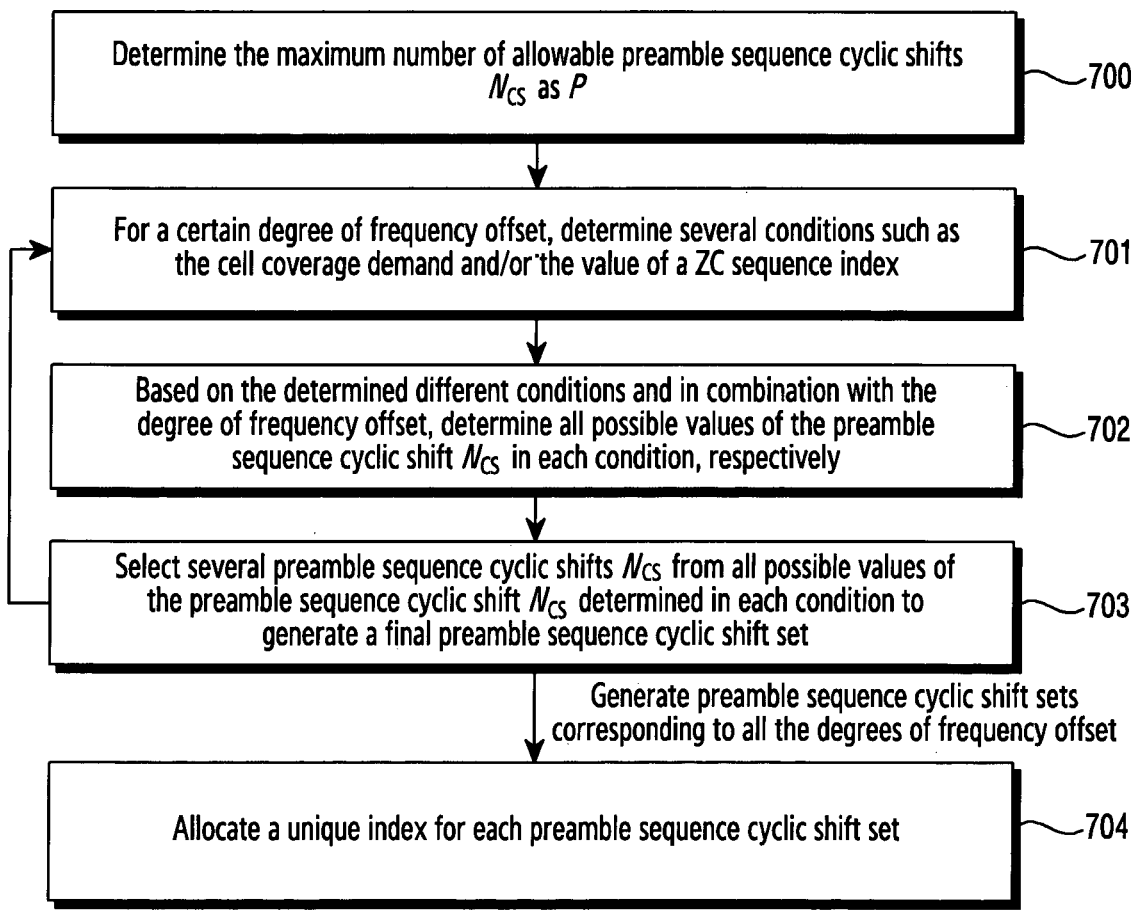

[Fig. 40]
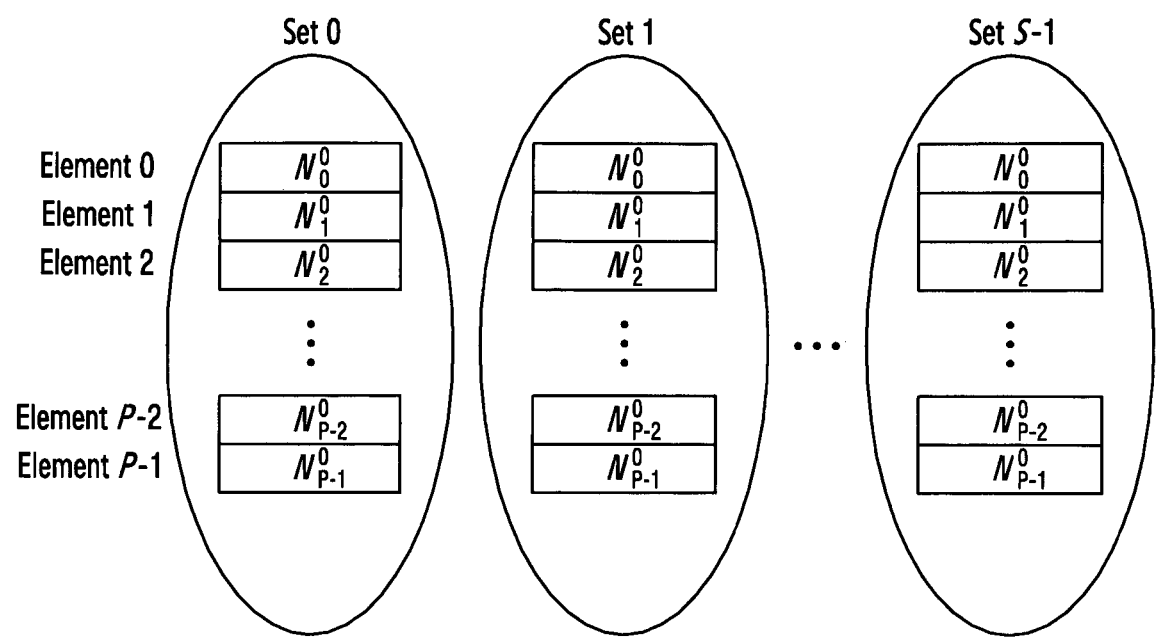

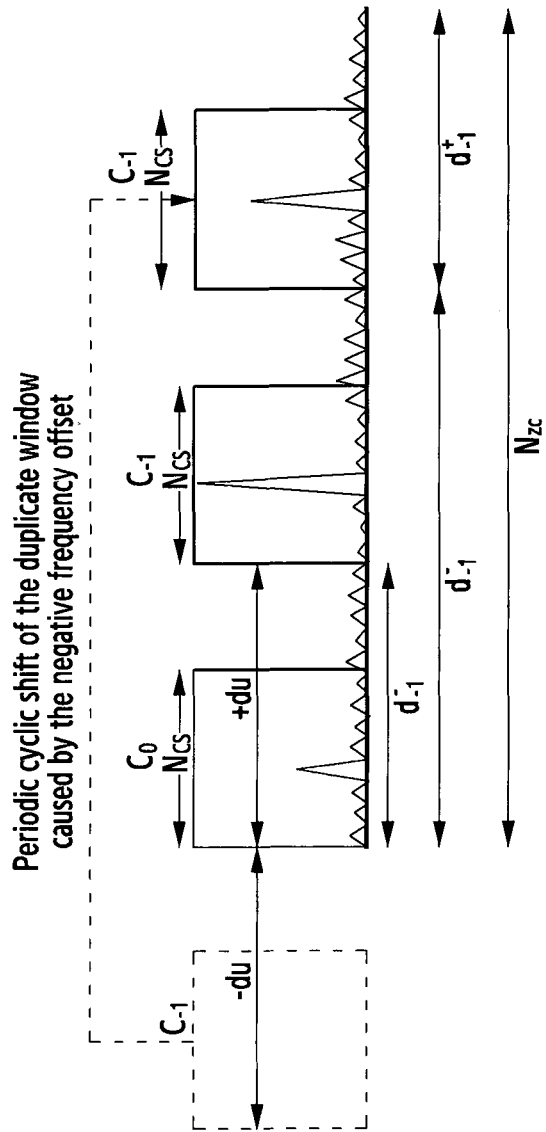
[Fig. 41]

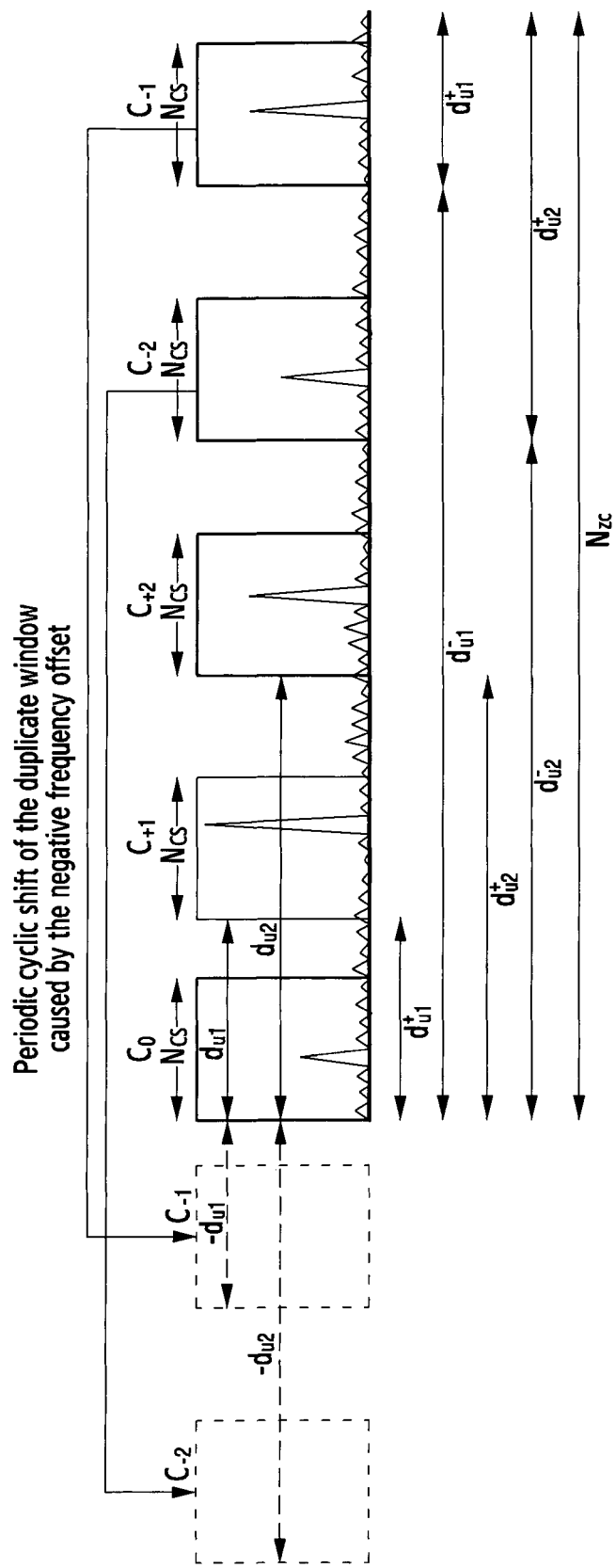
[Fig. 42]

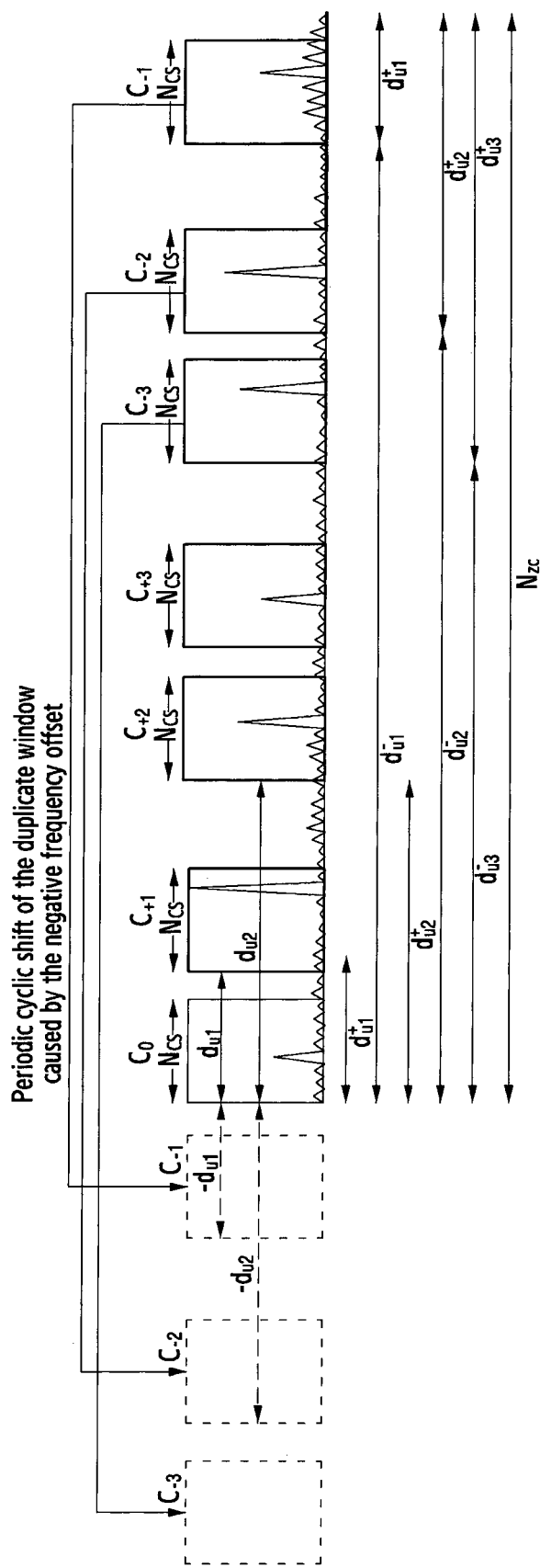
[Fig. 43]

[Fig. 44]
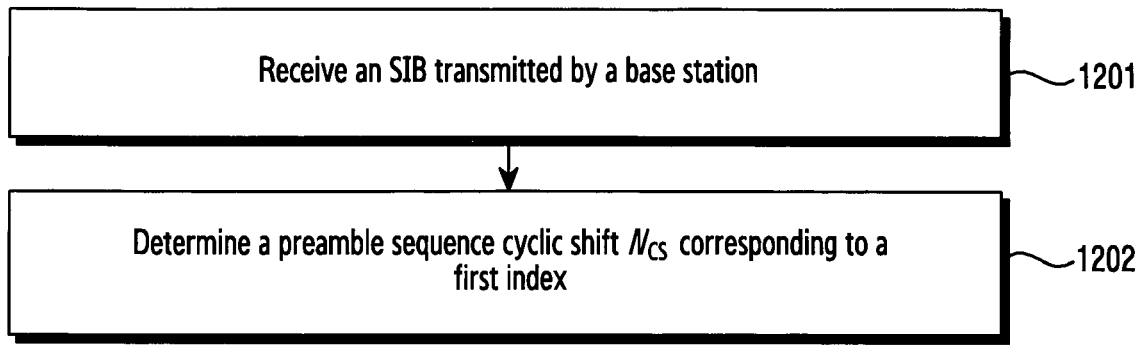
[Fig. 45]
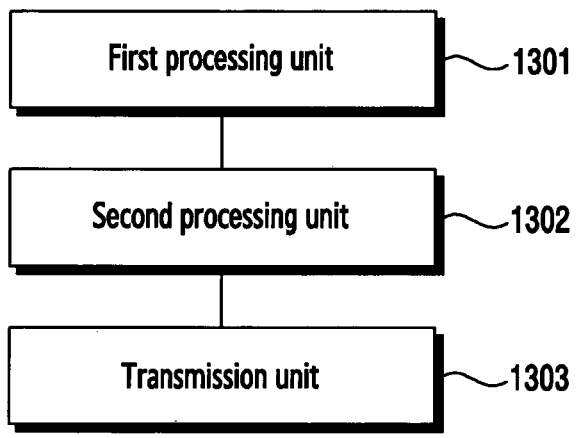
[Fig. 46]
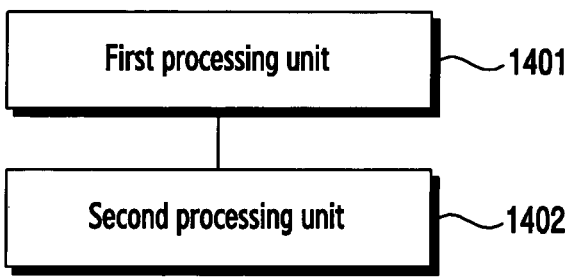

METHOD AND APPARATUS FOR UPLINK TRANSMISSION IN WIRELESS COMMUNICATION SYSTEM

TECHNICAL FIELD

The present disclosure relates to a wireless communication system, and in particular to method and apparatus for uplink transmission in wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In various scenarios of a wireless communication system such as the 5G system, in order to perform uplink transmission, random access procedure and an uplink resource allocation is required for a user equipment (UE).

DISCLOSURE OF INVENTION

Technical Problem

An aspect of the present disclosure is to provide method and apparatus for uplink transmission in wireless communication system.

Another aspect of the present disclosure is to provide method and apparatus for random access procedure and an uplink resource allocation in wireless communication system.

Solution to Problem

In order to overcome the above technical problems or at least partially solve the above technical problems, the following technical solutions are proposed:

An embodiment of the present disclosure provides, according to one aspect, a method for uplink resource allocation, which is executed by a base station and includes the following steps of:

allocating BWP resources within the whole bandwidth and intra-BWP PRB resources to a UE; and transmitting BWP resource indication information and intra-BWP PRB resource indication information to the UE, wherein, the BWP resource indication information is used for indicating the BWP resources that is allocated by the base station to the UE, and the intra-BWP PRB resource indication information is used for indicating the intra-BWP PRB resources which is allocated by the base station to the UE.

According to another aspect, an embodiment of the present disclosure further provides a method for uplink transmission, which is executed by a UE and includes the following steps of:

receiving BWP resource indication information and intra-BWP PRB resource indication information transmitted by a base station;

determining the BWP resources and the intra-BWP PRB resources allocated by the base station according to the BWP resource indication information and the intra-BWP PRB resource indication information; and performing uplink transmission according to the determined BWP resources and the intra-BWP PRB resources allocated by the base station.

According to still another aspect, an embodiment of the present disclosure further provides a base station, including:

an allocating module, configured to allocate BWP resources and intra-BWP PRB resources to a UE;

a transmitting module, configured to transmit BWP resource indication information and intra-BWP PRB resource indication information to the UE, wherein, the BWP resource indication information is used for indicating the BWP resources allocated by the base station to the UE, and the intra-BWP PRB resource indication information is used for indicating the intra-BWP PRB resources allocated by the base station to the UE.

According to still another aspect, an embodiment of the present disclosure further provides a UE, including:

a receiving module, configured to receive the BWP resource indication information transmitted by the base station and intra-BWP PRB resource indication information; and a transmitting module, configured to determine BWP resources allocated by the base station and intra-BWP PRB resources according to the BWP resource indication information received by the receiving module and the intra-BWP PRB resource indication information and performs uplink transmission.

According to a further aspect, an embodiment of the present disclosure further provides a base station, including: a memory, a processor, and a computer program stored in the memory and executable on the processor, wherein, the processor executes the above-mentioned method for allocating uplink resources executed by the base station.

According to a further aspect, an embodiment of the present disclosure further provides a UE, including: a memory, a processor, and a computer program stored in the memory and executable on the processor, wherein, the processor executes the above-mentioned method for uplink resources allocation executed by the UE.

According to still another aspect, an embodiment of the present disclosure provides a method for transmitting uplink data, which is executed by a terminal, includes:

acquiring a physical random access channel (PRACH) resource pool configuration;

randomly selecting PRACH resources in the PRACH resource pool to transmit a preamble sequence;

receiving the random access response (RAR), determining a modulation and coding scheme (MCS) table used for parsing uplink (UL) grant according to an indication in a random access response (RAR), and acquiring a transport block size (TBS) and/or a resource block and/or a modulation mode in the UL grant according to the MCS table;

reading data from the buffer according to the TBS, and transmitting Msg3 on the specified UL grant.

Preferably, the terminal decides one of the two MCS tables to be used for parsing the UL grant according to 1 reserved bit.

Preferably, the terminal acquires a first MCS configuration by parsing the UL grant in the existing RAR, and further acquires a second MCS configuration according to several reserved bits.

Further, in the step of acquiring the PRACH resource pool configuration, acquiring two PRACH resource pools, wherein, if the data in the terminal buffer is greater than a threshold, the first of the two PRACH resource pools is selected; and if the data is smaller than the threshold, the second of the two PRACH resource pools is selected.

Preferably, the two PRACH resource pools can be configured with different mask sequences, and/or configured on different carriers and/or further dividing one group of resources as the first PRACH resource pool by resources in the existing PRACH resource group for contention-free random access.

Preferably, two PRACH resource pools respectively correspond to different MAC RAR formats.

Further, in the step of acquiring the PRACH resource pool configuration, acquiring the repetition times for transmitting the preamble sequence of the corresponding PRACH resource pool, and parsing the MCS table according to the above repetition times.

According to still another aspect, an embodiment of the present disclosure provides a method for receiving uplink data, which is executed by a base station and includes the following steps of:

configuring a PRACH resource pool and the repetition times of a preamble sequence;

detecting the preamble sequence;

transmit an RAR, wherein, two uplink resource configuration available for Msg3 transmission are configured in the RAR;

According to the above one or more MCS values, Msg3 is decoded on the corresponding physical resources.

Preferably, the two uplink resource configurations share part of the scheduling parameters, including one or more of the following parameters: subcarrier spacing, subcarrier allocation, scheduling delay and repetition times.

Preferably, the two uplink resource configurations include two independent MCS fields. Wherein, the MCS field indicates the modulation scheme, the number of RUs, and the TBS value through a predefined table.

Preferably, the two uplink resource configurations correspond to the same MCS field, but have different interpretations for the MCS field according to the indication of another field.

Preferably, the field for determining the interpretation mode of the MCS field is 1 bit, and when the bit indicates "0", the MCS field is interpreted by a predefined table, when the bit indicates "1", the MCS field is interpreted by another predefined table.

According to still another aspect, an embodiment of the present disclosure provides a terminal, including:

an acquiring module, configured to acquire a PRACH resource pool configuration; and a transmitting module, configured to randomly select one PRACH resource in a PRACH resource pool to transmit a preamble sequence;

a processing module, configured to receive a RAR, decide an MCS table used for parsing UL grant according to an indication in the RAR, and acquire a TBS and/or a resource block and/or a modulation mode in the UL grant according to the MCS table;

reading module, configured to read data from the buffer according to the TBS; and transmitting module, further configured for transmitting Msg3 on the specified UL grant.

According to still another aspect, an embodiment of the present disclosure provides a base station, including:

a configuration module, configured to configure repetition times of a PRACH resource pool and a preamble sequence;

a detecting module, configured to detect the preamble sequence;

a transmitting module, configured to transmit an RAR, wherein, two uplink resource configurations available for Msg3 transmission are configured in the RAR;

a decoding module, configured to decode Msg3 on corresponding physical resources according to the one or more MCS values.

The present disclosure provides a base station, a UE, a method for uplink resource allocation, and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resources allocated by the base station to the UE. The intra-BWP PRB resource indication information is used for indicating the intra-BWP PRB resources allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission. That is, a new method for uplink resource allocation is designed to be applied to BWP-based bandwidth allocation for future radio communication systems.

The present disclosure provides a method for determining a preamble sequence cyclic shift, applied in a user equipment in which a preamble sequence cyclic shift $N_{cs}$ set is stored in advance, comprising the following steps of:

receiving a System Information Block (SIB) transmitted by a base station to acquire a first index carried in the SIB; and selecting a preamble sequence cyclic shift $N_{cs}$ corresponding to the first index from the preamble sequence cyclic shift set stored in advance, according to the first index.

Preferably, the step of receiving a System Information Block (SIB) transmitted by a base station to acquire a first index carried in the SIB specifically comprises:

receiving at least one SIB transmitted by the base station; and selecting one SIB from the at least one SIB according to a preset condition, and determining the first index carried in the selected SIB.

Preferably, the preset condition is to preferably select a synchronization signal block having the highest signal intensity, and each synchronization signal block carries at least one SIB.

Preferably, the preset condition is to select a synchronization signal block having the highest signal intensity, and each synchronization signal block carries at least one SIB.

Preferably, each preamble sequence cyclic shift set corresponds to one second index, and the step of selecting a preamble sequence cyclic shift $N_{cs}$ corresponding to the first index from the preamble sequence cyclic shift set stored in advance, according to the first index, comprises:

acquiring a second index carried in the SIB; and selecting a preamble sequence cyclic shift $N_{cs}$ corresponding to the first index from the preamble sequence cyclic shift set stored in advance, according to the first index and the second index.

Preferably, when there are at least two preamble sequence cyclic shift sets stored in advance, the step of selecting a preamble sequence cyclic shift $N_{cs}$ corresponding to the first index from the preamble sequence cyclic shift sets stored in advance, according to the first index and the second index comprises:

Determining a preamble sequence cyclic shift set corresponding to the second index from the at least two preamble sequence cyclic shift sets stored in advance, according to the second index; and Selecting a preamble sequence cyclic shift $N_{cs}$ corresponding to the first index from the preamble sequence cyclic shift set corresponding to the second index, according to the first index.

Preferably, when there are at least two preamble sequence cyclic shift sets stored in advance, the step of selecting a preamble sequence cyclic shift $N_{cs}$ corresponding to the first index from the preamble sequence cyclic shift sets stored in advance, according to the first index and the second index comprises:

Determining a preamble sequence cyclic shift set corresponding to the second index from the at least two preamble sequence cyclic shift sets stored in advance, according to the second index;

Selecting a preamble sequence cyclic shift $N_{cs}$ corresponding to the first index from the preamble sequence cyclic shift set corresponding to the second index, according to the first index; and when it is unable to generate any preamble sequence based on the physical index of an initial preamble root sequence and the selected preamble sequence cyclic shift $N_{cs}$, determining that the preamble sequence cyclic shift $N_{cs}$ is 0, i.e., NCS=0; or otherwise, keeping the selected preamble sequence cyclic shift $N_{cs}$ unchanged.

Preferably, when there is one preamble sequence cyclic shift set stored in advance, the step of selecting a preamble sequence cyclic shift $N_{cs}$ corresponding to the first index from the preamble sequence cyclic shift set stored in advance, according to the first index and the second index, comprises:

when it is determined that the second index is not 0, determining that the preamble sequence cyclic shift $N_{cs}$ is 0, i.e., NCS=0; or otherwise, selecting a preamble sequence cyclic shift $N_{cs}$ corresponding to the first index from the preamble sequence cyclic shift set stored in advance, according to the first index.

Preferably, when there is one preamble sequence cyclic shift set stored in advance, the step of selecting a preamble sequence cyclic shift $N_{cs}$ corresponding to the first index from the preamble sequence cyclic shift set stored in advance, according to the first index comprises:

if a direct configuration of a preamble sequence cyclic shift $N_{cs}$ (zeroCyclicShift) indication is carried in the SIB, determining that the preamble sequence cyclic shift $N_{cs}$ is 0, i.e., NCS=0; or otherwise, selecting a preamble sequence cyclic shift $N_{cs}$ corresponding to the first index from the preamble sequence cyclic shift set stored in advance, according to the first index.

Preferably, the step of selecting a preamble sequence cyclic shift $N_{cs}$ corresponding to the first index from the preamble sequence cyclic shift set stored in advance, according to the first index specifically comprises:

If the zeroCyclicShift indication carried in the SIB is 1, determining that the preamble sequence cyclic shift $N_{cs}$ is 0, i.e., NCS=0; or otherwise, selecting a preamble sequence cyclic shift $N_{cs}$ corresponding to the first index from the preamble sequence cyclic shift set stored in advance, according to the first index.

Preferably, each preamble sequence cyclic shift $N_{cs}$ corresponds to one first index.

The present disclosure further discloses a method for configuring a preamble sequence cyclic shift set, comprising the following steps of:

determining all values of the preamble sequence cyclic shift $N_{cs}$ according to a Zadoff-Chu (ZC) sequence and the degree of frequency offset; and selecting a preset number of preamble sequence cyclic shifts $N_{cs}$ from all values of the preamble sequence cyclic shift $N_{cs}$ to generate a preamble sequence cyclic shift set, and transmitting the generated preamble sequence cyclic shift set to both the base station and the user equipment for storage.

Preferably, the indexes of the ZC sequence is $1 \leq u \leq N_{zc}-1$, and the step of determining all values of the preamble sequence cyclic shifts $N_{cs}$ according to a Zadoff-Chu (ZC) sequence and the degree of frequency offset specifically comprises:

Calculating all values of the preamble sequence cyclic shifts $N_{cs}$ corresponding to the uth indexes of the ZC sequence, according to the ZC sequence and the degree of frequency offset, and dividing the calculated values of the preamble sequence cyclic shifts $N_{cs}$ into Q groups in accordance with a preset value range of the preamble sequence cyclic shift $N_{cs}$; and the step of selecting a preset number of preamble sequence cyclic shifts $N_{cs}$ from all values of the preamble sequence cyclic shifts $N_{cs}$ to generate a preamble sequence cyclic shift set, specifically comprises:

selecting a preset number of preamble sequence cyclic shifts from all values of the preamble sequence cyclic shifts $N_{cs}$ in each of the divided Q groups to generate a preamble sequence cyclic shift set;

where $N_{zc}$ denotes the length of the ZC sequence.

Preferably, the maximum number of preamble sequence cyclic shifts $N_{cs}$ in the preamble sequence cyclic shift set is P, where P≥1.

Preferably, the step of selecting a preset number of preamble sequence cyclic shifts $N_{cs}$ from the preamble sequence cyclic shifts $N_{cs}$ in each of the divided Q groups, specifically comprises: selecting zero preamble sequence cyclic shift $N_{cs}$ or at least one preamble sequence cyclic shift $N_{cs}$.

Preferably, the degree of frequency offset comprises frequency offset that is 1 time, 2 times and 3 times of a sub-carrier spacing of the random access channel, and the value range of the preamble sequence cyclic shift $N_{cs}$ is not greater than an absolute difference between the cyclic shifts generated by the ZC sequence at any two degrees of frequency offset.

Preferably, when the maximum degree of frequency offset is 2 times of a sub-carrier spacing of a random access channel, the value range of the preamble sequence cyclic shift $N_{cs}$ further comprises:

$N_{cs} \leq d_{u1} \leq (N_{zc} - N_{cs})/2$ $N_{cs} \leq d_{u2} \leq (N_{zc} - N_{cs})/2$ $N_{cs} \leq |d_{u1} - d_{u2}|$ where, $d_{u1}$ denotes a smaller one of the cyclic shift generated by the ZC sequence in time domain when the degree of frequency offset is +1 time of the sub-carrier spacing of the random access channel and the cyclic shift generated by the ZC sequence in time domain when the degree of frequency offset is −1 time of the sub-carrier spacing of the random access channel, and $d_{u2}$ denotes a smaller one of the cyclic shift generated by the ZC sequence in time domain when the degree of frequency offset is +2 times of the sub-carrier spacing of the random access channel and the cyclic shift generated by the ZC sequence in time domain when the degree of frequency offset is −2 times of the sub-carrier spacing of the random access channel.

Preferably, when the maximum degree of frequency offset is 3 times of a sub-carrier spacing of a random access channel, the value range of the preamble sequence cyclic shift $N_{cs}$ further comprises:

$N_{cs} \leq d_{u3} \leq (N_{zc} - N_{cs})/2$ $N_{cs} \leq |d_{u3} - d_{u1}|$ $N_{cs} \leq |d_{u2} - d_{u3}|$ where, $d_{u3}$ denotes a smaller one of the cyclic shift generated by the ZC sequence in time domain when the degree of frequency offset is +3 times of the sub-carrier spacing of the random access channel and the cyclic shift generated by the ZC sequence by the ZC sequence in time domain when the degree of frequency offset is −3 times of the sub-carrier spacing of the random access channel.

The present disclosure provides a device for determining a preamble sequence cyclic shift, applied in a user equipment in which a preamble sequence cyclic shift $N_{cs}$ set is stored in advance, comprising:

a first processing unit configured to receive a System Information Block (SIB) transmitted by a base station to acquire a first index carried in the SIB; and a second processing unit configured to select a preamble sequence cyclic shift $N_{cs}$ corresponding to the first index from the preamble sequence cyclic shift set stored in advance, according to the first index.

The present disclosure further discloses a device for configuring a preamble sequence cyclic shift set, comprising:

a first processing unit configured to determine all values of a preamble sequence cyclic shift $N_{cs}$ according to a Zadoff-Chu (ZC) sequence and the degree of frequency offset;

a second processing unit configured to select a preset number of preamble sequence cyclic shifts $N_{cs}$ from all values of the preamble sequence cyclic shifts $N_{cs}$ to generate a preamble sequence cyclic shift set; and a transmission unit configured to transmit the generated preamble sequence cyclic shift set to both the base station and the user equipment for storage.

Compared with the prior art, the present disclosure has the following advantages.

In the present disclosure, the complex and diverse demands such as coverage in 5G wireless communication systems are satisfied, the intra-cell interference and the inter-cell interference are reduced, and lower access delay and better access experience are provided for users.

Additional aspects and advantages of the disclosure will be set forth in part in the description which follows, and in part will be obvious from the description below, or can be learned by practice of the disclosure.

Advantageous Effects of Invention

According to various embodiments of the present disclosure, the base station and/or user equipment can efficiently allocate uplink resources, and efficiently perform random access procedure.

BRIEF DESCRIPTION OF DRAWINGS

The foregoing and/or additional aspects and advantages of the present disclosure will be readily apparent from the following description of the embodiments, taken in conjunction with the accompanying drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is an interactive flowchart of a method for uplink resource allocation and a method for uplink transmission method according to an embodiment of the present disclosure;

FIG. 6 is a schematic diagram of UL Grant binary bit arrangement according to an embodiment of the present disclosure;

FIG. 7 is another schematic diagram of UL Grant binary bit arrangement according to an embodiment of the present disclosure.

FIG. 8 is still another schematic diagram of UL Grant binary bit arrangement according to an embodiment of the present disclosure;

FIG. 9 is still another schematic diagram of UL Grant binary bit arrangement according to an embodiment of the present disclosure;

FIG. 10 is still another schematic diagram of UL Grant binary bit arrangement according to an embodiment of the present disclosure;

FIG. 11 is still another schematic diagram of UL Grant binary bit arrangement according to an embodiment of the present disclosure;

FIG. 12 is still schematic diagram of UL Grant binary bit arrangement according to an embodiment of the present disclosure;

FIG. 13 is still another schematic diagram of UL Grant binary bit arrangement according to an embodiment of the present disclosure;

FIG. 14 is yet another schematic diagram of UL Grant binary bit arrangement according to an embodiment of the present disclosure.

FIG. 15 is yet another schematic diagram of UL Grant binary bit arrangement according to an embodiment of the present disclosure;

FIG. 16 is still another schematic diagram of UL Grant binary bit arrangement according to an embodiment of the present disclosure;

FIG. 17 is a schematic diagram of a binary bit arrangement of PRB resource allocation information within a BWP in an UL Grant according to an embodiment of the present disclosure;

FIG. 18 is a schematic diagram of another binary bit arrangement of PRB resource allocation information within BWP in UL Grant according to an embodiment of the present disclosure;

FIG. 19 is a schematic diagram of another binary bit arrangement of PRB resource allocation information within BWP in UL Grant according to an embodiment of the present disclosure;

FIG. 20 is a schematic diagram of another binary bit arrangement of PRB resource allocation information within BWP in UL Grant according to an embodiment of the present disclosure;

FIG. 21 is a schematic diagram of another binary bit arrangement of PRB resource allocation information within BWP in UL Grant according to an embodiment of the present disclosure;

FIG. 22 is a schematic flowchart of transmitting UL data by a UE through Msg3 in an embodiment of the present disclosure;

FIG. 23 is a schematic diagram of a MAC RAR of an NB-IOT UE in an embodiment of the present disclosure;

FIG. 24 is a schematic diagram of a MAC RAR of an eMTC Mode B UE in an embodiment of the present disclosure;

FIG. 25 is a schematic flowchart of transmitting UL data by the UE through Msg3 in an embodiment of the present disclosure;

FIG. 26 is a schematic flowchart of transmitting, by the UE, TBS information actually used by Msg3 through a PUCCH in an embodiment of the present disclosure;

FIG. 27 is a schematic flowchart of transmitting, by the UE, TBS information actually used by Msg3 through Msg3 piggyback in an embodiment of the present disclosure;

FIG. 28 is a schematic flowchart of transmitting, by the UE, TBS information actually used by Msg3 through DMRS of Msg3 in an embodiment of the present disclosure;

FIG. 29 is a schematic flowchart of scheduling, by an eNB, retransmission of Msg3 based on a TBS value actually used by Msg3 in an embodiment of the present disclosure;

FIG. 30 is a schematic diagram of an exemplary mobile communication network according to an embodiment of the present disclosure;

FIG. 31 is a schematic diagram of an apparatus structure of a base station according to an embodiment of the present disclosure;

FIG. 32 is a schematic diagram of an apparatus structure of a UE according to an embodiment of the present disclosure.

FIG. 33 is a schematic flowchart of the conventional contention-based random access in the prior art;

FIG. 34 is a schematic flowchart of a method for determining a random access preamble sequence cyclic shift amount according to the present disclosure;

FIG. 35 is a schematic diagram of a method for transmitting a preamble sequence cyclic shift amount configuration index under multiple beams and a preamble sequence cyclic shift amount set index according to the present disclosure;

FIG. 36 is a schematic structure diagram of a transmitting terminal based on an antenna array according to the present disclosure;

FIG. 37 is a schematic diagram of designating a beam direction by a user equipment according to the present disclosure;

FIG. 38 is a schematic flowchart of a method for configuring a preamble sequence cyclic shift amount set according to the present disclosure;

FIG. 39 is a schematic flowchart of a method for configuring a preamble sequence cyclic shift amount set according to the present disclosure;

FIG. 40 is a schematic diagram of the generated preamble sequence cyclic shift amount set according to the present disclosure;

FIG. 41 is a schematic diagram of a search window for a frequency offset that is 1 time of the sub-carrier spacing of a random access channel and a duplicate window according to the present disclosure;

FIG. 42 is a schematic diagram of a search window for a frequency offset that is 2 times of the sub-carrier spacing of the random access channel and a duplicate window according to the present disclosure;

FIG. 43 is a schematic diagram of a search window for a frequency offset that is 3 times of the sub-carrier spacing of the random access channel and a duplicate window according to the present disclosure;

FIG. 44 is a schematic flowchart of a method for determining a preamble sequence cyclic shift amount according to the present disclosure;

FIG. 45 is a schematic structure diagram of a device for configuring a preamble sequence cyclic shift amount set according to the present disclosure; and FIG. 46 is a schematic structure diagram of a device for determining a preamble sequence cyclic shift amount according to the present disclosure.

BEST MODE FOR CARRYING OUT THE INVENTION

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present disclosure belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein include not only apparatuses merely with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, and a music/video player terminal. For example, it may be a PDA, a Mobile Internet Device (MID) and/or a mobile phone with a music/video playback function, or may be apparatuses such as a smart TV and a set-top box.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for apparatus and method for uplink transmission in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

The rapid development of information industry, particularly the increasing demand from the mobile Internet and the Internet of Things (IoT), brings about unprecedented challenges in the future mobile communication technology. For example, according to the ITU-R M.[IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communication industry and academia have prepared for 2020s by launching an extensive study of the fifth-generation mobile communication technology (5G). Currently, in ITU-R M.[IMT.VISION] from ITU, the framework and overall objectives of the future 5G have been discussed, where the demands outlook, application scenarios and various important performance indexes of 5G have been described in detail. In terms of new demands in 5G, the ITU-R M.[IMT. FUTURE TECHNOLOGY TRENDS] from ITU provides information related to the 5G technology trends, which is intended to address prominent issues such as significant improvement on system throughput, consistency of the user experience, scalability to support IoT, time delay, energy efficiency, cost, network flexibility, support for emerging services and flexible spectrum utilization, etc.

It is an important step in a radio communication system to indicate the UE the resources for uplink transmission through an uplink grant (UL Grant). In LTE/LTE-A, a specific Downlink Control Information (DCI) and a Random Access Response (RAR or Msg2) in the random access procedure both include the UL Grant. Wherein, the UL grant contains the following information:

frequency hopping flag resource allocation indication, which might include Resource Indication Value (RIV) and frequency hopping resource allocation information;

Modulation and Coding Scheme (MCS);

Channel Quality Information (CQI) request;

other information;

The UE can obtain a starting Physical Resource Block (PRB) location ($RB_{START}$) and the number ($L_{CRBs}$) of allocated continuous PRBs according to the RIV and a corresponding calculation method. If the frequency hopping flag is 0, only the RIV is included in the resource allocation indication. In this case, a Physical Uplink Shared Channel (PUSCH) continuously maps $L_{CRBs}$ resource blocks starting from the resource block $RB_{START}$ in accordance with a way of increasing the resource block index. If the frequency hopping flag is 1, the resource allocation indication includes both the frequency hopping resource allocation information and the RIV. In this case, the PUSCH resource allocation in a first slot (or a subframe during an even number of HARQ transmissions) and the PUSCH resource allocation in a second slot (or a subframe during an odd number of HARQ transmissions) can be obtained according to the RIV, the frequency hopping resource allocation information and other possible information (such as the cell-specific frequency hopping pattern, mirror pattern, etc.).

It should be noted that in the LTE/LTE-A system, the uplink resource allocation aims at the entire system bandwidth, that is, one or more PRBs are selected among all available PRBs in the uplink system bandwidth as the allocated PUSCH transmission resources. Since LTE/LTE-A employs the uplink transmission scheme of DFT-S-OFDM, if the number of allocated PRBs is more than one, the PRBs are continuous in frequency domain.

In the future radio communication system, the whole system bandwidth will be divided into several Bandwidth Parts (BWPs). For any UE, only one uplink BWP is activated at the same time. Therefore, the allocation of the uplink resources in the UL Grant of the future radio communication system needs to include both the indication of the BWP and the indication of the PRB within the BWP. In addition, in the future, the radio communication system can simultaneously support both a cycle Prefix-Orthogonal Frequency Division Multiplexing (CP-OFDM) uplink transmission scheme and a Discrete Fourier Transform-Spread-Orthogonal Frequency Division Multiplexing (DFT-S-OFDM) uplink transmission scheme. Therefore, if the number of allocated PRBs is more than one, these PRBs may be continuous in frequency domain or may be discrete, or may also be partially continuous. On the other hand, if the UL Grant includes a frequency hopping indication, frequency hopping of uplink resources may be performed within the same BWP or between different BWPs.

As mentioned above, the method for uplink resource allocation of the system-wide bandwidth continuous PRB used in the UL Grant of LTE/LTE-A cannot be applied to future radio communication systems.

In addition, for machine type communication (MTC), typical data types, such as meter reading services, are aperiodic packets. Therefore, if the data service can be transmitted to the base station as soon as possible, it can be switched to the idle mode as soon as possible, thereby achieving the power saving effect after successful. In the working project of Rel-15 NB-IoT (narrow band internet of thing) and enhanced MTC (eMTC), the data service information carried in Msg3 and Msg4 will be standardized. However, in the current NB-IoT system, the RAR can only indicate the 88-bit UL grant for Msg3 transmission. Therefore, it is necessary to extend the transport block size (TBS) which can be indicated by the UL grant in the RAR of NB-IoT system, so that the TBS can carry uplink data services. For the eMTC systems, it is also necessary to extend the TBS of eMTC due to the limited maximum supported TBS in coverage enhancement mode B (CE mode B). In addition, larger TBSs should not affect previous versions of UEs or UEs that do not support this function. Therefore, some new mechanisms are also needed to avoid the impact on UEs that do not support this function.

On the other hand, a random access process, as an important step in a wireless communication system, is used for establishing uplink synchronization between a user and a base station and for allocating, by the base station and to the user, an ID for identifying a user, etc. The performance of random access directly influences the user's experience. For a conventional wireless communication system, for example, in LTE and LTE-A, the random access process is used in various scenarios such as establishment of an initial link, cell handover, reestablishment of an uplink and RRC (Radio Resource Control) connection reestablishment, and is classified into contention-based random access and contention-free random access depending upon whether a user exclusively occupies preamble sequence resources.

In LTE-A, the contention-based random access process includes four steps, as shown in FIG. 33. Before the start of the random access process, the base station transmits configuration information of the random access process to the user and the user performs the random access process according to the received configuration information. In the first step, the user randomly selects a preamble sequence from a preamble sequence resource pool and transmits the preamble sequence to a base station. The base station performs correlation detection on the received signal, so as to identify the preamble sequence transmitted by the user. In the second step, the base station transmits a Random Access Response (RAR) to the user. The RAR contains an identifier of a random access preamble sequence, a timing advance instruction determined according to an estimated time delay between the user and the base station, a Temporary Cell-Radio Network Temporary Identifier (TC-RNTI), and time-frequency resources allocated for the user to perform uplink transmission next time. In the third step, the user transmits a Message 3 (Msg3) to the base station according to the information in the RAR. The Msg3 contains information such as a user equipment identifier and an RRC link request, wherein the user equipment identifier is an identifier that is unique to the user and used for resolving a collision. In the fourth step, the base station transmits a collision resolution identifier to the user, the collision resolution identifier containing a terminal identifier of a user who wins in the collision resolution. The user upgrades TC-RNTI to Cell-Radio Network Temporary Identifier (C-RNTI) upon detecting its own identifier, and transmits an Acknowledgement (ACK) signal to the base station to complete the random access process and then waits for the scheduling of the base station.

For a contention-free random access process, since the base station has known the identifier of the user, the base station can allocate a preamble sequence to the user. Thus, when transmitting a preamble sequence, the user does not need to randomly select a sequence, and instead, it will use the allocated preamble sequence. Upon detecting the allocated preamble sequence, the base station will transmit a corresponding random access response, the random access response includes information such as timing advance and uplink resource allocation. Upon receiving the random access response, the user considers that the uplink synchronization has been completed, and then waits for the further scheduling of the base station. Thus, the initial access process and the contention-free random access process contain only two steps: a step 1 of transmitting a preamble sequence, and a step 2 of transmitting a random access response. In an LTE-A system, a Random Access Channel (RACH) uses a cyclic shift sequence of a Zadoff-Chu (ZC) sequence having a length of 839 as a preamble sequence. Two random access preamble sequence cyclic shift sets are configured in a practical system, i.e., a non-restricted set and a restricted set, which respectively correspond to low-speed cells and high-speed cells. For the high-speed cells, the maximum allowable frequency offset is 1 time of the sub-carrier spacing of the random access channel.

The selection of the cyclic shift has great influence on the performance of the random access. If the cyclic shift is too large, the number of cyclic shift sequences that can be generated by each ZC root sequence will be reduced, and consequently, the ZC sequence is less reused and the inter-cell interference is increased; and if the cyclic shift is too small, the coverage of cells will be reduced, and the networking demands cannot be satisfied. For low-speed cells, in the selection of the cyclic shift, the coverage of cells is mainly considered; and for high-speed cells, in addition to the coverage of cells, the influence on the ZC sequence zero correlation from the frequency offset is also required to be considered.

Taking all these factors into account, the configuration of the preamble sequence cyclic shift set in the LTE-A system is as shown in Table 1 ($N_{cs}$ denotes the cyclic shift). The non-restricted set contains 16 cyclic shifts and the restricted set contains 15 cyclic shifts.

TABLE 1

The preamble sequence cyclic shift set in the LTE-A

| $N_{CS}$ configuration | $N_{CS}$ value | |
|---|---|---|
| | Non-restricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

The System Information Block (SIB) contains a 1-bit high-speed-flag. If this flag is 0, the non-restricted set in Table 1 is used; and if this flag is 1, the restricted set in Table 1 is used. In addition, the user also reads a preamble sequence cyclic shift index (zeroCorrelationZoneConfig) of the random access channel contained in the SIB, and determines the final cyclic shift according to the index and the selected cyclic shift set.

During the present generation of a preamble sequence cyclic shift, only two sets are defined, i.e., an non-restricted set and a restricted set, which respectively correspond to low-speed cells and high-speed cells having a maximum frequency offset that is 1 time of the sub-carrier spacing of the random access channel. In a 5G wireless communication system, the system supports millimeter-wave-level greater carrier frequencies, a sub-carrier spacing of a different size is used for different carrier frequencies, and the coverage demands for cells change correspondingly. It is necessary to redesign the existing cyclic shift set being free of frequency offset and the cyclic shift set having a frequency offset that is 1 time of the sub-carrier spacing. In addition, a high carrier frequency will also result in a greater carrier frequency offset. And, under a high carrier frequency, the characteristics of Radio-Frequency (RF) devices, such as non-linearity, will also introduce a certain degree of carrier frequency offset. In this case, the carrier frequency offset may be much greater than 1 time of the sub-carrier spacing of the random access channel. It is desired to design a new preamble sequence cyclic shift set.

As described above, the use of cyclic shifts in the non-restricted set and the restricted set in the LTE-A cannot meet the requirements of the 5G wireless communication system. It is required to design more cyclic shift sets for the complex and diverse demands in the 5G wireless communication system, design specific cyclic shift values in each cyclic shift set according to different situations, and design a corresponding method for determining a cyclic shift.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

According to various embodiments, at least one of the wireless communication interface 210 and the backhaul communication interface 220 may include transmitting module 2302 and/or transmitting unit 1313. Here, transmitting module 2302 and/or transmitting unit 1313 may be a command/code temporarily resided in the at least one of the wireless communication interface 210 and the backhaul communication interface 220, a storage space that stores the command/code, or a part of circuitry of the at least one of the wireless communication interface 210 and the backhaul communication interface 220.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to various embodiments, the controller 240 may includes allocating module 2301, first processing unit 1301, and/or second processing unit 1302. Here, module 2301, first processing unit 1301, and/or second processing unit 1302 may be a command/code temporarily resided in the controller 240, a storage space that stores the command/code, or a part of circuitry of the controller 240.

According to exemplary embodiments of the present disclosure, the controller 240 may transmit, to a user equipment (UE), resource indication information. The resource indication comprises at least one of bandwidth part (BWP) resource indication information for indicating BWP resources that is allocated by the BS to the UE, intra-BWP physical resource block (PRB) resource indication information for indicating intra-BWP PRB resources that is allocated by the BS to the UE, and time domain indication information. The resource indication information is transmitted through at least one of uplink grant information, and remaining system information (RMSI).

According to another embodiment of the present disclosure, the controller 240 may determine values of a preamble sequence cyclic shift $N_{cs}$ based on a Zadoff-Chu (ZC) sequence and a degree of frequency offset, select a preset number of preamble sequence cyclic shifts $N_{cs}$ from the values of the preamble sequence cyclic shift $N_{cs}$ to generate a preamble sequence cyclic shift set, and control to transmit the generated preamble sequence cyclic shift set to at least one of a base station (BS) and a user equipment (UE)

For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

According to various embodiments, the communication interface 310 may include receiving module 2401 and/or transmitting module 2402. Here, the receiving module 2401 and/or transmitting module 2402 may be a command/code temporarily resided in the communication interface 310, a storage space that stores the command/code, or a part of circuitry of the communication interface 310.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to various embodiments, the controller 330 may include first processing unit 1401 and/or second processing unit 1402. Here, the first processing unit 1401 and/or second processing unit 1402 may be a command/code temporarily resided in the controller 330, a storage space that stores the command/code, or a part of circuitry of the controller 330.

According to exemplary embodiments of the present disclosure, the controller 330 may control to receive, from a base station (BS), resource indication information, and transmit an uplink signal based on the resource indication information. The resource indication comprises at least one of bandwidth part (BWP) resource indication information for indicating BWP resources that is allocated by the BS to the UE, intra-BWP physical resource block (PRB) resource indication information for indicating intra-BWP PRB resources that is allocated by the BS to the UE, and time domain indication information. The resource indication information is transmitted through at least one of uplink grant information, and remaining system information (RMSI).

According to another embodiment of the present disclosure, the controller 330 may control to receive, from a base station, a system information block (SIB) comprising a first index, and select a preamble sequence cyclic shift $N_{cs}$ corresponding to the first index from a preamble sequence cyclic shift set stored in the storage unit 320.

For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be conFig.d in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In the prior art, the method for uplink resource allocation of system-wide bandwidth continuous PRB employed in the UL Grant of LTE/LTE-A cannot be applied to future radio communication systems. It is necessary to design a new method for uplink resource allocation for the BWP-based bandwidth division form for the future radio communication system.

For the future radio communication system, an embodiment of the present disclosure proposes a new method for uplink resource allocation. In this method, the UL Grant is still used for uplink resource allocation, wherein the uplink resource allocation information includes at least two parts of indication information: one part indicates the information of the BWP and the other indicates the information of PRB within the BWP. If the UL Grant further includes indication of frequency hopping, the uplink resource allocation information should also include resource allocation of the corresponding frequency hopping. Specifically, for the foregoing two part of the indication information, the embodiments of the present disclosure provide different specific resource allocation solutions, in which each solution supports two different frequency hopping indications, i.e. no frequency hopping and frequency hopping, and also supports three different PRB allocation ways, i.e. continuous allocation of PRBs, discontinuous allocation of PRBs and partially continuous allocation of PRBs.

The method for uplink resource allocation provided in the embodiments of the present disclosure can be applied to a situation in which full bandwidth needs to be divided in a future radio communication system, and a resource allocation requirement that meets a diversity of needs is provided, and the complexity and the system overhead are relatively low, so that the user can perform more efficient uplink transmission and provide the user with a better access experience.

FIG. 5 is an interactive flowchart of a method for uplink resource allocation, in which, Step 501: a base station allocates BWP resources and PRB resources within the BWP to a UE; Step 502: the base station transmits BWP resource indication information and intra-BWP PRB resource indication information to the UE, wherein, the BWP resource indication information is used for indicating the BWP resources which is allocated by the base station to the UE, and the intra-BWP PRB resource indication information is used for indicating the intra-BWP PRB resources allocated by the base station to the UE; Step 503: the UE receives the BWP resource indication information and the intra-BWP PRB resource indication information transmitted by the base station; Step 504: the UE determines the BWP resources and the intra-BWP PRB resources allocated by the base station according to the BWP resource indication information and the intra-BWP PRB resource indication information; Step 505: the UE performs uplink transmission according to the determined BWP resources and the intra-BWP PRB resources allocated by the base station.

Further, before Step 502, the method further includes: transmitting, by the base station, the Remaining System Information (RMSI) based on the resource information of the downlink BWP.

Specifically, Step 502 includes: transmitting, by the base station, the BWP resource indication information and the intra-BWP PRB resource indication information through the uplink grant information to the UE; or, transmitting, by the base station, the BWP resource indication information to the UE through the RMSI, and transmitting, through uplink grant information, intra-BWP PRB resource indication information to the UE.

Wherein, if the uplink grant information does not carry frequency hopping indication information, the BWP resource indication information in the uplink grant information indicates the UE the BWP used for uplink transmission, wherein the intra-BWP PRB resource indication information in the uplink grant information indicates the UE the PRB in the BWP indicated by the BWP indication information used for uplink transmission.

wherein, if the uplink grant information carries the frequency hopping indication information, the frequency hopping indication information is located in the at least one of the BWP indication information and the intra-BWP PRB resource indication information.

Specifically, the arrangement way of the BWP resource indication information and the intra-BWP PRB resource indication information in the uplink grant information is a first predefined arrangement way.

wherein, the first predefined arrangement way includes at least one of the followings:

the BWP resource indication information and the intra-BWP PRB resource indication information are arranged adjacent to each other, and the BWP resource indication information or the intra-BWP PRB resource indication information is located at the most significant bit (MSB);

the BWP resource indication information and the intra-BWP PRB resource indication information are arranged adjacent to each other, and the BWP resource indication information or the intra-BWP PRB resource indication information is located at the least significant bit (LSB);

the BWP resource indication information and the intra-BWP PRB resource indication information are arranged adjacent to each other, and neither the BWP resource indication information nor the intra-BWP PRB resource indication information is located at the MSB and the LSB;

the BWP resource indication information and the intra-BWP PRB resource indication information are not arranged adjacent to each other, and the BWP resource indication information and the intra-BWP PRB resource indication information are located at the MSB or the LSB;

the BWP resource indication information and the intra-BWP PRB resource indication information are not arranged adjacent to each other, and neither the BWP resource indication information nor the intra-BWP PRB resource indication information is located at the MSB or the LSB.

Wherein, the method further includes:

allocating time domain indication information to the UE;

wherein, the step of transmitting the BWP resource indication information and the intra-BWP PRB resource indication information to the UE includes: transmitting the BWP resource indication information, the intra-BWP PRB resource indication information and the time domain indication information to the UE.

Wherein, the time domain resource indication information indicates the UE the starting location of the time domain of the uplink data transmission and the number of symbols, mini-slots or slots used for the uplink data transmission in one mini-slot/slot/subframe.

Further, the step of transmitting the BWP resource indication information, the intra-BWP PRB resource indication information and the time domain indication information to the UE includes any one of the followings:

transmitting the BWP resource indication information, the intra-BWP PRB resource indication information and the time domain indication information to the UE through the uplink grant information;

transmitting the BWP resource indication information through an RMSI to the UE, and transmitting the intra-BWP PRB resource indication information and the time domain indication information to the UE through the uplink grant information;

using the BWP resource indication information and the intra-BWP PRB resource indication information as the frequency domain indication information;

the arrangement way of the frequency domain indication information and the time domain indication information in the uplink grant information is a second predefined arrangement way;

wherein, the second predefined arrangement way includes at least one of the followings:

the frequency domain indication information and the time domain indication information are arranged adjacent to each other, the frequency domain indication information or the time domain indication information is located at the MSB;

the frequency domain indication information and the time domain indication information are arranged adjacent to each other, and the frequency domain indication information or the time domain indication information is located at the LSB;

the frequency domain indication information and the time domain indication information are arranged adjacent to each other, and neither the frequency domain indication information nor the time domain indication information is located at the LSB and the MSB.

Further, the arrangement way of the PRB resources within the PRB indication information and the time domain indication information in the uplink grant information is a third predefined arrangement way;

wherein, the third predefined arrangement way includes at least one of the followings:

The intra-BWP PRB resource indication information and the time domain indication information are arranged adjacent to each other, the time domain indication information or the intra-BWP PRB resource indication information is located at the MSB;

The intra-BWP PRB resource indication information and the time domain indication information are arranged adjacent to each other, the time domain indication information or the intra-BWP PRB resource indication information is located at the LSB;

The intra-BWP PRB resource indication information and the time domain indication information are arranged adjacent to each other, and neither the time indication information nor the intra-BWP PRB resource indication information is located at the LSB and the MSB.

Further, the BWP resource indication information indicates the BWP resource allocated by the base station to the UE through at least one of the following ways:

a first index value, wherein the first index value is an index value of the BWP;

a second index value, wherein, the second index value is an index value corresponding to a frequency difference between a frequency location of the BWP and a frequency location of a predefined BWP, wherein, the frequency location includes a starting frequency location or a central frequency location;

a third index value and a fourth index value, wherein, the third index value is an index value of the BWP which is allocated by the base station to the UE on a first time unit, and the fourth index value is an index value of the BWP which is allocated by the base station to the UE on a second time unit, wherein the time unit includes any one of a slot, a mini-slot and a subframe; and a fifth index value and a sixth index value, wherein, the fifth index value is an index value which is corresponding to a difference between a frequency location of the BWP for uplink transmission and allocated by the base station to the UE on the first time unit and a frequency location of a predefined BWP, and the sixth index is an index value which is corresponding to a difference between a frequency location of the BWP for uplink transmission and allocated by the base station to the UE on the second time unit and a frequency location of a predefined BWP.

Further, the intra-BWP PRB resource indication information indicates the BWP resources within the BWP which is allocated by the base station to the UE by at least one of the following ways:

RIV;

number of segments of multiple continuous uplink PRB resources allocated by the base station to the UE, and RIV respectively corresponding to each segment;

bit-map information, wherein the intra-BWP PRB resource indication information uses a resource block group (RBG) as a unit;

RBG indication information and bit-map information, wherein, the intra-BWP PRB resource indication information uses the RBG as a unit;

RBG resource allocation information and bit group information, wherein, the intra-BWP PRB resource indication information uses the PRB as a unit;

at least one of the number of segments of multiple continuous RBG resources allocated by the base station to the UE, starting location information of each segment of RBG, and length information of each segment of RBG;

at least one of the number of segments of multiple continuous PRB resources allocated by the base station to the UE, starting location information of each segment of PRB, and length information of each segment of PRB.

Further, the starting location information of each segment of RBG is used for indicating at least one of the followings:

the starting location of each segment of RBG resources;

a difference between the starting location of the $0^{th}$ segment of RBG resources and the starting locations of each remaining segment of RBG resources;

a ratio between the starting location of the $0^{th}$ segment of RBG resources and the starting location of each remaining segment of RBG resources;

wherein, the length information of each segment of RBG is used for indicating at least one of the following:

the length of each segment of RBG resources;

a difference between the length of the $0^{th}$ segment of RBG resources and the length of each remaining segment of RBG resources;

a ratio between the length of the $0^{th}$ segment of RBG resource and the length of each remaining segment of RBG resources;

wherein, the starting location information of each segment of PRB is used for indicating at least one of the followings:

the starting location of each segment of PRB resources;

a difference between the starting location of the $0^{th}$ segment of PRB resources and the starting location of each remaining segment of PRB resources;

a ratio between the starting location of the $0^{th}$ segment of PRB resources and the starting location of each remaining segment of PRB resources;

wherein, the length information of each segment of PRB resources is used for indicating at least one of the followings:

the length of each segment of PRB resources;

a difference between the length of the $0^{th}$ segment of PRB resources and the length of each remaining segment of PRB resources;

a ratio between the length of the $0^{th}$ segment of PRB resources and the length of each remaining segment of PRB resources.

Further, Step 503 includes any one of the followings: receiving, by the UE, BWP resource indication information and the intra-BWP PRB resource indication information transmitted by the base station through the uplink grant information; and/or, receiving, by the UE, the BWP resource indication information transmitted by the base station through the RMSI, and receiving the intra-BWP PRB resource indication information transmitted by the base station through the uplink grant information.

Further, if there is no frequency hopping indication information in the uplink grant information, the step of the UE determining, according to the BWP resource indication information and the intra-BWP PRB resource indication information, the BWP resources and the intra-BWP PRB resources allocated by the base station includes: the UE determines the BWP resources and the intra-BWP PRB resources allocated by the base station from the BWP resource indication information and the intra-BWP PRB resource indication information in the uplink grant information.

Further, if there is frequency hopping indication information in the uplink grant information, the way for determining, by the UE and according to the BWP resource indication information, the BWP resources allocated for the UE by the base station includes:

if there is no frequency hopping indication information in the BWP resource indication information, determining, by the UE and according to the BWP resource indication information in the uplink grant information, BWP resources allocated for the UE by the base station; or if there is no frequency hopping indication information in the BWP resource indication information, determining, according to the frequency hopping resources between the BWP allocation information and the BWP resource indication information in the intra-BWP PRB resource indication information, the BWPs used for uplink transmission on the first time unit and the second time unit respectively;

if the BWP resource indication information contains the frequency hopping resources between the BWP allocation information, determining, according to the intra-BWP frequency hopping resource allocation information and the part of the BWP resource indication information which is not the frequency hopping resource allocation information, the BWPs used for uplink transmission on the first time unit and the second time unit respectively; or if the BWP resource indication information contains both the frequency hopping resources between the BWP allocation information and the frequency hopping resources between the intra-BWP PRB allocation information, based on the frequency hopping resources between the BWP allocation information and the part of the BWP resource indication information which is not the frequency hopping resource allocation information, the BWPs used for uplink transmission on the first time unit and the second time unit respectively.

Further, if there is frequency hopping indication information in the uplink grant information, a way for determining, by the UE and according to the intra-BWP PRB resource indication information, the intra-BWP PRB resources allocated by the base station includes:

if the intra-BWP PRB resource indication information does not contain the frequency hopping indication information, determining, by the UE and based on the intra-BWP PRB resource indication information, the intra-BWP PRB resources allocated for the UE by the base station; or, if the intra-BWP PRB resource indication information does not contain the frequency hopping indication information, determining, based on the intra-BWP inter-PRB frequency hopping resource allocation information and the intra-BWP PRB resource indication information in the BWP resource indication information, the intra-BWP PRB resources used for uplink transmission on the first time unit and the second time unit respectively;

if the intra-BWP PRB resource indication information contains the intra-BWP inter-PRB frequency hopping resource allocation information, determining, based on the intra-BWP inter-PRB frequency hopping resource allocation information and the part, which is not the frequency hopping resources, of the intra-BWP PRB resource indication information, the intra-BWP PRB resources used for uplink transmission on the first time unit and the second time unit respectively;

if the intra-BWP PRB resource indication information contains both the intra-BWP inter-PRB frequency hopping resource allocation information and the inter-BWP frequency hopping resource allocation information, determining, based on the intra-BWP inter-PRB frequency hopping resource allocation information and the part, which is not the frequency hopping resource allocation information, of the intra-BWP PRB resource indication information, the intra-BWP PRB resources used for uplink transmission on the first time unit and the second time unit respectively.

Further, if the UE acquires the intra-BWP PRB resource indication information only from the uplink grant information, the method further includes:

if the uplink grant information does not contain the frequency hopping indication information, the UE determines the PRB resources used for uplink transmission allocated within the uplink BWP based on the intra-BWP PRB resource indication information acquired in the uplink grant information; and if the uplink grant information contains the frequency hopping indication information, the UE determines, based on the intra-BWP inter-PRB frequency hopping resource allocation information in the intra-BWP PRB resource indication information and the part, which is not the frequency hopping resource allocation information, of the intra-BWP PRB resource indication information, the PRB resources used for uplink transmission allocated within the uplink BWP on the first time unit and the second time unit respectively.

Specifically, the step of receiving the BWP resource indication information and the intra-BWP PRB resource indication information transmitted by the base station includes:

receiving the BWP resource indication information, the intra-BWP PRB resource indication information and the time domain resource indication information transmitted by the base station;

the step of determining the BWP resources and the intra-BWP PRB resources allocated by the base station according to the BWP resource indication information and the intra-BWP PRB resource indication information includes:

determining the BWP resources, the intra-BWP PRB resources and the time domain resources allocated by the base station according to the BWP resource indication information, the intra-BWP PRB resource indication information and the time domain resource indication information.

Specifically, the step of receiving the BWP resource indication information, the intra-BWP PRB resource indication information and the time domain resource indication information transmitted by the base station includes:

receiving the BWP resource indication information, the intra-BWP PRB resource indication information and the time domain resource indication information transmitted by the base station through the uplink grant information; or receiving the BWP resource indication information transmitted by the base station through the RMSI, and receiving the intra-BWP PRB resource indication information and the time domain resource indication information transmitted by the base station through the uplink grant information.

Specifically, the way for determining the time domain resources according to the time domain resource indication information includes:

determining the time domain resources allocated by the base station from the time domain resource indication information in the uplink grant information.

Specifically, the step of performing uplink transmission according to the determined BWP resources and the intra-BWP PRB resources allocated by the base station includes: performing uplink transmission according to the determined BWP resources, the intra-BWP PRB resources and the time domain resources allocated by the base station.

Further, the method further includes: the UE reads the RMSI and acquires resource information of at least one available uplink BWP, resource information of each available uplink BWP includes at least one of a central frequency location of each BWP, a starting frequency location of each BWP, a frequency location difference and a bandwidth of the BWP, wherein, the frequency location difference is a location difference between a central frequency location of the BWP and a central frequency location of a predefined BWP, or a location difference between a starting frequency location of the BWP and a starting frequency location of a predefined BWP.

Further, the way for determining the BWP resources allocated by the base station according to the BWP resource indication information includes: the UE determines at least one of the index value of the uplink BWP allocated by the base station and the index value corresponding to the frequency location difference according to the BWP resource indication information carried in the uplink grant information, and determines at least one of the central frequency location, the starting frequency location and the bandwidth of the BWP used for uplink transmission and allocated by the base station according to at least one of the determined index value of the uplink BWP and the index value corresponding to the frequency location difference allocated by the base station and according to the acquired resource information of multiple available uplink BWPs; and/or, the UE determines the indexes respectively corresponding to the two uplink BWPs according to the BWP resource indication information carried in the uplink grant information, and determines at least one of the central frequency location of the BWP, the starting frequency location and the bandwidth used for uplink transmission on the first time unit and the second time unit according to the determined indexes respectively corresponding to the two uplink BWPs, the index value corresponding to the frequency location difference and the acquired resource information of multiple available uplink BWPs.

Further, the way for determining the intra-BWP PRB resources allocated by the base station according to the intra-BWP PRB resource indication information includes:

determining, by the UE, the intra-BWP PRB resources allocated by the base station through the RIV; and/or determining, by the UE, the intra-BWP PRB resources allocated by the base station through the number of the segments of multiple continuous uplink PRB resources allocated by the base station to the UE and the RIV respectively corresponding to each segment; and/or determining, by the UE, the intra-BWP PRB resources allocated by the base station through bit-map information, wherein, the intra-BWP PRB resource indication information uses the RBG as the unit; and/or determining, by the UE, the intra-BWP PRB resources allocated by the base station through RBG set indication information and the bit-map information, wherein, the intra-BWP PRB resource indication information uses the RBG set as the unit; and/or determining, by the UE, the intra-BWP PRB resources allocated by the base station through RBG set resource allocation information and the bit group information, wherein, the intra-BWP PRB resource indication information uses the PRB as the unit; and/or determining, by the UE, the intra-BWP PRB resources allocated by the base station through at least one of the number of segments of multiple continuous RBG resources, starting location information of each segment of RBG and length information of each segment of RBG allocated by the base station to the UE; and/or determining, by the UE, the intra-BWP PRB resources allocated by the base station through at least one of the number of segments of multiple continuous PRB resources, starting location information of each segment of PRB and length information of each segment of PRB allocated by the base station to the UE.

An embodiment of the present disclosure provides a method for uplink resource allocation and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resource allocated by the base station to the UE. The intra-BWP PRB resource indication information is used for indicating the intra-BWP PRB resource allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission, that is, a new method for uplink resource allocation is designed to be applied to BWP-based bandwidth division for future radio communication systems.

Embodiment 1

This embodiment of the present disclosure introduces a method for uplink resource allocation by the base station to the UE. In this embodiment, the bandwidth used by the entire system uplink is divided into several BWPs. Wherein, each of the BWPs can be continuous, partially contiguous, or discrete. If the entire bandwidth is divided into N uplink BWPs (wherein, N is a positive integer), the N BWPs are sequentially numbered and allocated indexes $0, 1, \ldots, N-1$. Wherein, the $n^{th}$ BWP includes $L_n$ PRBs. The $L_n$ PRBs are also sequentially numbered, and indexes $0, 1, \ldots, L_n-1$ are allocated.

The UE first detects a Physical Broadcast Channel (PBCH), acquires resource information of one downlink BWP, further acquires RMSI of the BWP and reads all available BWP information in the RMSI, wherein, the information can include index numbers of all available uplink BWPs, a central frequency location (or a frequency location difference between a starting frequency location and a frequency location of the BWP at a known location, etc.) and a bandwidth of each uplink BWP, etc.

It should be noted that the above information can be explicit or implicit; and there can be a pairing relation between the uplink BWP and the downlink BWP, or there is no pairing relation.

When a subsequent base station transmits a Random Access Response (RAR) and when it is necessary to perform uplink scheduling using Downlink Control Information (DCI), the transmitted UL Grant includes the following information:

BWP resource indication information
intra-BWP PRB resource indication information
other information Wherein, when there is no frequency hopping indication in the UL Grant, the BWP resource indication information indicates a certain BWP resource used for UE uplink data transmission, and the intra-BWP PRB resource indication information indicates the PRB resources within the uplink BWP for UE uplink transmission; when there is a frequency hopping indication in the UL Grant, the BWP resource indication information can include both frequency hopping indication information and BWP resource information used for UE uplink data transmission. The intra-BWP PRB resource indication information can include both frequency hopping indication information and activated uplink intra-BWP PRB resource information used for transmission.

It should be noted that, the frequency hopping indication information may only be included in the BWP resource indication information, which may only be included in the intra-BWP PRB resource indication information, or may be included in both of the above information; and the frequency hopping indication information may only include the inter-BWP frequency hopping resource allocation, may only include the inter-BWP frequency hopping resource allocation within a same BWP, and may include both the above allocations of the frequency hopping resource.

Specifically, after the above information is converted into binary bits, the composition of the UL Grant may have the following different arrangements from left to right:

(1) the BWP indication information is at the left of the intra-BWP PRB resource indication information, and the BWP indication information and the intra-BWP PRB resource indication information are adjacent to each other. The several specific possible cases are shown in FIG. 6.

(2) the BWP indication information is at the left of the intra-BWP PRB resource indication information, and the BWP indication information and the intra-BWP PRB resource indication information are not adjacent to each other. The several specific possible cases are shown in FIG. 7.

(3) the BWP indication information is at the right of the intra-BWP PRB resource indication information, and the BWP indication information and the intra-BWP PRB resource indication information are adjacent to each other. The several specific possible cases are shown in FIG. 8.

(4) the BWP indication information is at the right of the intra-BWP PRB resource indication information, and the BWP indication information and the intra-BWP PRB resource indication information are not adjacent to each other. The several specific possible cases are shown in FIG. 9

It should be noted that, for different binary bit arrangements of the UL grant, the MSB of the system may be at the left of the LSB and may also be at the right. The MSB and the LSB in FIG. 6 to FIG. 9 are exchanged, which is also a possible binary bit arrangement of the UL Grant in this embodiment. In addition, it should be noted that, the foregoing BWP resource indication information and the intra-BWP PRB resource indication information may be two independent indications, and may also be combined into the same indication.

When there is no frequency hopping indication information in the UL Grant, after receiving the UL Grant, the UE can acquire the allocation information of the uplink resources by the following steps:

11. Reading the BWP resource indication information in the UL Grant, and acquiring the allocated BWP used for uplink transmission resources based on the indication information.

12. Reading the intra-BWP PRB resource indication information in the UL Grant, and acquiring the PRB resources occupied by the allocated uplink transmission resources within the BWP based on the indication information.

13. Acquiring the final PRB resource information used for uplink transmission based on the BWP information used by the uplink transmission resources acquired in step 11 and the PRB resource information occupied by the uplink transmission resources acquired in step 12 within the BWP.

It should be noted that the above step 11 may be performed before step 12, step 12 may also be performed before step 11, and steps 11 and 12 may be performed simultaneously. It is not limited in the embodiment of the present disclosure.

When the UL Grant includes the frequency hopping indication information, after receiving the UL Grant, the UE may acquire the allocation information of the uplink resource by the following steps:

21. The UE reads the BWP resource indication information in the UL Grant, and if the BWP resource indication information does not include the frequency hopping indication information, the UE acquires the BWP used by the allocated uplink transmission resources based on the indication information, or respectively acquires the BWP used for the uplink transmission resources in a first slot (or a symbol, a mini-slot and a subframe) and a second slot (or a symbol, a mini-slot and a subframe) based on inter-BWP frequency hopping resource allocation information, the BWP resource indication information and other possible information (such as a cell identifier and a UE identifier) acquired in step 22; if the BWP resource indication information contains the inter-BWP frequency hopping resource allocation information, the UE respectively acquires the BWP used for uplink transmission resources in a first slot (or a symbol, a mini-slot and a subframe) and a second slot (or a symbol, a mini-slot and a subframe) based on the BWP resource indication information, the part, which is not the frequency hopping resource allocation information, of the BWP resource indication information and other possible information (such as a cell identifier and a UE identifier, and the like); if it both contains the inter-BWP frequency hopping resource allocation information and the intra-BWP inter-PRB frequency hopping resource allocation information simultaneously, the UE respectively acquires the BWP used for uplink transmission resources in a first slot (or a symbol, a mini-slot and a subframe) and a second slot (or a symbol, a mini-slot and a subframe) based on the frequency hopping resources between the BWPs allocation information, the part, which is not the frequency hopping resource allocation information, of BWP resource indication information and other possible information (such as a cell identifier and a UE identifier, and the like).

22. Reading the intra-BWP PRB resource indication information in the UL Grant, and if there is no frequency hopping indication information, acquiring the PRB resource occupied by the allocated uplink transmission resources within the BWP based on the indication information or respectively acquiring the PRB resources occupied by the uplink transmission resources allocated by the first slot (or a symbol, a mini-slot and a subframe) and the second slot (or a symbol, a mini-slot and a subframe) within the BWP based on the intra-BWP inter-BWP frequency hopping resource allocation information acquired in step 21, the intra-BWP PRB resource indication information and other possible information (such as a cell identifier and a UE identifier, and the like); if the intra-BWP PRB resource indication information contains the intra-BWP inter-BWP frequency hopping resource allocation information, the UE respectively acquires the PRB resource occupied by the uplink transmission resources allocated by the first slot (or a symbol, a mini-slot and a subframe) and the second slot (or a symbol, a mini-slot and a subframe) within the BWP based on the indication information, the part, which is not the frequency resource allocation information, of the intra-BWP PRB resource indication information and other possible information (such as a cell identifier and a UE identifier, and the like); if the intra-BWP PRB resource indication information contains both the intra-BWP frequency hopping resource allocation information and the intra-BWP inter-BWP frequency hopping resource allocation information, the UE respectively acquires the PRB resource occupied by the uplink transmission resource allocated by the first slot (or a symbol, a mini-slot and a subframe) and the second slot (or a symbol, a mini-slot and a subframe) within the BWP based on the intra-BWP inter-BWP frequency hopping resource allocation information, the part, which is not the frequency resource allocation information, of the intra-BWP PRB resource indication information and other possible information (such as a cell identifier and a UE identifier, and the like).

23. Based on the BWP information used by the uplink transmission resources acquired in step 21 and the possible frequency hopping between the BWPS information and the intra-BWP PRB resource information occupied by the uplink transmission resources acquired in step 22 and possible intra-BWP inter-BWP frequency hopping information to respectively acquire the final PRB resources occupied by the uplink transmission resources allocated in the first slot (or a symbol, a mini-slot and a subframe) and the second slot (or a symbol, a mini-slot and a subframe) within the BWP.

It should be noted that step 21 can be performed before step 22, and step 22 can be performed before step 21, and steps 21 and 22 can be performed simultaneously. It is not limited in the embodiment of the present disclosure.

Embodiment 2

This embodiment of the present disclosure introduces a method for uplink resource allocation by the base station to the UE. Similar to Embodiment 1, the bandwidth used by the entire system uplink is divided into several BWPs. Wherein, each of the BWPs can be contiguous, partially contiguous, or discrete. If the entire bandwidth is divided into N uplink BWPs (wherein, N is a positive integer), the N BWPs are sequentially numbered and to which indexes 0, 1, . . . , N−1 are allocated. Wherein, the $n^{th}$ BWP includes $L_n$ PRBs. The $L_n$ PRBs are also sequentially numbered and to which indexes 0, 1, . . . , $L_n$−1 are allocated.

The UE first detects the PBCH, acquires the resource information of one downlink BWP, further acquires the RMSI of the BWP and reads the resource information of the uplink BWP in the RMSI. In this embodiment of the present disclosure, the RMSI includes only resource information of one uplink BWP, and the information can include a central frequency location (or a frequency location difference between the starting frequency location and a frequency location of the BWP at a known location etc.) and a bandwidth of an uplink BWP, and the like.

It should be noted that the above information can be explicit or implicit; and there can be a pairing relation between the uplink BWP and the downlink BWP, or there is no pairing relation.

When a subsequent base station transmits an RAR and when it is necessary to perform uplink scheduling using the DCI, the transmitted UL Grant includes the following information:

intra-BWP PRB resource indication information other information

Wherein, when there is no frequency hopping indication in the UL Grant, the intra-BWP PRB resource indication information indicates the PRB resources used by the UE used for uplink intra-BWP transmission; and when there is a frequency hopping indication in the UL Grant, the intra-BWP PRB resource indication information can include both the frequency hopping indication information and the uplink intra-BWP PRB resource information used for transmission.

Specifically, after the above information is converted into binary bits, the possible specific composition of the UL Grant is shown in FIG. 10.

It should be noted that, for the different binary bit arrangements of the UL Grant in FIG. 10, the MSB of the system can be at the left of the LSB and may also be at the right. The MSB and the LSB in FIG. 10 are exchanged, which is also a possible binary bit arrangement of the UL Grant in this embodiment.

When there is no frequency hopping indication information in the UL Grant, after receiving the UL Grant, the UE can acquire the allocation information of the uplink resources by the following steps:

31. Reading the intra-BWP PRB resource indication information in the UL Grant.

32. Acquiring the PRB resources allocated for uplink transmission within the uplink BWP based on the indication information in step 31.

When the UL Grant includes the frequency hopping indication information, after receiving the UL Grant, the UE can acquire the allocation information of the uplink resources by the following steps:

41. Reading the intra-BWP inter-PRB frequency hopping resource allocation information in the intra-BWP PRB resource indication information in the UL Grant.

42. Reading the part, which is not the frequency hopping resource allocation information, of the intra-BWP PRB resource indication information in the intra-BWP PRB resource indication information in the UL Grant.

43. Acquiring the intra-BWP PRB resources used for uplink transmission allocated in the first slot (or a symbol, a mini-slot and a subframe) and the second slot (or a symbol, a mini-slot and a subframe) respectively based on the information acquired in step 41, the information acquired in step 42 and other possible information (such as a cell identifier and a UE identifier, and the like).

It should be noted that step 41 can be performed before step 42, and step 42 can be performed before step 41, and steps 41 and 42 can be performed simultaneously. It is not limited in the embodiment of the present disclosure.

Embodiment 3

This embodiment of the present disclosure introduces a method for uplink resource allocation by the base station to the UE. In this embodiment, the bandwidth used by the entire system uplink is divided into several BWPs. Wherein, each of the BWPs can be contiguous, partially contiguous, or discrete. If the entire bandwidth is divided into N uplink BWPs (wherein, N is a positive integer), the N BWPs are sequentially numbered and to which indexes 0, 1, . . . , N−1 are allocated. The $n^{th}$ BWP includes $L_n$ PRBs. The $L_n$ PRBs are also sequentially numbered and to which indexes 0, 1, . . . , $L_n$−1 are allocated.

The UE first detects the PBCH, acquires the resource information of one downlink BWP, further acquires the RMSI of the BWP and reads all available BWP information in the RMSI. The information can include index numbers of all available uplink BWPs, a central frequency location (or a frequency location different between a starting frequency location and a frequency location of the BWP at a known location, etc.) and a bandwidth of each uplink BWP, and the like.

It should be noted that the above information can be explicit or implicit; and there can be a pairing relation between the uplink BWP and the downlink BWP, or there is no pairing relation.

When a subsequent base station transmits an RAR and when it is necessary to perform uplink scheduling using the DCI, the transmitted UL Grant includes the following information:

BWP resource indication information
PRB resource within BWP indication information
time domain resource indication information
other information Wherein, the time domain resource indication information indicates a starting location in time domain for the uplink data transmission of the UE (e.g. starting after K symbols/mini-slots/slots/sub-frames after the start of the downlink data transmission, wherein, K is a positive integer) and the number of the symbols, mini-slots or slots L used in one mini-slot/slot/subframe by the uplink data transmission. When there is no frequency hopping indication in the UL Grant, the BWP resource indication information indicates a certain BWP resources used for UE uplink data transmission, and the intra-BWP PRB resource indication information indicates the indicated uplink intra-BWP PRB resources used for transmission; when there is a frequency hopping indication in the UL Grant, the BWP resource indication information can include both the frequency hopping indication information and the BWP resource information used for UE uplink data transmission. The indication information of the intra-BWP PRB resources can include both the frequency hopping indication information and the activated uplink intra-BWP PRB resource information used for transmission.

It should be noted that, the frequency hopping indication information may only be included in the BWP resource indication information, or may only be included in the intra-BWP PRB resource indication information, or may be included in both the above information; and the frequency hopping indication information may only include the allocation of the intra-BWP frequency hopping resources, or may only include the frequency hopping resource allocation between the PRB within a same BWP, or may include both the above two allocations of the frequency hopping resources.

Specifically, after the above information is converted into binary bits, the composition of the UL Grant may have the following different arrangements from left to right:

(1) The time domain indication information is at the left of the frequency domain indication information (the BWP indication information is adjacent to the PRB within the BWP indication information), and the two are adjacent to each other. The specific possible cases are shown in FIG. 11 and FIG. 12.

(2) The time domain indication information is at the right of the frequency domain indication information (the BWP indication information is adjacent to the intra-BWP PRB indication information), and the two are adjacent to each other. The specific possible cases are shown in FIG. 13 and FIG. 14.

It should be noted that, for different binary bit arrangements of the above UL Grant, the MSB of the system may be at the left of the LSB, and may also be at the right. The MSB and the LSB in FIG. 11 to FIG. 14 are exchanged, which is also a possible binary bit arrangement of the UL Grant in this embodiment. In addition, it should be noted that, the foregoing BWP resource indication information and the intra-BWP PRB resource indication information can be two independent indications, and may also be combined into the same indication.

When there is no frequency hopping indication information in the UL Grant, after receiving the UL Grant, the UE can acquire the allocation information of the uplink resources by the following steps:

51: Reading the time domain resource indication information in the UL Grant, and acquiring the allocated uplink transmission time domain resources based on the indication information.

52: Reading the BWP resource indication information in the UL Grant, and acquiring the BWP used by the allocated uplink transmission resources based on the indication information.

53: Reading the intra-BWP PRB resource indication information in the UL Grant, and acquiring the PRB resource occupied by the allocated uplink transmission resources within the BWP based on the indication information.

54: Acquiring the final resource information used for uplink transmission based on the uplink transmission time domain resources in step 51, the BWP information used by the uplink transmission resources acquired in step 52 and the PRB resource information occupied by the uplink transmission resources within the BWP acquired in step 53.

It should be noted that the above step 51, step 52, and step 53 can be performed in any order, or any two or three of the above steps can be performed simultaneously. It is not limited in the embodiment of the present disclosure.

When the UL Grant includes the frequency hopping indication information, after receiving the UL Grant, the UE can acquire the allocation information of the uplink resources by the following steps:

61: Reading the time domain resource indication information in the UL Grant, and acquiring the allocated uplink transmission time domain resources based on the indication information.

62. The UE reads the BWP resource indication information in the UL Grant, and if the BWP resource indication information does not contain the frequency hopping indication information, the UE acquires the BWP used by the allocated uplink transmission resources based on the indication information, or respectively acquires the BWP used for uplink transmission resources in a first slot (or a symbol, a mini-slot and a subframe) and a second slot (or a symbol, a mini-slot and a subframe) based on inter-BWP frequency hopping resource allocation information acquired in step 22, the part, which is not the frequency hopping resource allocation information, of the BWP resource indication information and other possible information (such as a cell identifier and a UE identifier, and the like); if the BWP resource indication information contains the inter-BWP frequency hopping resource allocation information, the UE respectively acquires the BWP used by the uplink transmission resources in a first slot (or a symbol, a mini-slot and a subframe) and a second slot (or a symbol, a mini-slot and a subframe) based on the BWP resource indication information, the part, which is not the frequency hopping resource allocation information, of the BWP resource indication information and other possible information (such as a cell identifier and a UE identifier, and the like); if the BWP resource indication information contains both the inter-BWP frequency hopping resource allocation information and the intra-BWP inter-PRB frequency hopping resource allocation information, the UE respectively acquires the BWP used by the uplink transmission resources in a first slot (or a symbol, a mini-slot and a subframe) and a second slot (or a symbol, a mini-slot and a subframe) based on the inter-BWP frequency hopping resource allocation information and the part, which is not the frequency hopping resource allocation information, of BWP resource indication information and other possible information (such as a cell identifier and a UE identifier, and the like).

63. Reading the intra-BWP PRB resource indication information in the UL Grant, if there is no frequency hopping indication information, acquiring the BWP resources occupied within the BWP by the allocated uplink transmission resources based on the indication information, or respectively acquiring the PRB resources occupied within the BWP by the allocated uplink transmission resources in a first slot (or a symbol, a mini-slot and a subframe) and a second slot (or a symbol, a mini-slot and a subframe) based on the intra-BWP inter-PRB frequency hopping resource allocation information acquired in step 21, the part, which is not the frequency hopping resource information, of the intra-BWP PRB resource indication information and other possible information (such as a cell identifier and a UE identifier, and the like); if it contains the intra-BWP inter-PRB frequency hopping resource allocation information, respectively acquiring the PRB resources occupied by the allocated uplink transmission resources within the BWP in a first slot (or a symbol, a mini-slot and a subframe) and a second slot (or a symbol, a mini-slot and a subframe) based on the indication information and the part, which is not the frequency hopping resource information, of the intra-BWP PRB resource indication information and other possible information (such as a cell identifier and a UE identifier, and the like); if the intra-BWP PRB resource indication information contains both the inter-BWP frequency hopping resource allocation information and the intra-BWP inter-PRB frequency hopping resource indication information, acquiring the PRB resources occupied within the BWP by the allocated uplink transmission resources in a first slot (or a symbol, a mini-slot and a subframe) and a second slot (or a symbol, a mini-slot and a subframe) based on the intra-BWP frequency hopping resource allocation information, the part, which is not the frequency hopping resource allocation information, of intra-BWP PRB resource indication information and other possible information (such as a cell identifier and a UE identifier, and the like).

64. Acquiring the final uplink transmission resources in a first slot (or a symbol, a mini-slot and a subframe) and a second slot (or a symbol, a mini-slot and a subframe) respectively, based on the uplink transmission time domain resources acquired in step 61, the BWP information used by the uplink transmission resources and possible intra-BWP frequency hopping information acquired in step 62, the PRB resource information occupied within the BWP by the uplink transmission resources and the possible intra-BWP inter-PRB frequency hopping information acquired in step 63.

It should be noted that the above steps 61, 62, and 63 can be performed in any order, any two or three of the above steps can be performed simultaneously. It is not limited in the embodiment of the present disclosure.

Embodiment 4

This embodiment of the present disclosure introduces a method for uplink resource allocation by the base station to the UE. Similar to Embodiment 1, the bandwidth used by the entire system uplink is divided into several BWPs. Each of the BWPs can be contiguous, partially contiguous, or discrete. If the entire bandwidth is divided into N uplink BWPs (wherein, N is a positive integer), the N BWPs are sequentially numbered and to which indexes 0, 1, ..., N−1 are allocated. Wherein, the $n^{th}$ BWP includes $L_n$ PRBs. The $L_n$ PRBs are also sequentially numbered and to which indexes 0, 1, ..., $L_n$−1 are allocated.

The UE first detects the PBCH, acquires the resource information of one downlink BWP, further acquires the RMSI of the BWP and reads the resource information of the uplink BWP in the RMSI. In this embodiment of the present disclosure, the RMSI includes only the resource information of one uplink BWP, and the information can include a central frequency location (or a frequency location different between a starting frequency location and a frequency location of the BWP at a known location, etc.) and a bandwidth of an uplink BWP, and the like.

It should be noted that the above information can be explicit or implicit; and there can be a pairing relation between the uplink BWP and the downlink BWP, or there is no pairing relation.

When a subsequent base station transmits an RAR and when it is necessary to perform uplink scheduling using the DCI, the transmitted UL Grant includes the following information:

intra-BWP PRB resource indication information
time domain resource indication information
other information Wherein, the time domain resource indication information indicates a starting location in time domain for the uplink data transmission of the UE (e.g. starting after K symbols/mini-slots/slots/sub-frames after the start of the downlink data transmission, wherein, K is a positive integer) and the number of the symbols, mini-slots or slots L used in one mini-slot/slot/subframe by the uplink data transmission. When there is no frequency hopping indication in the UL Grant, the intra-BWP PRB resource indication information indicates the UE the PRB resources used for transmission within the uplink BWP, and when there is a frequency hopping indication in the UL Grant, the indication information of the intra-BWP PRB resources can include both the frequency hopping indication information and the PRB resource information used for transmission within the uplink BWP.

Specifically, after the above information is converted into binary bits, the composition of the UL Grant can have the following different arrangements from left to right:

(1) The time domain indication information is at the left of the intra-BWP PRB indication information, and the time domain indication information and the intra-BWP PRB indication information are adjacent to each other. The specific possible case is shown in FIG. 15.

(2) The time domain indication information is at the right of the intra-BWP PRB indication information, and the time domain indication information and the intra-BWP PRB indication information are adjacent to each other. The specific possible case is shown in FIG. 16.

It should be noted that, for different binary bit arrangements of the above UL Grant, the MSB of the system may be at the left of the LSB, and may also be at the right. The MSB and the LSB in FIG. 15 to FIG. 16 are exchanged, which is also a possible binary bit arrangement of the UL Grant in this embodiment.

When there is no frequency hopping indication information in the UL Grant, after receiving the UL Grant, the UE can acquire the allocation information of the uplink resources by the following steps:

Step 71: Reading the time domain resource indication information in the UL Grant, and acquiring the allocated uplink transmission time domain resources based on the indication information.

Step 72: Reading the intra-BWP PRB resource indication information in the UL Grant.

Step 73: Acquiring the final resource information for uplink transmission based on the uplink transmission time domain resources acquired in step 71 and the intra-BWP PRB resource information occupied by the uplink transmission resources in step 72.

It should be noted that above step 71 can be performed before step 72, step 72 can be performed before step 71, and steps 71 and 72 can be performed simultaneously. It is not limited in the embodiment of the present disclosure.

When the UL Grant contains the frequency hopping indication information, after receiving the UL Grant, the UE can acquire the allocation information of the uplink resources by the following steps:

Step 81: Reading the time domain resource indication information in the UL Grant, and acquiring the allocated uplink transmission time domain resources based on the indication information.

Step 82: Reading the intra-BWP inter-PRB frequency hopping resource allocation information in the intra-BWP PRB resource indication information in the UL Grant.

Step 83: Reading the part, which is not the frequency hopping resource allocation information, of the intra-BWP PRB resource indication information in the intra-BWP PRB resource indication information in the UL Grant.

Step 84: Acquiring the resources used for uplink transmission allocated within the uplink BWP in a first slot (or a symbol, a mini-slot and a subframe) and a second slot (or a symbol, a mini-slot and a subframe) respectively based on the uplink transmission time domain resources acquired in step 71, the information acquired in step 82, the information acquired in step 43 and other possible information (such as a cell identifier and a UE identifier, and the like).

It should be noted that the above step 81, step 82, and step 83 can be performed in any order, any two or three of the above steps can be performed simultaneously. It is not limited in the embodiment of the present disclosure.

Embodiment 5

On the basis of the method for uplink resource allocation by the base station to the UE introduced in Embodiment 1, Embodiment 2, Embodiment 3 and Embodiment 4, this embodiment of the present disclosure introduces a method for generating the BWP resource indication information and the intra-BWP PRB resource indication information in the UL Grant transmitted by the base station, and a method for detecting the indication information by the UE. In this embodiment of the present disclosure, the bandwidth used by the entire system uplink is divided into several BWPs. Wherein, each of the BWPs can be contiguous, partially contiguous, or discrete.

After the UE reads the RMSI, the ways that the UE specifically indicates the BWP resource information and the UE detects the BWP resource information can includes the following different types:

Type 1: After reading the RMSI, the UE acquires information about N available uplink BWPs (wherein, N is a positive integer and N≥2), and includes a frequency difference between the central frequency location of each BWP and a frequency location of a BWP at a known frequency location or a frequency difference between the starting frequency location and the frequency location of a BWP at a known frequency location. The indexes of N uplink BWPs are 0, 1, . . . , N−1 in order; the bandwidth of the $n^{th}$ (0≤n≤N−1) BWP is $L_n$ PRBs, and the indexes of the $L_n$ PRBs are 0, 1, . . . , $L_n$−1.

The base station uses $\lceil \log_2 N \rceil$ bits of binary information to represent the allocated BWP resources. Wherein, the $\lceil \log_2 N \rceil$ bits of binary information and the BWP with an index n (1≤n≤N−1) have the following mapping relation: for any BWP with an index n, it corresponds to a piece of binary information having a non-repetitive length $\lceil \log_2 N \rceil$ bit. A possible mapping relation is that: for a decimal index n, it is converted to a binary number having a length of $\lceil \log_2 N \rceil$ (the number of insufficient digits complements zero), using the converted binary number as its corresponding BWP resource allocation information in accordance with the order of arranging the MSB at the left and the LSB at the right or the order of arranging the LSB at the left and the MSB at the right.

The base station does not indicate the frequency hopping resource allocation information. The base station allocates an uplink BWP with an index n (1≤n≤N−1) to a certain UE, obtains the binary information corresponding to the BWP according to the above mapping relationship, and uses the binary information as the BWP resource allocation information, and transmits in the UL grant.

After receiving the BWP resource allocation information in the UL Grant, the UE obtains the index of the uplink BWP based on the foregoing mapping relationship. Based on the index of the uplink BWP and the read RMSI BWP information, the BWP central frequency location (or the starting frequency location) and the bandwidth allocated by uplink transmission are acquired.

Type 2: After reading the RMSI, the UE acquires the bandwidth information of the uplink BWP. The base station uses the frequency difference between the starting frequency location of the BWP and the frequency location of the BWP at a known location or the frequency difference between the central frequency location of the BWP and the frequency location of the BWP at a known location to represent the frequency location of the uplink BWP. Assuming there are M possible frequency differences and indexes of the frequency differences are respectively 0, 1, . . . , M−1, the base station uses $\lceil \log_2 M \rceil$ bits of binary information to represent the allocated BWP resources. The $\lceil \log_2 N \rceil$ bits of binary information and the BWP with a frequency difference index m (1≤m≤N−1) have the following mapping relation: for any BWP with the difference index m, it corresponds to a piece of binary information having a non-repetitive length of $\lceil \log_2 N \rceil$ bits. A possible mapping relationship is that: sorting the possible frequency differences in ascending order or descending order, and allocating the difference indexes 0, 1, . . . , M−1 in order, and converting the decimal indexes to the binary numbers, and using the converted binary numbers as the corresponding BWP resource allocation information.

The base station does not indicate the frequency hopping resource allocation information. The base station allocates an uplink BWP with a difference index m (1≤m≤M−1) to a certain UE, obtains binary information corresponding to a frequency difference between the BWP and the BWP at a known location according to the foregoing mapping relationship, uses this binary information as the BWP resource allocation information, and transmits in the UL Grant.

After receiving the BWP resource allocation information in the UL Grant, the UE obtains the index of the frequency difference between the uplink BWP and the BWP at a known location based on the foregoing mapping relationship. The BWP central frequency location and the bandwidth allocated by the uplink transmission are acquired based on this index, the frequency location of a known BWP and the uplink BWP bandwidth information acquired by reading the RMSI.

Type 3: On the basis of type 1, the base station indicates the inter-BWP frequency hopping resource allocation information. Similarly, after reading the RMSI, the UE acquires information about N available uplink BWPs (wherein, N is a positive integer and N≥2), and includes a frequency difference between the central frequency location of each BWP and a frequency location of a BWP at a known frequency location or a frequency difference between the starting frequency location and the frequency location of a BWP at a known frequency location. The indexes of the N uplink BWPs are 0, 1, . . . , N−1 in order, and for any BWP with an index of n, there is a piece of binary information with a non-repetitive length of $\lceil \log_2 N \rceil$ bits corresponding thereto.

The base station allocates two uplink BWPs (1≤n≤N−1) with indexes $n_1$ and $n_2$ to a certain UE, which respectively indicating the UE the BWP resource allocation in the first slot (or a symbol, a mini-slot or a subframe) and in the second slot (or a symbol, a mini-slot, or a subframe). According to the above mapping relationship, the base station respectively obtains the binary information corresponding to the two BWPs, uses the two pieces of binary information as the BWP resource allocation information, and transmits in the UL Grant.

After receiving the BWP resource allocation information in the UL Grant, the UE respectively obtains indexes of two uplink BWPs based on the foregoing mapping relationship. Based on the indexes and the information acquired by reading the RMSI, the BWP central frequency location (or the starting frequency location) and the bandwidth allocated by the uplink transmission in the first slot (or a symbol, a mini-slot or a subframe) and in the second slot (or a symbol, a mini-slot, or a subframe) are respectively acquired.

Type 4: On the basis of Type 2, the base station indicates the frequency hopping resources between the BWP allocation information. Similarly, after reading the RMSI, the UE obtains the bandwidth information of the uplink BWP. For the starting frequency location or central frequency location of a certain BWP at a known frequency location, the base station uses the frequency difference between the starting frequency location of the BWP and the frequency location of the BWP at a known location or the frequency difference between the central frequency location of the BWP and the frequency location of the BWP at a known location. Assuming there are M possible frequency differences, and the indexes of the frequency difference are respectively 0, 1, . . . , M−1, then the base station uses $\lceil \log_2 M \rceil$ bits of binary information to represent the allocated BWP resource. The $\lceil \log_2 M \rceil$ bits of binary information and the BWP with the frequency difference index m (1≤m≤M−1) has the following mapping relationship: for any BWP with the difference index m, it corresponds to a piece of binary information having an non-repetitive length of $\lceil \log_2 N \rceil$ bits.

The base station allocates two uplink BWPs with indexes $m_1$ and $m_2$ (1≤m≤M−1) to a certain UE respectively to indicate the UE the BWP resource allocation in the first time slot (or a symbol, a mini-slot, a subframe) and in the second time slot (or a symbol, a mini-slot, a subframe). According to the above mapping relationship, the base station respectively obtains the two pieces of binary information corresponding to the frequency differences between the two BWPs and the BWP at a known location, and uses the two pieces of binary information as the BWP resource allocation information, and transmits in the UL Grant.

After receiving the BWP resource allocation information in the UL Grant, the UE respectively obtains the indexes of the frequency differences between the two uplink BWPs and the BWP at a known location based on the foregoing mapping relationship. Based on the indexes and the uplink BWP bandwidth information acquired by reading the RMSI, the BWP central frequency location (or the starting frequency location) and the bandwidth allocated by the uplink transmission in the first slot (or a symbol, a mini-slot or a subframe) and in the second slot (or a symbol, a mini-slot, or a subframe) are respectively acquired.

On the other hand, for a certain BWP, the way that the UE specifically indicates the intra-BWP PRB resource information and the UE detects the intra-BWP PRB resource information has the following different cases:

Type 1: The bandwidth of the BWP where the uplink resources allocated by the base station to the UE is $L_{UL}$ PRBs, and indexes of the $L_{UL}$ PRBs are 0, 1, . . . , $L_{UL}$−1 in order. The base station uses $\log_2 \lceil L_{UL}(L_{UL}+1)/2 \rceil$ bits of information to indicate an uplink resource allocation with a starting PRB index location of $RB_{START}$ and a length of $L_{CRBs}$ PRBs. In this case, the RIV can be calculated by the following formula:

$$RIV = \begin{cases} L_{UL}(L_{CRBs} - 1) + RB_{START} & L_{CRBs} - 1 \leq L_{UL}/2 \\ L_{UL}(L_{UL} - L_{CRBs} - 1) + (L_{UL} - 1 - RB_{START}) & L_{CRBs} - 1 > L_{UL}/2 \end{cases}$$

When the base station does not indicate the intra-BWP inter-PRB frequency hopping resource allocation information, the base station allocates a certain UE an uplink resource allocation with a starting PRB index of $RB_{START}$ and a length of $L_{CRBs}$ PRBs, and then converts the calculated decimal RIV into the a binary number having a length of $\log_2 \lceil L_{UL}(L_{UL}+1)/2 \rceil$ (the number of insufficient digits complements zero), uses the converted binary number as the BWP resources within the BWP allocation information in accordance with the order of arranging the MSB at the left and the LSB at the right or the order of arranging the LSB at the left and the MSB at the right, and transmits in the UL Grant.

After receiving the intra-BWP PRB resource allocation information in the UL Grant, the UE converts the binary information into decimal information to obtain the RIV information, and then obtains the values of $RB_{START}$ and $L_{CRBs}$ by the following formula to obtain the PRB information allocated by the uplink transmission within the BWP:

$$a=\lfloor RIV/L_{UL} \rfloor, b=RIV \bmod L_{UL}$$

if $a+b>L_{UL}, RB_{START}=L_{UL}-1-b$ and $L_{CRBs}=L_{UL}+2-a$;

and if $a+b \leq L_{UL}, RB_{START}=b$ and $L_{CRBs}=a$.

If the base station indicates the intra-BWP inter-PRB frequency hopping resource allocation information, the intra-BWP PRB resource allocation information includes both the frequency hopping resource allocation information and normal PRB resource allocation information. When a base station allocates PRB resources, the base station calculates the RIV based on the normal PRB resource allocation information according to the foregoing method. After receiving the intra-BWP inter-PRB resource indication information, the UE can obtain the normal PRB resource allocation information from the RIV according to the foregoing method. The PRB resource occupied within the BWP by the allocated uplink transmission resources in a first slot (or a symbol, a mini-slot and a subframe) and a second slot (or a symbol, a mini-slot and a subframe) is acquired respectively based on the frequency hopping resource allocation information, the normal PRB resource allocation information and other possible information (such as a cell identifier and a UE identifier, and the like).

It should be noted that, the length of the intra-BWP PRB resource allocation information can be indicated by a variable related to a bandwidth of the PRB, or can be a fixed value. When the length of the information is a fixed value, if the number of bits which is necessary to actually calculate the intra-BWP PRB resource allocation information is less than the fixed value, the MSB or the LSB can be supplemented to 0, and the UE removes these supplements and performs the detection; if the number of bits which is necessary to actually calculate the intra-BWP PRB resource allocation information is greater than the fixed value, the MSB or the LSB can be cut off for an equal length, and the UE can complement several 0 or 1 to perform detection.

Type 2: The bandwidth of the BWP where the uplink resources are located allocated by the base station to the UE is $L_{UL}$ PRBs, and indexes of the $L_{UL}$ PRBs are 0, 1, . . . , $L_{UL}-1$ in order. The base station uses $\log_2 \lceil L_{UL}(L_{UL}+1)/2 \rceil$ bits of information to indicate an uplink resource allocation with a starting PRB index location of $RB_{START}$ and a length of $L_{CRBs}$ PRBs. In this case, the RIV can be calculated by the following formula:

$$RIV = \begin{cases} L_{UL}(L_{CRBs}-1) + RB_{START} & L_{CRBs}-1 \leq L_{UL}/2 \\ L_{UL}(L_{UL}-L_{CRBs}-1) + (L_{UL}-1-RB_{START}) & L_{CRBs}-1 > L_{UL}/2 \end{cases}$$

When the base station does not indicate the intra-BWP inter-PRB frequency hopping resource allocation information, the base station allocates Q continuous uplink PRB resources to a certain UE, wherein, Q is a positive integer and indexes 0, 1, . . . , Q−1 are allocated to each uplink PRB resource. The starting PRB index location of the $q^{th}$ uplink transmission resource (0≤q≤Q−1) is $RB_{START}$ and the length is $L_{CRBs}^q$ PRBs. For each uplink transmission resource, the RIV value $RIV^q$ (0≤q≤Q−1) corresponding to the resource is calculated according to the above relationship in turn, and each calculated RIV decimal value is converted into a fixed-length binary number (the length is $\lceil \log_2 L_{UL}(L_{UL}+1)/2 \rceil$, and the insufficient number of bits are complemented with zero). The base station transmits the converted RIV value of each resource and the possible number of uplink PRB resources Q which is considered as the intra-BWP PRB resource allocation information in the UL Grant.

Specifically, after the above information is converted into binary bits, a possible specific composition of the intra-BWP PRB resource allocation information in the UL Grant is shown in FIG. 17.

It should be noted that, for the binary bit arrangement with different intra-BWP PRB resource allocation information in the UL Grant, the MSB of the system may be at the left of the LSB and may also be at the right. The MSBs and the LSBs in FIG. 17 are exchanged, which is also a possible binary bit arrangement of the intra-BWP PRB resource allocation information in the UL Grant in this embodiment.

After receiving the intra-BWP PRB resource allocation information in the UL Grant, the UE converts the binary information into the decimal information to obtain the number Q of uplink transmission resources and each RIV information, and then obtains the value of each $RB_{START}^q$ and $L_{CRBs}^q$, and acquires each PRB resource information (0≤q≤Q−1) allocated by uplink transmission within BWP:

$$a^q=\lfloor RIV^q/L_{UL} \rfloor, b^q=RIV^q \bmod L_{UL}$$

if $a^q+b^q>L_{UL}, RB_{START}^q=L_{UL}-1-b^q$ and $L_{CRBs}^q=L_{UL}+2-a^q$;

if $a^q+b^q \leq L_{UL}$, $RB_{START}^q=b^q$ and $L_{CRBs}^q=a^q$. If the base station indicates the intra-BWP inter-PRB frequency hopping resource allocation information, the intra-BWP PRB resource allocation information contains both the frequency hopping resource allocation information and the normal PRB resource allocation information. When a base station allocates PRB resources, each value of the RIV can be calculated based on the normal PRB resource allocation information according to the foregoing method. After receiving the resources between the PRB within the BWP indication information, the UE can obtain the normal PRB resource allocation information from the number of the uplink transmission resources and each RIV according to the foregoing method. Each segment of PRB resources occupied within the BWP by the uplink transmission resources allocated in the first slot (or a symbol, a min-slot, a subframe) and in the second slot (or a symbol, a min-slot, a subframe) are respectively acquired based on the frequency hopping allocation resource information, the normal PRB resource allocation information and other possible information (such as a cell identifier and a UE identifier, and the like).

It should be noted that, the length of the intra-BWP PRB resource allocation information can be indicated by a variable related to a bandwidth of the PRB, or can be a fixed value. When the length of the information is a fixed value, if the number of bits which is necessary to actually calculate the intra-BWP PRB resource allocation information is less than the fixed value, the MSB or the LSB at each RIV can be supplemented to 0, and the UE removes these supplements and performs the detection; if the number of bits which is necessary to actually calculate the intra-BWP PRB resource allocation information is greater than the fixed value, the MSB or the LSB at each RIV can be cut off for an equal length, and the UE cam complement several 0 or 1 to perform the detection.

Type 3: The bandwidth of the BWP, where the uplink resources are located, allocated by the base station to the UE is $L_{UL}$ PRBs, and indexes of the $L_{UL}$ PRBs are 0, 1, ..., $L_{UL}-1$ in order. According to the size of the bandwidth of the BWP, the system defines a concept of RBG, wherein, each RBG consists of a fixed number of P PRBs (the number of PRBs in the RBG at the edge of the BWP may be less than P), wherein, P is a positive integer. The base station uses $Q=\lceil L_{UL}/P \rceil$ bits of bit-map information to indicate the intra-BWP PRB uplink resource allocation and the base station allocates the uplink transmission resources in units of RBGs.

Specifically, indexes 0, 1, ..., Q−1 are sequentially added to the Q RBGs within the BWP and the bit group $b=[b_0, \ldots, b_{Q-1}]$ is defined. The number of the elements in this bit set is the same as the number of the divided RBGs. The value of the element $b_i$ in this bit set is 0 or 1, which represents whether to allocate the $i^{th}$ RBG, wherein, 0 represents no allocation and 1 represents allocation.

The base station allocates one or more RBG resources to a certain UE, the UE generates a corresponding bit group using the foregoing way and according to whether to allocate a certain RBG within the BWP. The generated bit set using as the intra-BWP PRB resource allocation information is transmitted in the UL Grant.

After receiving the intra-BWP PRB resource allocation information in the UL Grant, the UE obtains one or more pieces of intra-BWP RBG information allocated for uplink transmission according to a location with a value of 1 in the information. If multiple RBG resources are allocated, different RBGs can be continuous or discrete.

It should be noted that, the length of the intra-BWP PRB resource allocation information can be a variable related to the bandwidth of the BWP, or can be a fixed value.

Type 4: The bandwidth of the BWP, where the uplink resources are located, allocated by the base station to the UE is $L_{UL}$ PRBs, and indexes of the $L_{UL}$ PRBs are 0, 1, ..., $L_{UL}-1$ in order. According to the size of the bandwidth of the BWP, the system defines a concept of the RBG, wherein, each RBG consists of a fixed number of $P_1$ PRBs (the number of the PRBs in the RBG at the edge of the BWP may be less than $P_1$), wherein, $P_1$ is a positive integer. On the basis of $\lceil L_{UL}/P_1 \rceil$ PRBS, the system further defines $P_2$ RBG sets, wherein, the number of the RBGs of each RBG set is $\lceil \lceil L_{UL}/P_1 \rceil/P_2 \rceil$ or $\lceil \lceil L_{UL}/P_1 \rceil/P_2 \rceil-1$. $P_2$ RBG sets are sequentially allocated indexes 0, 1, ..., $P_2-1$. The base station indicates the intra-BWP PRB uplink resource allocation to allocate uplink transmission resources in units of RBG in a way of combining the RBG set indication and the bit-map information.

Specifically, for $P_2$ RBG sets, the information of the RBG set is indicated by the information of $\lceil \log_2 P_2 \rceil$ bits. Wherein, the RBG set with index p ($0 \leq p \leq P_2-1$) and the $\lceil \log_2 P_2 \rceil$ bits of binary information has the following mapping relationship: for any RBG set, it corresponds to a piece of binary information having a non-repetitive length of $\lceil \log_2 P_2 \rceil$ bits. Assuming that the number of RBGs within the RBG set with an index p is $Q_p$ ($0 \leq p \leq P_2-1$), and indexes 0, 1, ..., $Q_p-1$ are added to $Q_p$ RBGs within the RBG set and a bit set $b=[b_0, \ldots, b_{Q_p-1}]$ is defined. The number of elements in the bit set is the same as the number of RBGs in the RBG set. The value of the element $b_i$ ($0 \leq i \leq Q_p-1$) in the bit set is 0 or 1, representing whether to allocate the $i^{th}$ RBG, wherein, 0 represents no allocation and 1 represents allocation.

The base station allocates one or more RBG resources within a RBG set to a certain UE. In the above way, the base station first indicates the RBG set resource allocation information, and then generates a corresponding bit set according to whether to allocate a certain RBG within the RBG set, both of the above steps are included in the intra-BWP PRB resource allocation information to be transmitted in the UL Grant. It should be noted that, the intra-BWP PRB resource allocation information may also include a fixed bit of RBG offset indication.

Specifically, after the above information is converted into binary bits, a possible specific composition of the intra-BWP PRB resource allocation information in the UL Grant is shown in FIG. 18.

It should be noted that, for the binary bit arrangement with different intra-BWP PRB resource allocation information in the UL Grant, the MSB of the system may be at the left of the LSB and may also be at the right. The MSB and the LSB in FIG. 18 can be exchanged, which is also a possible binary bit arrangement of the intra-BWP PRB resource allocation information in the UL Grant in this embodiment.

After receiving the intra-BWP PRB resource allocation information in the UL Grant, the UE acquires the RBG set resource allocation information according to the RBG set index information therein, and allocates the location with the value 1 in the bit-map information according to the RBG resource, acquires one or more RBG resource information allocated within the RBG set. If multiple RBG resources are allocated, different RBG can be continuous or discrete.

It should be noted that, the length of the intra-BWP PRB resource allocation information can be indicated through a variable related to the bandwidth of the BWP, or can be a fixed value.

Type 5: The bandwidth of the BWP, where the uplink resources are located, allocated by the base station to the UE is $L_{UL}$ PRBs, and indexes of the $L_{UL}$ PRBs are 0, 1, ..., $L_{UL}-1$ in order. According to the size of the bandwidth of the BWP, the system defines a concept of RBG, wherein, each RBG consists of a fixed number of $P_1$ PRBs (the number of PRBs in the RBG at the edge of the BWP may be less than $P_1$), wherein, $P_1$ is a positive integer. On the basis of $P_1$ RBGs, the system further defines $P_2$ RBG sets. Indexes 0, 1, ..., $P_2-1$ are sequentially allocated for the $P_2$ RBG sets. The base station indicates the PRB uplink resource allocation within the BWP in a way of combining the RBG set indication with the bit-map information and allocates the uplink transmission resources in units of PRB.

Specifically, for $P_2$ RBG sets, the information of the RBG set is indicated by $\lceil \log_2 P_2 \rceil$ bits information. Wherein, the RBG set with index p ($0 \leq p \leq P_2-1$) and the $\lceil \log_2 P_2 \rceil$ bits of binary information has the following mapping relationship: for any RBG set, it corresponds to a piece of binary information having an non-repetitive length $\lceil \log_2 P_2 \rceil$ bit.

Assuming that the number of PRBs within an RBG set with an index p is $Q_p$ ($0 \leq p \leq P_2-1$), indexes 0, 1, ..., $Q_p-1$ are sequentially added to $Q_p$ PRBs within the RBG set, and a bit set $b=[b_0, \ldots, b_{Q_p-1}]$ is defined, the number of elements in the bit set is the same as the number of PRBs in the RBG set. The value of the element $b_i$ ($0 \leq i \leq Q_p-1$) in the bit set is 0 or 1, representing whether the $i^{th}$ PRB is allocated, wherein, 0 represent no allocation and 1 represents allocation.

The base station allocates one or more PRB resources within a RBG set to a certain UE. In the above way, the base station first indicates the RBG set resource allocation information, and then generates a corresponding bit group according to whether to allocate a PRB within the RBG set, both of the above steps are included in the intra-BWP PRB resource allocation information to be transmitted in the UL Grant. It should be noted that, the intra-BWP PRB resource allocation information may also include a fixed bit of PRB offset indication.

Specifically, after the above information is converted into binary bits, a possible specific composition of the intra-BWP PRB resource allocation information in the UL Grant is shown in FIG. 19.

It should be noted that, for the binary bit arrangement with different intra-BWP PRB resource allocation information in the UL Grant, the MSB of the system may be at the left of the LSB and may also be at the right. The MSB and the LSB in FIG. 19 are exchanged which is also a possible binary bit arrangement of the intra-BWP PRB resource allocation information in the UL Grant in this embodiment.

After receiving the intra-BWP PRB resource allocation information in the UL Grant, the UE acquires the RBG set resource allocation information according to the RBG set index information therein, and allocates the location with the value 1 in the bit-map information according to the PRB resources, acquires one or more PRB resource information allocated within the RBG set. If multiple PRB resources are allocated, the different PRBs can be continuous or discrete.

It should be noted that, the length of the intra-BWP PRB resource allocation information can be indicated through a variable related to the bandwidth of the BWP, or can be a fixed value.

Type 6: The bandwidth of the BWP, where the uplink resources are located, allocated by the base station to the UE is $L_{UL}$ PRBs, and indexes of the $L_{UL}$ PRBs are 0, 1, . . . , $L_{UL}-1$ in order. According to the size of the bandwidth of the BWP, the system defines a concept of RBG, wherein, each RBG consists of a fixed number of P PRBs (the number of PRBs in the RBG at the edge of the BWP may be less than P), wherein, P is a positive integer. The number of the intra-BWP RBG is $\lceil L_{UL}/P \rceil$, the RBG sets are sequentially allocated with indexes 0, 1, . . . , $\lceil L_{UL}/P \rceil-1$. The base station allocates the uplink transmission resources in units of PRB.

The base station allocates Q continuous RBG resources to a certain UE, wherein, Q is a positive integer and indexes 0, 1, . . . , Q−1 are allocated to each RBG resource. The starting RBG index location of the $q^{th}$ (0≤q≤Q−1) uplink transmission resource is $RBG_{START}^q$ and the length is $L_{CRBGs}^q$ PRBs. The base station combines the starting location information of each PRB $RBG_{START}^q$ (0≤q≤Q−1), the length information of each PRB $L_{CRBGs}^q$ and the possible number of RBG resources as the intra-BWP PRB resource allocation information, and transmits in the UL Grant.

Specifically, after the above information is converted into binary bits, a possible specific composition of the intra-BWP PRB resource allocation information in the UL Grant is shown in FIG. 20.

It should be noted that, for the binary bit arrangement with different intra-BWP PRB resource allocation information in the UL Grant, the MSB of the system may be at the left of the LSB and may also be at the right. The MSB and the LSB in FIG. 20 are exchanged which is also a possible binary bit arrangement of the intra-BWP PRB resource allocation information in the UL Grant in this embodiment.

Wherein, the starting location of each RBG resource may have different composition as follows:

(1) Indicating the starting location of each RBG resource respectively $RBG_{START}^0$, $RBG_{START}^1$, . . . $RBG_{START}^{Q-1}$;

(2) Indicating the differences $RBG_{START}^1-RBG_{START}^0$, . . . , $RBG_{START}^{Q-1}-RBG_{START}^0$ between the starting location of the each remaining RGB resources and the starting location $RBG_{START}^0$ of the 0th paragraph of RBG resources, and these differences are generated in a limited set;

(3) Indicating the ratio $RBG_{START}^1/RBG_{START}^0$, . . . , $RBG_{START}^{Q-1}/RBG_{START}^0$ of the starting location of the each remaining RGB resources to the starting location $RBG_{START}^0$ of the 0th paragraph of RBG resources, and these ratios are generated in a limited set.

The length of each RBG resource may have the following different compositions:

(1) Indicating the length $L_{CRBGs}^0$, $L_{CRBGs}^1$, . . . $L_{CRBGs}^{Q-1}$ of each paragraph of RBG resources respectively;

(2) Indicating the differences $L_{CRBGs}^1-L_{CRBGs}^0$, . . . , $L_{CRBGs}^{Q-1}-L_{CRBGs}^0$ between the length of the each remaining RGB resources and the length $L_{CRBGs}^0$ of the 0th paragraph of RBG resource, and these differences are generated in a limited set;

(3) Indicating the ratio of the each remaining RGB resource to the length $L_{CRBGs}^0$ of the 0th paragraph of RBG resources, and these differences are generated in a limited set.

After receiving the intra-BWP PRB resource allocation information in the UL Grant, the UE obtains the values (q=0, 1, . . . , Q−1) of the each $RBG_{START}^q$ and $L_{CRBGs}^q$ to acquire each RBG resource information allocated by the uplink transmission within the BWP.

It should be noted that, the length of the intra-BWP PRB resource allocation information can be indicated through a variable related to the bandwidth of the BWP, or can be a fixed value.

Type 7: The bandwidth of the BWP, where the uplink resources are located, allocated by the base station to the UE is $L_{UL}$ PRBs, and indexes of the $L_{UL}$ PRBs are 0, 1, . . . , $L_{UL}-1$ in order. The base station allocates uplink transmission resources in units of PRBs.

The base station allocates Q continuous RBG resources to a certain UE, wherein, Q is a positive integer and indexes 0, 1, . . . , Q−1 are allocated to each RBG resource. The starting PRB index location of the $q^{th}$ (0≤q≤Q−1) uplink transmission resource is $RBG_{START}^q$ and the length is $L_{CRBGs}^q$ PRBs. The base station combines the starting location information of each PRB $RBG_{START}^q$ (0≤q≤Q−1), the length information of each RBG $L_{CRBGs}^q$ and the possible number of PRB resources as the intra-BWP PRB resource allocation information, and transmits in the UL Grant.

Specifically, after the above information is converted into binary bits, a possible specific composition of the intra-BWP PRB resource allocation information in the UL Grant is as shown in FIG. 21.

It should be noted that, for the binary bit arrangement with different intra-BWP PRB resource allocation information in the UL Grant, the MSB of the system may be at the left of the LSB and may also be at the right. The MSB and the LSB in FIG. 21 are exchanged which is also a possible binary bit arrangement of the intra-BWP PRB resource allocation information in the UL Grant in this embodiment.

Wherein, the starting locations of each PRB resource may have different composition as follows:

(1) Indicating the starting location of each PRB resource respectively $RB_{START}^0$, $RB_{START}^1$, . . . $RB_{START}^{Q-1}$;

(2) Indicating the differences $RB_{START}^1-RB_{START}^0$, . . . , $RB_{START}^{Q-1}-RB_{START}^0$ between the starting location $RB_{START}^0$ of the 0th paragraph of PRB resources and the starting location of the each remaining PRB resources, and these differences are generated in a limited set;

(3) Indicating the ratio $RB_{START}^1/RB_{START}^0$, . . . , $RB_{START}^{Q-1}/RB_{START}^0$ of starting location $RB_{START}^0$ of the 0th paragraph of PRB resources and the starting location of the each remaining PRB resources, and these ratios are generated in a limited set.

The length of each PRB resource may have the following different composition:

(1) Indicating the length $L_{CRBs}^0, L_{CRBs}^1, \ldots L_{CRBs}^{Q-1}$ of each PRB resource respectively;

(2) Indicating the differences $L_{CRBs}^0, L_{CRBs}^1, \ldots, L_{CRBs}^{Q-1}-L_{CRBs}^0$ between the length $L_{CRBs}^0$ of the 0th PRB resources and the length of the each remaining PRB resources, and these differences are generated in a limited set;

(3) Indicating the ratio of the each remaining PRB resource to the length $L_{CRBs}^0$ of the 0th paragraph of PRB resources, and these differences are generated in a limited set.

After receiving the intra-BWP PRB resource allocation information in the UL Grant, the UE obtains the values (q=0, 1, ..., Q-1) of each $RB_{START}^q$ and $L_{CRBs}^q$, and acquires each PRB resource information allocated by the uplink transmission within the BWP.

It should be noted that, the length of the intra-BWP PRB resource allocation information can be indicated through a variable related to the bandwidth of the BWP, or can be a fixed value.

Type 8: PRB resources within BWP allocation information in UL Grant can combine two or more cases in type 1 to type 7 together to indicate one of the above multiple types. Specifically, the intra-BWP PRB resource allocation information includes the following two parts: type indication information and normal PRB resource allocation information. The type indication information indicates one type of PRB resource allocation information in all available BWPs, and the normal PRB resource allocation information is consistent with the type of PRB resource allocation information in the foregoing type 1 to type 7 or other possible BWPs.

It should be noted that, the length of the intra-BWP PRB resource allocation information can be indicated through a variable related to the bandwidth of the BWP, or can be a fixed value.

Embodiment 6

The embodiment of the present disclosure is a flow of transmitting UL data through Msg3 by a UE In practical applications, the NB-IOT UE and the eMTC UE often support some small data packet services. If these small data packets are transmitted after establishing the RRC connection with the base station by the conventional method, the control signaling overhead for establishing the RRC connection is large, and is not cost-effective relative to the small packet transmission. Furthermore, the transmission delay of the data of the UE is also large. One optimization method is that Msg3 in the Random access channel (RACH) process transmits small data packets as soon as possible, thereby greatly improving data transmission delay and UE power consumption, and saving a lot of unnecessary control signaling overhead. The following embodiments describe the flow that a UE transmits the UL data through Msg3.

FIG. 22 is a flowchart that a UE transmits UL data through Msg3. In the first step, a UE randomly selects one PRACH resource in the PRACH resource pool configured by a base station and transmits Msg1 (i.e. a PRACH preamble). The UE uses the same PRACH resource pool regardless of whether the UE transmits UL data in Msg3.

In the second step, if the Msg1 is detected by the base station, the base station transmits a corresponding Msg2 (carried by the PDSCH) and allocates two sets of resources with different number of PRBs in the UL Grant of an RAR. The two resource sets correspond to different TBS values. Wherein, the large TBS value is used for transmitting the UL data and necessary control signaling of the MAC/RRC layer such as the UE ID and the like at Msg3, the small TBS value is used for transmitting the necessary control signaling of the MAC/RRC layer such as the UE ID and the like.

In order not to affect the previous version of the UE, the first UL grant can be transmitted in the format of the previous version. For example, for NB-IoT, the UL grant in the RAR can indicate 88 bits. The second UL grant can indicate the new TBS table using reserved information bits in the original RAR format. In another example, the base station transmits two Msg2s, that is, two PDSCHs are allocated to the same UE. Or, the base station transmits one PDSCH which includes two RAR MAC PDUs, indicating two UL grants respectively. Or, the base station transmits one RAR MAC PDU, and uses an extra MCS table which is indicated by the reserved bit for indicating an extra TBS, and the other parameters are those in another UL Grant, for example, the frequency domain resource location, or the time domain starting location, the timing advance (TA), or the TPC command, etc.

In the third step, the UE receives the Msg2 and selects a corresponding TBS value according to whether the UL data is to be transmitted on Msg3 and transmits Msg3 (carried by the PUSCH) on the corresponding resource set. For example, if there is UL data to be transmitted in the buffer of the UE, a larger TBS allocated in the RAR grant and its corresponding resource set is selected; if there is no UL data to be transmitted in the buffer of the UE, that is, the UL data is not transmitted in Msg3, Then the smaller TBS allocated in the RAR grant and the corresponding resource set is selected.

In the fourth step, the base station attempts to decode Msg3 on both resources allocated in the RAR grant. If Msg3 is decoded in the resource set with a larger number of PRBs (corresponding to a large TBS value), the eNB considers that the Msg3 carries the UL data of the UE. If Msg3 is decoded in the resource set with a smaller number of PRBs (corresponding to a small TBS value), the eNB considers that the Msg3 does not carry the UL data of the UE. The base station transmits Msg4 (carried by the PDSCH) according to the result of decoding the Msg3.

In the flow of FIG. 22, the information about whether the UE carries the UL data in Msg3 is obtained through blind detection by the base station on two resource sets. Before transmitting Msg3, there is no signaling to indicate the information to the base station.

In an embodiment, in order to support the flow of FIG. 22, the UL grant in the RAR allocates two physical resources with different sizes (corresponding to different TBS values), and the UE can select one of the two TBS values to transmit Msg3 according to its own needs. The resource scheduling of these two TBS values can share part of the scheduling information such as subcarrier interval indication (1 bit), subcarrier allocation information indication (6 bits), scheduling delay indication (2 bits) and repetition times (3 bits) described in section 16.3.3 of 3GPP spec 36.213. The resource scheduling of these two TBS values is distinguished by different MCS indication fields. For the design of the MCS indication field, reference can be made to Table 16.3.3-1 of 3GPP spec 36.213, that is, an MCS index can determine a modulation mode, number of resource units (RU) and the TBS value, wherein, the maximum TBS values supported by the two MCS indication fields are different, and the modulation mode, the number of RUs and the TBS values corresponding to the two MCS indication fields may be different under the same MCS index. The two physical resources allocated in the RAR grant are the same in frequency domain. Only the number of the RUs in time domain is different, that is, the resource set with a smaller number of PRBs is included in the resource set with a larger number of PRBs.

In one example, the first MCS indicator field described above may reuse an existing table of the Rel-14 system (see Table 16.3.3-1 of 3GPP Spec 36.213 for only one TBS with a fixed value of 88 bits), UEs before the Rel-15 release could decode this MCS indicator field, a second MCS indicator field could employ a new table (supporting a larger TBS value, such as 256 bits), and only UEs after the Rel-15 release can decode.

If the UE before Rel-15 release receives the UL grant in the RAR, Msg3 will be transmitted according to the scheduling of the first MCS indication field, and only the necessary control signaling of MAC/RRC layer such as the UE ID is transmitted. If UEs of the Rel-15 release and after the Rel-15 release receiving the UL grant in this RAR, the UE may transmit Msg3 according to its own demand by selecting one of the two MCS indication fields. If the second MCS indication field is selected, the UE can carry the UL data in Msg3 and vice versa the UL data cannot be carried in Msg3. The signaling overhead of the second MCS indication field can occupy the reserved area immediately after the UL grant field in the existing MAC RAR (see the "R" field after "UL Grant" in FIG. 23), then the existing MAC RAR Overall overhead remains unchanged.

In one example, the first MCS indication field and the second MCS indication field use the same field indication, but the decoding is determined by another field. This field for determining the decoding of the MCS indication field is 1 bit. In one example, this field is not in the MAC RAR structure with the UL grant but occupies the first reserved bit of the MAC RAR for the existing eMTC Mode B UE (see the first "R" field in FIG. 24). For example, when the "R" field indicates "0", the MCS indication field employs the first decoding way (for example, Table 1 shown in the below, the maximum supported TBS value is 328 bits). When the "R" field indicates "1", the MCS indication field employs the second solution (for example, Table 2 shown in the below, the maximum supported TBS value is 600 bits). This will maintain the existing MAC RAR overhead unchanged to indicate some information additionally for extending the TBS value of Msg3 PUSCH. In another example, this field belongs to the UL grant.

If the UE before the Rel-15 release receives the UL grant in the RAR, Msg3 is transmitted according to the scheduling of the first MCS indication field (Table 1), and only the necessary control signaling of the MAC/RRC layer such as the UE ID is transmitted. If UEs of the Rel-15 release and after the Rel-15 release receiving this RAR, the UEs decide whether to schedule the MCS indication field in the UL Grant by employing Table 1 or Table 2 according to the value of the "R" field so as to further acquire the TBS value. Table 2 and Table 3 are schematic diagrams of the two TBSs.

TABLE 2 first TBS table of CE Mode B

| $I_{TBS}$ | $N_{PRB}$ | |
|---|---|---|
| | 3 | 6 |
| 0 | 56 | 152 |
| 1 | 88 | 208 |
| 2 | 144 | 256 |
| 3 | 176 | 328 |

TABLE 3 second TBS table of CE MODE B

| $I_{TBS}$ | $N_{PRB}$ | |
|---|---|---|
| | 1 | 2 |
| 0 | 56 | 152 |
| 1 | 144 | 256 |
| 2 | 208 | 408 |
| 3 | 256 | 600 |

Embodiment 7

FIG. 25 is a flowchart that a UE transmits UL data through Msg3. In the first step, the UE selects a corresponding PRACH resource pool according to whether there is UL data transmission in the buffer. The UE randomly selects one PRACH resource in the selected PRACH resource pool to transmit Msg1. In one example, the PRACH procedure initiated by the Msg1 is a contention-based random access.

In the second step, the UE receives Msg2 and decodes the UL grant in the RAR carried by the Msg2 according to the selected PRACH resource pool (or the purpose of initiating the PRACH), that is, different PRACH resource pools correspond to different UL grant formats in the RAR.

In the third step, the UE transmits Msg3 on the UL resources allocated by the decoded UL grant. It is noted that, although the UE selects the NPRACH resources according to whether there is UL data transmission in the buffer, the base station also determines whether it needs to provide a sufficiently large TBS according to its scheduling situation. Therefore, after decoding the UL grant, the UE can determine, according to a predefined rule, whether to carry UL data besides the necessary control signaling of the MAC/RRC layer or only carry the buffer status report (BSR) information besides the necessary control signaling of the MAC/RRC layer.

In the flow of FIG. 25, whether the UE needs to carry the UL data in Msg3 is indicated to the eNB through Msg1, and the eNB can use the corresponding RAR grant to schedule a larger TBS for Msg3 according to the indication, so as to carry UL data of the UE.

In one embodiment, different PRACH resource pools are used for different PRACH purposes in FIG. 25. The PRACH resource pools for different PRACH purposes can be distinguished in a code domain, a time domain or a frequency domain. In one example, the code domain here refers to being distinguished by the PRACH preamble, for example, the PRACH preamble is divided into GroupA and GroupB, wherein, the PRACH preamble in GroupA is used for conventional PRACH purposes, and the PRACH preamble in GroupB is used for the PRACH purpose of UL data transmission on Msg3. In one example, for NB-IOT UEs, PRACH resources used for different PRACH purposes are configured on different NB-IOT carriers (anchor carriers or non-anchor carriers). In one example, for eMTC UEs, PRACH resources for different PRACH purposes are configured on different Narrow-Bands.

In yet another embodiment, the PRACH resource pool for different PRACH purposes in FIG. 25 is distinguished by using different mask sequences around different PRACHs, wherein, the PRACH preamble is transmitted repeatedly, a signal sequence can be superposed on the PRACH repeated for many times (that is, each repeated PRACH is masked by a different signal), there can be multiple signal sequences for the mask, and the eNB blindly decodes the mask sequence on the receiving side to acquire additional information. For example, there are mask sequences {1, 1, 1, 1} and {1, -1, 1-1} available for 4 PRACH repetitive transmissions. If the UE transmits the PRACH by employing {1, 1, 1, 1}, it indicates that the UE requests to establish a normal RRC connection. If the UE transmits a PRACH by employing {1, -1, 1, -1}, it indicates that the UE requests to transmit the UL data on Msg3.

In one embodiment, different PRACH resource pools (or different PRACH purposes) correspond to different UL formats in the RAR. Here, the TBS indicated by the UL grant in the RAR may be the same or different, but the maximum TBS which can indicated may be different. The RAR grant corresponding to the PRACH resource pool for transmitting UL data in Msg3 may indicate a larger TBS to support the transmission of UL data in addition to the necessary control signaling of the MAC/RRC layer such as the UE ID.

Embodiment 8

This embodiment of the present disclosure is used for scheduling the RAR grant of the NB-IOT UE transmitting the UL data in Msg3.

The existing NB-IOT UE allocates a fixed value (88 bits) in Msg3, referring to Table 16.3.3-1 in 3GPP Spec 36.213, which is used for transmission of necessary control signaling of the MAC/RRC layer such as UE ID. If the UL data is to be transmitted in Msg3, the TBS value which can be supported by Msg3 must be extended. The following embodiment describes a TBS extension method for Msg3 of NB-IOT UEs.

Table 3 is an example of the MCS used by the NB-IOT UE for determining Msg3 NPUSCH. For specific parameter definitions and physical meanings, reference can be made to section 16.3.3 of 3GPP Spec 36.213. In this MCS table, two TBS values can be supported, such as 88 bits and 256 bits as given in an example of Table 3. If the eNB configures the minimum TBS value of 88 bits in the RAR grant, the UE transmits only the necessary control signaling of the MAC/RRC layer such as the UE ID in Msg3. If the base station configures the maximum TBS value of 256 bits in the RAR grant, in addition to transmitting the necessary control signaling of MAC/RRC such as UE ID in Msg3, the UE can also transmit the UL data.

This MCS table may allow the base station to flexibly decide whether to schedule the UE to transmit the UL data in Msg3 according to the actual resource allocation situation. Although the UE requests to transmit the UL data in Msg3 through a dedicated PRACH resource pool, the base station cannot schedule the UE to transmit the UL data in Msg3.

In another embodiment, the MCS table can support multiple TBS values. That is, the eNB can flexibly determine whether to allow the UE to carry the UL data in Msg3 according to the actual resource allocation situation, and determine the size of the UL data that the UE carries in Msg3. For example, the MCS table can support three TBS values, of which the minimum TBS value is used for transmission of necessary control signaling of the MAC/RRC layer such as the UE ID and the like, the medium TBS value is used for transmission of the necessary control signaling of the MAC/RRC layer such as the UE ID and the small amount of the UL data (such as BSR), and the maximum TBS value is used for transmission of the necessary control signaling of the MAC/RRC layer such as UE ID and the transmission of a large amount of the UL data.

In yet another embodiment, the minimum TBS value supported by Table 4 is a predefined value (88 bits), but the maximum TBS value is not a predefined value, but is statically configured by the base station in the System Information Block (SIB). In one example, the base station configures only one TBS value in the SIB for transmission of the UL data in Msg3. In another example, the base station configures multiple TBS values (e.g., 2 or 3) in the SIB for transmission of the UL data in Msg3 to flexibly schedule the size of the UL data packets transmitted in Msg3.

In still another embodiment, the maximum TBS value supported by Table 3 is related to the resource pool selected by Msg1, that is, the UE can transmit the UL data in Msg3 according to the selection request of Msg1 and can also request the TBS corresponding to size for UL data transmission according to the buffered data size. In other words, the UE can report the size of the buffered data in Msg1, and the base station indicates the TBS value corresponding to size for carrying the UL data in Msg3 according to the buffered data size reported by Msg1.

For example, there are two PRACH mask sequences corresponding to the different maximum TBS value of Msg3, and the maximum TBS value of Msg3 corresponding to the PRACH mask sequence {1, 1, 1, 1} is 536 bits, which is used for transmitting more UL data in Msg3. The maximum TBS value of Msg3 corresponding to the PRACH mask sequence {1, -1, 1, -1} is 256 bits, which is used for transmitting less UL data at Msg3.

TABLE 4

MCS table of Msg3 NPUSCH for NB-IOT UE

| MCS index $I_{MCS}$ | Modulation mode $\Delta f =$ 3.75 kHz or $\Delta f = 15$ kHz and $I_{sc} = 0$, 1, . . . , 11 | Modulation mode $\Delta f =$ 3.75 kHz and $I_{sc} > 11$ | RU number $N_{RU}$ | TBS |
|---|---|---|---|---|
| '000' | pi/2 BPSK | QPSK | 4 | 88 bits |
| '001' | pi/4 QPSK | QPSK | 3 | 88 bits |
| '010' | pi/4 QPSK | QPSK | 1 | 88 bits |
| '011' | pi/2 BPSK | QPSK | 8 | 256 bits |
| '100' | pi/4 QPSK | QPSK | 6 | 256 bits |
| '101' | pi/4 QPSK | QPSK | 4 | 256 bits |
| '110' | pi/4 QPSK | QPSK | 3 | 256 bits |
| '111' | pi/4 QPSK | QPSK | 2 | 256 bits |

Table 5 is another example of an MCS table used by the NB-IOT UE for determining Msg3 NPUSCH. For specific parameter definitions and physical meanings, reference can be made to section 16.3.3 of 3GPP Spec 36.213, wherein, Nrep refers to the PRACH repetition times selected in Msg1. The MCS/TBS table is similar to Table 1, which supports two TBS values. The smaller TBS value is used for transmitting the necessary control signaling of the MAC/RRC layer (for example, the UE ID, etc.). The larger TBS value is used for transmitting the necessary control signaling of the MAC/RRC layer (for example, the UE ID, etc.) and the UL data.

The difference between Table 5 and Table 4 lies in that the code rate selection supporting the TBS transmission is related to the repetition times of the NPRACH selected in Msg1, that is, under a same MCS value, due to the repetition times is different, its corresponding number of RUs and/or modulation mode may be different. When the repetition times of the NPRACH is relative small, Msg3 transmission carrying the UL data can have a relative high code rate, and when the repetition times of the NPRACH is relative large, Msg3 transmission carrying the UL data can have a relative low code rate.

TABLE 5

MCS table of Msg3 NPUSCH for NB-IOT UE

| MCS index $I_{MCS}$ | Modulation mode $\Delta f = 3.75$ kHz or $\Delta f = 15$ kHz and $I_{sc} = 0$, $1, \ldots, 11$ | Modulation mode $\Delta f = 15$ kHz and $I_{sc} > 11$ | RU number $N_{RU}$, and $N_{rep} = R1$ | RU number $N_{RU}$, and $N_{rep} = R2/R3$ | TBS |
|---|---|---|---|---|---|
| '000' | pi/2 BPSK | QPSK | 4 | 4 | 88 bits |
| '001' | pi/4 QPSK | QPSK | 3 | 3 | 88 bits |
| '010' | pi/4 QPSK | QPSK | 1 | 1 | 88 bits |
| '011' | pi/2 BPSK | QPSK | 8 | 8 | 256 bits |
| '100' | pi/4 QPSK | QPSK | 5 | 7 | 256 bits |
| '101' | pi/4 QPSK | QPSK | 4 | 6 | 256 bits |
| '110' | pi/4 QPSK | QPSK | 3 | 5 | 256 bits |
| '111' | pi/4 QPSK | QPSK | 2 | 4 | 256 bits |

For example, in Table 5, when the repetition times of the NPRACH selected by Msg1 are equal to R1, the decoding of the number of RUs is one column in Table 5. When the repetition times of the NPRACH selected by Msg1 are equal to R2/R3, the decoding of the number of RUs is another column in Table 5. Here, R1, R2 and R3 are three different repetition times of the NPRACH configured by the eNB in the SIB, and the UE selects corresponding repetition times of the NPRACH according to its own channel quality.

In another embodiment, different repetition times of the NPRACH correspond to different TBS values under the same MCS value. For example, a maximum TBS value supported can be relative large while the repetition times of the NPRACH is relative small, and a maximum TBS value supported can be relative small when the repetition times of the NPRACH is relative large. Since the channel of the UE has a poor channel quality, more resources will be occupied while transmitting relative large TBS. If the transmission contention of Msg3 fails, it will be a waste of the system resources. However, determining the supportable TBS values according to the channel quality of the UE will be more effective.

In still another embodiment, the repetition times of the different NPRACHs correspond to different MCS tables, that is, the modulation modes, the number of RUs, and the TBS values corresponding to the repetition times of the different NPRACHs may all be different under the same MCS index.

Embodiment 9

This embodiment of the present disclosure is used for scheduling an eMTC mode B UE to transmit RAR of UL data in Msg3.

The maximum TBS value that can be allocated by the existing eMTC mode B UE in Msg3 is 328 bits, referring to the contents in section 6.2 of 3GPP Spec 36.213 which is suitable for transmitting the necessary control signaling of the MAC/RRC layer (for example, the UE ID, etc.) in Msg3. If the UL data is to be transmitted in Msg3, The TBS value which can be supported by Msg3 must be extended. The following embodiment describes a TBS extension method for Msg3 PUSCH of eMTC mode B UEs.

The number of PRBs allocable by the existing eMTC mode B UEs is 3 and 6. The TBS value of Msg3 PUSCH is obtained by truncating the TBS index ($I_{TBS}$) range of the conventional PUSCH to the lowest four values. In order to extend the TBS value, the way of valuing the TBS is modified to select 4 of the TBS indexes of the conventional PUSCH intermittently, while maintaining the TBS field (2 bits) in the RAR grant unchanged. For example, Table 6 is the TBS table of the existing eMTC PUSCH (only displaying the part that $I_{TBS}$ is 0 to 7), which selecting several discrete TBS values whose number of the PRBs is shown in column 3 and column 6 (for example, $I_{TBS}$ is the TBS corresponding to 0, 2, 4 and 6) for mode B UE. Table 7 is the obtained TBS table of Msg3 PUSCH for the eMTC Mode B UE, wherein, the maximum supportable TBS value is 600 bits used for combining and transmitting the necessary control signaling of the MAC/RRC layer (for example, the UE ID, etc.) in Msg3 and the UL data.

TABLE 6

TBS table for eMTC PUSCH (part)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

TABLE 7

TBS table of Msg3 PUSCH for eMTC mode B

| $I_{TBS}$ | $N_{PRB}$ | |
|---|---|---|
| | 1 | 2 |
| 0 | 56 | 152 |
| 1 | 144 | 256 |
| 2 | 208 | 408 |
| 3 | 256 | 600 |

Embodiment 10

According to the embodiment of the present application, the eMTC UE is scheduled to transmit UL data on an Msg3 PUSCH, the base station provides multiple possible TBSs in the RAR grant for the UE to select, and the UE will select one TBS value which most closely matches with the data size in the MAC buffer to transmit Msg3, so that the number of the padding bits in the MAC PDU is reduced as much as possible. It is assumed that the base station will perform blindly decoding on the Msg3 based on the multiple possible TBS values. The maximal number of times for blindly decoding is the same as the number of the provided multiple possible TBSs.

In this embodiment, the transmission of the multiple possible TBSs uses the same resource allocation, the same Modulation mode (the default modulation mode is QPSK) and different repetition times, the current indication field used for repetition number in the RAR grant is used for the TBS with the maximal value among the multiple TBS in default. The repetition number corresponding to the other TBSs can be calculated based on the repetition number indicated by this indication field and a predefined formula.

In one example, the formula is $RN\_2=\{RN\_1*(TBS\_2+24)/(TBS\_1+24)\}$, in another example, the formula is $RN\_2=\{RN\_1*(TBS\_2)/(TBS\_1)\}$. Here, $TBS\_1$ is the TBS with the maximal value among the multiple TBSs, $RN\_1$ is the repetition number corresponding to the $TBS\_1$, i.e., the repetition number indicated in the RAR grant, $TBS\_2$ are the other TBSs among the multiple TBSs excluding the TBS with the maximal value. $RN\_2$ is the repetition number corresponding to $TBS\_2$, where $RN\_2$ can be implicitly derived from $RN\_1$. In one example, the calculation operator $\{.\}$ is to select the closest value upwardly for all the repetition number supported by the existing specification for values in $\{\ \}$. In another example, the calculation operation $\{.\}$ is to select the closest value which meets a multiple of 2 upwardly for all values in $\{\ \}$.

For example, for CE Mode B, the set of all the values of the repetition number supported by the existing specification is $\{1, 4, 8, 16, 32, 64, 128, 192, 256, 384, 512, 768, 1024, 1536, 2048\}$, it is assumed that $TBS\_1=1000$ bits, $RN\_1=1024$, $TBS\_2=328$ bits, then $RN\ 2=\{1024*(328+24)/(1000+24)\}$. $RN\_2=384$ if selecting the closest value in the current repetition number upwardly. $RN\_2=352$ if selecting the closest value which meet a multiple of 2 upwardly.

In this embodiment, the step of indicating the multiple TBS values in the RAR grant can be achieved by indicating which TBS set based on one predefined TBS set table. For example, Table 8 and Table 9 respectively provide an example of a TBS set table used for CE Mode A and CE Mode B, this table can provide multiple possible TBS sets, for example, the TBS set may include one to four TBS values, then the number of times for blindly decoding on Msg3 corresponding to the base station is 1-4.

The values in the TBS set can be selected according to an arithmetic sequence, or the TBS values corresponding to multiple typical EDT service can also be selected. The maximal TBS value included in these TBS sets should be the same, the maximal TBS value is also the maximal TBS value allowed by the broadcast EDT Msg3 of the base station in the system information. The base station can configure a corresponding maximal TBS value for each CE level. Each broadcast maximal TBS value should correspond to one TBS set table. For example, if the maximal TBS value supported by the broadcast EDT Msg3 in the system information may have eight candidate values, then there may be at most eight corresponding TBS set tables.

In addition, the base station will broadcast in the system information whether multiple TBS values can be used. If the base station configures that the multiple TBS values can be used, then the UE select one TBS value for the transmission of Msg3 in the indicated TBS set. If the base station does not configure that the multiple TBS values can be used, then the UE can only select the maximal TBS value for the transmission of the Msg3 in the indicated TBS set.

TABLE 8

TBS set table of Msg3 PUSCH for CE Mode A

| Index | TBS set |
|---|---|
| '000' | {1000, 776, 552, 328} bits |
| '001' | {1000, 840, 632, 424} bits |
| '010' | {1000, 632, 328} bits |
| '011' | {1000, 776, 424} bits |
| '100' | {1000, 776} bits |
| '101' | {1000, 552} bits |
| '110' | 1000 bits |
| '111' | Reserved status |

TABLE 9

TBS set table of Msg3 PUSCH for CE Mode B

| Index | TBS set |
|---|---|
| '000' | {936, 776, 552, 328} bits |
| '001' | {936, 632, 328} bits |
| '010' | {936, 552} bits |
| '011' | 936 bits |

Table 8 includes eight TBS sets, which can be indicated by reusing the existing 3-bit MCS indication field in the RAR grant. Table 9 includes 4 TBS sets, which can be indicated by reusing the existing 3-bit TBS indication field in the RAR grant. Then the overall size of the RAR grant can remain unchanged.

Embodiment 11

According to the embodiment of the present application, the NB-IOT UE is scheduled to transmit UL data on an Msg3 NPUSCH, the base station provides multiple possible TBSs in the RAR grant for the UE to select, and the UE will select one TBS value which most closely matches with the data size in the MAC buffer to transmit Msg3, so that the number of the padding bits in the MAC PDU is reduced as much as possible. It is assumed that the base station will perform blindly decoding on the Msg3 based on the multiple possible TBS values. The maximal number of times for blindly decoding is the same as the number of the provided multiple possible TBSs.

In this embodiment, the transmission of the multiple possible TBSs uses the same resource allocation (frequency-domain resource allocation within one RU), the same modulation mode, the different number of RUs and the same repetition number. In the RAR grant, the step of indicating the multiple TBS values and corresponding number of RUs can be achieved by indicating which MCS/RU/TBS value based on a predefined MCS/RU/TBS table.

For example, Table 10 shows one example of MCS/RU/TBS table of Msg3 NPUSCH for NB-IOT. For EDT Msg3, this table can provide multiple possible TBS sets. For example, if the TBS may include one to four TBS values, then the number of blindly decoding on the Msg3 corresponding to the base station is one to four. Furthermore, for each TBS set, in the row of the number of the RUs, it has corresponding number of RUs, for example, in the table, the value of '00111' indicates one TBS set including four TBSs, i.e., {1000, 776, 552, 328} bits, and the number of RUs corresponding to the four TBS values are respectively {10, 8, 6, 4}.

For EDT Msg3, the values in one TBS set can be selected according to an arithmetic sequence, or the TBS values corresponding to multiple typical EDT service can also be selected. The maximal TBS value included in these TBS sets should be the same, the maximal TBS value is the maximal TBS value allowed by the broadcast EDT Msg3 of the base station in the system information. The base station can configure the corresponding maximal TBS value for each CE level. Each broadcast maximal TBS value should correspond to one MCS/RU/TBS table.

In addition, Table 10 further includes TBS values for non-EDT Msg3, i.e., the 88-bit TBS for the Msg3 NPUSCH in the existing specification (including three possibilities for allocating RUs). In this case, when the base station allocates resources for Msg3, if the available resources at that time is not sufficient for carrying UE data in the Msg3, then the base station can fall back EDT to non-EDT mode, i.e., indicating one 88-bit TBS value in the RAR grant. If the UE receives the indication, then the Msg3 cannot carry the UE data and can only be used for transmitting the ID of the UE and the necessary MAC/RRC layer control signaling.

The indicated number included in Table 10 may be greater than the MCS/RU/TBS table of the existing specification, then the existing 3-bit MCS/RU/TBS indication field in the RAN grant can be extended, for example, extended to 5 bits for supporting Table 10.

TABLE 10

MCS/RU/TBS table of Msg3 PUSCH for NB-IOT

| MCS INDEX $I_{MCS}$ | Modulation mode $\Delta f$ = 3.75 kHz or $\Delta f$ = 15 kHz and $I_{sc} = 0$, 1, ..., 11 | Modulation mode $\Delta f$ = 15 kHz and $I_{sc} > 11$ | Number of RUs $N_{RU}$ | TBS |
|---|---|---|---|---|
| '00000' | pi/2 BPSK | QPSK | 4 | 88 bits |
| '00001' | pi/4 QPSK | QPSK | 3 | 88 bits |
| '00010' | pi/4 QPSK | QPSK | 1 | 88 bits |
| '00011' | pi/4 QPSK | QPSK | 10 | 1000 bits |
| '00100' | pi/4 QPSK | QPSK | 8 | 1000 bits |
| '00101' | pi/4 QPSK | QPSK | 6 | 1000 bits |
| '00110' | pi/4 QPSK | QPSK | 4 | 1000 bits |
| '00111' | pi/4 QPSK | QPSK | {10, 8, 6, 4} | {1000, 776, 552, 328} bits |
| '01000' | pi/4 QPSK | QPSK | {8, 6, 4, 2} | {1000, 776, 552, 328} bits |
| '01001' | pi/4 QPSK | QPSK | {6, 4, 2, 1} | {1000, 776, 552, 328} bits |
| '01010' | pi/4 QPSK | QPSK | {4, 3, 2, 1} | {1000, 776, 552, 328} bits |
| '01011' | pi/4 QPSK | QPSK | {10, 6, 4} | {1000, 632, 328} bits |
| '01100' | pi/4 QPSK | QPSK | {8, 4, 2} | {1000, 632, 328} bits |
| '01101' | pi/4 QPSK | QPSK | {6, 3, 1} | {1000, 632, 328} bits |
| '01111' | pi/4 QPSK | QPSK | {4, 2, 1} | {1000, 632, 328} bits |
| ... | ... | ... | ... | ... |
| '11110' | reserved | reserved | reserved | reserved |
| '11111' | reserved | reserved | reserved | reserved |

In another example, Table 10 only includes indication of MCS/TBS value, i.e., the indication including modulation mode and TBS set, where the number of RUs is indicated by another dedicated field in the RAR grant. Similar to description for the repetition number in Embodiment 10, the number of RUs indicated in the RAR grant is for the maximal TBS value in the indicated TBS set, and the number of RUs corresponding to the other TBS values can be obtained based on the number of RUs indicated by this indication field and a predefined calculation formula, for example, by using the calculation formula similar to that in Embodiment 10.

In another embodiment, the multiple TBS values use the same resource allocation (frequency-domain resource allocation within one RU), the same modulation mode, the same number of RUs and the different repetition number. Furthermore, similar to the description about eMTC in Embodiment 10, the current indication field used for repetition number in the RAR grant is used for the TBS with the maximal value among the multiple TBS in default. The repetition number corresponding to the other TBSs can be calculated based on the repetition number indicated by this indication field and a predefined calculation formula, for example, by using a calculation formula similar to that in Embodiment 10.

Embodiment 12

In a feature that supports Early Data Transmission (EDT) through Msg3, a base station does not know the data size that the UE actually needs to transmit before receiving Msg3, therefore, the base station is unable to provide an accurate TBS for Msg3. When the TBS value of Msg3 is greater than the data size that the UE needs to transmit, the UE can only perform bit padding in the MAC PDU. In order to reduce the number of padding bits of the UE in Msg3, the base station provides Msg3 with multiple possible TBSs for the UE to select. The UE selects the most suitable TBS to transmit Msg3 according to the actual data size. At the receiving side, the base station needs to perform blind decoding on Msg3 based on the hypothesis that there are multiple possible TBSs. Such blind decoding will bring additional complexity to the base station. In order to avoid such blind decoding, the UE informs the base station of the TBS value used for the actual transmission of Msg3 before transmitting Msg3 or while transmitting Msg3, so the base station can detect the TBS value used for the actual transmission of Msg3 and decode the Msg3 according to the TBS value.

In one embodiment, an eNB provides Msg3 with multiple possible TBSs for the UE to select, the UE selects an appropriate TBS value according to the actual data size, and the TBS value used for the actual transmission of Msg3 is transmitted through a PUCCH and is transmitted to the base station before transmitting Msg3, so the eNB can detect the TBS value used for the actual transmission of Msg3 and decode the Msg3 based on the TBS value, thereby avoiding blind decoding on Msg3 based on the hypothesis that there are multiple TBSs. The specific steps of the embodiment are shown in FIG. 26.

In a first step, a UE transmits a PRACH to an eNB for requesting EDT.

In a second step, after receiving the PRACH, the eNB transmits one RAR scheduling Msg3 to the UE and provides Msg3 with multiple possible TBSs for the UE to select.

In a third step, after receiving the RAR, the UE selects one TBS value for Msg3 according to the data size and reports the information of selected TBS value to the base station through a PUCCH.

In a fourth step, the UE transmits Msg3 immediately upon transmitting the PUCCH based on the selected TBS value.

In the above embodiment, the base station provides Msg3 with at mot four possible TBSs for the UE to select, i.e., the TBS value used for the actual transmission of Msg3 can be indicated by at most 2 bits, and the PUCCH used for carrying the 1-2 bits of TBS information can reuse the existing PUCCH format.

In one example, the PUCCH format used for carrying TBS value used for the actual transmission of Msg3 is related to the number of possible TBSs provided by the base station for Msg3, and the number may be related to the maximum TBS value of Msg3 broadcast in the system information or may be related to the real-time scheduling of the base station. For example, when the base station provides Msg3 with two TBSs for the UE to select, the 1-bit information may be carried by using the existing PUCCH format 1a; When the base station provides Msg3 with three to four TBSs for the UE to select, the existing PUCCH format 1b can be used to carry the 2-bit information.

In another example, when the base station provides Msg3 with 2-4 TBSs for the UE to select, the TBS value used for the actual transmission of Msg3 is carried by fixedly using the PUCCH format 1b.

For an eMTC UE, referring to the description of HARQ-ACK resources in section 10.1.2.1 of the existing standard 3GPP 36.213, when the MPDCCH-PRB-set for scheduling Msg2 is configured for distributed transmission, the resources of the PUCCH are calculated according to the following formula:

$$n_{PUCCH}^{(1,p0)} = n_{ECCE,q} + N_{PUCCH,q}^{(m1)} + RAR\_ID$$

When the MPDCCH-PRB-set is configured for centralized transmission, the calculation formula can be derived in the same way. Where $p_0$ is the antenna port number, and q is the index number of the MPDCCH-PRB-set used for scheduling Msg2. $n_{ECCE,q}$ is the index number of the starting CCE occupied by the MPDCCH of Msg2. $N_{PUCCH,q}^{(m1)}$ is PUCCH parameter configured by the base station for MPDCCH-PRB-set q (referring to PUCCH resources).

In one example, the parameter $N_{PUCCH,q}^{(m1)}$ is the same as the parameter used by PUCCH carrying ACK/NACK of Msg4, i.e., a parameter n1PUCCH-AN-InfoList-r13 broadcast by the base station in the system information, and a corresponding reference PUCCH resource value is configured for each CE level. In another example, the parameter $N_{PUCCH,q}^{(m1)}$ is dedicated for the PUCCH carrying the TBS value used for the actual transmission of Msg3, which is different from the parameter used by the PUCCH carrying ACK/NACK of Msg4, the new parameter may be named as n1PUCCH-Msg3-InfoList-r15. Similar to the existing parameter n1PUCCH-AN-InfoList-r13, the new parameter is broadcast by the base station in system information, and a corresponding reference PUCCH resource value is configured for each CE level.

Where RAR_ID is the index number of the UE's RAR in the MAC PDU to which it belongs, and one or more MAC RARs are included in the MAC PDU of Msg2, e.g. RAR_ID=0 for the first MAC RAR of the MAC PDU and RAR_ID=n−1 for the $N^{th}$ MAC RAR. In another example, RAR_ID in the above calculation formula is replaced by preamble ID used by Msg1 PRACH.

In another example, the calculation formula for the resources of the PUCCH are (RAR_ID and other descriptions can be reused):

$$n_{PUCCH}^{(1,p0)} = n_{ECCE,q} + \Delta_{ARO} + N_{PUCCH,q}^{(m1)} + RAR\_ID$$

Wherein $\Delta_{ARO}$ is indicated by the ACK/NACK Resource offset (ARO) field contained in an MPDCCH of Msg2, the indicated value is interpreted according to Table 11, which refers to Table 10.1.2.1-1 of the existing standard 3GPP 36.213.

TABLE 11

| Interpretation of $\Delta_{ARO}$ values | |
| --- | --- |
| ACK/NACK Resource offset field | $\Delta_{ARO}$ |
| 0 | 0 |
| 1 | −1 |

TABLE 11-continued

| Interpretation of $\Delta_{ARO}$ values | |
| --- | --- |
| ACK/NACK Resource offset field | $\Delta_{ARO}$ |
| 2 | −2 |
| 3 | 2 |

In the above embodiment, the transmission time of PUCCH carrying the TBS value used for actual transmission of Msg3 is determined by reusing a method for determining the transmission time of Msg3 in an existing system, for example, the UE transmits the PUCCH in the sixth subframe after receiving Msg2, and the existing Msg3 may be transmitted immediately after the PUCCH.

In the above embodiment, the repetition number of the PUCCH for carrying TBS value used for the actual transmission of Msg3 is the same as the repetition number of the PUCCH for carrying ACK/NACK of the Msg4, that is, the repetition number of the PUCCH configured by the base station for each CE level in the system information.

In the above embodiment, the PUCCH is transmitted before Msg3, and the time relationship between the PUCCH and Msg3 follows a predefined rule. For example, Msg3 is transmitted immediately after the PUCCH, that is, the UE transmits Msg3 in the first subframe after transmitting the PUCCH, and if the PUCCH is repeatedly transmitted, the UE transmits Msg3 in the first subframe after transmitting the last subframe of the PUCCH. In another example, the PUCCH and Msg3 have a fixed interval so as to reserve the base station the decoding time for PUCCH, for example, the UE transmits Msg3 in the third subframe after transmitting the PUCCH, and if the PUCCH is repeatedly transmitted, the UE transmits Msg3 in the third subframe after transmitting the last subframe of the PUCCH.

In the above embodiment, when the base station provides only one TBS value for Msg3, it is not necessary to transmit the PUCCH, and Msg3 follows the existing transmission time, that is, the UE transmits Msg3 in the sixth subframe after receiving Msg2.

For an NB-IOT UE, TBS value used for the actual transmission of Msg3 is transmitted through NPUSCH format 2. In the existing system, the time-frequency resource of NPUSCH format 2 is explicitly indicated by a 4-bit HARQ-ACK resource indication field in the corresponding DCI, and when the NPUSCH format 2 is used for carrying TBS value used for the actual transmission of Msg3, the corresponding resource is jointly determined by HARQ-ACK resource indicated in the DCI scheduling Msg2 and RAR_ID, for example, determining according to the following formula:

$$Resource\_index = (AN\_resource + RAR\_ID) \bmod 16$$

Wherein AN_resource is the indication value (0-15) contained in MPDCCH of Msg2, RAR_ID is the index of RAR of the UE in the MAC PDU to which the UE belongs, the obtained range of the Resource_index is 0-15 by calculation, and time-frequency resources corresponding to NPUSCH format 2 are determined according to the existing Table 12 and Table 13, which refer to Table 16.4.2-1 and Table 16.4.2-2 of the existing standard 3GPP 36.213.

In another example, the above Resource_index is determined according to the following formula (RAR_ID and other descriptions can be reused):

$$Resource\_index = RAR\_ID \bmod 16$$

TABLE 12

Determination of time-frequency resources of
PUCCH when subcarrier spacing is 3.75 kHz

| Resource index number | Subcarrier index number | $k_0$ |
|---|---|---|
| 0 | 38 | 13 |
| 1 | 39 | 13 |
| 2 | 40 | 13 |
| 3 | 41 | 13 |
| 4 | 42 | 13 |
| 5 | 43 | 13 |
| 6 | 44 | 13 |
| 7 | 45 | 13 |
| 8 | 38 | 21 |
| 9 | 39 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

TABLE 13

Determination of time-frequency resources
of PUCCH when subcarrier spacing is 15 kHz

| Resource index number | Subcarrier index number | $k_0$ |
|---|---|---|
| 0 | 0 | 13 |
| 1 | 1 | 13 |
| 2 | 2 | 13 |
| 3 | 3 | 13 |
| 4 | 0 | 15 |
| 5 | 1 | 15 |
| 6 | 2 | 15 |
| 7 | 3 | 15 |
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

For an NB-IOT UE, the transmission time of Msg3 is explicitly indicated, in RAR grant, by an indication field of a 2-bit scheduling delay, and the base station shall ensure that the NPUSCH format 1 carrying Msg3 is transmitted after the NPUSCH format 2 carrying TBS value used for the actual transmission of Msg3 when scheduling Msg3. If the NPUSCH format 2 is repeatedly transmitted, it is ensured that the transmission of the NPUSCH format 1 is started after the NPUSCH format 2 is completely transmitted.

In one example, there is a predefined time relationship between the NPUSCH format 1 carrying Msg3 and the NPUSCH format 2 carrying TBS value used for the actual transmission of Msg3, and the transmission time of the NPUSCH format 1 may be determined based on the predefined time relationship and the transmission time of the NPUSCH format 2, or the transmission time of the NPUSCH format 1 may be determined based on the predefined time relationship and the transmission time of the NPUSCH format 2.

In one example, the transmission time of the NPUSCH format 2 carrying the TBS value used for the actual transmission of Msg3 is indicated in the corresponding RAR grant, for example, indicating by a dedicated 2-bit indication field shown in Table 14, which refers to Table 16.5.1-1 of the existing standard 3GPP 36.213, NPUSCH format 1 carrying Msg3 is transmitted immediately after the NPUSCH format 2.

TABLE 14

Scheduling delay of TBS value used
for the actual transmission of Msg3

| $I_{Dealy}$ | $k_0$ |
|---|---|
| 0 | 12 |
| 1 | 16 |
| 2 | 32 |
| 3 | 64 |

In another embodiment, an eNB provides Msg3 with multiple possible TBSs for the UE to select, the UE selects an appropriate TBS value according to the actual data size, and TBS value used for the actual transmission of Msg3 is transmitted through Msg3 piggyback and is transmitted to the base station together with Msg3, then the eNB can detect the TBS value used for the actual transmission of Msg3 and decode Msg3 based on the TBS value, thereby avoiding blind decoding on Msg3 based on the hypothesis that there are multiple TBSs. The specific steps of the embodiment are shown in FIG. 27.

In a first step, a UE transmits a PRACH to an eNB for requesting EDT.

In a second step, after receiving the PRACH, the eNB transmits one RAR scheduling Msg3 to the UE and provides Msg3 with multiple possible TBSs for the UE to select.

In a third step, after receiving the RAR, the UE selects one TBS to transmit Msg3 according to the data size and reports the information of selected TBS value to the base station through Msg3 piggyback.

In the above embodiment, the base station provides Msg3 with at mort four possible TBSs for the UE to select, i.e., the TBS value used for the actual transmission of Msg3 can be indicated by at most 2 bits, the TBS information can be transmitted by occupying part of the resources of Msg3, and it is unnecessary to transmit the TBS information when the base station provides Msg3 with only one TBS.

In one example, when the base station provides Msg3 with 2-4 possible TBSs, the TBS value used for the actual transmission of Msg3 is indicated fixedly by using 2-bit information. In another example, when the base station provides Msg3 with 3-4 possible TBSs, and the TBS value used for the actual transmission of Msg3 is indicated by using 2-bit information. When the base station provides Msg3 with two possible TBSs, the TBS value used for the actual transmission of Msg3 is indicated by using 1-bit information.

In one example, when the TBS information is transmitted by Msg3 piggback, the number of REs used for carrying TBS information is a fixed value. In another example, the number of REs used for carrying TBS information is related to one or more of the following factors, wherein these factors include the number of bits of TBS information, multiple possible TBS values provided by the base station for Msg3, the total number of REs allocated by the base station for Msg3 (within one subframe), etc.

In one example, the number of REs used for carrying TBS information is only related to the number of bits of TBS information, for example, the number of occupied RE is N when TBS information is 1 bit, and the number of occupied Res is 2N when TBS information is 2 bits.

In one example, the number of REs used for carrying TBS information is the same as the existing method for determining the number of REs occupied by 1-2-bit HARQ-ACK during PUSCH piggyback. In another example, the number of REs used for carrying TBS information is the same as the method for determining the number of REs occupied by existing CSI during PUSCH piggyback.

In one example, the method for encoding the TBS information is the same as the method for encoding used by the existing 1-2-bit HARQ-ACK during PUSCH piggyback, i.e., repeated encoding. In another example, the method for encoding the TBS information is the same as the method for encoding used by the existing CSI during PUSCH piggyback i.e., Reed-Muller encoding.

In one example, the RE mapping of TBS information is similar to the existing RE mapping of 1-2-bit HARQ-ACK during PUSCH piggyback, i.e., mapped on the perimeter RE of the DMRS symbol. In another example, the RE position occupied by TBS information is similar to the RE position occupied by the existing CSI during PUSCH piggyback, i.e., mapping is started from the lowest position or the highest position of frequency domain resources, and a mapping mode in accordance with an order from the time domain to frequency domain is employed.

In one example, when Msg3 piggyback is performed on the TBS value used for the actual transmission of Msg3, Msg3 employs puncturing processing for the resources occupied by TBS information, i.e., Msg3 performs rate matching according to the total number of REs and discards the data symbols that Msg3 corresponds to the RE position occupied by the TBS information. In another example, when Msg3 piggyback is performed on the TBS value for the actual transmission of Msg3, Msg3 performs rate matching on the resources occupied by TBS information, i.e., Msg3 performs rate matching based on the remaining number of REs (the remaining number of REs refers to the result that the total number of REs minus the number of REs occupied by the TBS information).

In the above embodiment, when Msg3 repeatedly transmits, the repetition number corresponding to multiple TBSs provided by the base station for Msg3 is different, the repetition number indicated by the base station in RAR grant corresponds to the maximum TBS value, the repetition number of other TBS values can be deduced from the repetition number corresponding to the maximum TBS value, and the repetition number actually used by Msg3 corresponds to the actually-used TBS value.

In one example, the repetition number of the TBS information is the same as the repetition number of the actual transmission of Msg3 by default, without signaling indication that parts of REs are used for transmission of the TBS information within each subframe of Msg3.

In another example, the repetition number of the TBS information is the same as the repetition number corresponding to the minimum TBS value among the multiple TBS values provided by the base station for Msg3 by default, and no signaling is required to indicate that the repetition number for the actual transmission of Msg3 is greater than the repetition number of the TBS information when the TBS actually used by Msg3 is not the minimum TBS, then part of REs is used for transmission of TBS information in the first part of the subframes of Msg3, but no RE is used for transmission of TBS information in the rear part of the subframes of Msg3.

In yet another example, the repetition number of the TBS information is independent of the repetition number corresponding to multiple TBS values provided by the base station for Msg3, and a signaling indication is required to indicate, e.g., to indicate that the base station specifically configures the corresponding repetition number for each CE level in the system information. When scheduling Msg3, the base station shall ensure that the repetition number of Msg3 shall not be less than the repetition number of the TBS information.

In the above embodiment, the modulation method used by TBS information is the same as the modulation mode used by Msg3, for example, QPSK modulation is fixed.

In yet another embodiment, an eNB provides Msg3 with multiple possible TBSs for the UE to select, the UE selects an appropriate TBS value according to the actual data size, the TBS value used for actual transmission of Msg3 is carried by DMRS of Msg3, and transmitted to the base station together with Msg3, the eNB can detect the TBS value used for actual transmission of Msg3, and decode Msg3 based on the TBS value, thereby avoiding blind decoding on the Msg3 based on the hypothesis that there are multiple TBSs. The specific steps of the embodiment are shown in FIG. 28.

In a first step, a UE transmits a PRACH to an eNB for requesting EDT.

In a second step, after receiving the PRACH, the eNB transmits one RAR scheduling Msg3 to the UE and provides multiple possible TBSs for the UE to select.

In a third step, after receiving the RAR, the UE selects one TBS to transmit Msg3 according to the data size, and reports the information of selected TBS value through the DMRS of Msg3 to the base station.

In the above embodiment, the base station provides Msg3 with at most four possible TBSs for the UE to select, i.e. the TBS value used for the actual transmission of Msg3 can be indicated by at most 2 bits, and the information can be carried by DMRS of Msg3. When the base station provides only one TBS for Msg3, it is not necessary to transmit the TBS value used for the actual transmission of Msg3.

In one example, when the base station provides 2-4 possible TBSs for Msg3, and the TBS value used for the actual transmission of Msg3 is indicated by fixedly using 2-bit information. In another example, when the base station provides 3-4 possible TBSs for Msg3, the TBS value used for the actual transmission of Msg3 is indicated by using 2-bit information. When the base station provides 2 possible TBSs for Msg3, the TBS value used for the actual transmission of Msg3 is indicated by using 1-bit information.

In the above embodiment, the TBS value used for the actual transmission of Msg3 is carried by DMRS of Msg3, that is, TBS value used for the actual transmission of Msg3 corresponds to different DMRS signals. For example, TBS value used for actual transmission of Msg3 is carried by different cyclic shifts of DMRS, referring to the generation formula of DMRS signal in section 5.5.1 of 3GPP 36.211, the TBS value used for the actual transmission of Msg3 corresponds to different values of α, and a corresponding DMRS signal is generated based on the same base sequence and different values of α.

$$r_{u,v}^{(\alpha,\delta)}(n) = e^{j\alpha\left(n+\delta\frac{\overline{v}mod2}{2}\right)}\bar{r}_{u,v}(n), 0 \le n < M_{sc}^{RS}$$

Embodiment 13

In one embodiment, an eNB provides multiple possible TBSs for Msg3 for the UE to select, the UE selects an appropriate TBS value based on the actual data size and reports the information of selected TBS value and Msg3 to the base station. The eNB may not successfully decode Msg3 but may detect the TBS value used for the actual transmission of Msg3, then the eNB may allocate resources based on only this TBS value when scheduling retransmission of Msg3. When the TBS value is less than the TBS value indicated in RAR grant (the maximum TBS value among multiple TBS values provided for Msg3), the retransmission of Msg3 may save more resources than the initial transmission, and the eNB does not need to perform blind decoding based on the hypothesis that there are multiple TBS for the retransmission of Msg3. The specific steps of the embodiment are shown in FIG. 29.

In a first step, a UE transmits a PRACH to an eNB for requesting EDT.

In a second step, after receiving the PRACH, the eNB transmits one RAR scheduling Msg3 to the UE and provides Msg3 with multiple possible TBSs for the UE to select.

In a third step, after receiving the RAR, the UE selects one TBS to transmit Msg3 according to the data size and reports the information of selected TBS value to the base station.

In a fourth step, the eNB receives the TBS information and decodes Msg3 according to the TBS information. When the eNB fails to decode Msg3, the eNB schedules the retransmission of Msg3, and if the eNB successfully detects the TBS information, the eNB schedules the retransmission of Msg3 according to the detected TBS value. Otherwise, the eNB provides Msg3 with multiple possible TBSs for the UE to select, which is the same as the scheduling of the initial transmission of Msg3.

In a fifth step, the UE transmits the retransmission of Msg3, and the used TBS value is the same as the TBS value used for the initial transmission of Msg3.

In this embodiment, the eNB provides Msg3 with multiple possible TBSs for the UE to select. The UE selects an appropriate TBS value according to the actual data size, and transmits the TBS value used for actual transmission of Msg3 to the eNB. The eNB decides whether to provide one TBS or multiple possible TBSs for the retransmission of Msg3 according to whether the TBS information is successfully detected, if the eNB successfully detects the TBS information, only the detected TBS value is provided for the retransmission of Msg3, and if eNB does not successfully detect the TBS information, multiple possible TBS values are provided for the retransmission of Msg3. The multiple possible TBS values should be the same as the multiple possible TBS values provided for initial transmission of Msg3.

In order to support the above function, the DCI scheduling the retransmission of Msg3 includes a 1-bit flag for indicating whether there is one TBS or multiple possible TBS. For example, when the flag indicates '0', it indicates that the eNB provides only one TBS for the retransmission of Msg3, the TBS value indicated in the DCI is the TBS, and the repetition number indicated in the DCI is the repetition number for the TBS. When the flag indicates '1', it indicates that the eNB provides multiple possible TBSs for the retransmission of Msg3, that TBS value indicated in the DCI is the maximum TBS value among the multiple possible TBS values, and other possible TBS values may be implicitly derived based on this maximum TBS value and a predefined table (the table defining corresponding multiple possible TBSs for each maximum TBS value of Msg3 broadcasted in system information). The repetition number indicated in the DCI is the repetition number corresponding to the maximum TBS value, and the repetition number of other TBS values can be implicitly derived based on this repetition number and a predefined rule.

In one example, the 1-bit flag described above may reuse some existing indication fields in corresponding DCI formats, which may ensure that DCI scheduling retransmission of Msg3 can reuse the format and size of DCI scheduling other PUSCH to reduce the complexity of DCI design. For example, the 1-bit flag reuse 1 bit from the existing MCS field in corresponding DCI format. For the eMTC UE, when the DCI format 6-0A/6-0B is used for scheduling the retransmission of Msg3, 3 bits in the existing 4-bit MCS field are used as MCS indications, and the other 1 bit is used as the flag.

In another embodiment, the eNB provides Msg3 with multiple possible TBSs for the UE to select. The UE selects an appropriate TBS according to the actual data size, and the UE transmits the TBS value used for actual transmission of Msg3 to the eNB. The eNB provides only one TBS value for the retransmission of Msg3, regardless of whether the eNB successfully detects the TBS information. Here, when the UE reports the TBS value used for the actual transmission of Msg3, the transmission reliability is higher than Msg3, for example, the error probability reaches 1e-3 or lower. In this embodiment, the TBS value indicated by the DCI scheduling retransmission of Msg3 is the TBS value used for actual transmission of Msg3 in retransmission, the repetition number indicated by the DCI scheduling retransmission of Msg3 is the repetition number used for actual transmission of Msg3 in retransmission, and there is no difference in interpretation between the DCI scheduling retransmission of Msg3 and the DCI scheduling other PUSCH. Here, the eNB should ensure that the TBS value indicated by the DCI scheduling retransmission of Msg3 is the same as the TBS value used by the UE for the initial transmission of Msg3, and the TBS value indicated by the DCI scheduling retransmission of Msg3 may be different from the TBS value indicated by the RAR grant scheduling the initial transmission of Msg3, which is the largest among the multiple possible TBSs.

In yet another embodiment, an eNB provides Msg3 with multiple possible TBSs for the UE to select, the UE selects an appropriate TBS according to the actual data size, and the UE does not need to transmit TBS value used for the actual transmission of Msg3 to the eNB, so the eNB still provides multiple possible TBSs when scheduling the retransmission of Msg3, which are the same as the multiple possible TBSs provided for the initial transmission of Msg3. In this embodiment, the TBS indicated by the DCI scheduling the retransmission of Msg3 is the TBS with the maximum value among the multiple possible TBSs. Other possible TBS values can be implicitly derived according to this maximum TBS value and a predefined table (this table defining corresponding multiple possible TBSs for each maximum TBS value of Msg3 broadcasted in system information). The repetition number indicated by the DCI scheduling the retransmission of Msg3 is the repetition number corresponding to the maximum TBS value, and the repetition number of other TBS values can be implicitly derived according to this repetition number and a predefined rule. Here, the eNB should ensure that the TBS value indicated by the DCI scheduling retransmission of Msg3 is the same as the TBS value indicated by the RAR grant scheduling initial transmission of Msg3, which is the largest among the multiple possible TBSs.

Based on the above-mentioned embodiment provided by the present disclosure, as shown in FIG. 30, an exemplary radio communication system 3000 according to an embodiment of the present disclosure is shown. Wherein, the UE detects indication information. The radio communication system 3000 includes one or more fixed infrastructure units that form a network that is distributed over a geographic area. The base unit can also be referred to as an Access Point (AP), an Access Terminal (AT), a Base Station (BS), a Node-B and an evolved NodeB (eNB) Next Generation Base Stations (gNBs) or other terms used in the art. The AP in this embodiment of the present disclosure can be replaced by any one of the above terms. As shown in FIG. 30, one or more base stations 3001 and 3002 provide services for several mobile stations (MS) or UEs or terminal equipments or users 3003 and 3004 in a serving area. For example, the serving area is within a cell or a cell sector. In some systems, one or more BSs can be communicatively coupled to a controller forming an access network, wherein the controller can be communicatively coupled to one or more core networks. The present disclosure is not limited to any particular radio communication system.

In time domain and/or frequency domain, the base stations 3001 and 3002 transmit downlink (DL) communication signals 3012 and 3013 to the UEs 3003 and 3004, respectively. The UEs 3003 and 3004 communicate with one or more base units 3001 and 3002 through Uplink (UL) communication signals 3011 and 3014, respectively. In one embodiment, the mobile communication system 3000 is an Orthogonal Frequency Division Multiple Access (OFDM)/ Orthogonal Frequency Division Multiple Access (OFDMA) system including multiple base stations and multiple UEs, wherein, the multiple base stations include a base station 3001 and a base station 3002, the multiple UEs includes a UE 3003 and a UE 3004. The base station 3001 communicates with the UE 3003 through the UL communication signal 3011 and the DL communication signal 3012. When a base station has a DL packet to transmit to a UE, each UE obtains a DL allocation (resources), such as a Physical Downlink Shared Channel (PDSCH) or a narrowband Physical Downlink Shared Channel (NPDSCH). When a UE needs to transmit a packet to a base station in the uplink, the UE obtains a grant from a base station, wherein, the grant allocates a group of PUSCHs or NPUSCHs of the UL radio resources. The UE acquires DL or UL scheduling information from a Physical Downlink Control Channel (PDCCH) or MPDCCH or EPDCCH or NPDCCH which is specific to itself. The DL or UL scheduling information and other control information carried by the downlink control channel are referred to DCI. FIG. 30 also shows different physical channels exemplified by the DL 3012 and the UL 3011. The DL 3012 includes a PDCCH or EPDCCH or NPDCCH or MPDCCH 3021, a PDSCH or NPDSCH 3022, a Physical Control Formation Indicator Channel (PCFICH) 3023, a Physical Multicast Channel (PMCH) 3024, a Physical Broadcast Channel (PBCH) or a narrowband physical broadcast channel (NPBCH) 3025, a physical hybrid automatic repeat request indicator channel (PHICH) 3026 and a primary synchronization signal (PSS), a second synchronization signal (Secondary Synchronization Signal, SSS) or NPSS/NSSS signals. The downlink control channel 3021 transmits a DL control signal to the user. The DCI 3020 is carried through the downlink control channel 3021. The PDSCH 3022 transmits data information to the UE. PCFICH 3023 is used for decoding PDCCH information, such as dynamically indicating the number of symbols used by PDCCH 3021. PMCH 3024 carries broadcast multicast information. The PBCH or NPBCH 3025 carries Master Information Blocks (MIBs) for early detection of UEs and cell-wide coverage. The PHICH carries Hybrid Automatic Repeat request (HARQ) information, which indicates whether the base station has correctly received the transmitted uplink signal. The UL 3011 includes a Physical Uplink Control Channel (PUCCH) 3031, a PUSCH 3032, and Physical Random Access Channel (PRACH) 3033 carrying random access information.

In one embodiment, the radio communication network 3000 uses an OFDMA or multi-carrier architecture, including Adaptive Modulation and Coding (AMC) on the DL and next-generation single-carrier FDMA architecture or multi-carrier OFDMA architecture for UL transmission. The FDMA-based single-carrier architecture includes Interleaved FDMA (IFDMA), Localized FDMA (LFDMA) or DFT-spread OFDM (DFT-SOFDM) of IFDMA or LFDMA. In addition, it further includes enhanced non-interleaved NOMA architectures of OFDMA system, such as Pattern division multiple access (PDMA), Sparse code multiple access (MMAA), Low code rate spreading Frequency domain spreading (LCRSFDS), Non-orthogonal coded multiple access (NCMA), Resource spreading multiple access (RSMA), Interleave-grid multiple access (IGMA), Low density spreading with signature vector extension (LDS-SVE), Non-orthogonal coded access (NOCA), Interleave division multiple access (IDMA), Repetition division multiple access (RDMA), Group orthogonal coded access (GOCA) and Welch-bound based spread MA (WSMA), etc.

In OFDMA systems, the remote units are served by allocating downlink or uplink radio resources that typically contain a set of subcarriers on one or more OFDM symbols. The exemplary OFDMA protocols include the development of LTE and IEEE 802.16 standards of 3GPP UMTS standards. The architecture can also include the use of transmission techniques such as multi-carrier CDMA (MC-CDMA), multi-carrier direct sequence CDMA (MC-DS-CDMA) or Orthogonal Frequency and Code Division Multiplexing (OFCDM). Or, the architecture can be based on simpler time and/or frequency division multiplexing/multiple access techniques, or a combination of these different technologies. In an alternate embodiment, the communication system can use other cellular communication system protocols, including but not limited to TDMA or direct sequence CDMA.

The method for uplink resources allocation provided in the embodiments of the present disclosure can be applied to a situation in which full bandwidth needs to be divided in a future radio communication system, and a resource allocation requirement that meets a diversity of needs is provided, and the complexity and the system overhead are relatively low, so that the user can perform more efficient uplink transmission and to provide users with a better access experience.

An embodiment of the present disclosure provides a base station. As shown in FIG. 31, which includes an allocating module 2301 and a transmitting module 2302, wherein, the allocating module 2301 is configured to allocate BWP resources and intra-BWP PRB resources to the UE.

the transmitting module 2302 is configured to transmit BWP resource indication information and intra-BWP PRB resource indication information to the UE.

Wherein, the BWP resource indication information is used for indicating the BWP resources allocated by the base station to the UE, and the intra-BWP PRB resource indication information is used for indicating the intra-BWP PRB resources allocated by the base station to the UE.

An embodiment of the present disclosure provides a method for uplink resource allocation and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resources allocated by the base station to the UE. The intra-BWP PRB resource indication information is used for indicating the intra-BWP PRB resources allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission, that is, a new method for uplink resource allocation is designed to be applied to BWP-based bandwidth allocation for future radio communication systems.

The base station provided in this embodiment of the present disclosure is applicable to the foregoing method embodiments, and details will not be described herein again.

An embodiment of the present disclosure provides a UE, as shown in FIG. 32, which includes: a receiving module 2401 and a transmitting module 2402, wherein, the receiving module 2401 is configured to receive BWP resource indication information transmitted by a base station and intra-BWP PRB resource indication information.

the transmitting module 2402 is configured to determine, according to the BWP resource indication information received by the receiving module 2401 and the intra-BWP PRB resource indication information, BWP resources allocated by the base station and intra-BWP PRB resources, and perform uplink transmission.

An embodiment of the present disclosure provides a method for uplink resource allocation and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resources allocated by the base station to the UE. The intra-BWP PRB resource indication information is used for indicating the intra-BWP PRB resources allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission, that is, a new method for uplink resource allocation is designed to be applied to BWP-based bandwidth allocation for future radio communication systems.

The UE provided in this embodiment of the present disclosure is applicable to the foregoing method embodiments, and details will not be described herein again.

An embodiment of the present disclosure provides a base station including: a memory, a processor, and a computer program stored in the memory and operable on the processor, wherein, the processor executes the above-mentioned method for allocating uplink resources executed by the base station.

An embodiment of the present disclosure provides a method for uplink resource allocation and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resources allocated by the base station to the UE. The intra-BWP PRB resource indication information is used for indicating the intra-BWP PRB resources allocated by the base station, and then the UE receives the BWP resources indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission, that is, a new method for uplink resource allocation is designed to be applied to BWP-based bandwidth allocation for future radio communication systems.

The base station provided in this embodiment of the present disclosure is applicable to the foregoing method embodiments, and details will not be described herein again.

An embodiment of the present disclosure provides a UE, including: a computer program including a memory, a processor, and a computer program stored in the memory and operable on the processor, wherein, the processor executes the above-mentioned method for uplink resource allocation executed by the UE.

An embodiment of the present disclosure provides a method for uplink resource allocation and a method for uplink transmission. Compared with the prior art, in the embodiment of the present disclosure, a base station allocates BWP resources and intra-BWP PRB resources to a UE, the base station then transmits the BWP resource indication information and the intra-BWP PRB resource indication information to the UE. The BWP resource indication information is used for indicating the BWP resources allocated by the base station to the UE. The intra-BWP PRB resources indication information is used for indicating the intra-BWP PRB resources allocated by the base station, and then the UE receives the BWP resource indication information and the intra-BWP PRB resource indication information transmitted by the base station, and then determines the BWP resources and the intra-BWP PRB resources allocated by the base station according to the BWP resource indication information and the intra-BWP PRB resource indication information so as to perform uplink transmission, that is, a new method for uplink resource allocation is designed to be applied to BWP-based bandwidth allocation for future radio communication systems.

The UE provided in this embodiment of the present disclosure is applicable to the foregoing method embodiments, and details will not be described herein again.

The method for determining a preamble sequence cyclic shift, the method for configuring a preamble sequence cyclic shift set, the device for configuring a preamble sequence cyclic shift set and the device for determining a preamble sequence cyclic shift provided by the present disclosure will be described below one by one with reference to specific parameter designs.

The present disclosure provides a method for determining a preamble sequence cyclic shift, as shown in FIG. 30, comprising the following steps.

Step 0 (initial setting): A communication system generates all preamble sequence cyclic shift sets, allocates a unique index for each preamble sequence cyclic shift set, and allocates a unique index for each preamble sequence cyclic shift in each preamble sequence cyclic shift set.

Step 1: A base station transmits a System Information Block (SIB), wherein the SIB contains a random access preamble sequence cyclic shift configuration index (zero-CorrelationZoneConfig) and a preamble sequence cyclic shift set index (CyclicShiftSetIndex); and, a user equipment receives the SIB, and reads the zeroCorrelationZoneConfig and the CyclicShiftSetIndex contained in the SIB.

Step 2: The user equipment selects a corresponding preamble sequence cyclic shift set from all the preamble sequence cyclic shift sets generated in the initial step, based on the CyclicShiftSetIndex received in the step 1.

Step 3: The user equipment determines a final preamble sequence cyclic shift $N_{cs}$ from the preamble sequence cyclic shift set selected in the step 2, based on the zeroCorrelationZoneConfig received in the step 1.

It is to be noted that the following four adjustments can be made to the above solutions.

Adjustment Solution 1:

Step 1: A base station transmits a System Information Block (SIB), wherein the SIB contains a random access preamble sequence cyclic shift configuration index (zero-CorrelationZoneConfig) and a preamble sequence cyclic shift set index (CyclicShiftSetIndex); and, a user equipment receives the SIB, and reads the zeroCorrelationZoneConfig and the CyclicShiftSetIndex contained in the SIB.

Step 2: Based on the CyclicShiftSetIndex received in the step 1, the user equipment makes the following selections: if the CyclicShiftSetIndex is not 0, determining that the preamble sequence cyclic shift $N_{cs}$ is 0, i.e., $N_{cs}=0$; or otherwise, if the CyclicShiftSetIndex is 0, proceeding to the step 3.

Step 3: The user equipment determines, based on the zeroCorrelationZoneConfig received in the step 1 and from the preamble sequence cyclic shift set stored in advance, a final preamble sequence cyclic shift $N_{cs}$ Adjustment Solution 2:

Step 1: A base station transmits a System Information Block (SIB), wherein the SIB contains a random access preamble sequence cyclic shift configuration index (zero-CorrelationZoneConfig) and possibly contains a direct configuration of a preamble sequence cyclic shift (zeroCyclicShift) indication; and, a user equipment receives the SIB, and reads the zeroCorrelationZoneConfig contained in the SIB and the zeroCyclicShift indication possibly contained in the SIB.

Step 2: Based on the CyclicShiftSetIndex received in the step 1 and the zeroCyclicShift indication possibly received in the step 1, the user equipment makes the following selections: if the zeroCyclicShift indication has been received, determining that the preamble sequence cyclic shift $N_{cs}$ is 0, i.e., $N_{cs}=0$; or otherwise, if the zeroCyclicShift indication has not been received, proceeding to the step 3.

Step 3: The user equipment determines, based on the zeroCorrelationZoneConfig received in the step 1 and from the preamble sequence cyclic shift set stored in advance, a final preamble sequence cyclic shift $N_{cs}$.

Adjustment Solution 3:

Step 1: A base station transmits a System Information Block (SIB), wherein the SIB contains a random access preamble sequence cyclic shift configuration index (zero-CorrelationZoneConfig) and a direct configuration of a preamble sequence cyclic shift (zeroCyclicShift) indication; and, a user equipment receives the SIB, and reads the zeroCorrelationZoneConfig and zeroCyclicShift indication contained in the SIB.

Step 2: Based on the CyclicShiftSetIndex and zeroCyclicShift indication received in the step 1, the user equipment makes the following selections: if the received zeroCyclicShift indication is 1, determining that the preamble sequence cyclic shift $N_{cs}$ is 0, i.e., $N_{cs}=0$; or otherwise, if the received zeroCyclicShift indication is not 1, proceeding to the step 3.

Step 3: The user equipment determines, based on the zeroCorrelationZoneConfig received in the step 1 and from the preamble sequence cyclic shift set stored in advance, a final preamble sequence cyclic shift $N_{cs}$.

Adjustment solution 4:

Step 1: A base station transmits a System Information Block (SIB), wherein the SIB contains a random access preamble sequence cyclic shift configuration index (zero-CorrelationZoneConfig), a preamble sequence cyclic shift set index (CyclicShiftSetIndex) and an initial root sequence logic index (rootSequenceIndex); and, a user equipment receives the SIB, and reads the zeroCorrelationZoneConfig, CyclicShiftSetIndex and rootSequenceIndex contained in the SIB.

Step 2: The user equipment obtains a corresponding initial root sequence physical index u based on the rootSequenceIndex received in the step 1.

Step 3: The user equipment selects a corresponding preamble sequence cyclic shift set from all the preamble sequence cyclic shift sets generated in the initial step, based on the CyclicShiftSetIndex received in the step 1.

Step 4: The user equipment determines a preamble sequence cyclic shift $N_{cs}$ from the preamble sequence cyclic shift set selected in the step 2, based on the zeroCorrelationZoneConfig received in the step 1.

Step 5: If the preamble sequence cyclic set corresponding to the CyclicShiftSetIndex is a restricted set and it is unable to generate any ZC sequence based on the initial root sequence physical index u obtained in the step 2 and the preamble sequence cyclic shift obtained in the step 4, it is determined that the preamble sequence cyclic shift $N_{cs}$ is 0, i.e., $N_{cs}=0$; or otherwise, the preamble sequence cyclic shift $N_{cs}$ determined in the step 4 is kept unchanged.

In the step 1 of the above solutions, there is at least one SIB transmitted by the base station. As shown in FIG. 35, the user equipment selects one SIB from the at least one SIB according to the preset conditions, and determines the indexes carried in the selected SIB. The reason why the at least one SIB is transmitted is because the base station needs to decide an optimal transmitting beam direction of the base station according to the random access channel resource or preamble sequence used by the user equipment. Therefore, SIBs in synchronization signal blocks contained in different beams can be different. In the step 1, the base station can transmit SIBs containing different preamble sequence cyclic shift configuration indexes and preamble sequence cyclic shift set indexes, according to different cell coverage demands corresponding to different beams and on different beams. If a user has detected SIBs in one or more synchronization signal blocks, the user selects an SIB in one synchronization signal block according to the maximum received signal strength criterion, the first reception criterion or other criterions, and reads the preamble sequence cyclic shift configuration index and the preamble sequence cyclic shift set index in this SIB.

In the present disclosure, the base station can use a transmission structure based on an antenna matrix shown in FIG. 36. The elements shown in FIG. 36 may be included in the wireless communication interface 310. According to FIG. 36, each link which passed through baseband processing is connected to an antenna array consisting of antenna units through an up-convertor and a Digital-to-Analog Converter (DAC). Each antenna in the antenna array can only be adjusted in phase. By adjusting the phase, the antenna array can form beams in an appropriate direction so as to realize beamforming of the system. In order to ensure beam coverage, the user equipment can assign multiple beam directions having different orientations in advance, as shown in FIG. 37.

Based on the step 0, the present disclosure provides a method for configuring a preamble sequence cyclic shift set, as shown in FIG. 38, comprising the following steps:

step 601: all values of a preamble sequence cyclic shift $N_{cs}$ are determined according to a Zadoff-Chu (ZC) sequence and the degree of frequency offset; and step 602: a preset number of preamble sequence cyclic shifts $N_{cs}$ are selected from all values of the preamble sequence cyclic shift $N_{cs}$ to generate a preamble sequence cyclic shift set.

Further, the generated preamble sequence cyclic shift set is transmitted to both the base station and the user equipment for storage.

FIG. 39 shows a schematic diagram of the preamble sequence cyclic shift set generated by this configuration method. In this method, the generation of any preamble sequence cyclic shift set specifically comprises the following steps:

step 700 (initial setting): the maximum number of allowable preamble sequence cyclic shifts $N_{cs}$ is determined as P;

step 701: for a certain degree of frequency offset, several conditions such as the cell coverage demand and/or the value of a ZC sequence index are determined;

step 702: based on the different conditions determined in the step 701 and in combination with the degree of frequency offset, all possible values of the preamble sequence cyclic shift $N_{cs}$ in each condition are determined, respectively;

step 703: several preamble sequence cyclic shifts $N_{cs}$ are selected from all possible values of the preamble sequence cyclic shift $N_{cs}$ determined in each condition in the step 702 (the number of the selected preamble sequence cyclic shifts may be 0, 1 or more, and the total number of preamble sequence cyclic shifts correspondingly selected in different conditions is less than P) to generate a final preamble sequence cyclic shift set, and each preamble sequence cyclic shift $N_{cs}$ in this set is allocated with a unique index; and step 704: for different degrees of frequency offset, the steps 701 to 703 are repeated until preamble sequence cyclic shift sets corresponding to all the degrees of frequency offset are generated, and each preamble sequence cyclic shift set is allocated with a unique index.

In FIG. 40, the number of preamble sequence cyclic shift sets generated by the system is S, and the sets are successively allocated with preamble sequence cyclic shift set indexes (CyclicShiftSetIndex): index 0, index 1, . . . , index S−1. The number of preamble sequence cyclic shift $N_{cs}$ elements in each set is at most P, and the preamble sequence cyclic shift $N_{cs}$ elements are successively allocated with preamble sequence cyclic shift $N_{cs}$ configuration indexes (zeroCorrelationZoneConfig): index 0, index 1, . . . , index P−1. An element p (0≤p≤P−1) in a set s (0≤s≤S−1) can be represented by $N_p^s$. If the length of the used AC sequence is $N_{zc}$, the value range of any $N_p^s$ is $0 \le N_p^2 \le N_{zc}-1$. The index of each preamble sequence cyclic shift set is greater than 1 bit.

It is to be specifically noted that the element at any position in any preamble sequence cyclic shift set in FIG. 40 may be null (that is, there is no $N_p^s$ at this position). In this case, the number of elements in this preamble sequence cyclic shift set is less than P.

Specifically, the system determines the number of preamble sequence cyclic shift sets according to all possible degrees of frequency offset in different conditions. Each set corresponds to one degree of frequency offset. The system also allocates a unique preamble sequence cyclic shift set index (CyclicShiftSetIndex) for each set.

For example, when the maximum allowable degree of frequency offset of the system is 3 times of the sub-carrier spacing of a random access channel, the system can generate four preamble sequence cyclic shift sets, and allocate an index 0, an index 1, an index 2 and an index 3 to the four preamble sequence cyclic shift sets, respectively. The preamble sequence cyclic shift set corresponding to the index 0 supports a situation where there is no or negligible frequency offset; the preamble sequence cyclic shift set corresponding to the index 1 supports a situation where the maximum frequency offset is 1 time of the sub-carrier spacing of the random access channel; the preamble sequence cyclic shift set corresponding to the index 2 supports a situation where the maximum frequency offset is 2 times of the sub-carrier spacing of the random access channel; and, the preamble sequence cyclic shift set corresponding to the index 3 supports a situation where the maximum frequency offset is 3 times of the sub-carrier spacing of the random access channel.

In each preamble sequence cyclic shift set, all possible values of a cyclic shift $N_{cs}$ in each condition are determined based on the degree of frequency offset corresponding to this set and in combination with different conditions such as the cell coverage demands and/or the value of the ZC sequence index; then, several values of preamble sequence cyclic shifts $N_{cs}$ are selected from these possible values (the number of the selected values can be 0, 1 or more) to form a preamble sequence cyclic shift set; and, the selected preamble sequence cyclic shifts $N_{cs}$ are successively allocated with unique preamble sequence cyclic shift $N_{cs}$ configuration indexes (zeroCorrelationZoneConfig). It is to be specifically noted that the number of preamble sequence cyclic shift $N_{cs}$ elements in any preamble sequence cyclic shift set cannot exceed the maximum number P.

The present disclosure further provides a method for generating a preamble sequence based on a preamble sequence cyclic shift $N_{cs}$. The method comprises the following different situations.

1. When the determined preamble sequence cyclic shift is $N_{cs}$ and the maximum allowable frequency offset of the system is 2 times of the sub-carrier spacing of the random access channel, all preamble sequences are generated based on an initial root sequence logic index u.

2. When the determined preamble sequence cyclic shift is $N_{cs}$ and the zeroCorrelationZoneConfig corresponding to this cyclic shift is greater than a certain threshold, all preamble sequences are determined by a method 1; or otherwise, all preamble sequences are generated by a method 2. The method 1 corresponds to a method for generating preamble sequences when the maximum allowable frequency offset is 1 time of the sub-carrier spacing of the random access channel, and the method 2 corresponds to a method for generating preamble sequences when the maximum allowable frequency offset is 2 times of the sub-carrier spacing of the random access channel.

3. When the determined preamble sequence cyclic shift is $N_{cs}$ and the zeroCorrelationZoneConfig corresponding to this cyclic shift is less than a certain threshold, all preamble sequences are determined by a method 1; or otherwise, all preamble sequences are generated by a method 2. The method 1 corresponds to a method for generating preamble sequences when the maximum allowable frequency offset is 1 time of the sub-carrier spacing of the random access channel, and the method 2 corresponds to a method for generating preamble sequences when the maximum allowable frequency offset is 2 times of the sub-carrier spacing of the random access channel.

The method for configuring a preamble sequence cyclic shift set provided by the present disclosure will be described below by several embodiments.

Embodiment 14

In a situation where there is no or negligible frequency offset, the duration of a random access preamble sequence is $T_{SEQ}$, a cyclic shift sequence of a ZC sequence having a length of $N_{zc}$ is used as a preamble sequence, the maximum delay spread for an uplink asynchronous user is $\tau_{DS}$, and the number of additional guard samples due to the receiver pulse shaping filter is $n_g$.

In this situation, when the cell coverage radius demand is r, a lower bound for the preamble sequence cyclic shift $N_{cs}$ is:

$$N_{CS} \geq \frac{2r/c + \tau_{DS}}{T_{SEQ}} * N_{ZC} + n_g$$

where c denotes the velocity of light.

Based on the above conditions, the method for configuring a preamble sequence cyclic shift set specifically comprises the following steps:

step A (initial setting): the maximum number of allowable preamble sequence cyclic shifts $N_{cs}$ is determined as P;

step B: Q (Q≤P) cell coverage radii r are selected according to the actual dement for cell coverage;

step C: based on the Q cell coverage radii r determined in the step B, the value range of preamble sequence cyclic shifts $N_{cs}$ under each cell radius r is determined, respectively; and step D: a preamble sequence cyclic shift $N_{cs}$ is respectively selected from the value range of preamble sequence cyclic shifts $N_{cs}$ determined by each cell radius r in the step C to generate a final preamble sequence $N_{cs}$ set containing Q elements, and each preamble sequence cyclic shift $N_{cs}$ is allocated with a unique index, where the index No. is from 0 to Q−1.

In the step D, during the selection of a preamble sequence cyclic shift $N_{cs}$ from the value range of preamble sequence cyclic shifts $N_{cs}$ determined by each cell radius r, the selected preamble sequence cyclic shift $N_{cs}$ can be a preamble sequence cyclic shift $N_{cs}$ having a minimum value. Of course, the selection of the preamble sequence cyclic shift $N_{cs}$ is not limited thereto.

In Embodiment 14, in the situation where there is no or negligible frequency offset, the following description will be given by three specific implementations.

Specific Embodiment 14

A cyclic shift sequence of a ZC sequence having a length of $N_{zc}$ is used as a preamble sequence, the sub-carrier spacing of the random access channel is Δf, the duration of a random access preamble sequence is $T_{SEQ}$, the maximum delay spread for an uplink asynchronous user is $\tau_{DS}$, the number of additional guard samples due to the receiver pulse shaping filter is $n_g$, the cell coverage radius demand is r, and the preamble sequence cyclic shift is $N_{cs}$.

In the assumption that the values of the above parameters are $N_{zc}$=839, Δf=2.5 kHz, $T_{SEQ}$=400 μs, $\tau_{DS}$=2.6 μs, and $n_g$=2, a preferred method for configuring a preamble sequence cyclic shift set specifically comprises the following steps.

The maximum number of allowable preamble sequence cyclic shifts $N_{cs}$ is determined as 16.

The following values of the cell radius are selected in advance, and the value range of the preamble sequence cyclic shift $N_{cs}$ at each value of the cell radius is calculated:

(1) if r=0.68 km, $N_{cs}$≥17 can be obtained by the method for configuring a preamble sequence cyclic shift set of the present disclosure;

(2) if r=0.82 km, $N_{cs}$≥19 can be obtained by the method for configuring a preamble sequence cyclic shift set of the present disclosure;

(3) if r=1.04 km, $N_{cs}$≥22 can be obtained by the method for configuring a preamble sequence cyclic shift set of the present disclosure;

(4) if r=1.32 km, $N_{cs}$≥26 can be obtained by the method for configuring a preamble sequence cyclic shift set of the present disclosure;

(5) if r=0.68 km, $N_{cs}$≥31 can be obtained by the method for configuring a preamble sequence cyclic shift set of the present disclosure;

(6) if r=2.04 km, $N_{cs}$≥36 can be obtained by the method for configuring a preamble sequence cyclic shift set of the present disclosure;

(7) if r=2.40 km, $N_{cs}$≥41 can be obtained by the method for configuring a preamble sequence cyclic shift set of the present disclosure;

(8) if r=2.76 km, $N_{cs}$≥46 can be obtained by the method for configuring a preamble sequence cyclic shift set of the present disclosure;

(9) if r=3.69 km, $N_{cs}$≥59 can be obtained by the method for configuring a preamble sequence cyclic shift set of the present disclosure;

(10) if r=4.90 km, $N_{cs}$≥76 can be obtained by the method for configuring a preamble sequence cyclic shift set of the present disclosure;

(11) if r=6.12 km, $N_{cs}$≥93 can be obtained by the method for configuring a preamble sequence cyclic shift set of the present disclosure;

(12) if r=7.92 km, $N_{cs}$≥119 can be obtained by the method for configuring a preamble sequence cyclic shift set of the present disclosure;

(13) if r=11.4 km, $N_{cs}$≥167 can be obtained by the method for configuring a preamble sequence cyclic shift set of the present disclosure;

(14) if r=19.42 km, $N_{cs}$≥279 can be obtained by the method for configuring a preamble sequence cyclic shift set of the present disclosure;

(15) if r=29.43 km, $N_{cs} \geq 419$ can be obtained by the method for configuring a preamble sequence cyclic shift set of the present disclosure; and

(16) if r=59.47 km, $N_{cs} \geq 839$ can be obtained by the method for configuring a preamble sequence cyclic shift set of the present disclosure, that is, $N_{cs}=0$.

The minimum values of the preamble sequence cyclic shift $N_{cs}$ are selected from the 16 value ranges of the preamble sequence cyclic shift $N_{cs}$ to form a preamble sequence cyclic shift set {0, 17, 19, 22, 26, 31, 36, 41, 46, 59, 76, 93, 119, 167, 279, 419}. In an order from the smallest to largest values of the preamble sequence cyclic shift $N_{cs}$, indexes 0 to 15 are allocated for each preamble sequence cyclic shift $N_{cs}$, respectively. The eventually generated preamble sequence cyclic shift set is shown in the following table 15.

TABLE 15

Preamble sequence cyclic shift set

| $N_{CS}$ configuration | $N_{CS}$ value |
|---|---|
| 0 | 0 |
| 1 | 17 |
| 2 | 19 |
| 3 | 22 |
| 4 | 26 |
| 5 | 31 |
| 6 | 36 |
| 7 | 41 |
| 8 | 46 |
| 9 | 59 |
| 10 | 76 |
| 11 | 93 |
| 12 | 119 |
| 13 | 167 |
| 14 | 279 |
| 15 | 419 |

Specific Embodiment 15

A cyclic shift sequence of a ZC sequence having a length of $N_{zc}$ is used as a preamble sequence, the sub-carrier spacing of the random access channel is $\Delta f$, the duration of a random access preamble sequence is $T_{SEQ}$, the maximum delay spread for an uplink asynchronous user is $\tau_{DS}$, the number of additional guard samples due to the receiver pulse shaping filter is $n_g$, the cell coverage radius demand is r, and the preamble sequence cyclic shift is $N_{cs}$.

In the assumption that the values of the above parameters are $N_{zc}=839$, $\Delta f=5$ kHz, $T_{SEQ}=200$ μs, $\tau_{DS}=1.3$ μs and $n_g=2$, a preferred method for configuring a preamble sequence cyclic shift set specifically comprises the following steps.

The maximum number of allowable preamble sequence cyclic shifts $N_{cs}$ is determined as 16.

The following values of the cell radius are selected in advance, and the value range of the preamble sequence cyclic shift $N_{cs}$ at each value of the cell radius is calculated:

(1) if r=0.66 km, $N_{cs} \geq 26$ can be obtained by the method for configuring a preamble sequence cyclic shift set of the present disclosure;

(2) if r=0.73 km, $N_{cs} \geq 28$ can be obtained by the method for configuring a preamble sequence cyclic shift set of the present disclosure;

(3) if r=0.84 km, $N_{cs} \geq 31$ can be obtained by the method for configuring a preamble sequence cyclic shift set of the present disclosure;

(4) if r=0.95 km, $N_{cs} \geq 34$ can be obtained by the method for configuring a preamble sequence cyclic shift set of the present disclosure;

(5) if r=1.09 km, $N_{cs} \geq 38$ can be obtained by the method for configuring a preamble sequence cyclic shift set of the present disclosure;

(6) if r=1.31 km, $N_{cs} \geq 44$ can be obtained by the method for configuring a preamble sequence cyclic shift set of the present disclosure;

(7) if r=1.56 km, $N_{cs} \geq 51$ can be obtained by the method for configuring a preamble sequence cyclic shift set of the present disclosure;

(8) if r=1.81 km, $N_{cs} \geq 58$ can be obtained by the method for configuring a preamble sequence cyclic shift set of the present disclosure;

(9) if r=2.13 km, $N_{cs} \geq 67$ can be obtained by the method for configuring a preamble sequence cyclic shift set of the present disclosure;

(10) if r=2.45 km, $N_{cs} \geq 76$ can be obtained by the method for configuring a preamble sequence cyclic shift set of the present disclosure;

(11) if r=3.06 km, $N_{cs} \geq 93$ can be obtained by the method for configuring a preamble sequence cyclic shift set of the present disclosure;

(12) if r=3.99 km, $N_{cs} \geq 119$ can be obtained by the method for configuring a preamble sequence cyclic shift set of the present disclosure;

(13) if r=5.70 km, $N_{cs} \geq 167$ can be obtained by the method for configuring a preamble sequence cyclic shift set of the present disclosure;

(14) if r=9.71 km, $N_{cs} \geq 279$ can be obtained by the method for configuring a preamble sequence cyclic shift set of the present disclosure;

(15) if r=14.72 km, $N_{cs} \geq 419$ can be obtained by the method for configuring a preamble sequence cyclic shift set of the present disclosure; and

(16) if r=29.73 km, $N_{cs} \geq 839$ can be obtained by the method for configuring a preamble sequence cyclic shift set of the present disclosure, that is, $N_{cs}=0$.

The minimum values of the preamble sequence cyclic shift $N_{cs}$ are selected from the 16 value ranges of the preamble sequence cyclic shift $N_{cs}$ to form a preamble sequence cyclic shift set {0, 26, 28, 31, 34, 38, 44, 51, 58, 67, 76, 93, 119, 167, 279, 419}. In an order from the smallest to largest values of the preamble sequence cyclic shift $N_{cs}$, indexes 0 to 15 are allocated for each preamble sequence cyclic shift $N_{cs}$, respectively. The eventually generated preamble sequence cyclic shift set is shown in the following table 16.

TABLE 16

Preamble sequence cyclic shift set

| $N_{CS}$ configuration | $N_{CS}$ value |
|---|---|
| 0 | 0 |
| 1 | 26 |
| 2 | 28 |
| 3 | 31 |
| 4 | 34 |
| 5 | 38 |
| 6 | 44 |
| 7 | 51 |
| 8 | 58 |
| 9 | 67 |
| 10 | 76 |
| 11 | 93 |
| 12 | 119 |

TABLE 16-continued

| $N_{CS}$ configuration | $N_{CS}$ value |
|---|---|
| 13 | 167 |
| 14 | 279 |
| 15 | 419 |

Preamble sequence cyclic shift set

Specific Embodiment 16

A cyclic shift sequence of a ZC sequence having a length of $N_{zc}$ is used as a preamble sequence, the sub-carrier spacing of the random access channel is $\Delta f$, the duration of a random access preamble sequence is $T_{SEQ}$, the maximum delay spread for an uplink asynchronous user is $\tau_{DS}$, the number of additional guard samples due to the receiver pulse shaping filter is $n_g$, the cell coverage radius demand is r, and the preamble sequence cyclic shift is $N_{cs}$.

In the assumption that the values of the above parameters are $N_{zc}$=135 $\Delta f$=7.5 kHz, $T_{SEQ}$=13.33.33 μs, $\tau_{DS}$=0.87 μs and $n_g$=0, a preferred method for configuring a preamble sequence cyclic shift set specifically comprises the following steps.

The maximum number of allowable preamble sequence cyclic shifts $N_{cs}$ is determined as 16.

The following values of the cell radius are selected in advance, and the value range of the preamble sequence cyclic shift $N_{cs}$ at each value of the cell radius is calculated:

(1) if r=0.16 km, $N_{cs}$≥2 can be obtained by the method for configuring a preamble sequence cyclic shift set of the present disclosure;

(2) if r=0.45 km, $N_{cs}$≥4 can be obtained by the method for configuring a preamble sequence cyclic shift set of the present disclosure;

(3) if r=0.73 km, $N_{cs}$≥6 can be obtained by the method for configuring a preamble sequence cyclic shift set of the present disclosure;

(4) if r=1.02 km, $N_{cs}$≥8 can be obtained by the method for configuring a preamble sequence cyclic shift set of the present disclosure;

(5) if r=1.31 km, $N_{cs}$≥10 can be obtained by the method for configuring a preamble sequence cyclic shift set of the present disclosure;

(6) if r=1.60 km, $N_{cs}$≥12 can be obtained by the method for configuring a preamble sequence cyclic shift set of the present disclosure;

(7) if r=2.03 km, $N_{cs}$≥15 can be obtained by the method for configuring a preamble sequence cyclic shift set of the present disclosure;

(8) if r=2.46 km, $N_{cs}$≥18 can be obtained by the method for configuring a preamble sequence cyclic shift set of the present disclosure;

(9) if r=3.03 km, $N_{cs}$≥22 can be obtained by the method for configuring a preamble sequence cyclic shift set of the present disclosure;

(10) if r=3.61 km, $N_{cs}$≥26 can be obtained by the method for configuring a preamble sequence cyclic shift set of the present disclosure;

(11) if r=4.33 km, $N_{cs}$≥31 can be obtained by the method for configuring a preamble sequence cyclic shift set of the present disclosure; and

(12) if r=5.05 km, $N_{cs}$≥36 can be obtained by the method for configuring a preamble sequence cyclic shift set of the present disclosure.

The minimum values of the preamble sequence cyclic shift $N_{cs}$ are selected from the 12 value ranges of the preamble sequence cyclic shift $N_{cs}$ to form a preamble sequence cyclic shift set {2, 4, 6, 8, 10, 12, 15, 18, 22, 26, 31, 36}. In an order from the smallest to largest values of the preamble sequence cyclic shift $N_{cs}$, indexes 0 to 12 are allocated for each preamble sequence cyclic shift $N_{cs}$, respectively. The eventually generated preamble sequence cyclic shift set is shown in the following table 17.

TABLE 17

| $N_{CS}$ configuration | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | 18 |
| 8 | 22 |
| 9 | 26 |
| 10 | 31 |
| 11 | 36 |
| 12 | — |
| 13 | — |
| 14 | — |
| 15 | — |

Preamble sequence cyclic shift set

Embodiments 2 to 4 will be specifically described below with regard to a degree of frequency offset that is 1 time of the sub-carrier spacing of the random access channel, a degree of frequency offset that is 2 times of the sub-carrier spacing of the random access channel and a degree of frequency offset that is 3 times of the sub-carrier spacing of the random access channel, respectively.

The degrees of frequency offset comprise a degree of frequency offset that is 1 time of the sub-carrier spacing of the random access channel, a degree of frequency offset that is 2 times of the sub-carrier spacing of the random access channel and a degree of frequency offset that is 3 times of the sub-carrier spacing of the random access channel, and the value range of the preamble sequence cyclic shift $N_{cs}$ is not greater than an absolute value of a difference between cyclic shifts generated by the ZC sequence in time domain at any two degrees of frequency offset.

Embodiment 15

When the maximum degree of frequency offset is 1 time of the sub-carrier spacing of the random access channel, during the random access process, a cyclic shift sequence of a ZC sequence having a length of $N_{zc}$ is used as a preamble sequence, and the uth (where $1 \leq u \leq N_{zc}-1$) root sequence is:

$$x_u(n) = e^{-j\frac{\pi u n(n+1)}{N_{ZC}}}, 0 \leq n \leq N_{ZC} - 1$$

where u is the index of the ZC sequence.

With regard to the uth ZC root sequence, when the degree of frequency offset is +1 time of the sub-carrier spacing of the random access channel, a cyclic shift having a size of $d_{u1}^+ = (1/u) \bmod N_{zc}$ is generated by the ZC sequence in time domain; and when the degree of frequency offset is −1 time of the sub-carrier spacing of the random access channel, a cyclic shift having a size of $d_{u1}^- = (-1/u) \bmod N_{zc}$ is generated by the ZC sequence in time domain.

During the detection of the preamble sequence, due to the distortion of the cyclic shift, false alarm peaks will be generated in the Power Delay Profile (PDP), and wrong cyclic shift duplicate windows thus occur. As shown in FIG. 41, in an actual system, there will be positive frequency offset signals and negative frequency offset signals, so that there will be two wrong cyclic shift search windows. Wherein, $C_0$ denotes a correct original cyclic shift search window, $C_{-1}$ denotes a wrong duplicate search window caused by the negative frequency offset, and denotes a wrong duplicate search window caused by the positive frequency offset.

In this case, in order to avoid the mutual interference between sequences generated by a same root ZC sequence cyclic shift, the preamble sequence $N_{cs}$ needs to satisfy the following conditions: wrong search windows $C_{-1}$ and $C_{+1}$ of any cyclic shift ZC sequence are not overlapped with each other, not overlapped with the windows $C_{-1}$, $C_0$ and $C_{+1}$ of other cyclic shift ZC sequences, and not overlapped with the correct cyclic shift search window $C_0$ of this cyclic shift ZC sequence. This is defined as follows:

$$d_u = \begin{cases} d_{u1}^+ & 0 \leq d_{u1}^+ < N_{ZC}/2 \\ N_{ZC} - d_{u1}^+ & \text{otherwise} \end{cases}$$

where $d_{u1}^+ = (1/u) \bmod N_{zc}$. The final preamble sequence cyclic shift $N_{cs}$ needs to satisfy the following condition:

$$N_{cs} \leq d_u \leq (N_{zc} - N_{cs})/2$$

It is to be noted that, for different cell coverage demands, the conditions to be further satisfied by the preamble sequence cyclic shift $N_{cs}$ are the same as the conditions described in Embodiment 14.

Based on the above conditions, the method for configuring a preamble sequence cyclic shift set specifically comprises the following steps:

step A (initial setting): the maximum number of allowable preamble sequence cyclic shifts $N_{cs}$ is determined as P;

step B: based on the length $N_{zc}$ of the ZC sequence, all indexes u ($1 \leq u \leq N_{zc}-1$) of the ZC sequence are selected;

step C: for different indexes u of the ZC sequence and the degree of frequency offset, the value ranges of preamble sequence cyclic shifts $N_{cs}$ corresponding to all the indexes u of the ZC sequence are calculated, respectively; and step D: based on the $N_{zc}-1$ value ranges of preamble sequence cyclic shifts $N_{cs}$ obtained in the step C, the indexes u of the ZC sequence are classified into Q groups (Q≤P), the value ranges of preamble sequence cyclic shifts $N_{cs}$ corresponding to the groups are approximate to each other, and the intersection of the value ranges is not a null set. Based on different cell coverage demands, a preamble sequence cyclic shift $N_{cs}$ is selected from each common value range of preamble sequence cyclic shifts $N_{cs}$ to generate a final preamble sequence cyclic shift set containing Q elements, and each preamble sequence cyclic shift $N_{cs}$ is allocated with a unique index. The index No. is from 0 to Q−1.

During the selection of a preamble sequence cyclic shift $N_{cs}$ from each common value range of preamble sequence cyclic shifts $N_{cs}$, the selected preamble sequence cyclic shift $N_{cs}$ can be a preamble sequence cyclic shift $N_{cs}$ having a minimum value. Of course, the selection of the preamble sequence cyclic shift $N_{cs}$ is not limited thereto.

In this embodiment, when the preset generation conditions are the ZC sequence and the degree of frequency offset, in the step 601 of FIG. 38, all values of preamble sequence cyclic shifts $N_{cs}$ are determined according to the ZC sequence and the degree of frequency offset, specifically:

Calculating all values of preamble sequence cyclic shifts $N_{cs}$ corresponding to the uth ZC sequence, according to the ZC sequence and the degree of frequency offset, and classifying the u calculated values of preamble sequence cyclic shifts $N_{cs}$ into Q groups according to a preset value range of the preamble sequence cyclic shifts $N_{cs}$.

Step 602: A preset number of preamble sequence cyclic shifts $N_{cs}$ are selected from all values of preamble sequence cyclic shifts $N_{cs}$ to generate a preamble sequence cyclic shift set, which specifically comprises:

A preset number of preamble sequence cyclic shifts $N_{cs}$ are selected from all values of preamble sequence cyclic shifts $N_{cs}$ in each of the Q groups to generate a preamble sequence cyclic shift set.

The maximum number of preamble sequence cyclic shifts $N_{cs}$ in the preamble sequence cyclic shift set is P, where P≥1; and, the selection of a preset number of preamble sequence cyclic shifts $N_{cs}$ from preamble sequence cyclic shifts $N_{cs}$ in each of the Q groups comprises: selecting zero preamble sequence cyclic shift $N_{cs}$ or at least one preamble sequence cyclic shift $N_{cs}$.

In Embodiment 15, in the situation where the maximum degree of frequency offset is 1 time of the sub-carrier spacing of the random access channel, the following detailed description will be given by several specific implementations.

Specific Embodiment 17

A cyclic shift sequence of a ZC sequence having a length of $N_{zc}=135$ is used as a preamble sequence; and when the sub-carrier spacing of the random access channel is Δf=7.5 kHz, Δf=15 kHz, Δf=30 kHz, Δf=60 kHz or Δf=120 kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence cyclic shift $N_{cs}$ is S(u). With regard to the root sequence index u (1≤u≤138) of the ZC sequence, the maximum value S(u) of each preamble sequence cyclic shift $N_{cs}$ is calculated, and the calculation result is shown in Table 18.

TABLE 18

Maximum value S(u) of each preamble sequence cyclic shift $N_{cs}$

| U | 1 | 2 | 3 | 4 | 5 | 6 | 7 | 8 | 9 | 10 | 11 | 12 |
|---|---|---|---|---|---|---|---|---|---|----|----|----|
| S(u) | 1 | 1 | 46 | 35 | 28 | 23 | 20 | 35 | 31 | 14 | 38 | 23 |
| U | 13 | 14 | 15 | 16 | 17 | 18 | 19 | 20 | 21 | 22 | 23 | 24 |
| S(u) | 32 | 10 | 37 | 26 | 41 | 31 | 22 | 7 | 33 | 19 | 6 | 29 |
| U | 25 | 26 | 27 | 28 | 29 | 30 | 31 | 32 | 33 | 34 | 35 | 36 |
| S(u) | 39 | 16 | 36 | 5 | 24 | 37 | 9 | 13 | 21 | 45 | 4 | 27 |
| U | 37 | 38 | 39 | 40 | 41 | 42 | 43 | 44 | 45 | 46 | 47 | 48 |
| S(u) | 15 | 11 | 25 | 7 | 17 | 43 | 42 | 19 | 34 | 3 | 3 | 29 |
| U | 49 | 50 | 51 | 52 | 53 | 54 | 55 | 56 | 57 | 58 | 59 | 60 |
| S(u) | 17 | 25 | 30 | 8 | 21 | 18 | 43 | 5 | 39 | 12 | 33 | 44 |
| U | 61 | 62 | 63 | 64 | 65 | 66 | 67 | 68 | 69 | 70 | 71 | 72 |
| S(u) | 41 | 9 | 11 | 13 | 15 | 40 | 27 | 45 | 2 | 2 | 45 | 27 |
| U | 73 | 74 | 75 | 76 | 77 | 78 | 79 | 80 | 81 | 82 | 83 | 84 |
| S(u) | 40 | 15 | 13 | 11 | 9 | 41 | 44 | 33 | 12 | 39 | 5 | 43 |
| U | 85 | 86 | 87 | 88 | 89 | 90 | 91 | 92 | 93 | 94 | 95 | 96 |

TABLE 18-continued

Maximum value S(u) of each preamble sequence cyclic shift $N_{cs}$

| S(u) | 18 | 21 | 8 | 30 | 25 | 17 | 29 | 3 | 3 | 34 | 19 | 42 |
|---|---|---|---|---|---|---|---|---|---|---|---|---|
| U | 97 | 98 | 99 | 100 | 101 | 102 | 103 | 104 | 105 | 106 | 107 | 108 |
| S(u) | 43 | 17 | 7 | 25 | 11 | 15 | 27 | 4 | 45 | 21 | 13 | 9 |
| U | 109 | 110 | 111 | 112 | 113 | 114 | 115 | 116 | 117 | 118 | 119 | 120 |
| S(u) | 37 | 24 | 5 | 36 | 16 | 39 | 29 | 6 | 19 | 33 | 7 | 22 |
| U | 121 | 122 | 123 | 124 | 125 | 126 | 127 | 128 | 129 | 130 | 131 | 132 |
| S(u) | 31 | 41 | 26 | 37 | 10 | 32 | 23 | 38 | 14 | 31 | 35 | 20 |
| U | 133 | 134 | 135 | 136 | 137 | 138 | | | | | | |
| S(u) | 23 | 28 | 35 | 46 | 1 | 1 | | | | | | |

According to the calculation result of the maximum value of each preamble sequence cyclic shift $N_{cs}$, the ZC root sequence indexes are classified into 12 groups. The specific grouping situation and the common value range of each group of preamble sequence cyclic shifts $N_{cs}$ are shown in Table 19.

TABLE 19

Grouping situation of maximum values of preamble sequence cyclic shifts $N_{CS}$

| Common value range of $N_{CS}$ | ZC root sequence index |
|---|---|
| =1 | 1, 138, 2, 137, 69, 70 |
| ≤3 | 46, 93, 47, 92, 35, 104 |
| ≤5 | 28, 111, 56, 83, 23, 116 |
| ≤7 | 20, 119, 40, 99, 52, 87 |
| ≤9 | 31, 108, 62, 77, 14, 125 |
| ≤11 | 38, 101, 63, 76, 58, 81 |
| ≤13 | 32, 107, 64, 75, 10, 129, 37, 102, 65, 74 |
| ≤16 | 26, 113, 41, 98, 49, 90, 54, 85, 22, 117, 44, 95 |
| ≤20 | 7, 132, 33, 106, 53, 86, 19, 120, 6, 133, 12, 127 |
| ≤24 | 29, 110, 39, 100, 50, 89, 16, 123, 36, 103, 67, 72, 5, 134, 24, 115, 48, 91 |
| ≤30 | 51, 88, 9, 130, 18, 121, 13, 126, 21, 118, 59, 80, 45, 94, 4, 135, 8, 131, 27, 112 |
| ≤37 | 15, 124, 30, 109, 11, 128, 25, 114, 57, 82, 66, 73, 17, 122, 61, 78, 43, 96, 42, 97, 55, 84, 60, 79, 34, 105, 68, 71, 3, 136 |

Based on the result of grouping, the first group is discarded, and the maximum values of preamble sequence cyclic shifts $N_{cs}$ are selected from the value ranges of preamble sequence cyclic shifts $N_{cs}$ in the remaining 11 groups to form a preamble sequence cyclic shift set {3, 5, 7, 9, 11, 13, 16, 20, 24, 30, 37}. In the order from the smallest to largest values of the preamble sequence cyclic shifts $N_{cs}$, indexes 0 to 10 are allocated for the preamble sequence cyclic shifts $N_{cs}$, respectively. The eventually generated preamble sequence cyclic shift set is shown in Table 20.

TABLE 20

Preamble sequence cyclic shift set

| $N_{CS}$ configuration | $N_{CS}$ value |
|---|---|
| 0 | 3 |
| 1 | 5 |
| 2 | 7 |
| 3 | 9 |
| 4 | 11 |
| 5 | 13 |
| 6 | 16 |
| 7 | 20 |
| 8 | 24 |
| 9 | 30 |
| 10 | 37 |
| 11 | — |
| 12 | — |
| 13 | — |
| 14 | — |
| 15 | — |

Specific Embodiment 18

Based on the specific embodiments 3 and 4, in this specific embodiment, a cyclic shift sequence of a ZC sequence having a length of $N_{zc}=139$ is used as a preamble sequence; and when the sub-carrier spacing of the random access channel is $\Delta f=7.5$ kHz, $\Delta f=15$ kHz, $\Delta f=30$ kHz, $\Delta f=60$ kHz or $\Delta f=120$ kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset and a preamble sequence cyclic shift set when the maximum frequency offset is 1 time of the sub-carrier spacing of the random access channel are generated, respectively. The eventually generated preamble sequence cyclic shift sets are shown in Table 21. In Table 21, the set 0 represents a preamble sequence cyclic shift set when there is no or negligible frequency offset, and the set 1 represents a preamble sequence cyclic shift set when the maximum frequency offset is 1 time of the sub-carrier spacing of the random access channel.

TABLE 21

Preamble sequence cyclic shift sets

| $N_{CS}$ configuration | $N_{CS}$ value | |
|---|---|---|
| | Set 0 | Set 1 |
| 0 | 2 | 3 |
| 1 | 4 | 5 |
| 2 | 6 | 7 |
| 3 | 8 | 9 |
| 4 | 10 | 11 |
| 5 | 12 | 13 |
| 6 | 15 | 16 |
| 7 | 18 | 20 |
| 8 | 22 | 24 |
| 9 | 26 | 30 |
| 10 | 31 | 37 |
| 11 | 36 | — |
| 12 | — | — |
| 13 | — | — |
| 14 | — | — |
| 15 | — | — |

Specific Embodiment 19

A cyclic shift sequence of a ZC sequence having a length of $N_{zc}=839$ is used as a preamble sequence; and when the sub-carrier spacing of the random access channel is $\Delta f=1.25$ kHz, $\Delta f=2.5$ kHz or $\Delta f=5$ kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence cyclic shift $N_{cs}$ is S(u). With regard to the root sequence index u ($1 \leq u \leq 838$) of the ZC sequence, the maximum value $N_{cs}$ of each preamble sequence cyclic shift S(u) is calculated, and the calculation result is shown in Table 22.

TABLE 22

Maximum value S(u) of each preamble sequence cyclic shift $N_{cs}$

| U/S(u) | | | | | | | | | | |
|---|---|---|---|---|---|---|---|---|---|---|
| U    | 1   | 2   | 3   | 4   | 5   | 6   | 7   | 8   | 9   | 10  |
| S(u) | 1   | 1   | 279 | 210 | 168 | 140 | 120 | 105 | 93  | 84  |
| U    | 11  | 12  | 13  | 14  | 15  | 16  | 17  | 18  | 19  | 20  |
| S(u) | 229 | 70  | 129 | 60  | 56  | 105 | 148 | 233 | 265 | 42  |
| U    | 21  | 22  | 23  | 24  | 25  | 26  | 27  | 28  | 29  | 30  |
| S(u) | 40  | 267 | 73  | 35  | 235 | 129 | 31  | 30  | 29  | 28  |
| U    | 31  | 32  | 33  | 34  | 35  | 36  | 37  | 38  | 39  | 40  |
| S(u) | 27  | 236 | 178 | 74  | 24  | 233 | 68  | 265 | 43  | 21  |
| U    | 41  | 42  | 43  | 44  | 45  | 46  | 47  | 48  | 49  | 50  |
| S(u) | 266 | 20  | 39  | 267 | 261 | 73  | 125 | 35  | 137 | 151 |
| U    | 51  | 52  | 53  | 54  | 55  | 56  | 57  | 58  | 59  | 60  |
| S(u) | 181 | 242 | 95  | 202 | 61  | 15  | 103 | 217 | 128 | 14  |
| U    | 61  | 62  | 63  | 64  | 65  | 66  | 67  | 68  | 69  | 70  |
| S(u) | 55  | 203 | 253 | 118 | 142 | 89  | 263 | 37  | 231 | 12  |
| U    | 71  | 72  | 73  | 74  | 75  | 76  | 77  | 78  | 79  | 80  |
| S(u) | 130 | 268 | 23  | 34  | 179 | 276 | 207 | 43  | 223 | 21  |
| U    | 81  | 82  | 83  | 84  | 85  | 86  | 87  | 88  | 89  | 90  |
| S(u) | 145 | 133 | 91  | 10  | 227 | 39  | 135 | 143 | 66  | 261 |
| U    | 91  | 92  | 93  | 94  | 95  | 96  | 97  | 98  | 99  | 100 |
| S(u) | 83  | 228 | 9   | 241 | 53  | 201 | 173 | 137 | 161 | 151 |
| U    | 101 | 102 | 103 | 104 | 105 | 106 | 107 | 108 | 109 | 110 |
| S(u) | 108 | 255 | 57  | 121 | 8   | 95  | 149 | 101 | 254 | 61  |
| U    | 111 | 112 | 113 | 114 | 115 | 116 | 117 | 118 | 119 | 120 |
| S(u) | 257 | 15  | 245 | 184 | 197 | 217 | 251 | 64  | 141 | 7   |
| U    | 121 | 122 | 123 | 124 | 125 | 126 | 127 | 128 | 129 | 130 |
| S(u) | 104 | 55  | 191 | 203 | 47  | 273 | 218 | 59  | 13  | 71  |
| U    | 131 | 132 | 133 | 134 | 135 | 136 | 137 | 138 | 139 | 140 |
| S(u) | 269 | 89  | 82  | 144 | 87  | 37  | 49  | 152 | 169 | 6   |
| U    | 141 | 142 | 143 | 144 | 145 | 146 | 147 | 148 | 149 | 150 |
| S(u) | 119 | 65  | 88  | 134 | 81  | 23  | 234 | 17  | 107 | 179 |
| U    | 151 | 152 | 153 | 154 | 155 | 156 | 157 | 158 | 159 | 160 |
| S(u) | 50  | 138 | 170 | 158 | 249 | 199 | 171 | 154 | 248 | 215 |
| U    | 161 | 162 | 163 | 164 | 165 | 166 | 167 | 168 | 169 | 170 |
| S(u) | 99  | 145 | 175 | 133 | 239 | 187 | 211 | 5   | 139 | 153 |
| U    | 171 | 172 | 173 | 174 | 175 | 176 | 177 | 178 | 179 | 180 |
| S(u) | 157 | 200 | 97  | 135 | 163 | 143 | 237 | 33  | 75  | 275 |
| U    | 181 | 182 | 183 | 184 | 185 | 186 | 187 | 188 | 189 | 190 |
| S(u) | 51  | 189 | 243 | 114 | 195 | 212 | 166 | 241 | 182 | 53  |
| U    | 191 | 192 | 193 | 194 | 195 | 196 | 197 | 198 | 199 | 200 |
| S(u) | 123 | 201 | 213 | 173 | 185 | 244 | 115 | 250 | 156 | 172 |
| U    | 201 | 202 | 203 | 204 | 205 | 206 | 207 | 208 | 209 | 210 |
| S(u) | 96  | 54  | 62  | 255 | 221 | 224 | 77  | 121 | 277 | 4   |
| U    | 211 | 212 | 213 | 214 | 215 | 216 | 217 | 218 | 219 | 220 |
| S(u) | 167 | 186 | 193 | 247 | 160 | 101 | 58  | 127 | 272 | 225 |
| U    | 221 | 222 | 223 | 224 | 225 | 226 | 227 | 228 | 229 | 230 |
| S(u) | 205 | 257 | 79  | 206 | 220 | 271 | 85  | 92  | 11  | 259 |
| U    | 231 | 232 | 233 | 234 | 235 | 236 | 237 | 238 | 239 | 240 |
| S(u) | 69  | 264 | 18  | 147 | 25  | 32  | 177 | 141 | 165 | 7   |
| U    | 241 | 242 | 243 | 244 | 245 | 246 | 247 | 248 | 249 | 250 |
| S(u) | 94  | 52  | 183 | 196 | 113 | 191 | 214 | 159 | 155 | 198 |
| U    | 251 | 252 | 253 | 254 | 255 | 256 | 257 | 258 | 259 | 260 |
| S(u) | 117 | 273 | 63  | 109 | 102 | 59  | 111 | 13  | 230 | 71  |
| U    | 261 | 262 | 263 | 264 | 265 | 266 | 267 | 268 | 269 | 270 |
| S(u) | 45  | 269 | 67  | 232 | 19  | 41  | 22  | 72  | 131 | 87  |
| U    | 271 | 272 | 273 | 274 | 275 | 276 | 277 | 278 | 279 | 280 |
| S(u) | 226 | 219 | 126 | 49  | 180 | 76  | 209 | 169 | 3   | 3   |
| U    | 281 | 282 | 283 | 284 | 285 | 286 | 287 | 288 | 289 | 290 |
| S(u) | 209 | 119 | 252 | 65  | 262 | 44  | 38  | 67  | 90  | 81  |
| U    | 291 | 292 | 293 | 294 | 295 | 296 | 297 | 298 | 299 | 300 |
| S(u) | 222 | 204 | 63  | 117 | 219 | 17  | 113 | 183 | 188 | 165 |
| U    | 301 | 302 | 303 | 304 | 305 | 306 | 307 | 308 | 309 | 310 |
| S(u) | 131 | 25  | 36  | 69  | 11  | 85  | 41  | 79  | 19  | 249 |
| U    | 311 | 312 | 313 | 314 | 315 | 316 | 317 | 318 | 319 | 320 |
| S(u) | 116 | 199 | 193 | 171 | 277 | 77  | 45  | 124 | 192 | 215 |
| U    | 321 | 322 | 323 | 324 | 325 | 326 | 327 | 328 | 329 | 330 |
| S(u) | 115 | 185 | 213 | 246 | 111 | 175 | 195 | 243 | 51  | 150 |
| U    | 331 | 332 | 333 | 334 | 335 | 336 | 337 | 338 | 339 | 340 |
| S(u) | 109 | 187 | 194 | 211 | 278 | 5   | 239 | 139 | 99  | 153 |
| U    | 341 | 342 | 343 | 344 | 345 | 346 | 347 | 348 | 349 | 350 |
| S(u) | 155 | 157 | 159 | 100 | 107 | 97  | 162 | 176 | 238 | 163 |
| U    | 351 | 352 | 353 | 354 | 355 | 356 | 357 | 358 | 359 | 360 |
| S(u) | 98  | 174 | 164 | 237 | 26  | 33  | 47  | 75  | 208 | 275 |
| U    | 361 | 362 | 363 | 364 | 365 | 366 | 367 | 368 | 369 | 370 |
| S(u) | 251 | 197 | 245 | 189 | 177 | 149 | 16  | 57  | 216 | 161 |
| U    | 371 | 372 | 373 | 374 | 375 | 376 | 377 | 378 | 379 | 380 |
| S(u) | 147 | 106 | 9   | 83  | 132 | 270 | 227 | 91  | 259 | 223 |
| U    | 381 | 382 | 383 | 384 | 385 | 386 | 387 | 388 | 389 | 390 |
| S(u) | 207 | 123 | 46  | 260 | 231 | 263 | 271 | 253 | 110 | 256 |
| U    | 391 | 392 | 393 | 394 | 395 | 396 | 397 | 398 | 399 | 400 |
| S(u) | 103 | 122 | 190 | 181 | 274 | 125 | 205 | 78  | 225 | 86  |
| U    | 401 | 402 | 403 | 404 | 405 | 406 | 407 | 408 | 409 | 410 |
| S(u) | 136 | 48  | 127 | 27  | 29  | 31  | 235 | 146 | 80  | 221 |
| U    | 411 | 412 | 413 | 414 | 415 | 416 | 417 | 418 | 419 | 420 |
| S(u) | 247 | 112 | 258 | 229 | 93  | 240 | 167 | 279 | 2   | 2   |
| U    | 421 | 422 | 423 | 424 | 425 | 426 | 427 | 428 | 429 | 430 |
| S(u) | 279 | 167 | 240 | 93  | 229 | 258 | 112 | 247 | 221 | 80  |
| U    | 431 | 432 | 433 | 434 | 435 | 436 | 437 | 438 | 439 | 440 |
| S(u) | 146 | 235 | 31  | 29  | 27  | 127 | 48  | 136 | 86  | 225 |
| U    | 441 | 442 | 443 | 444 | 445 | 446 | 447 | 448 | 449 | 450 |
| S(u) | 78  | 205 | 125 | 274 | 181 | 190 | 122 | 103 | 256 | 110 |
| U    | 451 | 452 | 453 | 454 | 455 | 456 | 457 | 458 | 459 | 460 |
| S(u) | 253 | 271 | 263 | 231 | 260 | 46  | 123 | 207 | 223 | 259 |
| U    | 461 | 462 | 463 | 464 | 465 | 466 | 467 | 468 | 469 | 470 |
| S(u) | 91  | 227 | 270 | 132 | 83  | 9   | 106 | 147 | 161 | 216 |
| U    | 471 | 472 | 473 | 474 | 475 | 476 | 477 | 478 | 479 | 480 |
| S(u) | 57  | 16  | 149 | 177 | 189 | 245 | 197 | 251 | 275 | 208 |
| U    | 481 | 482 | 483 | 484 | 485 | 486 | 487 | 488 | 489 | 490 |
| S(u) | 75  | 47  | 33  | 26  | 237 | 164 | 174 | 98  | 163 | 238 |
| U    | 491 | 492 | 493 | 494 | 495 | 496 | 497 | 498 | 499 | 500 |
| S(u) | 176 | 162 | 97  | 107 | 100 | 159 | 157 | 155 | 153 | 99  |
| U    | 501 | 502 | 503 | 504 | 505 | 506 | 507 | 508 | 509 | 510 |
| S(u) | 139 | 239 | 5   | 278 | 211 | 194 | 187 | 109 | 150 | 51  |
| U    | 511 | 512 | 513 | 514 | 515 | 516 | 517 | 518 | 519 | 520 |
| S(u) | 243 | 195 | 175 | 111 | 246 | 213 | 185 | 115 | 215 | 192 |
| U    | 521 | 522 | 523 | 524 | 525 | 526 | 527 | 528 | 529 | 530 |
| S(u) | 124 | 45  | 77  | 277 | 171 | 193 | 199 | 116 | 249 | 19  |
| U    | 531 | 532 | 533 | 534 | 535 | 536 | 537 | 538 | 539 | 540 |
| S(u) | 79  | 41  | 85  | 11  | 69  | 36  | 25  | 131 | 165 | 188 |
| U    | 541 | 542 | 543 | 544 | 545 | 546 | 547 | 548 | 549 | 550 |
| S(u) | 183 | 113 | 17  | 219 | 117 | 63  | 204 | 222 | 81  | 90  |
| U    | 551 | 552 | 553 | 554 | 555 | 556 | 557 | 558 | 559 | 560 |
| S(u) | 67  | 38  | 44  | 262 | 65  | 252 | 119 | 209 | 3   | 3   |
| U    | 561 | 562 | 563 | 564 | 565 | 566 | 567 | 568 | 569 | 570 |
| S(u) | 169 | 209 | 76  | 180 | 49  | 126 | 219 | 226 | 87  | 131 |
| U    | 571 | 572 | 573 | 574 | 575 | 576 | 577 | 578 | 579 | 580 |
| S(u) | 72  | 22  | 41  | 19  | 232 | 67  | 269 | 45  | 71  | 230 |
| U    | 581 | 582 | 583 | 584 | 585 | 586 | 587 | 588 | 589 | 590 |
| S(u) | 13  | 111 | 59  | 102 | 109 | 63  | 273 | 117 | 198 | 155 |
| U    | 591 | 592 | 593 | 594 | 595 | 596 | 597 | 598 | 599 | 600 |
| S(u) | 159 | 214 | 191 | 113 | 196 | 183 | 52  | 94  | 7   | 165 |
| U    | 601 | 602 | 603 | 604 | 605 | 606 | 607 | 608 | 609 | 610 |
| S(u) | 141 | 177 | 32  | 25  | 147 | 18  | 264 | 69  | 259 | 11  |
| U    | 611 | 612 | 613 | 614 | 615 | 616 | 617 | 618 | 619 | 620 |
| S(u) | 92  | 85  | 271 | 220 | 206 | 79  | 257 | 205 | 225 | 272 |
| U    | 621 | 622 | 623 | 624 | 625 | 626 | 627 | 628 | 629 | 630 |
| S(u) | 127 | 58  | 101 | 160 | 247 | 193 | 186 | 167 | 4   | 277 |
| U    | 631 | 632 | 633 | 634 | 635 | 636 | 637 | 638 | 639 | 640 |
| S(u) | 121 | 77  | 224 | 221 | 255 | 62  | 54  | 96  | 172 | 156 |
| U    | 641 | 642 | 643 | 644 | 645 | 646 | 647 | 648 | 649 | 650 |
| S(u) | 250 | 115 | 244 | 185 | 173 | 213 | 201 | 123 | 53  | 182 |
| U    | 651 | 652 | 653 | 654 | 655 | 656 | 657 | 658 | 659 | 660 |

TABLE 22-continued

Maximum value S(u) of each preamble sequence cyclic shift $N_{cs}$

| | | | | | | | | | | |
|---|---|---|---|---|---|---|---|---|---|---|
| S(u) | 241 | 166 | 212 | 195 | 114 | 243 | 189 | 51 | 275 | 75 |
| U | 661 | 662 | 663 | 664 | 665 | 666 | 667 | 668 | 669 | 670 |
| S(u) | 33 | 237 | 143 | 163 | 135 | 97 | 200 | 157 | 153 | 139 |
| U | 671 | 672 | 673 | 674 | 675 | 676 | 677 | 678 | 679 | 680 |
| S(u) | 5 | 211 | 187 | 239 | 133 | 175 | 145 | 99 | 215 | 248 |
| U | 681 | 682 | 683 | 684 | 685 | 686 | 687 | 688 | 689 | 690 |
| S(u) | 154 | 171 | 199 | 249 | 158 | 170 | 138 | 50 | 179 | 107 |
| U | 691 | 692 | 693 | 694 | 695 | 696 | 697 | 698 | 699 | 700 |
| S(u) | 17 | 234 | 23 | 81 | 134 | 88 | 65 | 119 | 6 | 169 |
| U | 701 | 702 | 703 | 704 | 705 | 706 | 707 | 708 | 709 | 710 |
| S(u) | 152 | 49 | 37 | 87 | 144 | 82 | 89 | 269 | 71 | 13 |
| U | 711 | 712 | 713 | 714 | 715 | 716 | 717 | 718 | 719 | 720 |
| S(u) | 59 | 218 | 273 | 47 | 203 | 191 | 55 | 104 | 7 | 141 |
| U | 721 | 722 | 723 | 724 | 725 | 726 | 727 | 728 | 729 | 730 |
| S(u) | 64 | 251 | 217 | 197 | 184 | 245 | 15 | 257 | 61 | 254 |
| U | 731 | 732 | 733 | 734 | 735 | 736 | 737 | 738 | 739 | 740 |
| S(u) | 101 | 149 | 95 | 8 | 121 | 57 | 255 | 108 | 151 | 161 |
| U | 741 | 742 | 743, | 744 | 745 | 746 | 747 | 748 | 749 | 750 |
| S(u) | 137 | 173 | 201 | 53 | 241 | 9 | 228 | 83 | 261 | 66 |
| U | 751 | 752 | 753 | 754 | 755 | 756 | 757 | 758 | 759 | 760 |
| S(u) | 143 | 135 | 39 | 227 | 10 | 91 | 133 | 145 | 21 | 223 |
| U | 761 | 762 | 763 | 764 | 765 | 766 | 767 | 768 | 769 | 770 |
| S(u) | 43 | 207 | 276 | 179 | 34 | 23 | 268 | 130 | 12 | 231 |
| U | 771 | 772 | 773 | 774 | 775 | 776 | 777 | 778 | 779 | 780 |
| S(u) | 37 | 263 | 89 | 142 | 118 | 253 | 203 | 55 | 14 | 128 |
| U | 781 | 782 | 783 | 784 | 785 | 786 | 787 | 788 | 789 | 790 |
| S(u) | 217 | 103 | 15 | 61 | 202 | 95 | 242 | 181 | 151 | 137 |
| U | 791 | 792 | 793 | 794 | 795 | 796 | 797 | 798 | 799 | 800 |
| S(u) | 35 | 125 | 73 | 261 | 267 | 39 | 20 | 266 | 21 | 43 |
| U | 801 | 802 | 803 | 804 | 805 | 806 | 807 | 808 | 809 | 810 |
| S(u) | 265 | 68 | 233 | 24 | 74 | 178 | 236 | 27 | 28 | 29 |
| U | 811 | 812 | 813 | 814 | 815 | 816 | 817 | 818 | 819 | 820 |
| S(u) | 30 | 31 | 129 | 235 | 35 | 73 | 267 | 40 | 42 | 265 |
| U | 821 | 822 | 823 | 824 | 825 | 826 | 827 | 828 | 829 | 830 |
| S(u) | 233 | 148 | 105 | 56 | 60 | 129 | 70 | 229 | 84 | 93 |
| U | 831 | 832 | 833 | 834 | 835 | 836 | 837 | 838 | | |
| S(u) | 105 | 120 | 140 | 168 | 210 | 279 | 1 | 1 | | |

According to the calculation result of the maximum value of each preamble sequence cyclic shift $N_{cs}$, the ZC root sequence indexes are classified into 14 groups. The specific grouping situation and the common value range of each group of preamble sequence cyclic shifts $N_{cs}$ are shown in Table 23.

TABLE 23

Grouping situation of maximum values of preamble sequence cyclic shifts $N_{CS}$

| Common value range of $N_{CS}$ | ZC root sequence index |
|---|---|
| =1 | 1 2 837 838 419 420 279 280 559 560 210 629 168 336 503 671 140 699 120 240 599 719 105 734 93 373 466 746 84 755 229 305 534 610 70 769 129 258 581 710 60 779 56 112 727 783 367 472 148 296 543 691 233 606 |
| ≤19 | 265 309 530 574 42 797 40 80 759 799 |
| ≤22 | 267 572 73 146 693 766 35 804 235 302 537 604 |
| ≤26 | 355 484 31 404 435 808 30 809 29 405 434 810 28 811 |
| ≤31 | 27 406 433 812 236 603 178 356 483 661 74 765 24 48 791 815 |
| ≤36 | 303 536 68 136 703 771 287 552 43 86 753 796 21 818 |
| ≤41 | 266 307 532 573 20 819 39 78 761 800 286 553 261 317 522 578 |
| ≤46 | 383 456 125 357 482 714 402 437 137 274 565 702 151 688 181 329 510 658 242 597 95 190 649 744 202 637 |
| ≤55 | 61 122 717 778 15 824 103 368 471 736 217 622 128 256 583 711 14 825 55 110 729 784 203 636 253 293 546 586 118 721 142 284 555 697 89 750 263 288 551 576 |
| ≤68 | 37 802 231 304 535 608 12 827 130 260 579 709 268 571 23 46 793 816 34 805 179 358 481 660 276 563 207 316 523 632 398 441 223 308 531 616 409 430 145 290 549 694 |
| ≤82 | 133 706 91 374 465 748 10 829 227 306 533 612 400 439 135 270 569 704 143 696 66 132 707 773 289 550 83 378 461 756 228 611 9 415 424 830 241 598 53 106 733 786 201 638 173 346 493 666 351 488 161 339 500 678 |
| ≤100 | 344 495 108 216 623 731 255 584 57 391 448 782 121 718 8 16 823 831 372 467 149 345 494 690 101 738 254 331 508 585 389 450 257 325 514 582 412 427 245 297 542 594 184 655 197 321 518 642 311 528 251 294 545 588 64 775 141 282 557 698 7 832 104 208 631 735 392 447 191 382 457 648 318 521 47 396 443 792 273 566 218 403 436 621 |
| ≤128 | 59 780 13 26 813 826 71 768 269 301 538 570 375 464 82 164 675 757 144 695 87 174 665 752 401 438 49 98 741 790 152 687 169 338 501 670 6 833 119 238 601 720 65 774 88 176 663 751 134 705 81 162 677 758 408 431 234 371 468 605 17 822 107 366 473 732 330 509 50 100 739 789 138 701 170 340 499 669 158 681 249 341 498 590 199 640 171 342 497 668 |
| ≤158 | 154 685 248 343 496 591 215 624 99 370 469 740 347 492 175 350 489 664 353 486 239 300 539 600 187 652 211 417 422 628 5 834 139 278 561 700 153 686 157 314 525 682 200 639 97 194 645 742 352 487 163 326 513 676 348 491 237 365 474 602 33 806 75 150 689 764 275 564 51 394 445 788 189 650 243 298 541 596 114 725 195 322 517 644 212 627 166 332 507 673 299 540 182 364 475 657 393 446 123 246 593 716 319 520 213 |

TABLE 23-continued

Grouping situation of maximum values of preamble sequence cyclic shifts $N_{CS}$

| Common value range of $N_{CS}$ | ZC root sequence index |
|---|---|
| ≤202 | 313 526 626 333 506 185 327 512 654 244 595 115 362 477 724 250 589 156 312 527 683 172 667 96 192 647 743 54 785 62 124 715 777 292 547 221 397 442 618 224 615 77 381 458 762 359 480 277 281 558 562 4 835 167 334 505 672 186 653 193 323 516 646 247 592 160 320 519 679 369 470 58 116 723 781 127 712 272 295 544 567 225 614 205 410 429 634 291 548 79 380 459 760 206 633 220 399 440 619 271 568 85 377 462 754 92 747 11 414 425 828 259 580 69 385 454 770 264 575 18 36 803 821 147 692 25 407 432 814 32 807 |
| ≤237 | 177 354 485 662 349 490 165 337 502 674 416 423 94 188 651 745 52 787 183 328 511 656 196 643 113 363 476 726 324 515 214 411 428 625 159 680 155 310 529 684 198 641 117 361 478 722 283 556 63 388 451 776 109 730 102 204 635 737 390 449 111 222 617 728 413 426 230 379 460 609 384 455 45 90 749 794 285 554 67 386 453 772 232 607 19 38 801 820 41 798 22 44 795 817 72 767 131 262 577 708 376 463 226 387 452 613 219 620 126 252 587 713 395 444 180 360 479 659 76 763 209 315 524 630 335 504 3 418 421 836 |

Based on the result of grouping, the first group is discarded, and the maximum values of preamble sequence cyclic shifts $N_{cs}$ are selected from the value ranges of preamble sequence cyclic shifts $N_{cs}$ in the remaining 15 groups to form a preamble sequence cyclic shift set {19, 22, 26, 31, 36, 41, 46, 55, 68, 82, 100, 128, 158, 202, 237}. In the order from the smallest to largest values of the preamble sequence cyclic shifts $N_{cs}$, indexes 0 to 15 are allocated for the preamble sequence cyclic shifts $N_{cs}$, respectively. The eventually generated preamble sequence cyclic shift set is shown in Table 24.

TABLE 24

Preamble sequence cyclic shift set

| $N_{CS}$ configuration | $N_{CS}$ value |
|---|---|
| 0 | 19 |
| 1 | 22 |
| 2 | 26 |
| 3 | 31 |
| 4 | 36 |
| 5 | 41 |
| 6 | 46 |
| 7 | 55 |
| 8 | 68 |
| 9 | 82 |
| 10 | 100 |
| 11 | 128 |
| 12 | 158 |
| 13 | 202 |
| 14 | 237 |
| 15 | — |

Specific Embodiment 20

Based on the specific embodiments 1 and 6, a cyclic shift sequence of a ZC sequence having a length of $N_{zc}=839$ is used as a preamble sequence; and when the sub-carrier spacing of the random access channel is $\Delta f=1.25$ kHz, $\Delta f=2.5$ kHz, $\Delta f=5$ kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset and a preamble sequence cyclic shift set when the maximum frequency offset is 1 time of the sub-carrier spacing of the random access channel are generated, respectively. The eventually generated preamble sequence cyclic shift sets are shown in Table 25. In Table 25, the set 0 represents a preamble sequence cyclic shift set when there is no or negligible frequency offset, and the set 1 represents a preamble sequence cyclic shift set when the maximum frequency offset is 1 time of the sub-carrier spacing of the random access channel.

TABLE 25

Preamble sequence cyclic shift sets

| | $N_{CS}$ value | |
| $N_{CS}$ configuration | Set 0 | Set 1 |
|---|---|---|
| 0 | 0 | 19 |
| 1 | 17 | 22 |
| 2 | 19 | 26 |
| 3 | 22 | 31 |
| 4 | 26 | 36 |
| 5 | 31 | 41 |
| 6 | 36 | 46 |
| 7 | 41 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

Specific Embodiment 21

A cyclic shift sequence of a ZC sequence having a length of $N_{zc}=839$ is used as a preamble sequence; and when the sub-carrier spacing of the random access channel is $\Delta f=1.25$ kHz, $\Delta f=2.5$ kHz or $\Delta f=5$ kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence cyclic shift $N_{cs}$ is S(u). With regard to the root sequence index u (1≤u≤838) of the ZC sequence, the maximum value $N_{cs}$ of each preamble sequence cyclic shift S(u) is calculated, and the calculation result is shown in Table 26.

TABLE 26

Maximum value S(u) of each preamble sequence cyclic shift $N_{cs}$

| U | 1 | 2 | 3 | 4 | 5 | 6 | 7 | 8 | 9 | 10 |
|---|---|---|---|---|---|---|---|---|---|---|
| S(u) | 1 | 1 | 279 | 210 | 168 | 140 | 120 | 105 | 93 | 84 |
| U | 11 | 12 | 13 | 14 | 15 | 16 | 17 | 18 | 19 | 20 |
| S(u) | 229 | 70 | 129 | 60 | 56 | 105 | 148 | 233 | 265 | 42 |
| U | 21 | 22 | 23 | 24 | 25 | 26 | 27 | 28 | 29 | 30 |
| S(u) | 40 | 267 | 73 | 35 | 235 | 129 | 31 | 30 | 29 | 28 |
| U | 31 | 32 | 33 | 34 | 35 | 36 | 37 | 38 | 39 | 40 |
| S(u) | 27 | 236 | 178 | 74 | 24 | 233 | 68 | 265 | 43 | 21 |
| U | 41 | 42 | 43 | 44 | 45 | 46 | 47 | 48 | 49 | 50 |
| S(u) | 266 | 20 | 39 | 267 | 261 | 73 | 125 | 35 | 137 | 151 |
| U | 51 | 52 | 53 | 54 | 55 | 56 | 57 | 58 | 59 | 60 |
| S(u) | 181 | 242 | 95 | 202 | 61 | 15 | 103 | 217 | 128 | 14 |
| U | 61 | 62 | 63 | 64 | 65 | 66 | 67 | 68 | 69 | 70 |
| S(u) | 55 | 203 | 253 | 118 | 142 | 89 | 263 | 37 | 231 | 12 |
| U | 71 | 72 | 73 | 74 | 75 | 76 | 77 | 78 | 79 | 80 |
| S(u) | 130 | 268 | 23 | 34 | 179 | 276 | 207 | 43 | 223 | 21 |
| U | 81 | 82 | 83 | 84 | 85 | 86 | 87 | 88 | 89 | 90 |
| S(u) | 145 | 133 | 91 | 10 | 227 | 39 | 135 | 143 | 66 | 261 |
| U | 91 | 92 | 93 | 94 | 95 | 96 | 97 | 98 | 99 | 100 |
| S(u) | 83 | 228 | 9 | 241 | 53 | 201 | 173 | 137 | 161 | 151 |
| U | 101 | 102 | 103 | 104 | 105 | 106 | 107 | 108 | 109 | 110 |
| S(u) | 108 | 255 | 57 | 121 | 8 | 95 | 149 | 101 | 254 | 61 |
| U | 111 | 112 | 113 | 114 | 115 | 116 | 117 | 118 | 119 | 120 |
| S(u) | 257 | 15 | 245 | 184 | 197 | 217 | 251 | 64 | 141 | 7 |
| U | 121 | 122 | 123 | 124 | 125 | 126 | 127 | 128 | 129 | 130 |
| S(u) | 104 | 55 | 191 | 203 | 47 | 273 | 218 | 59 | 13 | 71 |
| U | 131 | 132 | 133 | 134 | 135 | 136 | 137 | 138 | 139 | 140 |
| S(u) | 269 | 89 | 82 | 144 | 87 | 37 | 49 | 152 | 169 | 6 |
| U | 141 | 142 | 143 | 144 | 145 | 146 | 147 | 148 | 149 | 150 |
| S(u) | 119 | 65 | 88 | 134 | 81 | 23 | 234 | 17 | 107 | 179 |
| U | 151 | 152 | 153 | 154 | 155 | 156 | 157 | 158 | 159 | 160 |
| S(u) | 50 | 138 | 170 | 158 | 249 | 199 | 171 | 154 | 248 | 215 |
| U | 161 | 162 | 163 | 164 | 165 | 166 | 167 | 168 | 169 | 170 |
| S(u) | 99 | 145 | 175 | 133 | 239 | 187 | 211 | 5 | 139 | 153 |
| U | 171 | 172 | 173 | 174 | 175 | 176 | 177 | 178 | 179 | 180 |
| S(u) | 157 | 200 | 97 | 135 | 163 | 143 | 237 | 33 | 75 | 275 |
| U | 181 | 182 | 183 | 184 | 185 | 186 | 187 | 188 | 189 | 190 |
| S(u) | 51 | 189 | 243 | 114 | 195 | 212 | 166 | 241 | 182 | 53 |
| U | 191 | 192 | 193 | 194 | 195 | 196 | 197 | 198 | 199 | 200 |
| S(u) | 123 | 201 | 213 | 173 | 185 | 244 | 115 | 250 | 156 | 172 |
| U | 201 | 202 | 203 | 204 | 205 | 206 | 207 | 208 | 209 | 210 |
| S(u) | 96 | 54 | 62 | 255 | 221 | 224 | 77 | 121 | 277 | 4 |
| U | 211 | 212 | 213 | 214 | 215 | 216 | 217 | 218 | 219 | 220 |
| S(u) | 167 | 186 | 193 | 247 | 160 | 101 | 58 | 127 | 272 | 225 |
| U | 221 | 222 | 223 | 224 | 225 | 226 | 227 | 228 | 229 | 230 |
| S(u) | 205 | 257 | 79 | 206 | 220 | 271 | 85 | 92 | 11 | 259 |
| U | 231 | 232 | 233 | 234 | 235 | 236 | 237 | 238 | 239 | 240 |
| S(u) | 69 | 264 | 18 | 147 | 25 | 32 | 177 | 141 | 165 | 7 |
| U | 241 | 242 | 243 | 244 | 245 | 246 | 247 | 248 | 249 | 250 |
| S(u) | 94 | 52 | 183 | 196 | 113 | 191 | 214 | 159 | 155 | 198 |
| U | 251 | 252 | 253 | 254 | 255 | 256 | 257 | 258 | 259 | 260 |
| S(u) | 117 | 273 | 63 | 109 | 102 | 59 | 111 | 13 | 230 | 71 |
| U | 261 | 262 | 263 | 264 | 265 | 266 | 267 | 268 | 269 | 270 |
| S(u) | 45 | 269 | 67 | 232 | 19 | 41 | 22 | 72 | 131 | 87 |
| U | 271 | 272 | 273 | 274 | 275 | 276 | 277 | 278 | 279 | 280 |
| S(u) | 226 | 219 | 126 | 49 | 180 | 76 | 209 | 169 | 3 | 3 |
| U | 281 | 282 | 283 | 284 | 285 | 286 | 287 | 288 | 289 | 290 |
| S(u) | 209 | 119 | 252 | 65 | 262 | 44 | 38 | 67 | 90 | 81 |
| U | 291 | 292 | 293 | 294 | 295 | 296 | 297 | 298 | 299 | 300 |
| S(u) | 222 | 204 | 63 | 117 | 219 | 17 | 113 | 183 | 188 | 165 |
| U | 301 | 302 | 303 | 304 | 305 | 306 | 307 | 308 | 309 | 310 |
| S(u) | 131 | 25 | 36 | 69 | 11 | 85 | 41 | 79 | 19 | 249 |
| U | 311 | 312 | 313 | 314 | 315 | 316 | 317 | 318 | 319 | 320 |
| S(u) | 116 | 199 | 193 | 171 | 277 | 77 | 45 | 124 | 192 | 215 |
| U | 321 | 322 | 323 | 324 | 325 | 326 | 327 | 328 | 329 | 330 |
| S(u) | 115 | 185 | 213 | 246 | 111 | 175 | 195 | 243 | 51 | 150 |
| U | 331 | 332 | 333 | 334 | 335 | 336 | 337 | 338 | 339 | 340 |
| S(u) | 109 | 187 | 194 | 211 | 278 | 5 | 239 | 139 | 99 | 153 |
| U | 341 | 342 | 343 | 344 | 345 | 346 | 347 | 348 | 349 | 350 |
| S(u) | 155 | 157 | 159 | 100 | 107 | 97 | 162 | 176 | 238 | 163 |
| U | 351 | 352 | 353 | 354 | 355 | 356 | 357 | 358 | 359 | 360 |
| S(u) | 98 | 174 | 164 | 237 | 26 | 33 | 47 | 75 | 208 | 275 |
| U | 361 | 362 | 363 | 364 | 365 | 366 | 367 | 368 | 369 | 370 |
| S(u) | 251 | 197 | 245 | 189 | 177 | 149 | 16 | 57 | 216 | 161 |
| U | 371 | 372 | 373 | 374 | 375 | 376 | 377 | 378 | 379 | 380 |
| S(u) | 147 | 106 | 9 | 83 | 132 | 270 | 227 | 91 | 259 | 223 |
| U | 381 | 382 | 383 | 384 | 385 | 386 | 387 | 388 | 389 | 390 |
| S(u) | 207 | 123 | 46 | 260 | 231 | 263 | 271 | 253 | 110 | 256 |
| U | 391 | 392 | 393 | 394 | 395 | 396 | 397 | 398 | 399 | 400 |
| S(u) | 103 | 122 | 190 | 181 | 274 | 125 | 205 | 78 | 225 | 86 |
| U | 401 | 402 | 403 | 404 | 405 | 406 | 407 | 408 | 409 | 410 |
| S(u) | 136 | 48 | 127 | 27 | 29 | 31 | 235 | 146 | 80 | 221 |
| U | 411 | 412 | 413 | 414 | 415 | 416 | 417 | 418 | 419 | 420 |
| S(u) | 247 | 112 | 258 | 229 | 93 | 240 | 167 | 279 | 2 | 2 |
| U | 421 | 422 | 423 | 424 | 425 | 426 | 427 | 428 | 429 | 430 |
| S(u) | 279 | 167 | 240 | 93 | 229 | 258 | 112 | 247 | 221 | 80 |
| U | 431 | 432 | 433 | 434 | 435 | 436 | 437 | 438 | 439 | 440 |
| S(u) | 146 | 235 | 31 | 29 | 27 | 127 | 48 | 136 | 86 | 225 |
| U | 441 | 442 | 443 | 444 | 445 | 446 | 447 | 448 | 449 | 450 |
| S(u) | 78 | 205 | 125 | 274 | 181 | 190 | 122 | 103 | 256 | 110 |
| U | 451 | 452 | 453 | 454 | 455 | 456 | 457 | 458 | 459 | 460 |
| S(u) | 253 | 271 | 263 | 231 | 260 | 46 | 123 | 207 | 223 | 259 |
| U | 461 | 462 | 463 | 464 | 465 | 466 | 467 | 468 | 469 | 470 |
| S(u) | 91 | 227 | 270 | 132 | 83 | 9 | 106 | 147 | 161 | 216 |
| U | 471 | 472 | 473 | 474 | 475 | 476 | 477 | 478 | 479 | 480 |
| S(u) | 57 | 16 | 149 | 177 | 189 | 245 | 197 | 251 | 275 | 208 |
| U | 481 | 482 | 483 | 484 | 485 | 486 | 487 | 488 | 489 | 490 |
| S(u) | 75 | 47 | 33 | 26 | 237 | 164 | 174 | 98 | 163 | 238 |
| U | 491 | 492 | 493 | 494 | 495 | 496 | 497 | 498 | 499 | 500 |
| S(u) | 176 | 162 | 97 | 107 | 100 | 159 | 157 | 155 | 153 | 99 |
| U | 501 | 502 | 503 | 504 | 505 | 506 | 507 | 508 | 509 | 510 |
| S(u) | 139 | 239 | 5 | 278 | 211 | 194 | 187 | 109 | 150 | 51 |
| U | 511 | 512 | 513 | 514 | 515 | 516 | 517 | 518 | 519 | 520 |
| S(u) | 243 | 195 | 175 | 111 | 246 | 213 | 185 | 115 | 215 | 192 |
| U | 521 | 522 | 523 | 524 | 525 | 526 | 527 | 528 | 529 | 530 |
| S(u) | 124 | 45 | 77 | 277 | 171 | 193 | 199 | 116 | 249 | 19 |
| U | 531 | 532 | 533 | 534 | 535 | 536 | 537 | 538 | 539 | 540 |
| S(u) | 79 | 41 | 85 | 11 | 69 | 36 | 25 | 131 | 165 | 188 |
| U | 541 | 542 | 543 | 544 | 545 | 546 | 547 | 548 | 549 | 550 |
| S(u) | 183 | 113 | 17 | 219 | 117 | 63 | 204 | 222 | 81 | 90 |
| U | 551 | 552 | 553 | 554 | 555 | 556 | 557 | 558 | 559 | 560 |
| S(u) | 67 | 38 | 44 | 262 | 65 | 252 | 119 | 209 | 3 | 3 |
| U | 561 | 562 | 563 | 564 | 565 | 566 | 567 | 568 | 569 | 570 |
| S(u) | 169 | 209 | 76 | 180 | 49 | 126 | 219 | 226 | 87 | 131 |
| U | 571 | 572 | 573 | 574 | 575 | 576 | 577 | 578 | 579 | 580 |
| S(u) | 72 | 22 | 41 | 19 | 232 | 67 | 269 | 45 | 71 | 230 |
| U | 581 | 582 | 583 | 584 | 585 | 586 | 587 | 588 | 589 | 590 |
| S(u) | 13 | 111 | 59 | 102 | 109 | 63 | 273 | 117 | 198 | 155 |
| U | 591 | 592 | 593 | 594 | 595 | 596 | 597 | 598 | 599 | 600 |
| S(u) | 159 | 214 | 191 | 113 | 196 | 183 | 52 | 94 | 7 | 165 |
| U | 601 | 602 | 603 | 604 | 605 | 606 | 607 | 608 | 609 | 610 |
| S(u) | 141 | 177 | 32 | 25 | 147 | 18 | 264 | 69 | 259 | 11 |
| U | 611 | 612 | 613 | 614 | 615 | 616 | 617 | 618 | 619 | 620 |
| S(u) | 92 | 85 | 271 | 220 | 206 | 79 | 257 | 205 | 225 | 272 |
| U | 621 | 622 | 623 | 624 | 625 | 626 | 627 | 628 | 629 | 630 |
| S(u) | 127 | 58 | 101 | 160 | 247 | 193 | 186 | 167 | 4 | 277 |
| U | 631 | 632 | 633 | 634 | 635 | 636 | 637 | 638 | 639 | 640 |
| S(u) | 121 | 77 | 224 | 221 | 255 | 62 | 54 | 96 | 172 | 156 |
| U | 641 | 642 | 643 | 644 | 645 | 646 | 647 | 648 | 649 | 650 |
| S(u) | 250 | 115 | 244 | 185 | 173 | 213 | 201 | 123 | 53 | 182 |
| U | 651 | 652 | 653 | 654 | 655 | 656 | 657 | 658 | 659 | 660 |
| S(u) | 241 | 166 | 212 | 195' | 114 | 243 | 189 | 51 | 275 | 75 |
| U | 661 | 662 | 663 | 664 | 665 | 666 | 667 | 668 | 669 | 670 |
| S(u) | 33 | 237 | 143 | 163 | 135 | 97 | 200 | 157 | 153 | 139 |
| U | 671 | 672 | 673 | 674 | 675 | 676 | 677 | 678 | 679 | 680 |
| S(u) | 5 | 211 | 187 | 239 | 133 | 175 | 145 | 99 | 215 | 248 |
| U | 681 | 682 | 683 | 684 | 685 | 686 | 687 | 688 | 689 | 690 |
| S(u) | 154 | 171 | 199 | 249 | 158 | 170 | 138 | 50 | 179 | 107 |
| U | 691 | 692 | 693 | 694 | 695 | 696 | 697 | 698 | 699 | 700 |

TABLE 26-continued

Maximum value S(u) of each preamble sequence cyclic shift $N_{cs}$

| S(u) | 17 | 234 | 23 | 81 | 134 | 88 | 65 | 119 | 6 | 169 |
|---|---|---|---|---|---|---|---|---|---|---|
| U | 701 | 702 | 703 | 704 | 705 | 706 | 707 | 708 | 709 | 710 |
| S(u) | 152 | 49 | 37 | 87 | 144 | 82 | 89 | 269 | 71 | 13 |
| U | 711 | 712 | 713 | 714 | 715 | 716 | 717 | 718 | 719 | 720 |
| S(u) | 59 | 218 | 273 | 47 | 203 | 191 | 55 | 104 | 7 | 141 |
| U | 721 | 722 | 723 | 724 | 725 | 726 | 727 | 728 | 729 | 730 |
| S(u) | 64 | 251 | 217 | 197 | 184 | 245 | 15 | 257 | 61 | 254 |
| U | 731 | 732 | 733 | 734 | 735 | 736 | 737 | 738 | 739 | 740 |
| S(u) | 101 | 149 | 95 | 8 | 121 | 57 | 255 | 108 | 151 | 161 |
| U | 741 | 742 | 743 | 744 | 745 | 746 | 747 | 748 | 749 | 750 |
| S(u) | 137 | 173 | 201 | 53 | 241 | 9 | 228 | 83 | 261 | 66 |
| U | 751 | 752 | 753 | 754 | 755 | 756 | 757 | 758 | 759 | 760 |
| S(u) | 143 | 135 | 39 | 227 | 10 | 91 | 133 | 145 | 21 | 223 |
| U | 761 | 762 | 763 | 764 | 765 | 766 | 767 | 768 | 769 | 770 |
| S(u) | 43 | 207 | 276 | 179 | 34 | 23 | 268 | 130 | 12 | 231 |
| U | 771 | 772 | 773 | 774 | 775 | 776 | 777 | 778 | 779 | 780 |
| S(u) | 37 | 263 | 89 | 142 | 118 | 253 | 203 | 55 | 14 | 128 |
| U | 781 | 782 | 783 | 784 | 785 | 786 | 787 | 788 | 789 | 790 |
| S(u) | 217 | 103 | 15 | 61 | 202 | 95 | 242 | 181 | 151 | 137 |
| U | 791 | 792 | 793 | 794 | 795 | 796 | 797 | 798 | 799 | 800 |
| S(u) | 35 | 125 | 73 | 261 | 267 | 39 | 20 | 266 | 21 | 43 |
| U | 801 | 802 | 803 | 804 | 805 | 806 | 807 | 808 | 809 | 810 |
| S(u) | 265 | 68 | 233 | 24 | 74 | 178 | 236 | 27 | 28 | 29 |
| U | 811 | 812 | 813 | 814 | 815 | 816 | 817 | 818 | 819 | 820 |
| S(u) | 30 | 31 | 129 | 235 | 35 | 73 | 267 | 40 | 42 | 265 |
| U | 821 | 822 | 823 | 824 | 825 | 826 | 827 | 828 | 829 | 830 |
| S(u) | 233 | 148 | 105 | 56 | 60 | 129 | 70 | 229 | 84 | 93 |
| U | 831 | 832 | 833 | 834 | 835 | 836 | 837 | 838 | | |
| S(u) | 105 | 120 | 140 | 168 | 210 | 279 | 1 | 1 | | |

According to the calculation result of the maximum value of each preamble sequence cyclic shift $N_{cs}$, the ZC root sequence indexes are classified into 14 groups. The specific grouping situation and the common value range of each group of preamble sequence cyclic shifts $N_{cs}$ are shown in Table 27.

TABLE 27

Grouping situation of maximum values of preamble sequence cyclic shifts $N_{CS}$

| Common value range of $N_{CS}$ | ZC sequence index |
|---|---|
| =1 | 1 2 837 838 419 420 279 280 559 560 210 629 168 336 503 671 140 699 120 240 599 719 105 734 93 373 466 746 84 755 229 305 534 610 70 769 129 258 581 710 60 779 56 112 727 783 367 472 148 296 543 691 233 606 265 309 530 574 42 797 40 80 759 799 267 572 73 146 693 766 35 804 235 302 537 604 355 484 31 404 435 808 |
| ≤28 | 30 809 29 405 434 810 28 811 |
| ≤31 | 27 406 433 812 236 603 178 356 483 661 |
| ≤34 | 74 765 24 48 791 815 303 536 68 136 703 771 |
| ≤38 | 287 552 43 86 753 796 21 818 266 307 532 573 20 819 39 78 761 800 |
| ≤44 | 286 553 261 317 522 578 383 456 125 357 482 714 402 437 137 274 565 702 151 688 |
| ≤51 | 181 329 510 658 242 597 95 190 649 744 202 637 61 122 717 778 15 824 103 368 471 736 |
| ≤58 | 217 622 128 256 583 711 14 825 55 110 729 784 203 636 253 293 546 586 118 721 142 284 555 697 89 750 |
| ≤67 | 263 288 551 576 37 802 231 304 535 608 12 827 130 260 579 709 268 571 23 46 793 816 34 805 179 358 481 660 |
| ≤76 | 276 563 207 316 523 632 398 441 223 308 531 616 409 430 145 290 549 694 133 706 91 374 465 748 10 829 227 306 533 612 |
| ≤86 | 400 439 135 270 569 704 143 696 66 132 707 773 289 550 83 378 461 756 228 611 9 415 424 830 241 598 53 106 733 786 201 638 173 346 493 666 351 488 161 339 500 678 |
| ≤100 | 344 495 108 216 623 731 255 584 57 391 448 782 121 718 8 16 823 831 372 467 149 345 494 690 101 738 254 331 508 585 389 450 257 325 514 582 412 427 245 297 542 594 184 655 197 321 518 642 311 528 251 294 545 588 64 775 141 282 557 698 7 832 104 208 631 735 392 447 191 382 457 648 318 521 47 396 443 792 273 566 218 403 436 621 |
| ≤128 | 59 780 13 26 813 826 71 768 269 301 538 570 375 464 82 164 675 757 144 695 87 174 665 752 401 438 49 98 741 790 152 687 169 338 501 670 6 833 119 238 601 720 65 774 88 176 663 751 134 705 81 162 677 758 408 431 234 371 468 605 17 822 107 366 473 732 330 509 50 100 739 789 138 701 170 340 499 669 158 681 249 341 498 590 199 640 171 342 497 668 |
| ≤158 | 154 685 248 343 496 591 215 624 99 370 469 740 347 492 175 350 489 664 353 486 239 300 539 600 187 652 211 417 422 628 5 834 139 278 561 700 153 686 157 314 525 682 200 639 97 194 645 742 352 487 163 326 513 676 348 491 237 365 474 602 33 806 75 150 689 764 275 564 51 394 445 788 189 650 243 298 541 596 114 725 195 322 517 644 212 627 166 332 507 673 299 540 182 364 475 657 393 446 123 246 593 716 319 520 213 313 526 626 333 506 185 327 512 654 244 595 115 362 477 724 250 589 156 312 527 683 172 667 96 192 647 743 |
| ≤202 | 54 785 62 124 715 777 292 547 221 397 442 618 224 615 77 381 458 762 359 480 277 281 558 562 4 835 167 334 505 672 |

TABLE 27-continued

Grouping situation of maximum values of preamble sequence cyclic shifts $N_{CS}$

| Common value range of $N_{CS}$ | ZC sequence index |
|---|---|
| ≤237 | 186 653 193 323 516 646 247 592 160 320 519 679 369 470 58 116 723 781 127 712 272 295 544 567 225 614 205 410 429 634 291 548 79 380 459 760 206 633 220 399 440 619 271 568 85 377 462 754 92 747 11 414 425 828 259 580 69 385 454 770 264 575 18 36 803 821 147 692 25 407 432 814 32 807 177 354 485 662 349 490 165 337 502 674 416 423 94 188 651 745 52 787 183 328 511 656 196 643 113 363 476 726 324 515 214 411 428 625 159 680 155 310 529 684 198 641 117 361 478 722 283 556 63 388 451 776 109 730 102 204 635 737 390 449 111 222 617 728 413 426 230 379 460 609 384 455 45 90 749 794 285 554 67 386 453 772 232 607 19 38 801 820 41 798 22 44 795 817 72 767 131 262 577 708 376 463 226 387 452 613 219 620 126 252 587 713 395 444 180 360 479 659 76 763 209 315 524 630 335 504 3 418 421 836 |

Based on the result of grouping, the first group is discarded, and the maximum values of preamble sequence cyclic shifts $N_{cs}$ are selected from the value ranges of preamble sequence cyclic shifts $N_{cs}$ in the remaining 15 groups to form a preamble sequence cyclic shift set {28, 31, 34, 38, 44, 51, 58, 67, 76, 86, 100, 128, 158, 202, 237}. In the order from the smallest to largest values of the preamble sequence cyclic shifts $N_{cs}$, indexes 0 to 15 are allocated for the preamble sequence cyclic shifts $N_{cs}$, respectively. The eventually generated preamble sequence cyclic shift set is shown in Table 28.

TABLE 28

Preamble sequence cyclic shift set

| $N_{CS}$ configuration | $N_{CS}$ value |
|---|---|
| 0 | 28 |
| 1 | 31 |
| 2 | 34 |
| 3 | 38 |
| 4 | 44 |
| 5 | 51 |
| 6 | 58 |
| 7 | 67 |
| 8 | 76 |
| 9 | 86 |
| 10 | 100 |
| 11 | 128 |
| 12 | 158 |
| 13 | 202 |
| 14 | 237 |
| 15 | — |

Specific Embodiment 22

Based on the specific embodiments 2 and 8, a cyclic shift sequence of a ZC sequence having a length of $N_{zc}$=839 is used as a preamble sequence; and when the sub-carrier spacing of the random access channel is Δf=1.25 kHz, Δf=2.5 kHz, Δf=5 kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset and a preamble sequence cyclic shift set when the maximum frequency offset is 1 time of the sub-carrier spacing of the random access channel are generated, respectively. The eventually generated preamble sequence cyclic shift sets are shown in Table 29. In Table 29, the set 0 represents a preamble sequence cyclic shift set when there is no or negligible frequency offset, and the set 1 represents a preamble sequence cyclic shift set when the maximum frequency offset is 1 time of the sub-carrier spacing of the random access channel.

TABLE 29

Preamble sequence cyclic shift sets

| | $N_{CS}$ value | |
|---|---|---|
| $N_{CS}$ configuration | Set 0 | Set 1 |
| 0 | 0 | 28 |
| 1 | 26 | 31 |
| 2 | 28 | 34 |
| 3 | 31 | 38 |
| 4 | 34 | 44 |
| 5 | 38 | 51 |
| 6 | 44 | 58 |
| 7 | 51 | 67 |
| 8 | 58 | 76 |
| 9 | 67 | 86 |
| 10 | 76 | 100 |
| 11 | 93 | 128 |
| 12 | 119 | 158 |
| 13 | 167 | 202 |
| 14 | 279 | 237 |
| 15 | 419 | — |

Embodiment 16

When the maximum degree of frequency offset is 2 times of the sub-carrier spacing of the random access channel, during the random access process, a cyclic shift sequence of a ZC sequence having a length of $N_{zc}$ is used as a preamble sequence, and the uth (where $1 \leq u \leq N_{zc}-1$) root sequence is:

$$x_u(n) = e^{-j\frac{\pi u n(n+1)}{N_{ZC}}}, \ 0 \leq n \leq N_{ZC} - 1$$

where u is the index of the ZC sequence.

With regard to the uth ZC root sequence, when the degree of frequency offset is +1 time of the sub-carrier spacing of the random access channel, a cyclic shift having a size of $d_{u1}^{+}=(1/u) \bmod N$ is generated by the ZC sequence in time domain; when the degree of frequency offset is −1 time of the sub-carrier spacing of the random access channel, a cyclic shift having a size of $d_{u1}^{-}=(-1/u) \bmod N_{zc}$ is generated by the ZC sequence in time domain; when the degree of frequency offset is +2 times of the sub-carrier spacing of the random access channel, a cyclic shift having a size of $d_{u2}^{+}=(2/u) \bmod N_{zc}$ is generated by the ZC sequence in time domain; and when the degree of frequency offset is −2 times of the sub-carrier spacing of the random access channel, a cyclic shift having a size of $d_{u2}^{-}=(-2/u) \bmod N_{Z}$ is generated by the ZC sequence in time domain.

During the detection of the preamble sequence, due to the distortion of the cyclic shift, false alarm peaks will be generated in the Power Delay Profile (PDP), and wrong cyclic shift duplicate windows thus occur. As shown in FIG. 42, in an actual system, there will be +1-time and +2-time frequency offset signals and −1-time and −2-time frequency offset signals, so that there will be four wrong cyclic shift search windows. Wherein, $C_0$ denotes a correct original cyclic shift search window, $C_{-1}$ denotes a wrong duplicate search window caused by the −1-time frequency offset, $C_{-2}$ denotes a wrong duplicate search window caused by the −2-time frequency offset, denotes a wrong duplicate search window caused by the +1-2-time frequency offset, and $C_{+2}$ denotes a wrong duplicate search window caused by the +2-time frequency offset.

In this case, in order to avoid the mutual interference between sequences generated by a same root ZC sequence cyclic shift, the cyclic shift $N_{cs}$ needs to satisfy the following conditions: wrong search windows $C_{-1}$, $C_{-2}$, $C_{+1}$ and $C_{+2}$ of any cyclic shift ZC sequence are not overlapped with each other, not overlapped with the windows $C_{-1}$, $C_{-2}$, $C_0$, $C_{+1}$ and $C_{+2}$ of other cyclic shift ZC sequences, and not overlapped with the correct cyclic shift search window $C_0$ of this cyclic shift ZC sequence. This is defined as follows:

$$d_{u1} = \begin{cases} d_{u1}^{+} & 0 \leq d_{u1}^{+} < N_{ZC}/2 \\ N_{ZC} - d_{u1}^{+} & \text{otherwise} \end{cases}$$

and $$d_{u2} = \begin{cases} d_{u2}^{+} & 0 \leq d_{u2}^{+} < N_{ZC}/2 \\ N_{ZC} - d_{u2}^{+} & \text{otherwise} \end{cases}$$

where $d_{u1}^{+}=(1/u) \bmod N_{zc}$, and $d_{u1}^{+}=(1/u) \bmod N_{zc}$. The final preamble sequence $N_{cs}$ needs to satisfy the following conditions:

$N_{cs} \leq d_{u1} \leq (N_{zc}-N_{cs})/2$ $N_{cs} \leq d_{u2} \leq (N_{zc}-N_{cs})/2$ $N_{cs} \leq |d_{u1}-d_{u2}|$ In the formulae, $d_{u1}$ denotes a smaller one of the cyclic shift generated by the ZC sequence in time domain when the degree of frequency offset is +1 time of the sub-carrier spacing of the random access channel and the cyclic shift generated by the ZC sequence in time domain when the degree of frequency offset is −1 time of the sub-carrier spacing of the random access channel, and $d_{u2}$ denotes a smaller one of the cyclic shift generated by the ZC sequence in time domain when the degree of frequency offset is +2 times of the sub-carrier spacing of the random access channel and the cyclic shift generated by the ZC sequence in time domain when the degree of frequency offset is −2 times of the sub-carrier spacing of the random access channel.

It is to be noted that, for different cell coverage demands, the conditions to be further satisfied by the preamble sequence $N_{cs}$ are the same as the conditions described in Embodiment 14.

Based on the above conditions, the method for configuring a preamble sequence cyclic shift set specifically comprises the following steps:

step A (initial setting): the maximum number of allowable preamble sequence cyclic shifts $N_{cs}$ is determined as P;

step B: based on the length $N_{zc}$ of the ZC sequence, all indexes u ($1 \leq u \leq N_{zc}-1$) of the ZC sequence are selected;

step C: for different indexes u of the ZC sequence and the degree of frequency offset, the value ranges of preamble sequence cyclic shifts $N_{cs}$ corresponding to all the indexes u of the ZC sequence are calculated, respectively; and step D: based on the $N_{zc}-1$ value ranges of preamble sequence cyclic shifts $N_{cs}$ obtained in the step C, the indexes u of the ZC sequence are classified into Q groups ($Q \leq P$), the value ranges of preamble sequence cyclic shifts $N_{cs}$ corresponding to the groups are approximate to each other, and the intersection of the value ranges is not a null set. Based on different cell coverage demands, a preamble sequence cyclic shift $N_{cs}$ is selected from each common value range of preamble sequence cyclic shifts $N_{cs}$ to generate a final preamble sequence cyclic shift set containing Q elements, and each preamble sequence cyclic shift $N_{cs}$ is allocated with a unique index. The index No. is from 0 to Q−1.

During the selection of a preamble sequence cyclic shift $N_{cs}$ from each common value range of preamble sequence cyclic shifts $N_{cs}$, the selected preamble sequence cyclic shift $N_{cs}$ can be a preamble sequence cyclic shift $N_{cs}$ having a minimum value. Of course, the selection of the preamble sequence cyclic shift $N_{cs}$ is not limited thereto.

In this embodiment, when the preset generation conditions are the ZC sequence and the degree of frequency offset, in the step 601 of FIG. 38, all values of preamble sequence cyclic shifts $N_{cs}$ are determined according to the ZC sequence and the degree of frequency offset, including:

Calculating all values of preamble sequence cyclic shifts $N_{cs}$ corresponding to the uth indexes of the ZC sequence, according to the ZC sequence and the degree of frequency offset, and classifying the u calculated values of preamble sequence cyclic shifts $N_{cs}$ into Q groups according to a preset value range of the preamble sequence cyclic shifts $N_{cs}$.

Step 602: A preset number of preamble sequence cyclic shifts $N_{cs}$ are selected from all values of preamble sequence cyclic shifts $N_{cs}$ to generate a preamble sequence cyclic shift set, specifically:

A preset number of preamble sequence cyclic shifts $N_{cs}$ are selected from all values of preamble sequence cyclic shifts $N_{cs}$ in each of the Q groups to generate a preamble sequence cyclic shift set.

The selection of a preset number of preamble sequence cyclic shifts $N_{cs}$ from preamble sequence cyclic shifts $N_{cs}$ in each of the Q groups is specifically: selecting zero preamble sequence cyclic shift $N_{cs}$ or at least one preamble sequence cyclic shift $N_{cs}$.

In Embodiment 15, in the situation where the maximum degree of frequency offset is 2 time of the sub-carrier spacing of the random access channel, the following detailed description will be given by several specific implementations.

Specific Embodiment 23

A cyclic shift sequence of a ZC sequence having a length of $N_{zc}=139$ is used as a preamble sequence; and when the sub-carrier spacing of the random access channel is $\Delta f=7.5$ kHz, $\Delta f=1$ kHz, $\Delta f=15$ kHz, $\Delta f=30$ kHz, $\Delta f=60$ kHz or $\Delta f=120$ kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence $N_{cs}$ is S(u). With regard to the root sequence index u ($1 \le u \le 138$) of the ZC sequence, the maximum value $N_{cs}$ of each preamble sequence cyclic shift S(u) is calculated, and the calculation result is shown in Table 30.

TABLE 30

Maximum value S(u) of each preamble sequence cyclic shift $N_{cs}$

| u | 1 | 2 | 3 | 4 | 5 | 6 | 7 | 8 | 9 | 10 | 11 | 12 |
|---|---|---|---|---|---|---|---|---|---|---|---|---|
| S(u) | 1 | 1 | 1 | 1 | 27 | 23 | 20 | 17 | 15 | 14 | 13 | 23 |
| u | 13 | 14 | 15 | 16 | 17 | 18 | 19 | 20 | 21 | 22 | 23 | 24 |
| S(u) | 11 | 10 | 9 | 26 | 8 | 23 | 22 | 7 | 20 | 19 | 6 | 23 |
| u | 25 | 26 | 27 | 28 | 29 | 30 | 31 | 32 | 33 | 34 | 35 | 36 |
| S(u) | 11 | 16 | 5 | 5 | 24 | 14 | 9 | 13 | 21 | 4 | 4 | 27 |
| u | 37 | 38 | 39 | 40 | 41 | 42 | 43 | 44 | 45 | 46 | 47 | 48 |
| S(u) | 15 | 11 | 25 | 7 | 17 | 10 | 13 | 19 | 3 | 3 | 3 | 26 |
| u | 49 | 50 | 51 | 52 | 53 | 54 | 55 | 56 | 57 | 58 | 59 | 60 |
| S(u) | 17 | 25 | 19 | 8 | 21 | 18 | 5 | 5 | 17 | 12 | 7 | 7 |
| u | 61 | 62 | 63 | 64 | 65 | 66 | 67 | 68 | 69 | 70 | 71 | 72 |
| S(u) | 16 | 9 | 11 | 13 | 15 | 19 | 27 | 2 | 2 | 2 | 2 | 27 |
| u | 73 | 74 | 75 | 76 | 77 | 78 | 79 | 80 | 81 | 82 | 83 | 84 |
| S(u) | 19 | 15 | 13 | 11 | 9 | 16 | 7 | 7 | 12 | 17 | 5 | 5 |
| u | 85 | 86 | 87 | 88 | 89 | 90 | 91 | 92 | 93 | 94 | 95 | 96 |
| S(u) | 18 | 21 | 8 | 19 | 25 | 17 | 26 | 3 | 3 | 3 | 19 | 13 |
| u | 97 | 98 | 99 | 100 | 101 | 102 | 103 | 104 | 105 | 106 | 107 | 108 |
| S(u) | 10 | 17 | 7 | 25 | 11 | 15 | 27 | 4 | 4 | 21 | 13 | 9 |
| u | 109 | 110 | 111 | 112 | 113 | 114 | 115 | 116 | 117 | 118 | 119 | 120 |
| S(u) | 14 | 24 | 5 | 5 | 16 | 11 | 23 | 6 | 19 | 20 | 7 | 22 |
| u | 121 | 122 | 123 | 124 | 125 | 126 | 127 | 128 | 129 | 130 | 131 | 132 |
| S(u) | 23 | 8 | 26 | 9 | 10 | 11 | 23 | 13 | 14 | 15 | 17 | 20 |
| u | 133 | 134 | 135 | 136 | 137 | 138 | | | | | | |
| S(u) | 23 | 27 | 1 | 1 | 1 | 1 | | | | | | |

According to the calculation result of the maximum value of each preamble sequence cyclic shift $N_{cs}$, the ZC root sequence indexes are classified into 12 groups. The specific grouping situation and the common value range of each group of preamble sequence cyclic shifts $N_{cs}$ are shown in Table 31.

TABLE 31

Grouping situation of the maximum values of preamble sequences $N_{CS}$

| Common value range of $N_{CS}$ | ZC root sequence index |
|---|---|
| =1 | 1, 138, 2, 137, 3, 136, 4, 135, 68, 71, 69, 70 |
| ≤3 | 45, 94, 46, 93, 47, 92, 34, 105, 35, 104 |
| ≤5 | 27, 112, 28, 111, 55, 84, 56, 83, 23, 116 |
| ≤7 | 20, 119, 40, 99, 59, 80, 60, 79, 15, 124, 52, 87 |
| ≤9 | 15, 124, 31, 108, 62, 77, 14, 125, 42, 97 |
| ≤11 | 13, 126, 25, 114, 38, 101, 63, 76, 58, 81, 11, 128, 32, 107, 43, 96, 64, 75 |
| ≤14 | 10, 129, 30, 109, 9, 130, 37, 102, 65, 74, 26, 113, 61, 78 |

TABLE 31-continued

Grouping situation of the maximum values of preamble sequences $N_{CS}$

| Common value range of $N_{CS}$ | ZC root sequence index |
|---|---|
| ≤17 | 8, 131, 41, 98, 49, 90, 57, 82, 54, 85, 22, 117, 44, 95, 51, 88, 66, 73, 7, 132, 21, 118 |
| ≤21 | 33, 106, 53, 86, 19, 120, 6, 133, 12, 127, 18, 121, 24, 115, 29, 110, 39, 100, 50, 89, 16, 123, 48, 91, 5, 134, 36, 103, 67, 72 |

Based on the result of grouping, the first group is discarded, and the maximum values of preamble sequence cyclic shifts $N_{cs}$ are selected from the value ranges of preamble sequence cyclic shifts $N_{cs}$ in the remaining 8 groups to form a preamble sequence cyclic shift set {3, 5, 7, 9, 11, 14, 17, 21}. In the order from the smallest to largest values of the preamble sequence cyclic shifts $N_{cs}$, indexes 0 to 7 are allocated for the preamble sequence cyclic shifts $N_{cs}$, respectively. The eventually generated preamble sequence cyclic shift set is shown in Table 32.

TABLE 32

Preamble sequence cyclic shift set

| $N_{CS}$ configuration | $N_{CS}$ value |
|---|---|
| 0 | 3 |
| 1 | 5 |
| 2 | 7 |
| 3 | 9 |
| 4 | 11 |
| 5 | 14 |
| 6 | 17 |
| 7 | 21 |
| 8 | — |
| 9 | — |
| 10 | — |
| 11 | — |
| 12 | — |
| 13 | — |
| 14 | — |
| 15 | — |

Specific Embodiment 24

Based on the specific embodiments 16, 17 and 23, in this specific embodiment, a cyclic shift sequence of a ZC sequence having a length of $N_{zc}=139$ is used as a preamble sequence; and when the sub-carrier spacing of the random access channel is $\Delta f=7.5$ kHz, $\Delta f=15$ kHz, $\Delta f=30$ kHz, $\Delta f=60$ kHz or $\Delta f=120$ kHz a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset, a preamble sequence cyclic shift set when the maximum degree of frequency offset is 1 time of the sub-carrier spacing of the random access channel and a preamble sequence cyclic shift set when the maximum degree of frequency offset is 2 times of the sub-carrier spacing of the random access channel are generated, respectively. The eventually generated preamble sequence cyclic shift sets are shown in Table 33. In Table 33, the set 2 represents a preamble sequence cyclic shift set when the maximum degree of frequency offset is 2 times of the sub-carrier spacing of the random access channel.

TABLE 33

Preamble sequence cyclic shift sets

| $N_{CS}$ configuration | $N_{CS}$ value | | |
|---|---|---|---|
| | Set 0 | Set 1 | Set 2 |
| 0 | 2 | 3 | 3 |
| 1 | 4 | 5 | 5 |
| 2 | 6 | 7 | 7 |
| 3 | 8 | 9 | 9 |
| 4 | 10 | 11 | 11 |
| 5 | 12 | 13 | 14 |
| 6 | 15 | 16 | 17 |
| 7 | 18 | 20 | 21 |
| 8 | 22 | 24 | — |
| 9 | 26 | 30 | — |
| 10 | 31 | 37 | — |
| 11 | 36 | — | — |
| 12 | — | — | — |
| 13 | — | — | — |
| 14 | — | — | — |
| 15 | — | — | — |

Specific Embodiment 25

A cyclic shift sequence of a ZC sequence having a length of $N_{zc}=839$ is used as a preamble sequence; and when the sub-carrier spacing of the random access channel is $\Delta f=1.25$ kHz, $\Delta f=2.5$ kHz or $\Delta f=5$ kHz, a preferred method for configuring a preamble sequence cyclic shift set specifically comprises the following steps.

The maximum number of allowable preamble sequence cyclic shifts N is determined as 16.

When the length of the ZC root sequence is $N_{zc}$ and the root sequence index is u, the maximum value of each preamble sequence cyclic shift $N_{cs}$ is S(u). With regard to the root sequence index u ($1 \leq u \leq 838$) of the ZC sequence, the maximum value $N_{cs}$ of each preamble sequence cyclic shift S(u) is calculated, and the calculation result is shown in Table 34.

TABLE 34

Maximum value S(u) of each preamble sequence cyclic shift $N_{cs}$

| U | 1 | 2 | 3 | 4 | 5 | 6 | 7 | 8 | 9 | 10 |
|---|---|---|---|---|---|---|---|---|---|---|
| S(u) | 1 | 1 | 1 | 1 | 167 | 140 | 120 | 105 | 93 | 84 |
| U | 11 | 12 | 13 | 14 | 15 | 16 | 17 | 18 | 19 | 20 |
| S(u) | 76 | 70 | 129 | 60 | 56 | 105 | 148 | 93 | 44 | 42 |
| U | 21 | 22 | 23 | 24 | 25 | 26 | 27 | 28 | 29 | 30 |
| S(u) | 40 | 38 | 73 | 35 | 67 | 129 | 31 | 30 | 29 | 28 |
| U | 31 | 32 | 33 | 34 | 35 | 36 | 37 | 38 | 39 | 40 |
| S(u) | 27 | 105 | 127 | 74 | 24 | 70 | 68 | 22 | 43 | 21 |
| U | 41 | 42 | 43 | 44 | 45 | 46 | 47 | 48 | 49 | 50 |
| S(u) | 41 | 20 | 39 | 19 | 56 | 73 | 125 | 35 | 137 | 151 |
| U | 51 | 52 | 53 | 54 | 55 | 56 | 57 | 58 | 59 | 60 |
| S(u) | 148 | 113 | 95 | 31 | 61 | 15 | 103 | 29 | 128 | 14 |
| U | 61 | 62 | 63 | 64 | 65 | 66 | 67 | 68 | 69 | 70 |
| S(u) | 55 | 27 | 40 | 118 | 142 | 89 | 25 | 37 | 73 | 12 |
| U | 71 | 72 | 73 | 74 | 75 | 76 | 77 | 78 | 79 | 80 |
| S(u) | 130 | 35 | 23 | 34 | 123 | 11 | 109 | 43 | 85 | 21 |
| U | 81 | 82 | 83 | 84 | 85 | 86 | 87 | 88 | 89 | 90 |
| S(u) | 145 | 133 | 91 | 10 | 79 | 39 | 135 | 143 | 66 | 28 |
| U | 91 | 92 | 93 | 94 | 95 | 96 | 97 | 98 | 99 | 100 |
| S(u) | 83 | 73 | 9 | 116 | 53 | 35 | 147 | 137 | 161 | 151 |
| U | 101 | 102 | 103 | 104 | 105 | 106 | 107 | 108 | 109 | 110 |
| S(u) | 108 | 74 | 57 | 121 | 8 | 95 | 149 | 101 | 77 | 61 |
| U | 111 | 112 | 113 | 114 | 115 | 116 | 117 | 118 | 119 | 120 |
| S(u) | 68 | 15 | 52 | 103 | 124 | 94 | 43 | 64 | 141 | 7 |
| U | 121 | 122 | 123 | 124 | 125 | 126 | 127 | 128 | 129 | 130 |
| S(u) | 104 | 55 | 75 | 115 | 47 | 20 | 33 | 59 | 13 | 71 |
| U | 131 | 132 | 133 | 134 | 135 | 136 | 137 | 138 | 139 | 140 |
| S(u) | 32 | 89 | 82 | 144 | 87 | 37 | 49 | 152 | 163 | 6 |
| U | 141 | 142 | 143 | 144 | 145 | 146 | 147 | 148 | 149 | 150 |
| S(u) | 119 | 65 | 88 | 134 | 81 | 23 | 97 | 17 | 107 | 151 |
| U | 151 | 152 | 153 | 154 | 155 | 156 | 157 | 158 | 159 | 160 |
| S(u) | 50 | 138 | 159 | 158 | 92 | 43 | 155 | 154 | 95 | 21 |
| U | 161 | 162 | 163 | 164 | 165 | 166 | 167 | 168 | 169 | 170 |
| S(u) | 99 | 145 | 139 | 133 | 61 | 91 | 5 | 5 | 139 | 153 |
| U | 171 | 172 | 173 | 174 | 175 | 176 | 177 | 178 | 179 | 180 |
| S(u) | 157 | 39 | 97 | 135 | 163 | 143 | 109 | 33 | 75 | 14 |
| U | 181 | 182 | 183 | 184 | 185 | 186 | 187 | 188 | 189 | 190 |
| S(u) | 51 | 83 | 55 | 114 | 127 | 9 | 166 | 58 | 111 | 53 |
| U | 191 | 192 | 193 | 194 | 195 | 196 | 197 | 198 | 199 | 200 |
| S(u) | 123 | 118 | 100 | 160 | 142 | 107 | 115 | 89 | 156 | 151 |
| U | 201 | 202 | 203 | 204 | 205 | 206 | 207 | 208 | 209 | 210 |
| S(u) | 96 | 54 | 62 | 37 | 45 | 57 | 77 | 121 | 4 | 4 |
| U | 211 | 212 | 213 | 214 | 215 | 216 | 217 | 218 | 219 | 220 |
| S(u) | 167 | 95 | 130 | 98 | 160 | 101 | 58 | 127 | 23 | 61 |
| U | 221 | 222 | 223 | 224 | 225 | 226 | 227 | 228 | 229 | 230 |
| S(u) | 19 | 34 | 79 | 15 | 41 | 26 | 85 | 92 | 11 | 62 |
| U | 231 | 232 | 233 | 234 | 235 | 236 | 237 | 238 | 239 | 240 |
| S(u) | 69 | 47 | 18 | 147 | 25 | 32 | 131 | 141 | 165 | 7 |
| U | 241 | 242 | 243 | 244 | 245 | 246 | 247 | 248 | 249 | 250 |
| S(u) | 94 | 52 | 145 | 55 | 113 | 133 | 17 | 159 | 155 | 47 |
| U | 251 | 252 | 253 | 254 | 255 | 256 | 257 | 258 | 259 | 260 |
| S(u) | 117 | 10 | 63 | 109 | 102 | 59 | 111 | 13 | 81 | 71 |
| U | 261 | 262 | 263 | 264 | 265 | 266 | 267 | 268 | 269 | 270 |
| S(u) | 45 | 16 | 67 | 89 | 19 | 41 | 22 | 72 | 131 | 87 |
| U | 271 | 272 | 273 | 274 | 275 | 276 | 277 | 278 | 279 | 280 |
| S(u) | 65 | 37 | 126 | 49 | 119 | 76 | 106 | 166 | 3 | 3 |
| U | 281 | 282 | 283 | 284 | 285 | 286 | 287 | 288 | 289 | 290 |
| S(u) | 3 | 119 | 83 | 65 | 53 | 44 | 38 | 67 | 90 | 81 |
| U | 291 | 292 | 293 | 294 | 295 | 296 | 297 | 298 | 299 | 300 |
| S(u) | 49 | 23 | 63 | 117 | 91 | 17 | 113 | 107 | 87 | 165 |
| U | 301 | 302 | 303 | 304 | 305 | 306 | 307 | 308 | 309 | 310 |
| S(u) | 131 | 25 | 36 | 69 | 11 | 85 | 41 | 79 | 19 | 46 |
| U | 311 | 312 | 313 | 314 | 315 | 316 | 317 | 318 | 319 | 320 |
| S(u) | 116 | 121 | 67 | 163 | 8 | 77 | 45 | 124 | 71 | 97 |
| U | 321 | 322 | 323 | 324 | 325 | 326 | 327 | 328 | 329 | 330 |
| S(u) | 115 | 99 | 13 | 101 | 111 | 157 | 59 | 110 | 51 | 150 |
| U | 331 | 332 | 333 | 334 | 335 | 336 | 337 | 338 | 339 | 340 |
| S(u) | 109 | 139 | 63 | 103 | 5 | 5 | 117 | 139 | 99 | 153 |
| U | 341 | 342 | 343 | 344 | 345 | 346 | 347 | 348 | 349 | 350 |
| S(u) | 155 | 157 | 159 | 100 | 107 | 97 | 162 | 135 | 113 | 163 |
| U | 351 | 352 | 353 | 354 | 355 | 356 | 357 | 358 | 359 | 360 |
| S(u) | 98 | 143 | 164 | 64 | 26 | 33 | 47 | 75 | 7 | 7 |
| U | 361 | 362 | 363 | 364 | 365 | 366 | 367 | 368 | 369 | 370 |
| S(u) | 86 | 51 | 104 | 136 | 154 | 149 | 16 | 57 | 25 | 161 |
| U | 371 | 372 | 373 | 374 | 375 | 376 | 377 | 378 | 379 | 380 |
| S(u) | 147 | 106 | 9 | 83 | 132 | 29 | 69 | 91 | 31 | 53 |
| U | 381 | 382 | 383 | 384 | 385 | 386 | 387 | 388 | 389 | 390 |
| S(u) | 11 | 123 | 46 | 59 | 85 | 50 | 13 | 80 | 110 | 71 |
| U | 391 | 392 | 393 | 394 | 395 | 396 | 397 | 398 | 399 | 400 |
| S(u) | 103 | 122 | 79 | 115 | 17 | 125 | 112 | 78 | 82 | 86 |
| U | 401 | 402 | 403 | 404 | 405 | 406 | 407 | 408 | 409 | 410 |
| S(u) | 136 | 48 | 127 | 27 | 29 | 31 | 101 | 146 | 80 | 88 |
| U | 411 | 412 | 413 | 414 | 415 | 416 | 417 | 418 | 419 | 420 |
| S(u) | 49 | 112 | 65 | 77 | 93 | 119 | 167 | 2 | 2 | 2 |
| U | 421 | 422 | 423 | 424 | 425 | 426 | 427 | 428 | 429 | 430 |
| S(u) | 2 | 167 | 119 | 93 | 77 | 65 | 112 | 49 | 88 | 80 |
| U | 431 | 432 | 433 | 434 | 435 | 436 | 437 | 438 | 439 | 440 |
| S(u) | 146 | 101 | 31 | 29 | 27 | 127 | 48 | 136 | 86 | 82 |
| U | 441 | 442 | 443 | 444 | 445 | 446 | 447 | 448 | 449 | 450 |
| S(u) | 78 | 112 | 125 | 17 | 115 | 79 | 122 | 103 | 71 | 110 |
| U | 451 | 452 | 453 | 454 | 455 | 456 | 457 | 458 | 459 | 460 |
| S(u) | 80 | 13 | 50 | 85 | 59 | 46 | 123 | 11 | 53 | 31 |
| U | 461 | 462 | 463 | 464 | 465 | 466 | 467 | 468 | 469 | 470 |
| S(u) | 91 | 69 | 29 | 132 | 83 | 9 | 106 | 147 | 161 | 25 |
| U | 471 | 472 | 473 | 474 | 475 | 476 | 477 | 478 | 479 | 480 |
| S(u) | 57 | 16 | 149 | 154 | 136 | 104 | 51 | 86 | 7 | 7 |
| U | 481 | 482 | 483 | 484 | 485 | 486 | 487 | 488 | 489 | 490 |
| S(u) | 75 | 47 | 33 | 26 | 64 | 164 | 143 | 98 | 163 | 113 |

TABLE 34-continued

Maximum value S(u) of each preamble sequence cyclic shift $N_{cs}$

| U | 491 | 492 | 493 | 494 | 495 | 496 | 497 | 498 | 499 | 500 |
|---|---|---|---|---|---|---|---|---|---|---|
| S(u) | 135 | 162 | 97 | 107 | 100 | 159 | 157 | 155 | 153 | 99 |
| U | 501 | 502 | 503 | 504 | 505 | 506 | 507 | 508 | 509 | 510 |
| S(u) | 139 | 117 | 5 | 5 | 103 | 63 | 139 | 109 | 150 | 51 |
| U | 511 | 512 | 513 | 514 | 515 | 516 | 517 | 518 | 519 | 520 |
| S(u) | 110 | 59 | 157 | 111 | 101 | 13 | 99 | 115 | 97 | 71 |
| U | 521 | 522 | 523 | 524 | 525 | 526 | 527 | 528 | 529 | 530 |
| S(u) | 124 | 45 | 77 | 8 | 163 | 67 | 121 | 116 | 46 | 19 |
| U | 531 | 532 | 533 | 534 | 535 | 536 | 537 | 538 | 539 | 540 |
| S(u) | 79 | 41 | 85 | 11 | 69 | 36 | 25 | 131 | 165 | 87 |
| U | 541 | 542 | 543 | 544 | 545 | 546 | 547 | 548 | 549 | 550 |
| S(u) | 107 | 113 | 17 | 91 | 117 | 63 | 23 | 49 | 81 | 90 |
| U | 551 | 552 | 553 | 554 | 555 | 556 | 557 | 558 | 559 | 560 |
| S(u) | 67 | 38 | 44 | 53 | 65 | 83 | 119 | 3 | 3 | 3 |
| U | 561 | 562 | 563 | 564 | 565 | 566 | 567 | 568 | 569 | 570 |
| S(u) | 166 | 106 | 76 | 119 | 49 | 126 | 37 | 65 | 87 | 131 |
| U | 571 | 572 | 573 | 574 | 575 | 576 | 577 | 578 | 579 | 580 |
| S(u) | 72 | 22 | 41 | 19 | 89 | 67 | 16 | 45 | 71 | 81 |
| U | 581 | 582 | 583 | 584 | 585 | 586 | 587 | 588 | 589 | 590 |
| S(u) | 13 | 111 | 59 | 102 | 109 | 63 | 10 | 117 | 47 | 155 |
| U | 591 | 592 | 593 | 594 | 595 | 596 | 597 | 598 | 599 | 600 |
| S(u) | 159 | 17 | 133 | 113 | 55 | 145 | 52 | 94 | 7 | 165 |
| U | 601 | 602 | 603 | 604 | 605 | 606 | 607 | 608 | 609 | 610 |
| S(u) | 141 | 131 | 32 | 25 | 147 | 18 | 47 | 69 | 62 | 11 |
| U | 611 | 612 | 613 | 614 | 615 | 616 | 617 | 618 | 619 | 620 |
| S(u) | 92 | 85 | 26 | 41 | 15 | 79 | 34 | 19 | 61 | 23 |
| U | 621 | 622 | 623 | 624 | 625 | 626 | 627 | 628 | 629 | 630 |
| S(u) | 127 | 58 | 101 | 160 | 98 | 130 | 95 | 167 | 4 | 4 |
| U | 631 | 632 | 633 | 634 | 635 | 636 | 637 | 638 | 639 | 640 |
| S(u) | 121 | 77 | 57 | 45 | 37 | 62 | 54 | 96 | 151 | 156 |
| U | 641 | 642 | 643 | 644 | 645 | 646 | 647 | 648 | 649 | 650 |
| S(u) | 89 | 115 | 107 | 142 | 160 | 100 | 118 | 123 | 53 | 111 |
| U | 651 | 652 | 653 | 654 | 655 | 656 | 657 | 658 | 659 | 660 |
| S(u) | 58 | 166 | 9 | 127 | 114 | 55 | 83 | 51 | 14 | 75 |
| U | 661 | 662 | 663 | 664 | 665 | 666 | 667 | 668 | 669 | 670 |
| S(u) | 33 | 109 | 143 | 163 | 135 | 97 | 39 | 157 | 153 | 139 |
| U | 671 | 672 | 673 | 674 | 675 | 676 | 677 | 678 | 679 | 680 |
| S(u) | 5 | 5 | 91 | 61 | 133 | 139 | 145 | 99 | 21 | 95 |
| U | 681 | 682 | 683 | 684 | 685 | 686 | 687 | 688 | 689 | 690 |
| S(u) | 154 | 155 | 43 | 92 | 158 | 159 | 138 | 50 | 151 | 107 |
| U | 691 | 692 | 693 | 694 | 695 | 696 | 697 | 698 | 699 | 700 |
| S(u) | 17 | 97 | 23 | 81 | 134 | 88 | 65 | 119 | 6 | 163 |
| U | 701 | 702 | 703 | 704 | 705 | 706 | 707 | 708 | 709 | 710 |
| S(u) | 152 | 49 | 37 | 87 | 144 | 82 | 89 | 32 | 71 | 13 |
| U | 711 | 712 | 713 | 714 | 715 | 716 | 717 | 718 | 719 | 720 |
| S(u) | 59 | 33 | 20 | 47 | 115 | 75 | 55 | 104 | 7 | 141 |
| U | 721 | 722 | 723 | 724 | 725 | 726 | 727 | 728 | 729 | 730 |
| S(u) | 64 | 43 | 94 | 124 | 103 | 52 | 15 | 68 | 61 | 77 |
| U | 731 | 732 | 733 | 734 | 735 | 736 | 737 | 738 | 739 | 740 |
| S(u) | 101 | 149 | 95 | 8 | 121 | 57 | 74 | 108 | 151 | 161 |
| U | 741 | 742 | 743 | 744 | 745 | 746 | 747 | 748 | 749 | 750 |
| S(u) | 137 | 147 | 35 | 53 | 116 | 9 | 73 | 83 | 28 | 66 |
| U | 751 | 752 | 753 | 754 | 755 | 756 | 757 | 758 | 759 | 760 |
| S(u) | 143 | 135 | 39 | 79 | 10 | 91 | 133 | 145 | 21 | 85 |
| U | 761 | 762 | 763 | 764 | 765 | 766 | 767 | 768 | 769 | 770 |
| S(u) | 43 | 109 | 11 | 123 | 34 | 23 | 35 | 130 | 12 | 73 |
| U | 771 | 772 | 773 | 774 | 775 | 776 | 777 | 778 | 779 | 780 |
| S(u) | 37 | 25 | 89 | 142 | 118 | 40 | 27 | 55 | 14 | 128 |
| U | 781 | 782 | 783 | 784 | 785 | 786 | 787 | 788 | 789 | 790 |
| S(u) | 29 | 103 | 15 | 61 | 31 | 95 | 113 | 148 | 151 | 137 |
| U | 791 | 792 | 793 | 794 | 795 | 796 | 797 | 798 | 799 | 800 |
| S(u) | 35 | 125 | 73 | 56 | 19 | 39 | 20 | 41 | 21 | 43 |
| U | 801 | 802 | 803 | 804 | 805 | 806 | 807 | 808 | 809 | 810 |
| S(u) | 22 | 68 | 70 | 24 | 74 | 127 | 105 | 27 | 28 | 29 |
| U | 811 | 812 | 813 | 814 | 815 | 816 | 817 | 818 | 819 | 820 |
| S(u) | 30 | 31 | 129 | 67 | 35 | 73 | 38 | 40 | 42 | 44 |
| U | 821 | 822 | 823 | 824 | 825 | 826 | 827 | 828 | 829 | 830 |
| S(u) | 93 | 148 | 105 | 56 | 60 | 129 | 70 | 76 | 84 | 93 |
| U | 831 | 832 | 833 | 834 | 835 | 836 | 837 | 838 | 0 | 0 |
| S(u) | 105 | 120 | 140 | 167 | 1 | 1 | 1 | 1 | 0 | 0 |

According to the calculation result of the maximum value of each preamble sequence cyclic shift $N_{cs}$, the ZC root sequence indexes are classified into 14 groups. The specific grouping situation and the common value range of each group of preamble sequence cyclic shifts $N_{cs}$ are shown in Table 35.

TABLE 35

Grouping situation of maximum values of preamble sequence cyclic shifts $N_{CS}$

| Common value range of $N_{CS}$ | ZC root sequence index |
|---|---|
| =1 | 1 2 3 4 835 836 837 838 418 419 420 421 279 280 281 558 559 560 209 210 629 630 167 168 335 336 503 504 671 672 140 699 120 240 359 360 479 480 599 719 105 315 524 734 93 186 373 466 653 746 84 252 587 755 76 229 305 381 458 534 610 763 70 769 129 258 323 387 452 516 581 710 60 180 659 779 56 112 224 615 727 783 262 367 472 577 |
| ≤17 | 148 247 296 395 444 543 592 691 233 606 44 221 265 309 530 574 618 795 |
| ≤20 | 42 126 713 797 40 80 160 679 759 799 38 267 572 801 73 146 219 292 547 620 693 766 |
| ≤24 | 35 804 67 235 302 369 470 537 604 772 226 355 484 613 31 62 404 435 777 808 |
| ≤28 | 30 90 749 809 29 58 376 405 434 463 781 810 28 811 27 54 379 406 433 460 785 812 131 236 603 708 127 178 356 483 661 712 |
| ≤34 | 74 222 617 765 24 48 72 96 743 767 791 815 303 536 68 136 204 272 567 635 703 771 22 287 552 817 43 86 172 667 753 796 |
| ≤40 | 21 63 776 818 41 225 266 307 532 573 614 798 20 819 39 78 117 156 683 722 761 800 19 286 553 820 205 261 317 522 578 634 310 383 456 529 125 232 250 357 482 589 607 714 |
| ≤48 | 402 437 137 274 291 411 428 548 565 702 151 386 453 688 181 329 362 477 510 658 113 242 597 726 95 190 285 380 459 554 649 744 202 637 61 122 183 244 595 656 717 778 15 45 794 824 |
| ≤57 | 103 206 368 471 633 736 188 217 622 651 128 256 327 384 455 512 583 711 14 825 55 110 165 220 619 674 729 784 203 230 |

TABLE 35-continued

Grouping situation of maximum values of preamble sequence cyclic shifts $N_{CS}$

| Common value range of $N_{CS}$ | ZC root sequence index |
|---|---|
| ≤70 | 609 636 253 293 333 506 546 586 118 354 485 721 142 271 284 413 426 555 568 697 89 750 25 263 288 313 526 551 576 814 37 111 728 802 231 304 377 462 535 608 12 36 803 827 130 260 319 390 449 520 579 709 268 571 23 46 69 92 747 770 793 816 34 102 737 805 123 179 358 481 660 716 11 276 563 828 109 207 316 414 425 523 632 730 398 441 85 223 308 393 446 531 616 754 388 409 430 451 145 259 290 549 580 694 133 399 440 706 91 182 283 374 465 556 657 748 |
| ≤84 | 10 829 79 227 306 385 454 533 612 760 361 400 439 478 135 270 299 540 569 704 143 410 429 696 66 132 198 264 575 641 707 773 289 550 83 166 295 378 461 544 673 756 155 228 611 684 9 18 415 424 821 830 116 241 598 723 53 106 159 212 627 680 733 786 201 638 147 173 320 346 493 519 666 692 214 351 488 625 161 322 339 500 517 678 |
| ≤100 | 193 344 495 646 108 216 324 407 432 515 623 731 255 584 57 114 334 391 448 505 725 782 121 363 476 718 8 16 32 807 823 831 277 372 467 562 149 196 298 345 494 541 643 690 101 738 77 177 254 331 508 585 662 762 328 389 450 511 189 257 325 514 582 650 397 412 427 442 52 245 297 349 490 542 594 787 184 655 124 197 321 394 445 518 642 715 |
| ≤116 | 94 311 528 745 251 294 337 502 545 588 64 192 647 775 141 275 282 416 423 557 564 698 7 832 104 208 312 527 631 735 392 447 75 191 382 457 648 764 115 318 521 724 47 396 443 792 273 566 33 185 218 403 436 621 654 806 59 780 13 26 813 826 71 213 626 768 237 269 301 538 570 602 375 464 82 164 246 593 675 757 144 695 87 174 348 491 665 752 364 401 438 475 49 98 741 790 |
| ≤138 | 152 687 163 169 332 338 501 507 670 676 6 833 119 238 601 720 65 195 644 774 88 176 352 487 663 751 134 705 81 162 243 596 677 758 408 431 97 234 371 468 605 742 17 51 788 822 107 366 473 732 330 509 50 100 150 200 639 689 739 789 138 701 170 340 499 669 158 365 474 681 157 249 341 498 590 682 199 640 171 326 342 497 513 668 154 685 153 248 343 496 591 686 194 215 624 645 99 370 469 740 347 492 139 175 314 350 489 525 664 700 353 486 239 300 539 600 187 278 561 652 5 211 417 422 628 834 |

Based on the result of grouping, the first group is discarded, and the maximum values of preamble sequence cyclic shifts $N_{cs}$ are selected from the value ranges of preamble sequence cyclic shifts No in the remaining 13 groups to form a preamble sequence cyclic shift set {17, 20, 24, 28, 34, 40, 48, 57, 70, 84, 100, 116, 138}. In the order from the smallest to largest values of the preamble sequence cyclic shifts $N_{cs}$, indexes 0 to 12 are allocated for the preamble sequence cyclic shifts $N_{cs}$, respectively. The eventually generated preamble sequence cyclic shift set is shown in Table 36.

TABLE 36

Preamble sequence cyclic shift set

| $N_{CS}$ configuration | $N_{CS}$ value |
|---|---|
| 0 | 17 |
| 1 | 20 |
| 2 | 24 |
| 3 | 28 |
| 4 | 34 |
| 5 | 40 |
| 6 | 48 |
| 7 | 57 |
| 8 | 70 |
| 9 | 84 |
| 10 | 100 |
| 11 | 116 |
| 12 | 138 |

TABLE 36-continued

Preamble sequence cyclic shift set

| $N_{CS}$ configuration | $N_{CS}$ value |
|---|---|
| 13 | — |
| 14 | — |
| 15 | — |

Specific Embodiment 26

Based on the specific embodiment 25, in this specific implementation, a cyclic shift sequence of a ZC sequence having a length of $N_{zc}$=839 is used as a preamble sequence; and when the sub-carrier spacing of the random access channel is Δf=1.25 kHz, Δf=2.5, or Δf=5 kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset, a preamble sequence cyclic shift set when the maximum degree of frequency offset is 1 time of the sub-carrier spacing of the random access channel and a preamble sequence cyclic shift set when the maximum degree of frequency offset is 2 times of the sub-carrier spacing of the random access channel are generated, respectively. The eventually generated preamble sequence cyclic shift sets are shown in Table 37. In Table 37, the set 0 represents a preamble sequence cyclic shift set when there is no or negligible frequency offset, the set 1 represents a preamble sequence cyclic shift set when the maximum frequency offset is 1 time of the sub-carrier spacing of the random access channel, and the set 2 represents a preamble sequence cyclic shift set when the maximum degree of frequency offset is 2 times of the sub-carrier spacing of the random access channel.

TABLE 37

Preamble sequence cyclic shift sets

| $N_{CS}$ configuration | $N_{CS}$ value | | |
|---|---|---|---|
| | Set 0 | Set 1 | Set 2 |
| 0 | 0 | 15 | 17 |
| 1 | 13 | 18 | 20 |
| 2 | 15 | 22 | 24 |
| 3 | 18 | 26 | 28 |
| 4 | 22 | 32 | 34 |
| 5 | 26 | 38 | 40 |
| 6 | 32 | 46 | 48 |
| 7 | 38 | 55 | 57 |
| 8 | 46 | 68 | 70 |
| 9 | 59 | 82 | 84 |
| 10 | 76 | 100 | 100 |
| 11 | 93 | 128 | 116 |
| 12 | 119 | 158 | 138 |
| 13 | 167 | 202 | — |
| 14 | 279 | 237 | — |
| 15 | 419 | — | — |

Based on the cell coverage demand, the value of the ZC sequence index and other conditions and in combination with different degrees of frequency offset, a preamble sequence cyclic shift set when there is no (or negligible) frequency offset and a preamble sequence cyclic shift set when the maximum degree of frequency offset is 2 times of the sub-carrier spacing of the random access channel are generated, respectively. The eventually generated preamble sequence cyclic shift sets are shown in Table 38. In Table 38, the set 0 represents a preamble sequence cyclic shift set when there is no or negligible frequency offset, and the set 1 represents a preamble sequence cyclic shift set when the maximum degree of frequency offset is 2 times of the sub-carrier spacing of the random access channel.

TABLE 38

Preamble sequence cyclic shift sets

| $N_{CS}$ configuration | $N_{CS}$ value | |
|---|---|---|
| | Set 0 | Set 1 |
| 0 | 0 | 17 |
| 1 | 13 | 20 |
| 2 | 15 | 24 |
| 3 | 18 | 28 |
| 4 | 22 | 34 |
| 5 | 26 | 40 |
| 6 | 32 | 48 |
| 7 | 38 | 57 |
| 8 | 46 | 70 |
| 9 | 59 | 84 |
| 10 | 76 | 100 |
| 11 | 93 | 116 |
| 12 | 119 | 138 |
| 13 | 167 | — |
| 14 | 279 | — |
| 15 | 419 | — |

TABLE 38-continued

Embodiment 17

When the maximum degree of frequency offset is 3 times of the sub-carrier spacing of the random access channel, during the random access process, a cyclic shift sequence of a ZC sequence having a length of $N_{zc}$ is used as a preamble sequence, and the uth (where $1 \leq u \leq N_{zc}-1$) root sequence is:

$$x_u(n) = e^{-j\frac{\pi u n(n+1)}{N_{ZC}}}, 0 \leq n \leq N_{ZC} - 1$$

where u is the index of the ZC sequence.

With regard to the uth ZC root sequence, when the degree of frequency offset is +1 time of the sub-carrier spacing of the random access channel, a cyclic shift having a size of $d_{u1}^+ = (1/u) \bmod N_{zc}$ is generated by the ZC sequence in time domain; when the degree of frequency offset is −1 time of the sub-carrier spacing of the random access channel, a cyclic shift having a size of $d_{u1}^- = (-1/u) \bmod N_{zc}$ is generated by the ZC sequence in time domain; when the degree of frequency offset is +2 times of the sub-carrier spacing of the random access channel, a cyclic shift having a size of $d_{u2}^+ = (2/u) \bmod N_{zc}$ is generated by the ZC sequence in time domain; when the degree of frequency offset is −2 times of the sub-carrier spacing of the random access channel, a cyclic shift having a size of $d_{u2}^- = (-2/u) \bmod N_{zc}$ is generated by the ZC sequence in time domain; when the degree of frequency offset is +3 times of the sub-carrier spacing of the random access channel, a cyclic shift having a size of $d_{u3}^+ = (3/u) \bmod N_{zc}$ is generated by the ZC sequence in time domain; and when the degree of frequency offset is −3 times of the sub-carrier spacing of the random access channel, a cyclic shift having a size of $d_{u3}^- = (-3/u) \bmod N_{zc}$ is generated by the ZC sequence in time domain.

During the detection of the preamble sequence, due to the distortion of the cyclic shift, false alarm peaks will be generated in the Power Delay Profile (PDP), and wrong cyclic shift duplicate windows thus occur. As shown in FIG. 43, in an actual system, there will be +1-time, +2-time and +3-time frequency offset signals and −1-time, −2-time and −3-time frequency offset signals, so that there will be six wrong cyclic shift search windows. Wherein, $C_0$ denotes a correct original cyclic shift search window, $C_{-1}$ denotes a wrong duplicate search window caused by the −1-time frequency offset, $C_{-2}$ denotes a wrong duplicate search window caused by the −2-time frequency offset, $C_{-3}$ denotes a wrong duplicate search window caused by the −3-time frequency offset, $C_{+1}$ denotes a wrong duplicate search window caused by the +1-time frequency offset, $C_{+2}$ denotes a wrong duplicate search window caused by the +2-time frequency offset, and $C_{+3}$ denotes a wrong duplicate search window caused by the +3-time frequency offset.

In this case, in order to avoid the mutual interference between sequences generated by a same root ZC sequence cyclic shift, the cyclic shift $N_{cs}$ needs to satisfy the following conditions: wrong search windows $C_{-1}$, $C_{-2}$, $C_{-3}$, $C_{+1}$, $C_{+2}$ and $C_{+3}$ of any cyclic shift ZC sequence are not overlapped with each other, not overlapped with the windows $C_{-1}$, $C_{-2}$, $C_{-3}$, $C_0$, $C_{+1}$, $C_{+2}$ and $C_{+3}$ of other cyclic shift ZC sequences, and not overlapped with the correct cyclic shift search window $C_0$ of this cyclic shift ZC sequence. This is defined as follows:

$$d_{u1} = \begin{cases} d_{u1}^+ & 0 \leq d_{u1}^+ < N_{ZC}/2 \\ N_{ZC} - d_{u1}^+ & \text{otherwise} \end{cases}$$

and $$d_{u2} = \begin{cases} d_{u2}^+ & 0 \leq d_{u2}^+ < N_{ZC}/2 \\ N_{ZC} - d_{u2}^+ & \text{otherwise} \end{cases}$$

and $$d_{u3} = \begin{cases} d_{u3}^+ & 0 \leq d_{u3}^+ < N_{ZC}/2 \\ N_{ZC} - d_{u3}^+ & \text{otherwise} \end{cases}$$

where $d_{u1}^+ = (1/u) \bmod N_{sc}$, $d_{u2}^+ = (2/u) \bmod N_{zc}$ and $d_{u3}^+ = (3/u) \bmod N_{zc}$. The final preamble sequence cyclic shift $N_{cs}$ needs to satisfy the following conditions:

$N_{cs} \leq d_{u1} \leq (N_{zc} - N_{cs})/2$ $N_{cs} \leq d_{u2} \leq (N_{zc} - N_{cs})/2$ $N_{cs} \leq d_{u3} \leq (N_{zc} - N_{cs})/2$ $N_{cs} \leq |d_{u1} - d_{u2}|$ $N_{cs} \leq |d_{u2} - d_{u3}|$ $N_{cs} \leq |d_{u3} - d_{u1}|$ In the formulae, $d_{u3}$ denotes a smaller one of the cyclic shift generated by the ZC sequence in time domain when the degree of frequency offset is +3 times of the sub-carrier spacing of the random access channel and the cyclic shift generated by the ZC sequence by the ZC sequence in time domain when the degree of frequency offset is -3 times of the sub-carrier spacing of the random access channel.

It is to be noted that, for different cell coverage demands, the conditions to be satisfied by the preamble sequence cyclic shift $N_{cs}$ are the same as the conditions described in Embodiment 14.

Based on the above conditions, the method for configuring a preamble sequence cyclic shift set specifically comprises the following steps:

step A (initial setting): the maximum number of allowable preamble sequence cyclic shifts $N_{cs}$ is determined as P;

step B: based on the length $N_{zc}$ of the ZC sequence, all indexes u ($1 \leq u \leq N_{zc} - 1$) of the ZC sequence are selected;

step C: for different indexes u of the ZC sequence and the degree of frequency offset, the value ranges of preamble sequence cyclic shifts $N_{cs}$ corresponding to all the indexes u of the ZC sequence are calculated, respectively; and step D: based on the $N_{zc} - 1$ value ranges of preamble sequence cyclic shifts $N_{cs}$ obtained in the step C, the indexes u of the ZC sequence are classified into Q groups ($Q \leq P$), the value ranges of preamble sequence cyclic shifts $N_{cs}$ corresponding to the groups are approximate to each other, and the intersection of the value ranges is not a null set. Based on different cell coverage demands, preamble sequence cyclic shifts $N_{cs}$ are selected from each common value range of preamble sequence cyclic shifts $N_{cs}$ in the groups to generate a final preamble sequence cyclic shift set containing Q elements, and each preamble sequence cyclic shift $N_{cs}$ is allocated with a unique index. The index No. is from 0 to Q−1.

During the selection of a preamble sequence cyclic shift $N_{cs}$ from each common value range of preamble sequence cyclic shifts $N_{cs}$, the selected preamble sequence cyclic shift $N_{cs}$ can be a preamble sequence cyclic shift $N_{cs}$ having a minimum value. Of course, the selection of the preamble sequence cyclic shift $N_{cs}$ is not limited thereto.

In this embodiment, when the preset generation conditions are the ZC sequence and the degree of frequency offset, in the step 601 of FIG. 38, all values of preamble sequence cyclic shifts $N_{cs}$ are determined according to the ZC sequence and the degree of frequency offset, specifically:

calculating, according to the ZC sequence and the degree of frequency offset, all values of preamble sequence cyclic shifts $N_{cs}$ corresponding to the uth ZC sequence, and classifying the u calculated values of preamble sequence cyclic shifts $N_{cs}$ into Q groups according to a preset value range of the preamble sequence cyclic shifts $N_{cs}$.

Step 602: A preset number of preamble sequence cyclic shifts $N_{cs}$ are selected from all values of preamble sequence cyclic shifts $N_{cs}$ to generate a preamble sequence cyclic shift set, specifically:

A preset number of preamble sequence cyclic shifts $N_{cs}$ are selected from all values of preamble sequence cyclic shifts $N_{cs}$ in each of the Q groups to generate a preamble sequence cyclic shift set.

The selection of a preset number of preamble sequence cyclic shifts NS from preamble sequence cyclic shifts $N_{cs}$ in each of the Q groups specifically is: selecting zero preamble sequence cyclic shift $N_{cs}$ or at least one preamble sequence cyclic shift $N_{cs}$.

In Embodiment 15, in the situation where the maximum degree of frequency offset is 3 time of the sub-carrier spacing of the random access channel, the following detailed description will be given by several specific embodiments.

Specific Embodiment 27

A cyclic shift sequence of a ZC sequence having a length of $N_{zc} = 139$ is used as a preamble sequence; and when the sub-carrier spacing of the random access channel is $\Delta f = 7.5$ kHz, $\Delta f = 15$ kHz, $\Delta f = 30$ kHz, $\Delta f = 60$ kHz or $\Delta f = 120$ kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence cyclic shift $N_{cs}$ is S(u). With regard to the root sequence index u ($1 \leq u \leq 138$) of the ZC sequence, the maximum value $N_{cs}$ of each preamble sequence cyclic shift S(u) is calculated, and the calculation result is shown in Table 39.

TABLE 39

Maximum value S(u) of each preamble sequence cyclic shift $N_{cs}$

| u | 1 | 2 | 3 | 4 | 5 | 6 | 7 | 8 | 9 | 10 | 11 | 12 |
|---|---|---|---|---|---|---|---|---|---|----|----|----|
| S(u) | 1 | 1 | 1 | 1 | 1 | 1 | 19 | 17 | 15 | 14 | 13 | 12 |
| U | 13 | 14 | 15 | 16 | 17 | 18 | 19 | 20 | 21 | 22 | 23 | 24 |
| S(u) | 11 | 10 | 9 | 9 | 8 | 8 | 7 | 7 | 13 | 19 | 6 | 6 |

TABLE 39-continued

Maximum value S(u) of each preamble sequence cyclic shift $N_{cs}$

| u | 25 | 26 | 27 | 28 | 29 | 30 | 31 | 32 | 33 | 34 | 35 | 36 |
|---|---|---|---|---|---|---|---|---|---|---|---|---|
| S(u) | 11 | 16 | 5 | 5 | 5 | 14 | 9 | 13 | 17 | 4 | 4 | 4 |
| u | 37 | 38 | 39 | 40 | 41 | 42 | 43 | 44 | 45 | 46 | 47 | 48 |
| S(u) | 15 | 11 | 7 | 7 | 17 | 10 | 13 | 19 | 3 | 3 | 3 | 3 |
| u | 49 | 50 | 51 | 52 | 53 | 54 | 55 | 56 | 57 | 58 | 59 | 60 |
| S(u) | 17 | 11 | 11 | 8 | 13 | 18 | 5 | 5 | 17 | 12 | 7 | 7 |
| u | 61 | 62 | 63 | 64 | 65 | 66 | 67 | 68 | 69 | 70 | 71 | 72 |
| S(u) | 16 | 9 | 11 | 13 | 15 | 19 | 2 | 2 | 2 | 2 | 2 | 2 |
| u | 73 | 74 | 75 | 76 | 77 | 78 | 79 | 80 | 81 | 82 | 83 | 84 |
| S(u) | 19 | 15 | 13 | 11 | 9 | 16 | 7 | 7 | 12 | 17 | 5 | 5 |
| u | 85 | 86 | 87 | 88 | 89 | 90 | 91 | 92 | 93 | 94 | 95 | 96 |
| S(u) | 18 | 13 | 8 | 11 | 11 | 17 | 3 | 3 | 3 | 3 | 19 | 13 |
| u | 97 | 98 | 99 | 100 | 101 | 102 | 103 | 104 | 105 | 106 | 107 | 108 |
| S(u) | 10 | 17 | 7 | 7 | 11 | 15 | 4 | 4 | 4 | 17 | 13 | 9 |
| u | 109 | 110 | 111 | 112 | 113 | 114 | 115 | 116 | 117 | 118 | 119 | 120 |
| S(u) | 14 | 5 | 5 | 5 | 16 | 11 | 6 | 6 | 19 | 13 | 7 | 7 |
| u | 121 | 122 | 123 | 124 | 125 | 126 | 127 | 128 | 129 | 130 | 131 | 132 |
| S(u) | 8 | 8 | 9 | 9 | 10 | 11 | 12 | 13 | 14 | 15 | 17 | 19 |
| u | 133 | 134 | 135 | 136 | 137 | 138 | | | | | | |
| S(u) | 1 | 1 | 1 | 1 | 1 | 1 | | | | | | |

According to the calculation result of the maximum value of each preamble sequence cyclic shift $N_{cs}$, the ZC root sequence indexes are classified into 8 groups. The specific grouping situation and the common value range of each group of preamble sequence cyclic shifts $N_{cs}$ are shown in Table 40.

TABLE 40

Grouping situation of maximum values of each preamble sequence $N_{CS}$

| Common value range of $N_{CS}$ | ZC root sequence index |
|---|---|
| =1 | 1, 138, 2, 137, 3, 136, 4, 135, 5, 134, 6, 133, 67, 72, 68, 71, 69, 70 |
| ≤3 | 45, 94, 46, 93, 47, 92, 48, 91, 34, 105, 35, 104, 36,103 |
| ≤5 | 27, 112, 28, 111, 29, 110, 55, 84, 56, 83, 23, 116, 24, 115 |
| ≤7 | 19, 120, 20, 119, 39, 100, 40, 99, 59, 80, 60, 79, 17, 122, 18, 121, 52, 87 |
| ≤9 | 15, 124, 16, 123, 31, 108, 62, 77, 14, 125, 42, 97 |
| ≤11 | 13, 126, 25, 114, 38, 101, 50, 89, 51, 88, 63, 76, 12, 127, 58, 81 |
| ≤13 | 11, 128, 21, 118, 32, 107, 43, 96, 53, 86, 64, 75, 10, 129, 30, 109, 9, 130, 37, 102, 65, 74 |
| ≤16 | 26, 113, 61, 78, 8, 131, 33, 106, 41, 98, 49, 90, 57, 82, 54, 85, 7, 132, 22, 117, 44, 95, 66, 73 |

Based on the grouping result, the first group is discarded, and the maximum values of preamble sequence cyclic shifts $N_{cs}$ are selected from the value ranges of preamble sequence cyclic shifts $N_{cs}$ in the remaining 7 groups to form a preamble sequence cyclic shift set {3, 5, 7, 9, 11, 13, 16}. In the order from the smallest to largest values of the preamble sequence cyclic shifts $N_{cs}$, indexes 0 to 6 are allocated for the preamble sequence cyclic shifts $N_{cs}$, respectively. The eventually generated preamble sequence cyclic shift set is shown in Table 41.

TABLE 41

Preamble sequence cyclic shift set

| $N_{CS}$ configuration | $N_{CS}$ value |
|---|---|
| 0 | 3 |
| 1 | 5 |
| 2 | 7 |
| 3 | 9 |

TABLE 41-continued

Preamble sequence cyclic shift set

| $N_{CS}$ configuration | $N_{CS}$ value |
|---|---|
| 4 | 11 |
| 5 | 13 |
| 6 | 16 |
| 7 | — |
| 8 | — |
| 9 | — |
| 10 | — |
| 11 | — |
| 12 | — |
| 13 | — |
| 14 | — |
| 15 | — |

Specific Embodiment 28

Based on the specific embodiments 3, 4, 10 and 14, in this specific embodiment, a cyclic shift sequence of a ZC sequence having a length of $N_{zc}$=139 is used as a preamble sequence; and when the sub-carrier spacing of the random access channel is Δf=7.5 kHz, Δf=15 kHz, Δf=30 kHz, Δf=60 kHz or Δf=120 kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset, a preamble sequence cyclic shift set when the maximum degree of frequency offset is 1 time of the sub-carrier spacing of the random access channel, a preamble sequence cyclic shift set when the maximum degree of frequency offset is 2 times of the sub-carrier spacing of the random access channel and a preamble sequence cyclic shift set when the maximum degree of frequency offset is 3 times of the sub-carrier spacing of the random access channel are generated, respectively. The eventually generated preamble sequence cyclic shift sets are shown in Table 42. In Table 42, the set 3 represents a preamble sequence cyclic shift set when the maximum degree of frequency offset is 3 times of the sub-carrier spacing of the random access channel.

TABLE 42

Preamble sequence cyclic shift sets

| $N_{CS}$ configuration | $N_{CS}$ value Set 0 | Set 1 | Set 2 | Set 3 |
|---|---|---|---|---|
| 0 | 2 | 3 | 3 | 3 |
| 1 | 4 | 5 | 5 | 5 |
| 2 | 6 | 7 | 7 | 7 |
| 3 | 8 | 9 | 9 | 9 |
| 4 | 10 | 11 | 11 | 11 |
| 5 | 12 | 13 | 14 | 13 |
| 6 | 15 | 16 | 17 | 16 |
| 7 | 18 | 20 | 21 | — |
| 8 | 22 | 24 | — | — |
| 9 | 26 | 30 | — | — |
| 10 | 31 | 37 | — | — |
| 11 | 36 | — | — | — |
| 12 | — | — | — | — |
| 13 | — | — | — | — |
| 14 | — | — | — | — |
| 15 | — | — | — | — |

Specific Embodiment 29

A cyclic shift sequence of a ZC sequence having a length of $N_{zc}=839$ is used as a preamble sequence; and when the sub-carrier spacing of the random access channel is $\Delta f=1.25$ kHz, $\Delta f=2.5$ kHz or $\Delta f=5$ kHz, a preferred method for configuring a preamble sequence cyclic shift set specifically comprises the following steps.

The maximum number of allowable preamble sequence cyclic shifts $N_{cs}$ is determined as 16.

When the length of the ZC root sequence is $N_{zc}$ and the root sequence index is u, the maximum value of each preamble sequence cyclic shift $N_{cs}$ is S(u). With regard to the root sequence index u ($1 \leq u \leq 838$) of the ZC sequence, the maximum value $N_{cs}$ of each preamble sequence cyclic shift S(u) is calculated, and the calculation result is shown in Table 43.

TABLE 43

Maximum value S(u) of each preamble sequence cyclic shift $N_{cs}$

| U | 1 | 2 | 3 | 4 | 5 | 6 | 7 | 8 | 9 | 10 |
|---|---|---|---|---|---|---|---|---|---|---|
| S(u) | 1 | 1 | 1 | 1 | 1 | 1 | 119 | 105 | 93 | 84 |
| U | 11 | 12 | 13 | 14 | 15 | 16 | 17 | 18 | 19 | 20 |
| S(u) | 76 | 70 | 65 | 60 | 56 | 105 | 49 | 93 | 44 | 42 |
| U | 21 | 22 | 23 | 24 | 25 | 26 | 27 | 28 | 29 | 30 |
| S(u) | 40 | 38 | 73 | 35 | 67 | 97 | 31 | 30 | 29 | 28 |
| U | 31 | 32 | 33 | 34 | 35 | 36 | 37 | 38 | 39 | 40 |
| S(u) | 27 | 105 | 51 | 74 | 24 | 70 | 68 | 22 | 43 | 21 |
| U | 41 | 42 | 43 | 44 | 45 | 46 | 47 | 48 | 49 | 50 |
| S(u) | 41 | 20 | 39 | 19 | 56 | 73 | 107 | 35 | 17 | 67 |
| U | 51 | 52 | 53 | 54 | 55 | 56 | 57 | 58 | 59 | 60 |
| S(u) | 33 | 113 | 95 | 31 | 61 | 15 | 103 | 29 | 71 | 14 |
| U | 61 | 62 | 63 | 64 | 65 | 66 | 67 | 68 | 69 | 70 |
| S(u) | 55 | 27 | 40 | 118 | 13 | 89 | 25 | 37 | 73 | 12 |
| U | 71 | 72 | 73 | 74 | 75 | 76 | 77 | 78 | 79 | 80 |
| S(u) | 59 | 35 | 23 | 34 | 56 | 11 | 98 | 43 | 85 | 21 |
| U | 81 | 82 | 83 | 84 | 85 | 86 | 87 | 88 | 89 | 90 |
| S(u) | 31 | 41 | 91 | 10 | 79 | 39 | 29 | 19 | 66 | 28 |
| U | 91 | 92 | 93 | 94 | 95 | 96 | 97 | 98 | 99 | 100 |
| S(u) | 83 | 73 | 9 | 116 | 53 | 35 | 26 | 77 | 17 | 42 |
| U | 101 | 102 | 103 | 104 | 105 | 106 | 107 | 108 | 109 | 110 |
| S(u) | 108 | 74 | 57 | 113 | 8 | 95 | 47 | 101 | 77 | 61 |
| U | 111 | 112 | 113 | 114 | 115 | 116 | 117 | 118 | 119 | 120 |
| S(u) | 68 | 15 | 52 | 81 | 73 | 94 | 43 | 64 | 7 | 7 |
| U | 121 | 122 | 123 | 124 | 125 | 126 | 127 | 128 | 129 | 130 |
| S(u) | 104 | 55 | 75 | 88 | 47 | 20 | 33 | 59 | 13 | 71 |
| U | 131 | 132 | 133 | 134 | 135 | 136 | 137 | 138 | 139 | 140 |
| S(u) | 32 | 89 | 82 | 25 | 87 | 37 | 49 | 73 | 6 | 6 |
| U | 141 | 142 | 143 | 144 | 145 | 146 | 147 | 148 | 149 | 150 |
| S(u) | 119 | 65 | 88 | 35 | 81 | 23 | 97 | 17 | 107 | 28 |
| U | 151 | 152 | 153 | 154 | 155 | 156 | 157 | 158 | 159 | 160 |
| S(u) | 50 | 11 | 11 | 49 | 92 | 43 | 16 | 69 | 95 | 21 |
| U | 161 | 162 | 163 | 164 | 165 | 166 | 167 | 168 | 169 | 170 |
| S(u) | 99 | 57 | 36 | 87 | 61 | 91 | 5 | 5 | 5 | 74 |
| U | 171 | 172 | 173 | 174 | 175 | 176 | 177 | 178 | 179 | 180 |
| S(u) | 54 | 39 | 97 | 82 | 24 | 62 | 109 | 33 | 75 | 14 |
| U | 181 | 182 | 183 | 184 | 185 | 186 | 187 | 188 | 189 | 190 |
| S(u) | 51 | 83 | 55 | 114 | 68 | 9 | 9 | 58 | 71 | 53 |
| U | 191 | 192 | 193 | 194 | 195 | 196 | 197 | 198 | 199 | 200 |
| S(u) | 101 | 83 | 100 | 13 | 43 | 107 | 115 | 89 | 59 | 21 |
| U | 201 | 202 | 203 | 204 | 205 | 206 | 207 | 208 | 209 | 210 |
| S(u) | 96 | 54 | 62 | 37 | 45 | 57 | 77 | 117 | 4 | 4 |
| U | 211 | 212 | 213 | 214 | 215 | 216 | 217 | 218 | 219 | 220 |
| S(u) | 4 | 91 | 63 | 98 | 39 | 101 | 58 | 77 | 23 | 61 |
| U | 221 | 222 | 223 | 224 | 225 | 226 | 227 | 228 | 229 | 230 |
| S(u) | 19 | 34 | 79 | 15 | 41 | 26 | 85 | 92 | 11 | 62 |
| U | 231 | 232 | 233 | 234 | 235 | 236 | 237 | 238 | 239 | 240 |
| S(u) | 69 | 47 | 18 | 43 | 25 | 32 | 46 | 67 | 7 | 7 |
| U | 241 | 242 | 243 | 244 | 245 | 246 | 247 | 248 | 249 | 250 |
| S(u) | 94 | 52 | 38 | 55 | 113 | 58 | 17 | 44 | 64 | 47 |
| U | 251 | 252 | 253 | 254 | 255 | 256 | 257 | 258 | 259 | 260 |
| S(u) | 117 | 10 | 63 | 109 | 102 | 59 | 111 | 13 | 81 | 71 |
| U | 261 | 262 | 263 | 264 | 265 | 266 | 267 | 268 | 269 | 270 |
| S(u) | 45 | 16 | 67 | 89 | 19 | 41 | 22 | 72 | 53 | 87 |
| U | 271 | 272 | 273 | 274 | 275 | 276 | 277 | 278 | 279 | 280 |
| S(u) | 65 | 37 | 83 | 49 | 61 | 76 | 103 | 3 | 3 | 3 |
| U | 281 | 282 | 283 | 284 | 285 | 286 | 287 | 288 | 289 | 290 |
| S(u) | 3 | 119 | 83 | 65 | 53 | 44 | 38 | 67 | 90 | 81 |
| U | 291 | 292 | 293 | 294 | 295 | 296 | 297 | 298 | 299 | 300 |
| S(u) | 49 | 23 | 63 | 117 | 91 | 17 | 113 | 76 | 87 | 14 |
| U | 301 | 302 | 303 | 304 | 305 | 306 | 307 | 308 | 309 | 310 |
| S(u) | 92 | 25 | 36 | 69 | 11 | 85 | 41 | 79 | 19 | 46 |
| U | 311 | 312 | 313 | 314 | 315 | 316 | 317 | 318 | 319 | 320 |
| S(u) | 116 | 78 | 67 | 8 | 8 | 77 | 45 | 95 | 71 | 97 |
| U | 321 | 322 | 323 | 324 | 325 | 326 | 327 | 328 | 329 | 330 |
| S(u) | 115 | 86 | 13 | 101 | 111 | 18 | 59 | 110 | 51 | 61 |
| U | 331 | 332 | 333 | 334 | 335 | 336 | 337 | 338 | 339 | 340 |
| S(u) | 109 | 48 | 63 | 103 | 5 | 5 | 117 | 72 | 99 | 37 |
| U | 341 | 342 | 343 | 344 | 345 | 346 | 347 | 348 | 349 | 350 |
| S(u) | 32 | 27 | 22 | 100 | 107 | 97 | 29 | 41 | 113 | 12 |
| U | 351 | 352 | 353 | 354 | 355 | 356 | 357 | 358 | 359 | 360 |
| S(u) | 98 | 31 | 19 | 64 | 26 | 33 | 47 | 75 | 7 | 7 |
| U | 361 | 362 | 363 | 364 | 365 | 366 | 367 | 368 | 369 | 370 |
| S(u) | 86 | 51 | 104 | 53 | 23 | 55 | 16 | 57 | 25 | 34 |
| U | 371 | 372 | 373 | 374 | 375 | 376 | 377 | 378 | 379 | 380 |
| S(u) | 52 | 106 | 9 | 83 | 47 | 29 | 69 | 91 | 31 | 53 |
| U | 381 | 382 | 383 | 384 | 385 | 386 | 387 | 388 | 389 | 390 |
| S(u) | 11 | 112 | 46 | 59 | 85 | 50 | 13 | 80 | 110 | 71 |
| U | 391 | 392 | 393 | 394 | 395 | 396 | 397 | 398 | 399 | 400 |
| S(u) | 103 | 107 | 79 | 66 | 17 | 89 | 93 | 78 | 82 | 86 |
| U | 401 | 402 | 403 | 404 | 405 | 406 | 407 | 408 | 409 | 410 |
| S(u) | 23 | 48 | 102 | 27 | 29 | 31 | 101 | 37 | 80 | 88 |
| U | 411 | 412 | 413 | 414 | 415 | 416 | 417 | 418 | 419 | 420 |
| S(u) | 49 | 112 | 65 | 77 | 93 | 119 | 2 | 2 | 2 | 2 |
| U | 421 | 422 | 423 | 424 | 425 | 426 | 427 | 428 | 429 | 430 |
| S(u) | 2 | 2 | 119 | 93 | 77 | 65 | 112 | 49 | 88 | 80 |
| U | 431 | 432 | 433 | 434 | 435 | 436 | 437 | 438 | 439 | 440 |
| S(u) | 37 | 101 | 31 | 29 | 27 | 102 | 48 | 23 | 86 | 82 |
| U | 441 | 442 | 443 | 444 | 445 | 446 | 447 | 448 | 449 | 450 |
| S(u) | 78 | 93 | 89 | 17 | 66 | 79 | 107 | 103 | 71 | 110 |
| U | 451 | 452 | 453 | 454 | 455 | 456 | 457 | 458 | 459 | 460 |
| S(u) | 80 | 13 | 50 | 85 | 59 | 46 | 112 | 11 | 53 | 31 |
| U | 461 | 462 | 463 | 464 | 465 | 466 | 467 | 468 | 469 | 470 |
| S(u) | 91 | 69 | 29 | 47 | 83 | 9 | 106 | 52 | 34 | 25 |
| U | 471 | 472 | 473 | 474 | 475 | 476 | 477 | 478 | 479 | 480 |
| S(u) | 57 | 16 | 55 | 23 | 53 | 104 | 51 | 86 | 7 | 7 |
| U | 481 | 482 | 483 | 484 | 485 | 486 | 487 | 488 | 489 | 490 |
| S(u) | 75 | 47 | 33 | 26 | 64 | 19 | 31 | 98 | 12 | 113 |
| U | 491 | 492 | 493 | 494 | 495 | 496 | 497 | 498 | 499 | 500 |
| S(u) | 41 | 29 | 97 | 107 | 100 | 22 | 27 | 32 | 37 | 99 |
| U | 501 | 502 | 503 | 504 | 505 | 506 | 507 | 508 | 509 | 510 |
| S(u) | 72 | 117 | 5 | 5 | 103 | 63 | 48 | 109 | 61 | 51 |
| U | 511 | 512 | 513 | 514 | 515 | 516 | 517 | 518 | 519 | 520 |
| S(u) | 110 | 59 | 18 | 111 | 101 | 13 | 86 | 115 | 97 | 71 |

TABLE 43-continued

Maximum value S(u) of each preamble sequence cyclic shift $N_{cs}$

| U | 521 | 522 | 523 | 524 | 525 | 526 | 527 | 528 | 529 | 530 |
|---|---|---|---|---|---|---|---|---|---|---|
| S(u) | 95 | 45 | 77 | 8 | 8 | 67 | 78 | 116 | 46 | 19 |
| U | 531 | 532 | 533 | 534 | 535 | 536 | 537 | 538 | 539 | 540 |
| S(u) | 79 | 41 | 85 | 11 | 69 | 36 | 25 | 92 | 14 | 87 |
| U | 541 | 542 | 543 | 544 | 545 | 546 | 547 | 548 | 549 | 550 |
| S(u) | 76 | 113 | 17 | 91 | 117 | 63 | 23 | 49 | 81 | 90 |
| U | 551 | 552 | 553 | 554 | 555 | 556 | 557 | 558 | 559 | 560 |
| S(u) | 67 | 38 | 44 | 53 | 65 | 83 | 119 | 3 | 3 | 3 |
| U | 561 | 562 | 563 | 564 | 565 | 566 | 567 | 568 | 569 | 570 |
| S(u) | 3 | 103 | 76 | 61 | 49 | 83 | 37 | 65 | 87 | 53 |
| U | 571 | 572 | 573 | 574 | 575 | 576 | 577 | 578 | 579 | 580 |
| S(u) | 72 | 22 | 41 | 19 | 89 | 67 | 16 | 45 | 71 | 81 |
| U | 581 | 582 | 583 | 584 | 585 | 586 | 587 | 588 | 589 | 590 |
| S(u) | 13 | 111 | 59 | 102 | 109 | 63 | 10 | 117 | 47 | 64 |
| U | 591 | 592 | 593 | 594 | 595 | 596 | 597 | 598 | 599 | 600 |
| S(u) | 44 | 17 | 58 | 113 | 55 | 38 | 52 | 94 | 7 | 7 |
| U | 601 | 602 | 603 | 604 | 605 | 606 | 607 | 608 | 609 | 610 |
| S(u) | 67 | 46 | 32 | 25 | 43 | 18 | 47 | 69 | 62 | 11 |
| U | 611 | 612 | 613 | 614 | 615 | 616 | 617 | 618 | 619 | 620 |
| S(u) | 92 | 85 | 26 | 41 | 15 | 79 | 34 | 19 | 61 | 23 |
| U | 621 | 622 | 623 | 624 | 625 | 626 | 627 | 628 | 629 | 630 |
| S(u) | 77 | 58 | 101 | 39 | 98 | 63 | 91 | 4 | 4 | 4 |
| U | 631 | 632 | 633 | 634 | 635 | 636 | 637 | 638 | 639 | 640 |
| S(u) | 117 | 77 | 57 | 45 | 37 | 62 | 54 | 96 | 21 | 59 |
| U | 641 | 642 | 643 | 644 | 645 | 646 | 647 | 648 | 649 | 650 |
| S(u) | 89 | 115 | 107 | 43 | 13 | 100 | 83 | 101 | 53 | 71 |
| U | 651 | 652 | 653 | 654 | 655 | 656 | 657 | 658 | 659 | 660 |
| S(u) | 58 | 9 | 9 | 68 | 114 | 55 | 83 | 51 | 14 | 75 |
| U | 661 | 662 | 663 | 664 | 665 | 666 | 667 | 668 | 669 | 670 |
| S(u) | 33 | 109 | 62 | 24 | 82 | 97 | 39 | 54 | 74 | 5 |
| U | 671 | 672 | 673 | 674 | 675 | 676 | 677 | 678 | 679 | 680 |
| S(u) | 5 | 5 | 91 | 61 | 87 | 36 | 57 | 99 | 21 | 95 |
| U | 681 | 682 | 683 | 684 | 685 | 686 | 687 | 688 | 689 | 690 |
| S(u) | 69 | 16 | 43 | 92 | 49 | 11 | 11 | 50 | 28 | 107 |
| U | 691 | 692 | 693 | 694 | 695 | 696 | 697 | 698 | 699 | 700 |
| S(u) | 17 | 97 | 23 | 81 | 35 | 88 | 65 | 119 | 6 | 6 |
| U | 701 | 702 | 703 | 704 | 705 | 706 | 707 | 708 | 709 | 710 |
| S(u) | 73 | 49 | 37 | 87 | 25 | 82 | 89 | 32 | 71 | 13 |
| U | 711 | 712 | 713 | 714 | 715 | 716 | 717 | 718 | 719 | 720 |
| S(u) | 59 | 33 | 20 | 47 | 88 | 75 | 55 | 104 | 7 | 7 |
| U | 721 | 722 | 723 | 724 | 725 | 726 | 727 | 728 | 729 | 730 |
| S(u) | 64 | 43 | 94 | 73 | 81 | 52 | 15 | 68 | 61 | 77 |
| U | 731 | 732 | 733 | 734 | 735 | 736 | 737 | 738 | 739 | 740 |
| S(u) | 101 | 47 | 95 | 8 | 113 | 57 | 74 | 108 | 42 | 17 |
| U | 741 | 742 | 743 | 744 | 745 | 746 | 747 | 748 | 749 | 750 |
| S(u) | 77 | 26 | 35 | 53 | 116 | 9 | 73 | 83 | 28 | 66 |
| U | 751 | 752 | 753 | 754 | 755 | 756 | 757 | 758 | 759 | 760 |
| S(u) | 19 | 29 | 39 | 79 | 10 | 91 | 41 | 31 | 21 | 85 |
| U | 761 | 762 | 763 | 764 | 765 | 766 | 767 | 768 | 769 | 770 |
| S(u) | 43 | 98 | 11 | 56 | 34 | 23 | 35 | 59 | 12 | 73 |
| U | 771 | 772 | 773 | 774 | 775 | 776 | 777 | 778 | 779 | 780 |
| S(u) | 37 | 25 | 89 | 13 | 118 | 40 | 27 | 55 | 14 | 71 |
| U | 781 | 782 | 783 | 784 | 785 | 786 | 787 | 788 | 789 | 790 |
| S(u) | 29 | 103 | 15 | 61 | 31 | 95 | 113 | 33 | 67 | 17 |
| U | 791 | 792 | 793 | 794 | 795 | 796 | 797 | 798 | 799 | 800 |
| S(u) | 35 | 107 | 73 | 56 | 19 | 39 | 20 | 41 | 21 | 43 |
| U | 801 | 802 | 803 | 804 | 805 | 806 | 807 | 808 | 809 | 810 |
| S(u) | 22 | 68 | 70 | 24 | 74 | 51 | 105 | 27 | 28 | 29 |
| U | 811 | 812 | 813 | 814 | 815 | 816 | 817 | 818 | 819 | 820 |
| S(u) | 30 | 31 | 97 | 67 | 35 | 73 | 38 | 40 | 42 | 44 |
| U | 821 | 822 | 823 | 824 | 825 | 826 | 827 | 828 | 829 | 830 |
| S(u) | 93 | 49 | 105 | 56 | 60 | 65 | 70 | 76 | 84 | 93 |
| U | 831 | 832 | 833 | 834 | 835 | 836 | 837 | 838 | | |
| S(u) | 105 | 119 | 1 | 1 | 1 | 1 | 1 | 1 | | |

According to the calculation result of the maximum value of each preamble sequence cyclic shift $N_{cs}$, the ZC root sequence indexes are classified into 13 groups. The specific grouping situation and the common value range of each group of preamble sequence cyclic shifts $N_{cs}$ are shown in Table 44.

TABLE 44

Grouping situation of maximum values of preamble sequence cyclic shifts $N_{CS}$

| Common value range of $N_{CS}$ | ZC root sequence index |
|---|---|
| =1 | 1 2 3 4 5 6 833 834 835 836 837 838 417 418 419 420 421 422 278 279 280 281 558 559 560 561 209 210 211 628 629 630 167 168 169 335 336 503 504 670 671 672 139 140 699 700 119 120 239 240 359 360 479 480 599 600 719 720 105 314 315 524 525 734 93 186 187 373 466 652 653 746 84 252 587 755 76 152 153 229 305 381 458 534 610 686 687 763 70 350 489 769 65 129 194 258 323 387 452 516 581 645 710 774 60 180 300 539 659 779 56 112 224 615 727 783 157 262 367 472 577 682 49 99 148 247 296 395 444 543 592 691 740 790 233 326 513 606 |
| ≤19 | 44 88 221 265 309 353 486 530 574 618 751 795 42 126 713 797 40 80 160 200 639 679 759 799 |
| ≤22 | 38 267 343 496 572 801 73 146 219 292 365 401 438 474 547 620 693 766 35 175 664 804 |
| ≤26 | 97 226 355 484 613 742 31 62 342 404 435 497 777 808 30 90 150 689 749 809 29 58 87 347 376 405 434 463 492 752 781 810 |
| ≤30 | 28 811 27 54 81 352 379 406 433 460 487 758 785 812 131 236 341 498 603 708 51 127 178 356 483 661 712 788 74 222 370 469 617 765 24 48 72 96 144 695 743 767 791 815 |
| ≤36 | 163 303 536 676 68 136 204 272 340 408 431 499 567 635 703 771 22 243 287 552 596 817 43 86 172 215 624 667 753 796 21 63 776 818 41 82 225 266 307 348 491 532 573 614 757 798 |
| ≤42 | 20 100 739 819 39 78 117 156 195 234 605 644 683 722 761 800 19 248 286 553 591 820 205 261 317 522 578 634 237 310 383 456 529 602 107 125 232 250 357 375 464 482 589 607 714 732 332 402 437 507 17 137 154 274 291 411 428 548 565 685 702 822 |
| ≤50 | 151 386 453 688 33 181 329 362 477 510 658 806 113 242 371 468 597 726 95 190 269 285 364 380 459 475 554 570 649 744 171 202 637 668 61 122 183 244 366 473 595 656 717 778 15 45 75 764 794 824 103 162 206 368 471 633 677 736 188 217 246 593 622 651 |
| ≤59 | 71 128 199 256 327 384 455 512 583 640 711 768 14 825 55 110 165 220 275 330 509 564 619 674 729 784 176 203 230 609 636 663 213 253 293 333 506 546 586 626 118 249 354 485 590 721 13 142 271 284 413 426 555 568 697 826 89 394 445 750 25 50 238 263 288 313 526 551 576 601 789 814 |
| ≤68 | 37 111 185 654 728 802 158 231 304 377 462 535 608 681 12 36 803 827 59 130 189 260 319 390 449 520 579 650 709 780 268 338 501 571 23 46 69 92 115 138 701 724 747 770 793 816 34 102 170 669 737 805 123 179 358 481 660 716 11 276 298 541 563 828 98 109 207 218 316 414 425 523 621 632 730 741 |
| ≤78 | 312 398 441 527 85 223 308 393 446 531 616 754 388 409 430 451 114 145 259 290 549 580 694 725 133 174 399 440 665 706 91 182 192 273 283 374 465 556 566 647 657 748 10 829 79 227 306 385 454 533 612 760 322 361 400 439 478 517 135 164 270 299 540 569 675 704 124 143 410 429 696 715 |
| ≤89 | 66 132 198 264 396 443 575 641 707 773 289 550 83 166 212 295 378 461 544 627 673 756 155 228 301 538 611 684 9 18 397 415 424 442 821 830 116 241 598 723 53 106 159 318 521 680 733 786 201 638 26 147 173 320 346 493 519 666 692 813 77 214 351 488 625 762 161 339 500 678 193 344 495 646 108 191 216 324 407 432 515 623 648 731 |
| ≤102 | 255 403 436 584 57 277 334 391 448 505 562 782 121 363 476 718 8 16 32 807 823 831 372 467 47 149 196 345 392 447 494 643 690 792 101 738 177 254 331 508 585 662 328 389 450 511 257 325 514 582 382 412 427 457 52 104 245 297 349 490 542 594 735 787 184 655 197 321 518 642 94 311 528 745 208 251 294 337 502 545 588 631 64 775 7 141 282 416 423 557 698 832 |

Based on the result of grouping, the first group is discarded, and the maximum values of preamble sequence cyclic shifts $N_{cs}$ are selected from the value ranges of preamble sequence cyclic shifts $N_{cs}$ in the remaining 12 groups to form a preamble sequence cyclic shift set {19, 22, 26, 30, 36, 42, 50, 59, 68, 78, 89, 102}. In the order from the smallest to largest values of the preamble sequence cyclic shifts $N_{cs}$, indexes 0 to 12 are allocated for the preamble sequence cyclic shifts $N_{cs}$, respectively. The eventually generated preamble sequence cyclic shift set is shown in Table 45.

TABLE 45

Preamble sequence cyclic shift set

| $N_{CS}$ configuration | $N_{CS}$ value |
|---|---|
| 0 | 19 |
| 1 | 22 |
| 2 | 26 |
| 3 | 30 |
| 4 | 36 |
| 5 | 42 |
| 6 | 50 |
| 7 | 59 |
| 8 | 68 |
| 9 | 78 |
| 10 | 89 |
| 11 | 102 |
| 12 | — |
| 13 | — |
| 14 | — |
| 15 | — |

Specific Embodiment 30

Based on the specific embodiment 25, in this specific embodiment, a cyclic shift sequence of a ZC sequence having a length of $N_{zc}=839$ is used as a preamble sequence; and, when the sub-carrier spacing of the random access channel is $\Delta f=1.25$ kHz, $\Delta f=2.5$ kHz, or $\Delta f=5$ kHz, a preferred method for configuring a preamble sequence cyclic shift set specifically comprises the following steps.

The maximum number of allowable preamble sequence cyclic shifts $N_{cs}$ is determined as 16.

Based on the cell coverage demand, the value of the ZC sequence index and other conditions and in combination with different degrees of frequency offset, a preamble sequence cyclic shift set when there is no (or negligible) frequency offset, a preamble sequence cyclic shift set when the maximum degree of frequency offset is 1 time of the sub-carrier spacing of the random access channel and a preamble sequence cyclic shift set when the maximum degree of frequency offset is 2 times of the sub-carrier spacing of the random access channel are generated, respectively. The eventually generated preamble sequence cyclic shift sets are shown in Table 46. In Table 46, the set 0 represents a preamble sequence cyclic shift set when there is no or negligible frequency offset, the set 1 represents a preamble sequence cyclic shift set when the maximum frequency offset is 1 time of the sub-carrier spacing of the random access channel, the set 2 represents a preamble sequence cyclic shift set when the maximum degree of frequency offset is 2 times of the sub-carrier spacing of the random access channel, and the set 3 represents a preamble sequence cyclic shift set when the maximum degree of frequency offset is 3 times of the sub-carrier spacing of the random access channel.

TABLE 46

Preamble sequence cyclic shift sets

| $N_{CS}$ configuration | $N_{CS}$ value | | | |
|---|---|---|---|---|
| | Set 0 | Set 1 | Set 2 | Set 3 |
| 0 | 0 | 15 | 17 | 19 |
| 1 | 13 | 18 | 20 | 22 |
| 2 | 15 | 22 | 24 | 26 |
| 3 | 18 | 26 | 28 | 30 |
| 4 | 22 | 32 | 34 | 36 |
| 5 | 26 | 38 | 40 | 42 |
| 6 | 32 | 46 | 48 | 50 |
| 7 | 38 | 55 | 57 | 59 |
| 8 | 46 | 68 | 70 | 68 |
| 9 | 59 | 82 | 84 | 78 |
| 10 | 76 | 100 | 100 | 89 |
| 11 | 93 | 128 | 116 | 102 |
| 12 | 119 | 158 | 138 | — |
| 13 | 167 | 202 | — | — |
| 14 | 279 | 237 | — | — |
| 15 | 419 | — | — | — |

Based on the steps 1 to 3, the present disclosure provides a method for determining a preamble sequence cyclic shift. As shown in FIG. 44, the method is applied in a user equipment in which a preamble sequence cyclic shift set is stored in advance. The method comprises the following steps.

Step 1201: A System Information Block (SIB) transmitted by a base station is received.

After the SIB has been received, a first index carried in the SIB is acquired.

The step of receiving a System Information Block (SIB) transmitted by a base station to acquire a first index carried in the SIB specifically comprises:

receiving at least one SIB transmitted by the base station; and selecting one SIB from the at least one SIB according to a preset condition, and determining the first index carried in the selected SIB.

The preset condition is to preferably select a synchronization signal block having the highest signal intensity, and each synchronization signal block carries at least one SIB.

Or, the preset condition is to select a first received synchronization signal block, and each synchronization signal block carries at least one SIB.

Of course, the specific content of the preset condition is not limited to the two specific contents mentioned above, and any correlation way containing any one of the two specific contents of the preset condition shall fall into the protection scope of the present disclosure.

Step 1202: A preamble sequence cyclic shift $N_{cs}$ corresponding to the first index is determined.

Each preamble sequence cyclic shift $N_{cs}$ corresponds to one first index.

This step can specifically comprise the following situations.

I) Each preamble sequence cyclic shift set corresponds to one second index, and the step of selecting a preamble sequence cyclic shift $N_{cs}$ corresponding to the first index from the preamble sequence cyclic shift set stored in advance, according to the first index comprises:

acquiring a second index carried in the SIB; and selecting a preamble sequence cyclic shift $N_{cs}$ corresponding to the first index from the preamble sequence cyclic shift set stored in advance, according to the first index and the second index.

In the situation I), specifically:

1) when there are at least two preamble sequence cyclic shift sets stored in advance, the step of selecting a preamble sequence cyclic shift $N_{cs}$ corresponding to the first index from the preamble sequence cyclic shift sets stored in advance, according to the first index and the second index comprises:

selecting a preamble sequence cyclic shift set corresponding to the second index from the at least two preamble sequence cyclic shift sets stored in advance, according to the second index; and selecting a preamble sequence cyclic shift $N_{cs}$ corresponding to the first index from the preamble sequence cyclic shift set corresponding to the second index, according to the first index;

2) when there are at least two preamble sequence cyclic shift sets stored in advance, the step of selecting a preamble sequence cyclic shift $N_{cs}$ corresponding to the first index from the preamble sequence cyclic shift sets stored in advance, according to the first index and the second index comprises:

selecting a preamble sequence cyclic shift set corresponding to the second index, according to the second index and from the at least two preamble sequence cyclic shift sets stored in advance;

selecting a preamble sequence cyclic shift $N_{cs}$ corresponding to the first index from the preamble sequence cyclic shift set corresponding to the second index, according to the first index; and when it is unable to generate any preamble sequence based on the physical index of an initial preamble root sequence and the selected preamble sequence cyclic shift $N_{cs}$, determining that the preamble sequence cyclic shift $N_{cs}$ is 0, i.e., NCS=0; or otherwise, keeping the selected preamble sequence cyclic shift $N_{cs}$ unchanged; and 3) when there is one preamble sequence cyclic shift set stored in advance, the step of selecting a preamble sequence cyclic shift $N_{cs}$ corresponding to the first index from the preamble sequence cyclic shift set stored in advance, according to the first index and the second index comprises:

when it is determined that the second index is not 0, determining that the preamble sequence cyclic shift $N_{cs}$ is 0, i.e., NCS=0; or otherwise, selecting a preamble sequence cyclic shift $N_{cs}$ corresponding to the first index from the preamble sequence cyclic shift set stored in advance, according to the first index.

II) When there is one preamble sequence cyclic shift set stored in advance, the step of selecting a preamble sequence cyclic shift $N_{cs}$ corresponding to the first index from the preamble sequence cyclic shift set stored in advance, according to the first index comprises:

if a direct configuration of a preamble sequence cyclic shift $N_{cs}$ (zeroCyclicShift) indication is carried in the SIB, determining that the preamble sequence cyclic shift $N_{cs}$ is 0, i.e., NCS=0; or otherwise, selecting a preamble sequence cyclic shift $N_{cs}$ corresponding to the first index from the preamble sequence cyclic shift set stored in advance, according to the first index.

III) When there is one preamble sequence cyclic shift set stored in advance and when a zeroCyclicShift indication is carried in the SIB, the step of selecting a preamble sequence cyclic shift $N_{cs}$ corresponding to the first index from the preamble sequence cyclic shift set stored in advance, according to the first index specifically comprises:

if the zeroCyclicShift indication carried in the SIB is 1, determining that the preamble sequence cyclic shift is 0, i.e., NCS=0; or otherwise, selecting a preamble sequence cyclic shift $N_{cs}$ corresponding to the first index from the preamble sequence cyclic shift set stored in advance, according to the first index.

The method for determining a preamble sequence cyclic shift provided by the present disclosure will be specifically described below by several embodiments.

Embodiment 18

In this embodiment, Table 47 shows examples of all the generated preamble sequence cyclic shifts. In Table 47, there are four preamble sequence cyclic shift sets, and there are at most 16 preamble sequence cyclic shift $N_{cs}$ elements in each set. In this case, the index No. of the preamble sequence cyclic shift sets is from 0 to 3 (2-bit information), and the preamble sequence cyclic shift $N_{cs}$ configuration index No. is from 0 to 15 (4-bit information).

TABLE 47

| $N_{CS}$ configuration | Preamble sequence cyclic shift sets $N_{CS}$ value | | | |
|---|---|---|---|---|
| | Set 0 | Set 1 | Set 2 | Set 3 |
| 0 | $N_0^0$ | $N_0^1$ | $N_0^2$ | $N_0^3$ |
| 1 | $N_1^0$ | $N_1^1$ | $N_1^2$ | $N_1^3$ |
| 2 | $N_2^0$ | $N_2^1$ | $N_2^2$ | $N_2^3$ |
| 3 | $N_3^0$ | $N_3^1$ | $N_3^2$ | $N_3^3$ |
| 4 | $N_4^0$ | $N_4^1$ | $N_4^2$ | $N_4^3$ |
| 5 | $N_5^0$ | $N_5^1$ | $N_5^2$ | $N_5^3$ |
| 6 | $N_6^0$ | $N_6^1$ | $N_6^2$ | $N_6^3$ |
| 7 | $N_7^0$ | $N_7^1$ | $N_7^2$ | $N_7^3$ |
| 8 | $N_8^0$ | $N_8^1$ | $N_8^2$ | $N_8^3$ |
| 9 | $N_9^0$ | $N_9^1$ | $N_9^2$ | $N_9^3$ |
| 10 | $N_{10}^0$ | $N_{10}^1$ | $N_{10}^2$ | $N_{10}^3$ |
| 11 | $N_{11}^0$ | $N_{11}^1$ | $N_{11}^2$ | $N_{11}^3$ |
| 12 | $N_{12}^0$ | $N_{12}^1$ | $N_{12}^2$ | $N_{12}^3$ |
| 13 | $N_{13}^0$ | $N_{13}^1$ | $N_{13}^2$ | — |
| 14 | $N_{14}^0$ | $N_{14}^1$ | — | — |
| 15 | $N_{15}^0$ | — | — | — |

With reference to Table 34, in the method for determining a preamble sequence cyclic shift $N_{cs}$ in this embodiment of the present disclosure, the random access preamble sequence cyclic shift $N_{cs}$ configuration index (zeroCorrelationZoneConfig) contained in the SIB transmitted by the base station is one piece of 4-bit information and has a value range from 0 to 15; and, the preamble sequence cyclic shift set index (CyclicShiftSetIndex) simultaneously contained in the SIB is one piece of 2-bit information and has a value range from 0 to 3.

When the zeroCorrelationZoneConfig is 13, the CyclicShiftSetIndex cannot be 3; when the zeroCorrelationZoneConfig is 14, the CyclicShiftSetIndex cannot be 2 or 3; and, when the zeroCorrelationZoneConfig is 15, the CyclicShiftSetIndex cannot be 1, 2 or 3.

The specific method for determining a preamble sequence cyclic shift will be described below.

Step 1: A base station transmits a System Information Block (SIB), wherein the ISB contains a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the zeroCorrelationZoneConfig and CyclicShiftSetIndex contained in the SIB.

Step 2: The user equipment selects a corresponding preamble sequence cyclic shift set from all preamble sequence cyclic shift sets, based on the CyclicShiftSetIndex received in the step 1.

Step 3: The user equipment determines a final preamble sequence cyclic shift $N_{cs}$ from the preamble sequence cyclic shift set selected in the step 2, based on the zeroCorrelationZoneConfig received in the step 1.

It is to be noted that the above solutions can be adjusted as follows.

Step 1: A base station transmits a System Information Block (SIB), and the ISB contains the logic index (rootSequenceIndex) of a preamble root sequence, a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the rootSequenceIndex, zeroCorrelationZoneConfig and CyclicShiftSetIndex contained in the SIB.

Step 2: The user equipment obtains the physical index u of a corresponding initial preamble root sequence based on the rootSequenceIndex received in the step 1.

Step 3: The user equipment selects a corresponding preamble sequence cyclic shift set from all preamble sequence cyclic shift sets, based on the CyclicShiftSetIndex received in the step 1.

Step 4: The user equipment determines a preamble sequence cyclic shift $N_{cs}$ from the preamble sequence cyclic shift set selected in the step 2, based on the zeroCorrelationZoneConfig received in the step 1.

Step 5: If the CyclicShiftSetIndex is 1 or 2 and it is unable to generate any preamble sequence based on the physical index u of the initial preamble root sequence obtained in the step 2 and the preamble sequence cyclic shift $N_{cs}$ obtained in the step 4, it is determined that NCS=0; or otherwise, the preamble sequence cyclic shift $N_{cs}$ determined in the step 4 is kept unchanged.

In addition, it is also to be noted that the steps in the method for determining a preamble sequence cyclic shift are also applicable to multi-beam operations. As shown in Table 34, in the step 1, the base station can transmit SIBs containing 4-bit preamble sequence cyclic shift $N_{cs}$ configuration indexes and 2-bit preamble sequence cyclic shift set indexes of different lengths, according to different cell coverage demands corresponding to different beams and on different beams. If the user equipment has detected SIBs in at least one synchronization signal block, the user equipment selects an SIB in one synchronization signal block, according to the maximum received signal strength criterion, the first reception criterion or other criterions, and reads the preamble sequence cyclic shift $N_{cs}$ configuration index and the preamble sequence cyclic shift set index in this SIB.

Embodiment 19

In this embodiment, Table 48 shows examples of all the generated preamble sequence cyclic shift sets. In Table 48, there are three preamble sequence cyclic shift sets, and there are at most 16 preamble sequence cyclic shift $N_{cs}$ elements in each set. In this case, the index No. of the preamble sequence cyclic shift sets is from 0 to 2 (2-bit information), and the preamble sequence cyclic shift $N_{cs}$ configuration index No. is from 0 to 15 (4-bit information).

TABLE 48

Preamble sequence cyclic shift sets

| $N_{CS}$ configuration | $N_{CS}$ value | | |
|---|---|---|---|
| | Set 0 | Set 1 | Set 2 |
| 0 | $N_0^0$ | $N_0^1$ | $N_0^2$ |
| 1 | $N_1^0$ | $N_1^1$ | $N_1^2$ |
| 2 | $N_2^0$ | $N_2^1$ | $N_2^2$ |
| 3 | $N_3^0$ | $N_3^1$ | $N_3^2$ |
| 4 | $N_4^0$ | $N_4^1$ | $N_4^2$ |
| 5 | $N_5^0$ | $N_5^1$ | $N_5^2$ |
| 6 | $N_6^0$ | $N_6^1$ | $N_6^2$ |
| 7 | $N_7^0$ | $N_7^1$ | $N_7^2$ |
| 8 | $N_8^0$ | $N_8^1$ | $N_8^2$ |
| 9 | $N_9^0$ | $N_9^1$ | $N_9^2$ |
| 10 | $N_{10}^0$ | $N_{10}^1$ | $N_{10}^2$ |
| 11 | $N_{11}^0$ | $N_{11}^1$ | $N_{11}^2$ |
| 12 | $N_{12}^0$ | $N_{12}^1$ | $N_{12}^2$ |
| 13 | $N_{13}^0$ | $N_{13}^1$ | $N_{13}^2$ |
| 14 | $N_{14}^0$ | $N_{14}^1$ | — |
| 15 | $N_{15}^0$ | — | — |

With reference to Table 48, in the method for determining a preamble sequence cyclic shift $N_{cs}$ in this embodiment of the present disclosure, the random access preamble sequence cyclic shift $N_{cs}$ configuration index (zeroCorrelationZoneConfig) contained in the SIB transmitted by the base station is one piece of 4-bit information and has a value range from 0 to 15; and, the preamble sequence cyclic shift set index (CyclicShiftSetIndex) simultaneously contained in the SIB is one piece of 2-bit information and has a value range from 0 to 2.

When the zeroCorrelationZoneConfig is 14, the CyclicShiftSetIndex cannot be 2; and, when the zeroCorrelationZoneConfig is 15, the CyclicShiftSetIndex cannot be 1 or 2.

The specific method for determining a preamble sequence cyclic shift will be described below.

Step 1: A base station transmits a System Information Block (SIB); wherein the SIB contains a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the zeroCorrelationZoneConfig and CyclicShiftSetIndex contained in the SIB.

Step 2: The user equipment selects a corresponding preamble sequence cyclic shift set from all preamble sequence cyclic shift sets, based on the CyclicShiftSetIndex received in the step 1.

Step 3: The user equipment determines a final preamble sequence cyclic shift $N_{cs}$ from the preamble sequence cyclic shift set selected in the step 2, based on the zeroCorrelationZoneConfig received in the step 1.

It is to be noted that the above solutions can be adjusted as follows.

Step 1: A base station transmits a System Information Block (SIB), wherein the SIB contains the logic index (rootSequenceIndex) of a preamble root sequence, a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the rootSequenceIndex, zeroCorrelationZoneConfig and CyclicShiftSetIndex contained in the SIB.

Step 2: The user equipment determines the physical index u of a corresponding initial preamble root sequence based on the rootSequenceIndex received in the step 1.

Step 3: The user equipment selects a corresponding preamble sequence cyclic shift set from all preamble sequence cyclic shift sets, based on the CyclicShiftSetIndex received in the step 1.

Step 4: The user equipment selects a preamble sequence cyclic shift $N_{cs}$ from the preamble sequence cyclic shift set selected in the step 2, based on the zeroCorrelationZoneConfig received in the step 1.

Step 5: If the CyclicShiftSetIndex is 1 or 2 and it is unable to generate any preamble sequence based on the physical index u of the initial preamble root sequence obtained in the step 2 and the preamble sequence cyclic shift $N_{cs}$ determined in the step 4, it is determined that NCS=0; or otherwise, the preamble sequence cyclic shift $N_{cs}$ determined in the step 4 is kept unchanged.

In addition, it is also to be noted that the steps in the method for determining a preamble sequence cyclic shift are also applicable to multi-beam operations. As shown in Table 35, in the step 1, the base station can transmit SIBs containing 4-bit preamble sequence cyclic shift $N_{cs}$ configuration indexes and 2-bit preamble sequence cyclic shift set indexes of different lengths, according to different cell coverage demands corresponding to different beams and on different beams. If the user equipment has detected SIBs in at least one synchronization signal block, the user equipment selects an SIB in one synchronization signal block, according to the maximum received signal strength criterion, the first reception criterion or other criterions, and reads the preamble sequence cyclic shift $N_{cs}$ configuration index and the preamble sequence cyclic shift set index in this SIB.

Embodiment 20

In this embodiment, Table 49 shows examples of all the generated preamble sequence cyclic shift sets. In Table 49, there are two preamble sequence cyclic shift sets, and there are at most 16 preamble sequence cyclic shift $N_{cs}$ elements in each set. In this case, the index No. of the preamble sequence cyclic shift sets is from 0 to 1 (1-bit information), and the preamble sequence cyclic shift $N_{cs}$ configuration index No. is from 0 to 15 (4-bit information).

TABLE 49

| Preamble sequence cyclic shift sets | | |
|---|---|---|
| $N_{CS}$ | $N_{CS}$ value | |
| configuration | Set 0 | Set 1 |
| 0 | $N_0^0$ | $N_0^1$ |
| 1 | $N_1^0$ | $N_1^1$ |
| 2 | $N_2^0$ | $N_2^1$ |
| 3 | $N_3^0$ | $N_3^1$ |
| 4 | $N_4^0$ | $N_4^1$ |
| 5 | $N_5^0$ | $N_5^1$ |
| 6 | $N_6^0$ | $N_6^1$ |
| 7 | $N_7^0$ | $N_7^1$ |
| 8 | $N_8^0$ | $N_8^1$ |
| 9 | $N_9^0$ | $N_9^1$ |
| 10 | $N_{10}^0$ | $N_{10}^1$ |
| 11 | $N_{11}^0$ | $N_{11}^1$ |
| 12 | $N_{12}^0$ | $N_{12}^1$ |
| 13 | $N_{13}^0$ | $N_{13}^1$ |
| 14 | $N_{14}^0$ | $N_{14}^1$ |
| 15 | $N_{15}^0$ | — |

With reference to Table 49, in the method for determining a preamble sequence cyclic shift $N_{cs}$ in this embodiment of the present disclosure, the random access preamble sequence cyclic shift $N_{cs}$ configuration index (zeroCorrelationZoneConfig) contained in the SIB transmitted by the base station is one piece of 4-bit information and has a value range from 0 to 15; and, the preamble sequence cyclic shift set index (CyclicShiftSetIndex) simultaneously contained in the SIB is one piece of 1-bit information and has a value range from 0 to 1.

When the zeroCorrelationZoneConfig is 15, the CyclicShiftSetIndex cannot be 1.

The specific method for determining a preamble sequence cyclic shift will be described below.

Step 1: A base station transmits a System Information Block (SIB), wherein the SIB contains the logic index (rootSequenceIndex) of a preamble root sequence, a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the rootSequenceIndex, zeroCorrelationZoneConfig and CyclicShiftSetIndex contained in the SIB.

Step 2: The user equipment determines the physical index u of a corresponding initial preamble root sequence based on the rootSequenceIndex received in the step 1.

Step 3: The user equipment selects a corresponding preamble sequence cyclic shift set from all preamble sequence cyclic shift sets, based on the CyclicShiftSetIndex received in the step 1.

Step 4: The user equipment selects a preamble sequence cyclic shift $N_{cs}$ from the preamble sequence cyclic shift set selected in the step 2, based on the zeroCorrelationZoneConfig received in the step 1.

Step 5: If the CyclicShiftSetIndex is 1 and it is unable to generate any preamble sequence based on the physical index u of the initial preamble root sequence obtained in the step 2 and the preamble sequence cyclic shift $N_{cs}$ determined in the step 4, it is determined that NCS=0; or otherwise, the preamble sequence cyclic shift $N_{cs}$ determined in the step 4 is kept unchanged.

In addition, it is also to be noted that the steps in the method for determining a preamble sequence cyclic shift are also applicable to multi-beam operations. As shown in Table 36, in the step 1, the base station can transmit SIBs containing 4-bit preamble sequence cyclic shift $N_{cs}$ configuration indexes and 1-bit preamble sequence cyclic shift set indexes of different lengths, according to different cell coverage demands corresponding to different beams and on different beams. If the user equipment has detected SIBs in at least one synchronization signal block, the user equipment selects an SIB in one synchronization signal block according to the maximum received signal strength criterion, the first reception criterion or other criterions, and reads the preamble sequence cyclic shift $N_{cs}$ configuration index and the preamble sequence cyclic shift set index in this SIB.

Embodiment 21

In this embodiment, as shown in Table 50, only one preamble sequence cyclic shift set is generated. There are P preamble sequence cyclic shift $N_{cs}$ elements in this set. In this case, the preamble sequence cyclic shift $N_{cs}$ configuration index No. is from 0 to P−1.

TABLE 50

| $N_{CS}$ configuration | $N_{CS}$ value |
|---|---|
| 0 | $N_0$ |
| 1 | $N_1$ |
| 2 | $N_2$ |
| ... | ... |
| P − 1 | $N_{P-1}$ |

With reference to Table 50, the method for determining a preamble sequence cyclic shift $N_{cs}$ in this embodiment of the present disclosure is as follows.

Step 1: A base station transmits a System Information Block (SIB), wherein the SIB contains a random access preamble sequence cyclic shift $N_{cs}$ configuration index (zeroCorrelationZoneConfig) and a preamble sequence cyclic shift set index (CyclicShiftSetIndex); and, a user equipment receives the SIB, and reads the zeroCorrelationZoneConfig and CyclicShiftSetIndex contained in the SIB.

Step 2: Based on the CyclicShiftSetIndex received in the step 1, the user equipment makes the following selections: if the CyclicShiftSetIndex is not 0, determining that $N_{cs}=0$; or otherwise, if the CyclicShiftSetIndex is 0, proceeding to the step 3.

Step 3: If the CyclicShiftSetIndex received by the user equipment in the step 1 is 0, the user equipment determines, based on the zeroCorrelationZoneConfig received in the step 1 and from a preamble sequence cyclic shift set, a final preamble sequence cyclic shift $N_{cs}$.

In addition, it is also to be noted that the steps in the method for determining a preamble sequence cyclic shift $N_{cs}$ are also applicable to multi-beam operations. As shown in Table 37, in the step 1, the base station can transmit, according to different cell coverage demands corresponding to different beams and on different beams, SIBs containing different preamble sequence cyclic shift $N_{cs}$ configuration indexes. If the user equipment has detected SIBs in at least one synchronization signal block, the user equipment selects, according to the maximum received signal strength criterion, the first reception criterion or other criterions, an SIB in one synchronization signal block, and reads the preamble sequence cyclic shift $N_{cs}$ configuration index and the preamble sequence $N_{cs}$ set index in this SIB.

Embodiment 22

In this embodiment, as shown in Table 51, only one preamble sequence cyclic shift set is generated. There are P preamble sequence cyclic shift $N_{cs}$ elements in this set. In this case, the preamble sequence cyclic shift $N_{cs}$ configuration index No. is from 0 to P−1.

TABLE 51

| $N_{CS}$ configuration | $N_{CS}$ value |
|---|---|
| 0 | $N_0$ |
| 1 | $N_1$ |
| 2 | $N_2$ |
| ... | ... |
| P − 1 | $N_{P-1}$ |

With reference to Table 51, the method for determining a preamble sequence cyclic shift $N_{cs}$ in this embodiment of the present disclosure is as follows.

Step 1: A base station transmits a System Information Block (SIB), wherein the SIB contains a random access preamble sequence cyclic shift $N_{cs}$ configuration index (zeroCorrelationZoneConfig). In addition, the SIB possibly contains a direct configuration of a preamble sequence cyclic shift $N_{cs}$ (zeroCyclicShift) indication. A user equipment receives the SIB, and reads the zeroCorrelationZoneConfig contained in the SIB and the zeroCyclicShift indication possibly contained in the SIB.

Step 2: Based on the CyclicShiftSetIndex received in the step 1 and the zeroCyclicShift indication possibly received in the step 1, the user equipment makes the following selections: if the zeroCyclicShift indication has been received, determining that the preamble sequence cyclic shift $N_{cs}$ is 0, i.e., $N_{cs}=0$; or otherwise, if the zeroCyclicShift indication has not been received, proceeding to the step 3.

Step 3: If the user equipment has not received the zeroCyclicShift indication in the step 1, the user equipment determines, based on the zeroCorrelationZoneConfig received in the step 1 and from a preamble sequence cyclic shift set, a final preamble sequence cyclic shift $N_{cs}$.

In addition, it is also to be noted that the steps in the method for determining a preamble sequence cyclic shift $N_{cs}$ are also applicable to multi-beam operations. As shown in Table 38, in the step 1, the base station can transmit, according to different cell coverage demands corresponding to different beams and on different beams, SIBs containing different preamble sequence cyclic shift $N_{cs}$ configuration indexes and different presence conditions of the indication of direct configuration of a preamble sequence cyclic shift $N_{cs}$. If the user equipment has detected SIBs in at least one synchronization signal block, the user equipment selects, according to the maximum received signal strength criterion, the first reception criterion or other criterions, an SIB in one synchronization signal block, and reads the preamble sequence cyclic shift $N_{cs}$ configuration index contained in this SIB and the indication of direct configuration of a preamble sequence cyclic shift $N_{cs}$ possibly contained in this SIB.

Embodiment 23

In this embodiment, as shown in Table 52, only one preamble sequence cyclic shift set is generated. There are P preamble sequence cyclic shift $N_{cs}$ elements in this set. In this case, the preamble sequence cyclic shift $N_{cs}$ configuration index No. is from 0 to P−1.

TABLE 52

| $N_{CS}$ configuration | $N_{CS}$ value |
|---|---|
| 0 | $N_0$ |
| 1 | $N_1$ |
| 2 | $N_2$ |
| ... | ... |
| P − 1 | $N_{P-1}$ |

With reference to Table 52, the method for determining a preamble sequence cyclic shift $N_{cs}$ in this embodiment of the present disclosure is as follows.

Step 1: A base station transmits a System Information Block (SIB), wherein the SIB contains a random access preamble sequence cyclic shift configuration index (zero-CorrelationZoneConfig) and a direct configuration of a preamble sequence cyclic shift (zeroCyclicShift) indication. A user equipment receives the SIB, and reads the zeroCorrelationZoneConfig and zeroCyclicShift indication contained in the SIB.

Step 2: Based on the CyclicShiftSetIndex received in the step 1 and the zeroCyclicShift indication possibly received in the step 1, the user equipment makes the following selections: if the received zeroCyclicShift indication is 1, determining that the preamble sequence cyclic shift N is 0, i.e., $N_{cs}=0$; or otherwise, if the received zeroCyclicShift indication is not 1, proceeding to the step 3.

Step 3: If the zeroCyclicShift indication received by the user equipment in the step 1 is not 1, the user equipment determines, based on the zeroCorrelationZoneConfig received in the step 1 and from a preamble sequence cyclic shift set, a final preamble sequence cyclic shift $N_{cs}$.

In addition, it is also to be noted that the steps in the method for determining a preamble sequence cyclic shift $N_{cs}$ are also applicable to multi-beam operations. As shown in Table 39, in the step 1, the base station can transmit, according to different cell coverage demands corresponding to different beams and on different beams, SIBs containing different preamble sequence cyclic shift $N_{cs}$ configuration indexes and the indication of direct configuration of a preamble sequence cyclic shift $N_{cs}$. If the user equipment has detected SIBs in at least one synchronization signal block, the user equipment selects, according to the maximum received signal strength criterion, the first reception criterion or other criterions, an SIB in one synchronization signal block, and reads the preamble sequence cyclic shift $N_{cs}$ configuration index and the indication of direct configuration of a preamble sequence cyclic shift $N_{cs}$ contained in this SIB.

The method for generating a preamble sequence provided by the present disclosure will be specifically described below by several embodiments.

Embodiment 24

This embodiment will describe a method for generating a preamble sequence when the maximum allowable degree of frequency offset of the system is 2 times of the sub-carrier spacing of the random access channel and it is determined that the preamble sequence cyclic shift $N_{cs}$ is not 0.

During the random access process, a cyclic shift sequence of a ZC sequence having a length of $N_{zc}$ is used as a preamble sequence, and the uth (where $1 \le u \le N_{zc}-1$) root sequence is:

$$x_u(n) = e^{-j\frac{\pi u n(n+1)}{N_{ZC}}}, 0 \le n \le N_{ZC}-1$$

where u is a root sequence physical index of the ZC sequence. It is defined as follows:

$$d_{u1} = \begin{cases} d_{u1}^+ & 0 \le d_{u1}^+ < N_{ZC}/2 \\ N_{ZC} - d_{u1}^+ & \text{otherwise} \end{cases}$$

and $$d_{u2} = \begin{cases} d_{u2}^+ & 0 \le d_{u2}^+ < N_{ZC}/2 \\ N_{ZC} - d_{u2}^+ & \text{otherwise} \end{cases}$$

where $d_{u1}^+ = (1/u) \bmod N_{zc}$ and $d_{u2}^+ = (2/u) \bmod N_{zc}$. It is further defined as follows:

$d_{max} = \max(d_{u1}, d_{u2})$ $d_{min} = \min(d_{u1}, d_{u2})$

The specific steps of generating a preamble sequence are as follows.

Step 1: A terminal determines a preamble sequence cyclic shift $N_{cs}$ that is not 0, then determines a corresponding initial physical root sequence index u based on an initial root sequence logic index transmitted by a base station, and determines the number M of preamble sequences to be generated.

Step 2: With regard to the physical root sequence index u, a cyclic shift ZC sequence having a ZCZ (Zero Correlation Zone) length of $N_{zc}$ is generated by the following formula:

$x_{u,v}(n) = x_u((n+C_v) \bmod N_{zc})$ where the absolute cyclic shift $C_v$ can be expressed as follows:

$C_v = d_{start} \lfloor v/n_{shift}^{RA} \rfloor + (v \bmod n_{shift}^{RA})N_{cs} \, v=0, 1,\ldots,n_{shift}^{RA} n_{group}^{RA} + \bar{n}_{shift}^{RA} - 1$ Related parameters can be further expressed as follows:

if $N_{cs} \le d_{min} \le d_{max} \le N_{zc}/3$, then:

$n_{shift}^{RA} = \min(\lfloor d_{min}/N_{cs} \rfloor, \lfloor (d_{max}-d_{min})/N_{cs} \rfloor)$ $d_{start} = 2d_{max} + n_{shift}^{RA} N_{cs}$ $n_{group}^{RA} = \lfloor N_{zc}/d_{start} \rfloor$ $\bar{n}_{shift}^{RA} = \max(\lfloor (n_{zc}-2d_{min}-n_{group}^{RA} d_{start})/n_{cs} \rfloor, 0);$ \hfill (1)

if $N_{cs}/3 \le d_{min} \le d_{max} \le (N_{zc}-N_{cs})/3$, then:

$n_{shift}^{RA} = \min(\lfloor N_{zc}-2d_{max})/N_{cs} \rfloor, \lfloor (d_{max}-d_{min})/N_{cs} \rfloor)$ $d_{start} = N_{zc} - 2d_{min} + n_{shift}^{RA} N_{cs}$ $n_{group}^{RA} = \lfloor d_{min}/d_{start} \rfloor$ $\bar{n}_{shift}^{RA} = \min(\max(\lfloor (d_{min}-n_{group}^{RA} d_{start})/n_{cs} \rfloor, 0), n_{shift}^{RA});$ \hfill (2)

if $N_{cs} \le d_{min} < N_{cs}/3 < d_{max} \le (N_{zc}-N_{cs})/3$, then:

$n_{shift}^{RA1} = \min(\lfloor d_{min}/N_{cs} \rfloor, \lfloor (d_{max}-d_{min})/N_{cs} \rfloor)$ $d_{start}^1 = 2d_{max} + n_{shift}^{RA1} N_{cs}$ $n_{group}^{RA1} = \lfloor n_{zc}/d_{start}^1 \rfloor$ $\bar{n}_{shift}^{RA1} = \max(\lfloor (N_{zc}-2d_{max}-n_{group}^{RA1} d_{start}^1)/n_{cs} \rfloor, 0)$ $n_{shift}^{RA2} = \min(\lfloor N_{zc}-2d_{max})/N_{cs} \rfloor, \lfloor (d_{max}-d_{min})/N_{cs} \rfloor)$ $d_{start}^2 = N_{zc} - 2d_{min} + n_{shift}^{RA2} N_{cs}$ $n_{group}^{RA2} = \lfloor d_{min}/d_{start}^2 \rfloor$ $\bar{n}_{shift}^{RA2} = \min(\max(\lfloor (d_{min}-n_{group}^{RA2} d_{start}^2)/n_{cs} \rfloor, 0), n_{shift}^{RA2});$ if $n_{shift}^{RA1} n_{group}^{RA1} + \bar{n}_{shift}^{RA1} \ge n_{shift}^{RA2} n_{group}^{RA2} + \bar{n}_{shift}^{RA2}$, then $n_{shift}^{RA} = n_{shift}^{RA1}, n_{group}^{RA} = n_{group}^{RA1},$
$\bar{n}_{shift}^{RA1} = n_{group}^{RA1};$ and if $n_{shift}^{RA1} n_{group}^{RA1} + \bar{n}_{shift}^{RA1} \geq n_{shift}^{RA2} n_{group}^{RA2} + \bar{n}_{shift}^{RA2},$ then $n_{shift}^{RA} = n_{shift}^{RA2}, n_{group}^{RA} = n_{group}^{RA2},$
$\bar{n}_{shift}^{RA} = n_{group}^{RA2}.$ For a same physical root sequence index u, all preamble sequences of this root sequence are generated based on different values of $C_v$ by the formula (if it is unable to generate any preamble sequence based on the physical root sequence index u, the preamble sequence cyclic shift $N_{cs}$ and the formula, this physical root sequence index u will be skipped, and the step 3 will be executed).

Step 3: The logic root sequence index is added by 1 to update the corresponding physical root sequence index u, and the step 2 is repeated until total M preamble sequences are generated.

Embodiment 25

This embodiment will describe a method for generating a preamble sequence when the maximum allowable degree of frequency offset of the system is 2 times of the sub-carrier spacing of the random access channel and the preamble sequence cyclic shift $N_{cs}$ is determined.

In this embodiment, as shown in Table 53, there are 2 preamble sequence cyclic shift sets. The eventually used set is indicated by a preamble sequence cyclic shift set index (CyclicShiftSetIndex) transmitted by a base station. The CyclicShiftSetIndex is one piece of 1-bit information and has a value range from 0 to 1.

TABLE 53

| Preamble sequence cyclic shift sets | | |
|---|---|---|
| $N_{CS}$ | $N_{CS}$ value | |
| configuration | Set 0 | Set 1 |
| 0 | $N_0^0$ | $N_0^1$ |
| 1 | $N_1^0$ | $N_1^1$ |
| 2 | $N_2^0$ | $N_2^1$ |
| ... | ... | ... |
| P − 2 | $N_{P-2}^0$ | $N_{P-2}^1$ |
| P − 1 | $N_{P-1}^0$ | — |

During the random access process, a cyclic shift sequence of a ZC sequence having a length of $N_{zc}$ is used as a preamble sequence, and the uth (where $1 \leq u \leq N_{zc}-1$) root sequence is:

$$x_u(n) = e^{-j\frac{\pi u n(n+1)}{N_{ZC}}}, 0 \leq n \leq N_{ZC} - 1$$

where u is a root sequence physical index of the ZC sequence. It is defined as follows:

$$d_{u1} = \begin{cases} d_{u1}^+ & 0 \leq d_{u1}^+ < N_{ZC}/2 \\ N_{ZC} - d_{u1}^+ & \text{otherwise} \end{cases}$$

and $$d_{u2} = \begin{cases} d_{u2}^+ & 0 \leq d_{u2}^+ < N_{ZC}/2 \\ N_{ZC} - d_{u2}^+ & \text{otherwise} \end{cases}$$

where $d_{u1}^+ = (1/u) \bmod N_{zc}$ and $d_{u2}^+ = (2/u) \bmod N_{zc}$. It is further defined as follows:

$$d_{max} = \max(d_{u1}, d_{u2})$$

$$d_{min} = \min(d_{u1}, d_{u2})$$

The specific steps of generating a preamble sequence are as follows.

Step 1: A terminal determines a preamble sequence cyclic shift $N_{cs}$, then determines a corresponding initial physical root sequence index u based on an initial root sequence logic index transmitted by the base station, and determines the number M of preamble sequences to be generated.

Step 2: With regard to the physical root sequence index u, a cyclic shift ZC sequence having a ZCZ (Zero Correlation Zone) length of $N_{zc}$ is generated by the following formula:

$$x_{u,v}(n) = x_u((n+C_v) \bmod N_{zc})$$

where the absolute cyclic shift $C_v$ can be expressed as follows:

$$C_v = \begin{cases} vN_{CS} & \text{for } CyclicShiftSetIndex = 0, N_{CS} \neq 0 \\ 0 & \text{for } N_{CS} = 0 \\ d_{start}\lfloor v/n_{shift}^{RA} \rfloor + (v \bmod n_{shift}^{RA})N_{CS} \\ v = 0, 1, \ldots, n_{shift}^{RA} n_{group}^{RA} + \bar{n}_{shift}^{RA} - 1 & \text{for } CyclicShiftSetIndex = 1 \end{cases}$$

When CyclicShiftSetIndex=1, related parameters can be further expressed as follows:

if $N_{cs} \leq d_{min} \leq d_{max} \leq N_{zc}/3$, then:

$n_{shift}^{RA} = \min(\lfloor d_{min}/N_{cs} \rfloor, \lfloor (d_{max}-d_{min})/N_{cs} \rfloor)$ $d_{start} = 2d_{max} + n_{shift}^{RA} N_{cs}$ $n_{group}^{RA} = \lfloor N_{zc}/d_{start} \rfloor$ $\bar{n}_{shift}^{RA} = \max(\lfloor (n_{zc}-2d_{min}-n_{group}^{RA} d_{start})/n_{cs} \rfloor, 0);$  (1)

if $N_{cs}/3 \leq d_{min} \leq d_{max} \leq (N_{zc}-N_{cs})/3$, then:

$n_{shift}^{RA} = \min(\lfloor (N_{zc}-2d_{max})/N_{cs} \rfloor, \lfloor (d_{max}-d_{min})/N_{cs} \rfloor)$ $d_{start} = N_{zc} - 2d_{min} + n_{shift}^{RA} N_{cs}$ $n_{group}^{RA} = \lfloor d_{min}/d_{start} \rfloor$ $\bar{n}_{shift}^{RA} = \min(\max(\lfloor (d_{min}-n_{group}^{RA} d_{start})/n_{cs} \rfloor, 0), n_{shift}^{RA});$  (2)

if $N_{cs} \leq d_{min} < N_{cs}/3 < d_{max} \leq (N_{zc}-N_{cs})/3$, then:

$n_{shift}^{RA1} = \min(\lfloor d_{min}/N_{cs} \rfloor, \lfloor (d_{max}-d_{min})/N_{cs} \rfloor)$ $d_{start}^1 = 2d_{max} + n_{shift}^{RA1} N_{cs}$ $n_{group}^{RA1} = \lfloor n_{zc}/d_{start}^1 \rfloor$ $\bar{n}_{shift}^{RA1} = \max(\lfloor (N_{zc}-2d_{max}-n_{group}^{RA1} d_{start}^1)/n_{cs} \rfloor, 0)$ $n_{shift}^{RA2} = \min(\lfloor N_{zc}-2d_{max})/N_{cs} \rfloor, \lfloor (d_{max}-d_{min})/N_{cs} \rfloor)$ $d_{start}^2 = N_{zc} - 2d_{min} + n_{shift}^{RA2} N_{cs}$ $n_{group}^{RA2} = \lfloor d_{min}/d_{start}^2 \rfloor$ $$\overline{n}_{shift}{}^{RA2}=\min(\max(\lfloor(d_{min}-n_{group}{}^{RA2}d_{start}{}^2)/n_{cs}\rfloor,0)n_{shift}{}^{RA2}); \quad (3)$$

if $n_{shift}{}^{RA1}n_{group}{}^{RA1}+\overline{n}_{shift}{}^{RA1}\geq n_{shift}{}^{RA2}n_{group}{}^{RA2}+\overline{n}_{shift}{}^{RA2}$, then $n_{shift}{}^{RA}=n_{shift}{}^{RA1}, n_{group}{}^{RA}=n_{group}{}^{RA1}$,
$\overline{n}_{shift}{}^{RA}=n_{group}{}^{RA1}$; and if $n_{shift}{}^{RA1}n_{group}{}^{RA1}+\overline{n}_{shift}{}^{RA1}\geq n_{shift}{}^{RA2}n_{group}{}^{RA2}+\overline{n}_{shift}{}^{RA2}$, then $n_{shift}{}^{RA}=n_{shift}{}^{RA2}, n_{group}{}^{RA}=n_{group}{}^{RA2}$,
$\overline{n}_{shift}{}^{RA}=n_{group}{}^{RA2}$.

For a same physical root sequence index u, all preamble sequences of this root sequence are generated based on different values of $C_v$ by the formula (if it is unable to generate any preamble sequence based on the physical root sequence index u, the preamble sequence cyclic shift $N_{cs}$ and the formula, this physical root sequence index u will be skipped, and the step 3 will be executed).

Step 3: The logic root sequence index is added by 1 to update the corresponding physical root sequence index u, and the step 2 is repeated until total M preamble sequences are generated.

Embodiment 26

This embodiment will describe a method for generating a preamble sequence when the maximum allowable degree of frequency offset of the system is 2 times of the sub-carrier spacing of the random access channel and the preamble sequence cyclic shift $N_{cs}$ is determined.

In this embodiment, as shown in Table 54, there are 3 preamble sequence cyclic shift sets. The eventually used set is indicated by a preamble sequence cyclic shift set index (CyclicShiftSetIndex) transmitted by a base station. The CyclicShiftSetIndex is one piece of 2-bit information and has a value range from 0 to 2.

TABLE 54

| | Preamble sequence cyclic shift sets | | |
|---|---|---|---|
| $N_{CS}$ | | $N_{CS}$ value | |
| configuration | Set 0 | Set 1 | Set 2 |
| 0 | $N_0^0$ | $N_0^1$ | |
| 1 | $N_1^0$ | $N_1^1$ | $N_1^2$ |
| 2 | $N_2^0$ | $N_2^1$ | $N_2^2$ |
| ... | ... | ... | ... |
| P − 3 | $N_{P-3}^0$ | $N_{P-3}^1$ | $N_{P-3}^2$ |
| P − 2 | $N_{P-2}^0$ | $N_{P-2}^1$ | — |
| P − 1 | $N_{P-1}^0$ | — | — |

During the random access process, a cyclic shift sequence of a ZC sequence having a length of $N_{zc}$ is used as a preamble sequence, and the uth (where $1\leq u\leq N_{zc}-1$) root sequence is:

$$x_u(n)=e^{-j\frac{\pi un(n+1)}{N_{ZC}}}, 0\leq n\leq N_{ZC}-1$$

where u is a root sequence physical index of the ZC sequence. It is defined as follows:

$$d_{u1}=\begin{cases}d_{u1}^+ & 0\leq d_{u1}^+<N_{ZC}/2\\ N_{ZC}-d_{u1}^+ & \text{otherwise}\end{cases}$$

-continued and $$d_{u2}=\begin{cases}d_{u2}^+ & 0\leq d_{u2}^+<N_{ZC}/2\\ N_{ZC}-d_{u2}^+ & \text{otherwise}\end{cases}$$

where $d_{u1}^+(=(1/u)\mod N_{zc}$ and $d_{u2}^+=(2/u)\mod N_{zc}$. It is further defined as follows:

$d_{max}=\max(d_{u1},d_{u2})$ $d_{min}=\min(d_{u1},d_{u2})$

The specific steps of generating a preamble sequence are as follows.

Step 1: A terminal determines a preamble sequence cyclic shift $N_{cs}$, then determines, based on an initial root sequence logic index transmitted by the base station, a corresponding initial physical root sequence index u, and determines the number M of preamble sequences to be generated.

Step 2: With regard to the physical root sequence index u, a cyclic shift ZC sequence having a ZCZ (Zero Correlation Zone) length of $N_{zc}$ is generated by the following formula:

$$x_{u,v}(n)=x_u((n+C_v)\mod N_{zc})$$

where the absolute cyclic shift $C_v$ can be expressed as follows:

$$C_v=\begin{cases}vN_{CS} & \text{for } CyclicShiftSetIndex=0, N_{CS}\neq 0\\ 0 & \text{for } N_{CS}=0\\ d_{start}\lfloor v/n_{shift}^{RA}\rfloor+(v\mod n_{shift}^{RA})N_{CS} & \text{for } CyclicShiftSetIndex=1\\ v=0,1,\ldots,n_{shift}^{RA}n_{group}^{RA}+\overline{n}_{shift}^{RA}-1\end{cases}$$

When CyclicShiftSetIndex=1, the related parameters can be further expressed as follows:

if $N_{cs}\leq d_{u1}\leq N_{zc}/3$, then:

$n_{shift}{}^{RA}=\lfloor d_{u1}/N_{cs}\rfloor$ $d_{start}=2d_{u1}+n_{shift}{}^{RA}N_{cs}$ $n_{group}{}^{RA}=\lfloor N_{zc}/d_{start}\rfloor$ $$\overline{n}_{shift}{}^{RA}=\max(\lfloor(n_{zc}-2d_{u1}-n_{group}{}^{RA}d_{start})/n_{cs}\rfloor,0); \quad (1)$$

if $N_{cs}/3\leq d_{u1}\leq(N_{zc}-N_{cs})/2$, then:

$n_{shift}{}^{RA}=\lfloor(N_{zc}-2d_{u1})/N_{cs}\rfloor$, $d_{start}=N_{zc}-2d_{u1}+n_{shift}{}^{RA}N_{cs}$ $n_{group}{}^{RA}=\lfloor d_{u1}/d_{start}\rfloor$ $$\overline{n}_{shift}{}^{RA}=\min(\max(\lfloor(d_{min}-n_{group}{}^{RA}d_{start})/n_{cs}\rfloor,0)n_{shift}{}^{RA}); \quad (2)$$

When CyclicShiftSetIndex=2, the related parameters can be further expressed as follows:

if $N_{cs}\leq d_{min}\leq d_{max}\leq N_{zc}/3$, then:

$n_{shift}{}^{RA}=\min(\lfloor d_{min}/N_{cs}\rfloor,\lfloor(d_{max}-d_{min})/N_{cs}\rfloor)$ $d_{start}=2d_{max}+n_{shift}{}^{RA}N_{cs}$ $n_{group}{}^{RA}=\lfloor N_{zc}/d_{start}\rfloor$ $$\bar{n}_{shift}^{RA}=\max(\lfloor(n_{zc}-2d_{min}-n_{group}^{RA}d_{start})/n_{cs}\rfloor,0); \quad (1)$$

if $N_{cs}/3 \le d_{min} \le d_{max} \le (N_{zc}-N_{cs})/2$, then:

$$n_{shift}^{RA}=\min(\lfloor(N_{zc}-2d_{max})/N_{cs}\rfloor,\lfloor(d_{max}-d_{min})/N_{cs}\rfloor)$$

$$d_{start}=N_{zc}-2d_{min}+n_{shift}^{RA}N_{cs}$$

$$n_{group}^{RA}=\lfloor d_{min}/d_{start}\rfloor$$

$$\bar{n}_{shift}^{RA}=\min(\max(\lfloor(d_{min}-n_{group}^{RA}d_{start})/n_{cs}\rfloor,0)n_{shift}^{RA}); \quad (2)$$

if $N_{cs} \le d_{min} < N_{cs}/3 < d_{max} \le (N_{zc}-N_{cs})/2$, then:

$$n_{shift}^{RA1}=\min(\lfloor d_{min}/N_{cs}\rfloor,\lfloor(d_{max}-d_{min})/N_{cs}\rfloor)$$

$$d_{start}^{1}=2d_{max}+n_{shift}^{RA1}N_{cs}$$

$$n_{group}^{RA1}=\lfloor n_{zc}/d_{start}^{1}\rfloor$$

$$\bar{n}_{shift}^{RA1}=\max(\lfloor(N_{zc}-2d_{max}-n_{group}^{RA1}d_{start}^{1})/n_{cs}\rfloor,0)$$

$$n_{shift}^{RA2}=\min(\lfloor(N_{zc}-2d_{max})/N_{cs}\rfloor,\lfloor(d_{max}-d_{min})/N_{cs}\rfloor)$$

$$d_{start}^{2}=N_{zc}-2d_{min}+n_{shift}^{RA2}N_{cs}$$

$$n_{group}^{RA2}=\lfloor d_{min}/d_{start}^{2}\rfloor$$

$$\bar{n}_{shift}^{RA2}=\min(\max(\lfloor(d_{min}-n_{group}^{RA2}d_{start}^{2})/n_{cs}\rfloor,0)n_{shift}^{RA2}); \quad (3)$$

if $n_{shift}^{RA1}n_{group}^{RA1}+\bar{n}_{shift}^{RA1} \ge n_{shift}^{RA2}n_{group}^{RA2}+n_{shift}^{RA2}$, then $n_{shift}^{RA}=n_{shift}^{RA1}$, $n_{group}^{RA}=n_{group}^{RA1}$, $\bar{n}_{shift}^{RA1}=n_{group}^{RA1}$; and if $n_{shift}^{RA1}n_{group}^{RA1}+\bar{n}_{shift}^{RA1} \ge n_{shift}^{RA2}n_{group}^{RA2}+n_{shift}^{RA2}$, then $$n_{shift}^{RA}=n_{shift}^{RA2}, n_{group}^{RA}=n_{group}^{RA2}, \bar{n}_{shift}^{RA}=n_{group}^{RA2}.$$

For a same physical root sequence index u, all preamble sequences of this root sequence are generated based on different values of $C_v$ by the formula (if it is unable to generate any preamble sequence based on the physical root sequence index u, the preamble sequence cyclic shift $N_{cs}$ and the formula, this physical root sequence index u will be skipped, and the step 3 will be executed).

Step 3: The logic root sequence index is added by 1 to update the corresponding physical root sequence index u, and the step 2 is repeated until total M preamble sequences are generated.

Embodiment 27

This embodiment will describe a method for generating a preamble sequence when the maximum allowable degree of frequency offset of the system is 1 time or 2 times of the sub-carrier spacing of the random access channel and it is determined that the preamble sequence cyclic shift $N_{cs}$ is not 0.

In this embodiment, as shown in Table 55, there are P elements in a restricted preamble sequence set. The value of $N_{cs}$ is indicated by a preamble sequence cyclic shift configuration index (zeroCorrelationZoneConfig) and a threshold T is predefined by the system. The zeroCorrelationZoneConfig is one piece of $\lceil \log_2 P \rceil$-bit information and has a value range from 0 to P−1; and, the value range of the threshold T is $0<T \le P-1$.

TABLE 55

| Preamble sequence cyclic shift set (restricted set) | |
|---|---|
| $N_{CS}$ configuration | $N_{CS}$ value |
| 0 | $N_0$ |
| 1 | $N_1$ |
| 2 | $N_2$ |
| ... | ... |
| P − 1 | $N_{P-1}$ |

During the random access process, a cyclic shift sequence of a ZC sequence having a length of $N_{zc}$ is used as a preamble sequence, and the uth (where $1 \le u \le N_{zc}-1$) root sequence is:

$$x_u(n) = e^{-j\frac{\pi u n(n+1)}{N_{ZC}}}, 0 \le n \le N_{ZC}-1$$

where u is a root sequence physical index of the ZC sequence. It is defined as follows:

$$d_{u1} = \begin{cases} d_{u1}^+ & 0 \le d_{u1}^+ < N_{ZC}/2 \\ N_{ZC}-d_{u1}^+ & \text{otherwise} \end{cases}$$

and $$d_{u2} = \begin{cases} d_{u2}^+ & 0 \le d_{u2}^+ < N_{ZC}/2 \\ N_{ZC}-d_{u2}^+ & \text{otherwise} \end{cases}$$

where $d_{u1}^+=(1/u) \mod N_{zc}$ and $d_{u2}^+(2/u) \mod N_{zc}$. It is further defined as follows:

$$d_{max}=\max(d_{u1},d_{u2})$$

$$d_{min}=\min(d_{u1},d_{u2})$$

The specific steps of generating a preamble sequence are as follows.

Step 1: A terminal determines a preamble sequence cyclic shift $N_{cs}$ that is not 0, then determines a corresponding initial physical root sequence index u based on an initial root sequence logic index transmitted by a base station, and determines the number M of preamble sequences to be generated.

Step 2: With regard to the physical root sequence index u, a cyclic shift ZC sequence having a ZCZ (Zero Correlation Zone) length of $N_{zc}$ is generated by the following formula:

$$x_{u,v}(n)=x_u((n+C_v) \mod N_{zc})$$

where the absolute cyclic shift $C_v$ can be expressed as follows:

$$C_v=d_{start}\lfloor v/n_{shift}^{RA}\rfloor+(v \mod n_{shift}^{RA})N_{cs} v=0,1,\ldots,n_{shift}^{RA}n_{group}^{RA}+\bar{n}_{shift}^{RA}-1$$

If zeroCorrelationZoneConfig<T, the related parameters can be further expressed as follows:

if $N_{cs} \le d_{u1} \le N_{zc}/3$, then:

$$n_{shift}^{RA}=\lfloor d_{u1}/N_{cs}\rfloor$$

$$d_{start}=2d_{u1}+n_{shift}^{RA}N_{cs}$$

$$n_{group}^{RA}=\lfloor N_{zc}/d_{start}\rfloor$$

$$\bar{n}_{shift}^{RA} = \max(\lfloor (n_{zc} - 2d_{u1} - n_{group}^{RA} d_{start})/n_{cs} \rfloor, 0); \quad (1)$$

if $N_{cs}/3 \le d_{u1} \le (N_{zc} - N_{cs})/2$, then:

$$n_{shift}^{RA} = \lfloor (N_{zc} - 2d_{u1})/N_{cs} \rfloor,$$

$$d_{start} = N_{zc} - 2d_{u1} + n_{shift}^{RA} N_{cs}$$

$$n_{group}^{RA} = \lfloor d_{u1}/d_{start} \rfloor$$

$$\bar{n}_{shift}^{RA} = \min(\max(\lfloor (d_{min} - n_{group}^{RA} d_{start})/n_{cs} \rfloor, 0) n_{shift}^{RA}); \quad (2)$$

If zeroCorrelationZoneConfig≥T, the related parameters can be further expressed as follows:

if $N_{cs} \le d_{min} \le d_{max} \le N_{zc}/3$, then:

$$n_{shift}^{RA} = \min(\lfloor d_{min}/N_{cs} \rfloor, \lfloor (d_{max} - d_{min})/N_{cs} \rfloor)$$

$$d_{start} = 2d_{max} + n_{shift}^{RA} N_{cs}$$

$$n_{group}^{RA} = \lfloor N_{zc}/d_{start} \rfloor$$

$$\bar{n}_{shift}^{RA} = \max(\lfloor (n_{zc} - 2d_{min} - n_{group}^{RA} d_{start})/n_{cs} \rfloor, 0); \quad (1)$$

if $N_{cs}/3 \le d_{min} \le d_{max} \le (N_{zc} - N_{cs})/2$, then:

$$n_{shift}^{RA} = \min(\lfloor (N_{zc} - 2d_{max})/N_{cs} \rfloor, \lfloor (d_{max} - d_{min})/N_{cs} \rfloor)$$

$$d_{start} = N_{zc} - 2d_{min} + n_{shift}^{RA} N_{cs}$$

$$n_{group}^{RA} = \lfloor d_{min}/d_{start} \rfloor$$

$$\bar{n}_{shift}^{RA} = \min(\max(\lfloor (d_{min} - n_{group}^{RA} d_{start})/n_{cs} \rfloor, 0) n_{shift}^{RA}); \quad (2)$$

if $N_{cs} \le d_{min} < N_{cs}/3 < d_{max} \le (N_{zc} - N_{cs})/2$, then:

$$n_{shift}^{RA1} = \min(\lfloor d_{min}/N_{cs} \rfloor, \lfloor (d_{max} - d_{min})/N_{cs} \rfloor)$$

$$d_{start}^1 = 2d_{max} + n_{shift}^{RA1} N_{cs}$$

$$n_{group}^{RA1} = \lfloor n_{zc}/d_{start}^1 \rfloor$$

$$\bar{n}_{shift}^{RA1} = \max(\lfloor (N_{zc} - 2d_{max} - n_{group}^{RA1} d_{start}^1)/n_{cs} \rfloor, 0)$$

$$n_{shift}^{RA2} = \min(\lfloor N_{zc} - 2d_{max} \rfloor /N_{cs}, \lfloor (d_{max} - d_{min})/N_{cs} \rfloor)$$

$$d_{start}^2 = N_{zc} - 2d_{min} + n_{shift}^{RA2} N_{cs}$$

$$n_{group}^{RA2} = \lfloor d_{min}/d_{start}^2 \rfloor$$

$$\bar{n}_{shift}^{RA2} = \min(\max(\lfloor (d_{min} - n_{group}^{RA2} d_{start}^2)/n_{cs} \rfloor, 0) n_{shift}^{RA2}); \quad (3)$$

if $n_{shift}^{RA1} n_{group}^{RA1} + \bar{n}_{shift}^{RA1} \ge n_{shift}^{RA2} n_{group}^{RA2} + \bar{n}_{shift}^{RA2}$, then $n_{shift}^{RA} = n_{shift}^{RA1}$,
$n_{group}^{RA} = n_{group}^{RA1}, \bar{n}_{shift}^{RA} = n_{group}^{RA1}$; and if $n_{shift}^{RA1} n_{group}^{RA1} + \bar{n}_{shift}^{RA1} \ge n_{shift}^{RA2} n_{group}^{RA2} + \bar{n}_{shift}^{RA2}$, then $$n_{shift}^{RA} = n_{shift}^{RA2}, n_{group}^{RA} = n_{group}^{RA2},$$
$$\bar{n}_{shift}^{RA} = n_{group}^{RA2}.$$

For a same physical root sequence index u, all preamble sequences of this root sequence are generated based on different values of $C_v$ by the formula (if it is unable to generate any preamble sequence based on the physical root sequence index u, the preamble sequence cyclic shift $N_{cs}$ and the formula, this physical root sequence index u will be skipped, and the step 3 will be executed).

Step 3: The logic root sequence index is added by 1 to update the corresponding physical root sequence index u, and the step 2 is repeated until total M preamble sequences are generated.

Embodiment 28

This embodiment will describe a method for generating a preamble sequence when the maximum allowable degree of frequency offset of the system is 1 time or 2 times of the sub-carrier spacing of the random access channel and it is determined that the preamble sequence cyclic shift $N_{cs}$ is not 0.

In this embodiment, as shown in Table 56, there are P elements in a restricted preamble sequence set. The value of $N_{cs}$ is indicated by a preamble sequence cyclic shift configuration index (zeroCorrelationZoneConfig) and a threshold T is predefined by the system. The zeroCorrelationZoneConfig is one piece of $\lceil \log_2 P \rceil$-bit information and has a value range from 0 to P−1; and, the value range of the threshold T is 0<T≤P−1.

TABLE 56

| Preamble sequence cyclic shift set (restricted set) | |
|---|---|
| $N_{CS}$ configuration | $N_{CS}$ value |
| 0 | $N_0$ |
| 1 | $N_1$ |
| 2 | $N_2$ |
| ... | ... |
| P − 1 | $N_{P-1}$ |

During the random access process, a cyclic shift sequence of a ZC sequence having a length of $N_{zc}$ is used as a preamble sequence, and the uth (where $1 \le u \le N_{zc} - 1$) root sequence is:

$$x_u(n) = e^{-j\frac{\pi u n(n+1)}{N_{ZC}}}, 0 \le n \le N_{ZC} - 1$$

where u is a root sequence physical index of the ZC sequence. It is defined as follows:

$$d_{u1} = \begin{cases} d_{u1}^+ & 0 \le d_{u1}^+ < N_{ZC}/2 \\ N_{ZC} - d_{u1}^+ & \text{otherwise} \end{cases}$$

and $$d_{u2} = \begin{cases} d_{u2}^+ & 0 \le d_{u2}^+ < N_{ZC}/2 \\ N_{ZC} - d_{u2}^+ & \text{otherwise} \end{cases}$$

where $d_{u1}^+ = (1/u) \bmod N_{zc}$ and $d_{u2}^+ = (2/u) \bmod N_{zc}$. It is further defined as follows:

$$d_{max} = \max(d_{u1}, d_{u2})$$

$$d_{min} = \min(d_{u1}, d_{u2})$$

The specific steps of generating a preamble sequence are as follows.

Step 1: A terminal determines a preamble sequence cyclic shift $N_{cs}$ that is not 0, then determines a corresponding initial physical root sequence index u based on an initial root sequence logic index transmitted by a base station, and determines the number M of preamble sequences to be generated.

Step 2: With regard to the physical root sequence index u, a cyclic shift ZC sequence having a ZCZ (Zero Correlation Zone) length of $N_{zc}$ is generated by the following formula:

$$x_{u,v}(n) = x_u((n+C_v) \bmod N_{zc})$$

where the absolute cyclic shift $C_v$ can be expressed as follows:

$$C_v = d_{start} \lfloor v/n_{shift}^{RA} \rfloor + (v \bmod n_{shift}^{RA}) N_{cs} \, v = 0, 1, \ldots, n_{shift}^{RA} n_{group}^{RA} + \bar{n}_{shift}^{RA} - 1$$

If zeroCorrelationZoneConfig>T, the related parameters can be further expressed as follows:

if $N_{cs} \leq d_{u1} \leq N_{zc}/3$, then:

$$n_{shift}^{RA} = \lfloor d_{u1}/N_{cs} \rfloor$$

$$d_{start} = 2d_{u1} + n_{shift}^{RA} N_{cs}$$

$$n_{group}^{RA} = \lfloor N_{zc}/d_{start} \rfloor$$

$$\bar{n}_{shift}^{RA} = \max(\lfloor (n_{zc} - 2d_{u1} - n_{group}^{RA} d_{start})/n_{cs} \rfloor, 0); \quad (1)$$

if $N_{cs}/3 \leq d_{u1} \leq (N_{zc} - N_{cs})/2$, then:

$$n_{shift}^{RA} = \lfloor (N_{zc} - 2d_{u1})/N_{cs} \rfloor,$$

$$d_{start} = N_{zc} - 2d_{u1} + n_{shift}^{RA} N_{cs}$$

$$n_{group}^{RA} = \lfloor d_{u1}/d_{start} \rfloor$$

$$\bar{n}_{shift}^{RA} = \min(\max(\lfloor (d_{min} - n_{group}^{RA} d_{start})/n_{cs} \rfloor, 0), n_{shift}^{RA}); \quad (2)$$

If zeroCorrelationZoneConfig≤T, the related parameters can be further expressed as follows:

if $N_{cs} \leq d_{min} \leq d_{max} \leq N_{zc}/3$, then:

$$n_{shift}^{RA} = \min(\lfloor d_{min}/N_{cs} \rfloor, \lfloor (d_{max}-d_{min})/N_{cs} \rfloor)$$

$$d_{start} = 2d_{max} + n_{shift}^{RA} N_{cs}$$

$$n_{group}^{RA} = \lfloor N_{zc}/d_{start} \rfloor$$

$$\bar{n}_{shift}^{RA} = \max(\lfloor (n_{zc} - 2d_{min} - n_{group}^{RA} d_{start})/n_{cs} \rfloor, 0); \quad (1)$$

if $N_{cs}/3 \leq d_{min} \leq d_{max} \leq (N_{zc} - N_{cs})/2$, then:

$$n_{shift}^{RA} = \min(\lfloor (N_{zc} - 2d_{max})/N_{cs} \rfloor, \lfloor (d_{max}-d_{min})/N_{cs} \rfloor)$$

$$d_{start} = N_{zc} - 2d_{min} + n_{shift}^{RA} N_{cs}$$

$$n_{group}^{RA} = \lfloor d_{min}/d_{start} \rfloor$$

$$\bar{n}_{shift}^{RA} = \min(\max(\lfloor (d_{min} - n_{group}^{RA} d_{start})/n_{cs} \rfloor, 0), n_{shift}^{RA}); \quad (2)$$

if $N_{cs} \leq d_{min} < N_{cs}/3 < d_{max} \leq (N_{zc} - N_{cs})/2$, then:

$$n_{shift}^{RA1} = \min(\lfloor d_{min}/N_{cs} \rfloor, \lfloor (d_{max}-d_{min})/N_{cs} \rfloor)$$

$$d_{start}^1 = 2d_{max} + n_{shift}^{RA1} N_{cs}$$

$$n_{group}^{RA1} = \lfloor n_{zc}/d_{start}^1 \rfloor$$

$$\bar{n}_{shift}^{RA1} = \max(\lfloor (N_{zc} - 2d_{max} - n_{group}^{RA1} d_{start}^1)/n_{cs} \rfloor, 0)$$

$$n_{shift}^{RA2} = \min(\lfloor (N_{zc} - 2d_{max})/N_{cs} \rfloor, \lfloor (d_{max}-d_{min})/N_{cs} \rfloor)$$

$$d_{start}^2 = N_{zc} - 2d_{min} + n_{shift}^{RA2} N_{cs}$$

$$n_{group}^{RA2} = \lfloor d_{min}/d_{start}^2 \rfloor$$

$$\bar{n}_{shift}^{RA2} = \min(\max(\lfloor (d_{min} - n_{group}^{RA2} d_{start}^2)/n_{cs} \rfloor, 0), n_{shift}^{RA2}); \quad (3)$$

if $n_{shift}^{RA1} n_{group}^{RA1} + \bar{n}_{shift}^{RA1} \geq n_{shift}^{RA2} n_{group}^{RA2} + \bar{n}_{shift}^{RA2}$, then $n_{shift}^{RA} = n_{shift}^{RA1}$, $\bar{n}_{shift}^{RA} = \bar{n}_{shift}^{RA1}$, $n_{group}^{RA} = n_{group}^{RA1}$; and if $n_{shift}^{RA1} n_{group}^{RA1} + \bar{n}_{shift}^{RA1} \geq n_{shift}^{RA2} n_{group}^{RA2} + \bar{n}_{shift}^{RA2}$, then $$n_{shift}^{RA} = n_{shift}^{RA2}, n_{group}^{RA} = n_{group}^{RA2},$$
$$\bar{n}_{shift}^{RA} = n_{group}^{RA2}.$$

For a same physical root sequence index u, all preamble sequences of this root sequence are generated based on different values of $C_v$ by the formula (if it is unable to generate any preamble sequence based on the physical root sequence index u, the preamble sequence cyclic shift $N_{cs}$ and the formula, this physical root sequence index u will be skipped, and the step 3 will be executed).

Step 3: The logic root sequence index is added by 1 to update the corresponding physical root sequence index u, and the step 2 is repeated until total M preamble sequences are generated.

Based on the specific embodiments of the present disclosure, the present disclosure further provides a device for configuring a preamble sequence cyclic shift set, as shown in FIG. 45. The device for configuring a preamble sequence cyclic shift set may be a base station (for example, base station 110), or a network entity other than the base station. According to the various embodiment of the present disclosure, the device for configuring a preamble sequence cyclic shift set comprises:

a first processing unit 1301 configured to determine all values of a preamble sequence cyclic shift $N_{cs}$ according to a Zadoff-Chu (ZC) sequence and the degree of frequency offset;

a second processing unit 1302 configured to select a preset number of preamble sequence cyclic shifts $N_{cs}$ from all values of the preamble sequence cyclic shifts $N_{cs}$ to generate a preamble sequence cyclic shift set; and a transmission unit 1303 configured to transmit the generated preamble sequence cyclic shift set to both the base station and the user equipment for storage.

Based on the specific implementations of the present disclosure, the present disclosure further provides a device for determining a preamble sequence cyclic shift, in which a preamble sequence cyclic shift set is stored in advance. As shown in FIG. 46, the determination device comprises:

a first processing unit 1401 configured to receive a System Information Block (SIB) transmitted by a base station to acquire a first index carried in the SIB; and a second processing unit 1402 configured to select a preamble sequence cyclic shift $N_{cs}$ corresponding to the first index from the preamble sequence cyclic shift set stored in advance, according to the first index.

In the present disclosure, for a 5G wireless communication system, the present disclosure provides a method for configuring a preamble sequence cyclic shift set. Different preamble sequence cyclic shift sets correspond to different degrees of frequency offset, and the specific values of preamble sequence cyclic shifts in each preamble sequence cyclic shift set are determined according to the related conditions such as different degrees of frequency offset. During the random access process, a user receives a System Information Block (SIB) transmitted by a base station, and reads a cyclic shift configuration index and a cyclic shift set index contained in the SIB. Eventually, the user selects, according to the cyclic shift set index, one set from all preamble sequence cyclic shift sets, and determines, based on the cyclic shift configuration index, a final cyclic shift from the selected cyclic shift set.

In the method for determining a preamble sequence cyclic shift $N_{cs}$ and the method for generating a preamble sequence provided by the present disclosure, the complex and diverse demands such as coverage in 5G wireless communication systems are satisfied, the intra-cell interference and the inter-cell interference are reduced, and lower access delay and better access experience are provided for users.

It should be understood by those skilled in the art that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present disclosure may be alternated, changed, combined or deleted. Further, the operations, methods, other steps in the flows, measures and solutions already discussed in the present disclosure may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

The foregoing descriptions are merely preferred embodiments of the present disclosure. It should be noted that, for a person of ordinary skill in the art, various modifications and embellishments can be made without departing from the principle of the present disclosure. Such modifications and embellishments shall be regarded as falling into the protection scope of the present disclosure.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be conFig.d for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be conFig.d into a single element or a single element in the description may be conFig.d into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a base station (BS) in a wireless communication system, the method comprising:
    allocating, to a user equipment (UE), bandwidth part (BWP) resources and physical resource block (PRB) resources within the BWP;
    transmitting, to the UE, remaining system information (RMSI) based resource information of downlink BWP; and
    transmitting, to the UE, resource indication information through the RMSI,
    wherein the resource indication information comprises at least one of BWP resource indication information for indicating BWP resources that is allocated by the BS to the UE, intra-BWP PRB resource indication information for indicating intra-BWP PRB resources that is allocated by the BS to the UE, and time domain indication information, and wherein the BWP resource indication information and the intra-BWP PRB resource indication information are arranged adjacent to each other and the BWP resource indication information and the intra-BWP PRB resource indication information are located at the most significant bits (MSBs) within an uplink (UL) grant.

2. The method of claim 1, wherein, the at least one of BWP resource indication information indicates the BWP resource which is allocated by the BS to the UE by at least one of:
a first index value, wherein, the first index value is the index value of the BWP,
a second index value, wherein, the second index value is an index value corresponding to a frequency difference between a frequency location of the BWP and the frequency location of a predefined BWP, wherein, the frequency location comprises a starting frequency location or a central frequency location,
a third index value and a fourth index value, wherein, the third index value is an index value of the BWP which is allocated by the BS to the UE on a first time unit, and the fourth index value is an index value of the BWP which is allocated by the BS to the UE on a second time unit, wherein, the time unit comprises any one of a symbol, a slot, a mini-slot and a subframe, and
a fifth index value and a sixth index value, wherein, the fifth index value is an index value which is corresponding to a difference between the frequency location of the BWP for uplink transmission and allocated by the BS to the UE on the first time unit and the frequency location of a predefined BWP, and the sixth index is an index value which is corresponding to a difference between the frequency location of the BWP for uplink transmission and allocated by the BS to the UE on the second time unit and the frequency location of a predefined BWP, wherein the intra-BWP PRB resource indication information indicates the intra-BWP PRB resources which is allocated by the BS to the UE by at least one of:
resource indication value (RIV),
number of segments of multiple continuous uplink PRB resources allocated by the BS to the UE, and the RIV respectively corresponding to each segment,
bit-map information, wherein, the intra-BWP PRB resource indication information uses a resource block group (RBG) as the unit,
RBG set indication information and bit-map information, wherein, the intra-BWP PRB resource indication information uses a RBG set as the unit,
RBG set resource allocation information and bit group information, wherein, the intra-BWP PRB resource indication information uses the PRB as the unit,
at least one of a number of segments of multiple continuous RBG resources allocated by the BS to the UE, starting location information of each segment of RBG, and length information of each segment of RBG, and
at least one of the number of segments of multiple continuous PRB resources allocated by the BS to the UE, starting location information of each segment of PRB, and length information of each segment of PRB, wherein, the starting location information of each segment of RBG is used for indicating at least one of the following:
a starting location of each segment of RBG resources,
a difference between the starting location of a $0^{th}$ segment of RBG resources and the starting locations of each remaining segment of RBG resources, and
a ratio between the starting location of the $0^{th}$ segment of RBG resources and the starting location of each remaining segment of RBG resources, wherein, the length information of each segment of RBG is used for indicating at least one of the following:
a length of each segment of RBG resources,
a difference between the length of the $0^{th}$ segment of RBG resources and the length of each remaining segment of RBG resources, and
a ratio between the length of the $0^{th}$ segment of RBG resources and the length of each remaining segment of RBG resources, wherein, the starting location information of each segment of PRB is used for indicating at least one of the following:
a starting location of each segment of PRB resources,
a difference between the starting location of a $0^{th}$ segment of PRB resources and the starting location of each remaining segment of PRB resources, and
a ratio between the starting location of the $0^{th}$ segment of PRB resources and the starting location of each remaining segment of PRB resources, and wherein, the length information of each segment of PRB resources is used for indicating at least one of the following:
a length of each segment of PRB resources,
a difference between the length of the $0^{th}$ segment of PRB resources and the length of each remaining segment of PRB resources, and
a ratio between the length of the $0^{th}$ segment of PRB resources and the length of each remaining segment of PRB resources.

3. The method of claim 1, wherein the resource indication information is received through uplink grant information in the UL grant.

4. The method of claim 3, if the uplink grant information comprises frequency hopping indication information, further comprising at least one of:
if there is no frequency hopping indication information in the at least one of BWP resource indication information, determining, based on the at least one of BWP resource indication information in the uplink grant information, BWP resources allocated by the base station;
if there is no frequency hopping indication information in the at least one of BWP resource indication information, determining, based on inter-BWP frequency hopping resource allocation information and the at least one of BWP resource indication information in the intra-BWP inter-PRB resource indication information, the BWPs used for uplink transmission on a first time unit and a second time unit respectively;
if the at least one of BWP resource indication information contains the inter-BWP frequency hopping resource allocation information, determining, based on the intra-BWP frequency hopping resource allocation information and the part, which is not the frequency hopping resource allocation information, of the at least one of BWP resource indication information, the BWPs used for uplink transmission on the first time unit and the second time unit respectively;

if the at least one of BWP resource indication information contains both the inter-BWP frequency hopping resource allocation information and the intra-BWP inter-PRB frequency hopping resource allocation information, determining, based on the inter-BWP frequency hopping resource allocation information and the part, which is not the frequency hopping resource allocation information, of the at least one of BWP resource indication information, the BWPs used for uplink transmission on the first time unit and the second time unit respectively;

if there is frequency hopping indication information in the uplink grant information, further comprising at least one of:

if the intra-BWP PRB resource indication information does not contain the frequency hopping indication information, determining, based on the intra-BWP PRB resource indication information, the intra-BWP PRB resource allocated by the base station;

if the intra-BWP PRB resource indication information does not contain the frequency hopping indication information, determining, based on the intra-BWP inter-PRB frequency hopping resource allocation information in the at least one of BWP resource indication information and the intra-BWP PRB resource indication information, the intra-BWP PRB resources used for uplink transmission on the first time unit and the second time unit respectively;

if the intra-BWP PRB resource indication information contains the intra-BWP inter-PRB frequency hopping resource allocation information, determining, based on the intra-BWP inter-PRB frequency hopping resource allocation information and the part, which is not the frequency hopping resources, of the intra-BWP PRB resource indication information, the intra-BWP PRB resources used for uplink transmission on the first time unit and the second time unit respectively; and if the intra-BWP PRB resource indication information contains both the intra-BWP inter-PRB frequency hopping resource allocation information and the inter-BWP frequency hopping resource allocation information, based on the intra-BWP inter-PRB frequency hopping resource allocation information and the part, which is not the frequency hopping resource allocation information, of the intra-BWP PRB resource indication information, the intra-BWP PRB resources used for uplink transmission on the first time unit and the second time unit respectively.

5. A method for operating a user equipment (UE) in a wireless communication system, the method comprising:

receiving, from a base station (BS), remaining system information (RMSI) based resource information of downlink bandwidth part (BWP);

receiving, from the BS, resource indication information through the RMSI; and transmitting an uplink signal based on the resource indication information, wherein the resource indication information comprises at least one of BWP resource indication information for indicating BWP resources that is allocated by the BS to the UE, intra-BWP physical resource block (PRB) resource indication information for indicating intra-BWP PRB resources that is allocated by the BS to the UE, and time domain indication information, and wherein the BWP resource indication information and the intra-BWP PRB resource indication information are arranged adjacent to each other and the BWP resource indication information and the intra-BWP PRB resource indication information are located at the most significant bits (MSBs) within an uplink (UL) grant.

6. The method of claim 5, wherein the resource indication information is received through uplink grant information in the UL grant.

7. The method of claim 6, if the uplink grant information comprises frequency hopping indication information, further comprising at least one of:

if there is no frequency hopping indication information in the at least one of BWP resource indication information, determining, based on the at least one of BWP resource indication information in the uplink grant information, BWP resources allocated by the base station;

if there is no frequency hopping indication information in the at least one of BWP resource indication information, determining, based on inter-BWP frequency hopping resource allocation information and the at least one of BWP resource indication information in the intra-BWP inter-PRB resource indication information, the BWPs used for uplink transmission on a first time unit and a second time unit respectively;

if the at least one of BWP resource indication information contains the inter-BWP frequency hopping resource allocation information, determining, based on the intra-BWP frequency hopping resource allocation information and the part, which is not the frequency hopping resource allocation information, of the at least one of BWP resource indication information, the BWPs used for uplink transmission on the first time unit and the second time unit respectively;

if the at least one of BWP resource indication information contains both the inter-BWP frequency hopping resource allocation information and the intra-BWP inter-PRB frequency hopping resource allocation information, determining, based on the inter-BWP frequency hopping resource allocation information and the part, which is not the frequency hopping resource allocation information, of the at least one of BWP resource indication information, the BWPs used for uplink transmission on the first time unit and the second time unit respectively;

if there is frequency hopping indication information in the uplink grant information, further comprising at least one of:

if the intra-BWP PRB resource indication information does not contain the frequency hopping indication information, determining, based on the intra-BWP PRB resource indication information, the intra-BWP PRB resource allocated by the base station;

if the intra-BWP PRB resource indication information does not contain the frequency hopping indication information, determining, based on the intra-BWP inter-PRB frequency hopping resource allocation information in the at least one of BWP resource indication information and the intra-BWP PRB resource indication information, the intra-BWP PRB resources used for uplink transmission on the first time unit and the second time unit respectively;

if the intra-BWP PRB resource indication information contains the intra-BWP inter-PRB frequency hopping resource allocation information, determining, based on the intra-BWP inter-PRB frequency hopping resource allocation information and the part, which is not the frequency hopping resources, of the intra-BWP PRB resource indication information, the intra-BWP PRB resources used for uplink transmission on the first time unit and the second time unit respectively; and if the intra-BWP PRB resource indication information contains both the intra-BWP inter-PRB frequency hopping resource allocation information and the inter-BWP frequency hopping resource allocation information, based on the intra-BWP inter-PRB frequency hopping resource allocation information and the part, which is not the frequency hopping resource allocation information, of the intra-BWP PRB resource indication information, the intra-BWP PRB resources used for uplink transmission on the first time unit and the second time unit respectively.

8. The method of claim 5, if the UE acquires the intra-BWP PRB resource indication information only from uplink grant information, further comprising:

if the uplink grant information does not contain frequency hopping indication information, determining the PRB resources used for uplink transmission allocated within an uplink BWP based on the intra-BWP PRB resource indication information acquired in the uplink grant information; and if the uplink grant information contains the frequency hopping indication information, determining, based on the intra-BWP inter-PRB frequency hopping resource allocation information and the part, which is not the frequency hopping resource allocation information, of the intra-BWP PRB resource indication information, the PRB resources used for uplink transmission allocated within the uplink BWP on a first time unit and a second time unit respectively.

9. The method of claim 5, further comprising:

reading, by the UE, the RMSI and acquiring resource information of at least one available uplink BWP, wherein the resource information of each available uplink BWP comprises at least one of a central frequency location of each BWP, a starting frequency location of each BWP, a frequency location difference and the bandwidth of the BWP, wherein, the frequency location difference is a location difference between a central frequency location of the BWP and a central frequency location of a predefined BWP or a location difference between a starting frequency location of the BWP and a starting frequency location of a predefined BWP; and further comprising at least one of:

determining at least one of an index value of the uplink BWP allocated by the base station and the index value corresponding to the frequency location difference based on the at least one of BWP resource indication information carried in an uplink grant information, and determines at least one of the central frequency location, the starting frequency location and the bandwidth of the BWP used for uplink transmission and allocated by the base station based on at least one of the determined index value of the uplink BWP and the index value corresponding to the frequency location difference allocated by the base station and based on the acquired resource information of multiple available uplink BWPs;

determining the indexes respectively corresponding to the two uplink BWPs based on the at least one of BWP resource indication information carried in the uplink grant information, and determines at least one of the central frequency location of the BWP, the starting frequency location and the bandwidth used for uplink transmission on a first time unit and a second time unit based on the determined indexes respectively corresponding to the two uplink BWPs and the index value corresponding to the frequency location difference and based on the acquired resource information of multiple available uplink BWPs;

determining the intra-BWP PRB resources allocated by the base station through a resource indication value (RIV);

determining the intra-BWP PRB resources allocated by the base station through a number of segments of multiple continuous uplink PRB resources allocated by the base station to the UE and the RIV respectively corresponding to each segment;

determining the intra-BWP PRB resources allocated by the base station through bit-map information, wherein, the intra-BWP PRB resource indication information uses a resource block group (RBG) as the unit;

determining the intra-BWP PRB resources allocated by the base station through RBG set indication information and the bit-map information, wherein, the intra-BWP PRB resource indication information uses the RBG set as the unit;

determining the intra-BWP PRB resources allocated by the base station through RBG set resource allocation information and bit group information, wherein, the intra-BWP PRB resource indication information uses the PRB as the unit;

determining the intra-BWP PRB resources allocated by the base station through at least one of a number of segments of multiple continuous RBG resources allocated by the base station to the UE, starting location information of each segment of RBG and length information of each segment of RBG; and determining the intra-BWP PRB resources allocated by the base station through at least one of the number of segments of multiple continuous PRB resources allocated by the base station to the UE, starting location information of each segment of PRB and length information of each segment of PRB.

* * * * *